US012615271B1

(12) United States Patent (10) Patent No.: US 12,615,271 B1
Erlingsson et al. (45) Date of Patent: Apr. 28, 2026

(54) COMPUTE ENVIRONMENT SECURITY MONITORING USING A LIVE STATE SNAPSHOT OF A COMPUTE RESOURCE

(71) Applicant: Fortinet, Inc., Sunnyvale, CA (US)

(72) Inventors: Ulfar Erlingsson, Palo Alto, CA (US); Yijou Chen, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 216 days.

(21) Appl. No.: 18/201,939

(22) Filed: May 25, 2023

Related U.S. Application Data

(63) Continuation-in-part of application No. 18/119,045, filed on Mar. 8, 2023, now Pat. No. 11,882,141, (Continued)

(51) Int. Cl.
*G06F 16/00* (2019.01)
*G06F 9/455* (2018.01)
(Continued)

(52) U.S. Cl.
CPC .......... *H04L 63/1425* (2013.01); *G06F 9/455* (2013.01); *G06F 9/545* (2013.01);
(Continued)

(58) Field of Classification Search
CPC ............. G06F 16/2456; G06F 16/9024; G06F 16/9038; G06F 16/9535; G06F 16/9537;
(Continued)

(56) References Cited

U.S. PATENT DOCUMENTS 6,347,339 B1    2/2002   Morris et al.
6,363,411 B1    3/2002   Dugan et al.
(Continued)

OTHER PUBLICATIONS

BehaviorKI: Behavior Pattern Based Runtime Integrity . . . —IEEE Xplore 2018.*
(Continued)

*Primary Examiner* — Shyue Jiunn Hwa
(74) *Attorney, Agent, or Firm* — Jaffery Watson Hamilton & DeSanctis LLP

(57) ABSTRACT

A data collection system is disclosed to be communicatively coupled to a data platform configured to perform security monitoring of a compute environment. A sub-kernel component of the data collection system may live capture a state snapshot of a compute resource within the compute environment. The live capture of the state snapshot may be performed by updating a master state snapshot with delta state snapshots so as to avoid detectable disruption to the compute resource during the live capture. Based on the state snapshot, the data collection system may determine event data that represents events occurring with respect to the compute resource and may provide the event data to the data platform for use by the data platform in performing the security monitoring of the compute environment. Corresponding methods, systems, and products for compute environment security monitoring using a live state snapshot of a compute resource are also disclosed.

20 Claims, 53 Drawing Sheets

Related U.S. Application Data which is a continuation of application No. 17/510, 179, filed on Oct. 25, 2021, now Pat. No. 11,637,849, which is a continuation of application No. 16/786, 822, filed on Feb. 10, 2020, now Pat. No. 11,157,502, which is a continuation of application No. 16/134, 806, filed on Sep. 18, 2018, now Pat. No. 10,614,071.

(60) Provisional application No. 62/650,971, filed on Mar. 30, 2018, provisional application No. 62/590,986, filed on Nov. 27, 2017, provisional application No. 63/400,999, filed on Aug. 25, 2022.

(51) Int. Cl.

| | |
|---|---|
| *G06F 9/54* | (2006.01) |
| *G06F 16/901* | (2019.01) |
| *G06F 16/9038* | (2019.01) |
| *G06F 16/9535* | (2019.01) |
| *G06F 16/9537* | (2019.01) |
| *G06F 21/57* | (2013.01) |
| *H04L 9/40* | (2022.01) |
| *H04L 43/045* | (2022.01) |
| *H04L 43/06* | (2022.01) |
| *H04L 67/306* | (2022.01) |
| *H04L 67/50* | (2022.01) |
| *G06F 16/2455* | (2019.01) |

(52) U.S. Cl.

CPC ...... *G06F 16/9024* (2019.01); *G06F 16/9038* (2019.01); *G06F 16/9535* (2019.01); *G06F 16/9537* (2019.01); *G06F 21/57* (2013.01); *H04L 43/045* (2013.01); *H04L 43/06* (2013.01); *H04L 63/10* (2013.01); *H04L 67/306* (2013.01); *H04L 67/535* (2022.05); *G06F 16/2456* (2019.01)

(58) Field of Classification Search

CPC .......... G06F 21/57; G06F 9/455; G06F 9/545; G06F 9/542; G06F 16/178; G06F 16/128; G06F 16/27; G06F 9/451; G06F 3/067; G06F 16/23; G06F 16/182; G06F 16/273; G06F 2201/815; G06F 3/065; G06F 16/10; G06F 16/22; G06F 16/235; G06F 16/275; G06F 16/289; G06F 30/327; G06F 30/333; G06F 8/65; G06F 15/16; G06F 11/004; G06F 8/60; G06F 12/126; G06F 16/212; G06F 16/217; G06F 16/284; H04L 43/045; H04L 43/06; H04L 63/1425; H04L 63/10; H04L 41/22; H04L 41/046

See application file for complete search history.

(56) References Cited

U.S. PATENT DOCUMENTS

| | | | |
|---|---|---|---|
| 6,434,663 B1 | 8/2002 | Grimsrud et al. |
| 6,938,084 B2 | 8/2005 | Gamache et al. |
| 7,054,873 B2 | 5/2006 | Nordstroem et al. |
| 7,233,333 B2 | 6/2007 | Lomask |
| 7,310,733 B1 | 12/2007 | Pearson et al. |
| 7,478,246 B2 | 1/2009 | Arndt et al. |
| 7,484,091 B2 | 1/2009 | Bade et al. |
| 7,526,501 B2 | 4/2009 | Albahari et al. |
| 7,529,801 B2 | 5/2009 | Moore et al. |
| 7,562,045 B2 | 7/2009 | Beadle et al. |
| 7,707,411 B2 | 4/2010 | Bade et al. |
| 7,739,211 B2 | 6/2010 | Coffman et al. |
| 7,743,153 B2 | 6/2010 | Hall et al. |
| 7,747,559 B2 | 6/2010 | Leitner et al. |
| 7,765,431 B2 | 7/2010 | Agha et al. |
| 7,797,548 B2 | 9/2010 | Pearson et al. |
| 7,856,544 B2 | 12/2010 | Schenfeld et al. |
| 7,926,026 B2 | 4/2011 | Klein et al. |
| 7,962,635 B2 | 6/2011 | Naidu et al. |
| 7,996,885 B2 | 8/2011 | Jaiswal et al. |
| 8,032,925 B2 | 10/2011 | Cho |
| 8,037,284 B2 | 10/2011 | Schenfeld et al. |
| 8,037,521 B2 | 10/2011 | Minato |
| 8,050,907 B2 | 11/2011 | Baisley et al. |
| 8,086,852 B2 | 12/2011 | Bade et al. |
| 8,140,977 B2 | 3/2012 | Kriss et al. |
| 8,151,107 B2 | 4/2012 | Song et al. |
| 8,160,999 B2 | 4/2012 | Jin et al. |
| 8,209,204 B2 | 6/2012 | Adler et al. |
| 8,276,197 B1 | 9/2012 | Mangal et al. |
| 8,291,233 B2 | 10/2012 | Pearson et al. |
| 8,301,660 B2 | 10/2012 | Yalamanchi |
| 8,341,711 B1 | 12/2012 | Pennington et al. |
| 8,351,456 B2 | 1/2013 | Kadous et al. |
| 8,352,589 B2 | 1/2013 | Ridel et al. |
| 8,359,584 B2 | 1/2013 | Rao et al. |
| 8,490,055 B2 | 7/2013 | Basak |
| 8,497,863 B2 | 7/2013 | Xie et al. |
| 8,549,002 B2 | 10/2013 | Herter et al. |
| 8,561,157 B2 | 10/2013 | Ge |
| 8,595,262 B1 | 11/2013 | Hayden |
| 8,607,306 B1 | 12/2013 | Bridge et al. |
| 8,655,989 B2 | 2/2014 | Ritter et al. |
| 8,725,587 B2 | 5/2014 | Beadle et al. |
| 8,826,403 B2 | 9/2014 | Bhaskaran et al. |
| 8,843,646 B2 | 9/2014 | Kuzin et al. |
| 8,959,608 B2 | 2/2015 | Ahmed et al. |
| 9,043,764 B2 | 5/2015 | Ranganathan et al. |
| 9,053,306 B2 | 6/2015 | Yoshigaki et al. |
| 9,053,437 B2 | 6/2015 | Adler et al. |
| 9,064,210 B1 | 6/2015 | Hart |
| 9,075,618 B2 | 7/2015 | Winternitz et al. |
| 9,110,873 B2 | 8/2015 | Woodall et al. |
| 9,159,024 B2 | 10/2015 | Bhanot et al. |
| 9,189,623 B1 | 11/2015 | Lin et al. |
| 9,225,730 B1 | 12/2015 | Brezinski |
| 9,231,935 B1 | 1/2016 | Bridge et al. |
| 9,239,873 B2 | 1/2016 | Branch et al. |
| 9,246,897 B2 | 1/2016 | He |
| 9,323,806 B2 | 4/2016 | Sadikov et al. |
| 9,369,450 B1 | 6/2016 | Barak et al. |
| 9,391,978 B2 | 7/2016 | Burch et al. |
| 9,400,882 B2 | 7/2016 | Pearson et al. |
| 9,430,830 B2 | 8/2016 | Madabhushi et al. |
| 9,495,522 B2 | 11/2016 | Singh et al. |
| 9,497,224 B2 | 11/2016 | Sweet et al. |
| 9,537,851 B2 | 1/2017 | Gordon et al. |
| 9,569,869 B2 | 2/2017 | Hesse et al. |
| 9,582,766 B2 | 2/2017 | Sadikov et al. |
| 9,589,069 B2 | 3/2017 | Yang et al. |
| 9,591,010 B1 | 3/2017 | Muddu et al. |
| 9,596,254 B1 | 3/2017 | Muddu et al. |
| 9,596,295 B2 | 3/2017 | Banadaki et al. |
| 9,600,915 B2 | 3/2017 | Winternitz et al. |
| 9,602,506 B2 | 3/2017 | Kang et al. |
| 9,602,526 B2 | 3/2017 | Liu et al. |
| 9,639,676 B2 | 5/2017 | Betz et al. |
| 9,652,875 B2 | 5/2017 | Vassilvitskii et al. |
| 9,659,337 B2 | 5/2017 | Lee et al. |
| 9,665,660 B2 | 5/2017 | Wensel |
| 9,667,641 B2 | 5/2017 | Muddu et al. |
| 9,679,243 B2 | 6/2017 | Zou et al. |
| 9,699,205 B2 | 7/2017 | Muddu et al. |
| 9,710,332 B1 | 7/2017 | Fan et al. |
| 9,720,703 B2 | 8/2017 | Reick et al. |
| 9,720,704 B2 | 8/2017 | Reick et al. |
| 9,727,441 B2 | 8/2017 | Agarwal et al. |
| 9,727,604 B2 | 8/2017 | Jin et al. |
| 9,729,416 B1 | 8/2017 | Khanal et al. |
| 9,740,744 B2 | 8/2017 | Stetson et al. |
| 9,741,138 B2 | 8/2017 | Friedlander et al. |
| 9,753,960 B1 | 9/2017 | Troyanovsky |
| 9,760,619 B1 | 9/2017 | Lattanzi et al. |

(56)　　　　　References Cited

U.S. PATENT DOCUMENTS

| | | | |
|---|---|---|---|
| 9,781,115 B2 | 10/2017 | Heise |
| 9,787,705 B1 | 10/2017 | Love et al. |
| 9,805,080 B2 | 10/2017 | Joshi et al. |
| 9,805,140 B2 | 10/2017 | Chakrabarti et al. |
| 9,811,790 B2 | 11/2017 | Ahern et al. |
| 9,813,435 B2 | 11/2017 | Muddu et al. |
| 9,819,671 B2 | 11/2017 | Ji |
| 9,824,473 B2 | 11/2017 | Winternitz et al. |
| 9,830,435 B2 | 11/2017 | Haven |
| 9,836,183 B1 | 12/2017 | Love et al. |
| 9,838,410 B2 | 12/2017 | Muddu et al. |
| 9,843,837 B2 | 12/2017 | Gopalan |
| 9,852,230 B2 | 12/2017 | Fleury et al. |
| 9,864,672 B2 | 1/2018 | Seto et al. |
| 9,887,999 B2 | 2/2018 | Dong et al. |
| 9,923,911 B2 | 3/2018 | Vasseur et al. |
| 9,942,220 B2 | 4/2018 | Bajenov et al. |
| 9,946,800 B2 | 4/2018 | Qian et al. |
| 9,954,842 B2 | 4/2018 | Huang |
| 9,985,827 B2 | 5/2018 | Li |
| 10,003,605 B2 | 6/2018 | Muddu et al. |
| 10,104,071 B2 | 10/2018 | Gordon et al. |
| 10,116,670 B2 | 10/2018 | Muddu et al. |
| 10,121,000 B1 | 11/2018 | Rivlin et al. |
| 10,122,740 B1 | 11/2018 | Finkelshtein et al. |
| 10,148,677 B2 | 12/2018 | Muddu et al. |
| 10,149,148 B2 | 12/2018 | Zha et al. |
| 10,158,652 B2 | 12/2018 | Muddu et al. |
| 10,182,058 B2 | 1/2019 | Xu |
| 10,205,735 B2 | 2/2019 | Apostolopoulos |
| 10,237,254 B2 | 3/2019 | Mcdowell et al. |
| 10,237,294 B1 | 3/2019 | Zadeh et al. |
| 10,243,970 B2 | 3/2019 | Muddu et al. |
| 10,249,266 B2 | 4/2019 | Zamir |
| 10,254,848 B2 | 4/2019 | Winternitz et al. |
| 10,331,659 B2 | 6/2019 | Ahuja et al. |
| 10,338,895 B2 | 7/2019 | Zhang et al. |
| 10,339,309 B1 | 7/2019 | Kling |
| 10,367,704 B2 | 7/2019 | Giura et al. |
| 10,382,303 B2 | 8/2019 | Khanal et al. |
| 10,382,529 B2 | 8/2019 | Wan et al. |
| 10,389,738 B2 | 8/2019 | Muddu et al. |
| 10,419,463 B2 | 9/2019 | Muddu et al. |
| 10,419,465 B2 | 9/2019 | Muddu et al. |
| 10,419,468 B2 | 9/2019 | Glatfelter et al. |
| 10,419,469 B1 | 9/2019 | Singh et al. |
| 10,425,437 B1 | 9/2019 | Bog et al. |
| 10,432,639 B1 | 10/2019 | Bebee et al. |
| 10,447,526 B2 | 10/2019 | Tucker et al. |
| 10,454,753 B2 | 10/2019 | Sasturkar et al. |
| 10,454,889 B2 | 10/2019 | Huang |
| 10,459,979 B2 | 10/2019 | Piechowicz et al. |
| 10,462,169 B2 | 10/2019 | Durairaj et al. |
| 10,491,705 B2 | 11/2019 | Oetting et al. |
| 10,496,263 B2 | 12/2019 | So et al. |
| 10,496,468 B2 | 12/2019 | Gefen et al. |
| 10,496,678 B1 | 12/2019 | Tang |
| 10,505,818 B1 | 12/2019 | Yona et al. |
| 10,510,007 B2 | 12/2019 | Singhal et al. |
| 10,515,095 B2 | 12/2019 | Childress et al. |
| 10,521,584 B1 | 12/2019 | Sharifi Mehr |
| 10,534,633 B2 | 1/2020 | Hilemon et al. |
| 10,541,042 B2 * | 1/2020 | Nelson ................ G06F 11/3698 |
| 10,565,373 B1 | 2/2020 | Rao et al. |
| 10,581,891 B1 | 3/2020 | Kapoor et al. |
| 10,587,609 B2 | 3/2020 | Ebrahimi et al. |
| 10,592,535 B2 | 3/2020 | Ahn et al. |
| 10,599,718 B2 | 3/2020 | Kumar et al. |
| RE47,937 E | 4/2020 | Ramachandran et al. |
| RE47,952 E | 4/2020 | Ramachandran et al. |
| 10,614,200 B2 | 4/2020 | Betz et al. |
| 10,642,867 B2 | 5/2020 | Palanciuc |
| 10,656,979 B2 | 5/2020 | Ishakian et al. |
| 10,664,757 B2 | 5/2020 | Lastras-Montano et al. |
| 10,666,668 B2 | 5/2020 | Muddu et al. |
| 10,673,880 B1 | 6/2020 | Pratt et al. |
| 10,685,295 B1 | 6/2020 | Ross et al. |
| 10,693,900 B2 | 6/2020 | Zadeh et al. |
| 10,698,954 B2 | 6/2020 | Piechowicz et al. |
| 10,701,051 B2 | 6/2020 | Ohsumi |
| 10,754,940 B2 | 8/2020 | Ohsumi |
| 10,756,982 B2 | 8/2020 | Bai et al. |
| 10,771,488 B2 | 9/2020 | Verma et al. |
| 10,775,183 B2 | 9/2020 | Ho et al. |
| 10,776,191 B2 | 9/2020 | Zheng et al. |
| 10,788,570 B2 | 9/2020 | Wilson |
| 10,791,131 B2 | 9/2020 | Nor et al. |
| 10,797,974 B2 | 10/2020 | Giura et al. |
| 10,812,497 B2 | 10/2020 | Venkatramani et al. |
| 10,824,675 B2 | 11/2020 | Alonso et al. |
| 10,824,813 B2 | 11/2020 | Smith et al. |
| 10,885,452 B1 | 1/2021 | Garg |
| 10,904,007 B2 | 1/2021 | Kim et al. |
| 10,904,270 B2 | 1/2021 | Muddu et al. |
| 10,911,470 B2 | 2/2021 | Muddu et al. |
| 10,986,114 B1 | 4/2021 | Singh et al. |
| 11,036,716 B2 | 6/2021 | Griffith et al. |
| 11,036,800 B1 | 6/2021 | Kayyoor et al. |
| 11,044,264 B2 | 6/2021 | Durairaj et al. |
| 11,048,492 B2 | 6/2021 | Jain et al. |
| 11,082,289 B2 | 8/2021 | Dang et al. |
| 11,120,343 B2 | 9/2021 | Das et al. |
| 11,126,533 B2 | 9/2021 | Knowles et al. |
| 11,194,849 B2 | 12/2021 | Lassoued et al. |
| 11,212,299 B2 | 12/2021 | Gamble et al. |
| 11,258,807 B2 | 2/2022 | Muddu et al. |
| 11,281,519 B2 | 3/2022 | Krishnaswamy et al. |
| 11,314,789 B2 | 4/2022 | Goldfarb |
| 11,411,966 B2 | 8/2022 | Muddu et al. |
| 11,431,735 B2 | 8/2022 | Shua |
| 11,463,464 B2 | 10/2022 | Zadeh et al. |
| 11,489,863 B1 | 11/2022 | Shua |
| 11,494,787 B2 | 11/2022 | Erickson et al. |
| 11,544,138 B2 | 1/2023 | Kapish et al. |
| 11,575,693 B1 | 2/2023 | Muddu et al. |
| 11,606,272 B1 | 3/2023 | Popelka et al. |
| 11,636,090 B2 | 4/2023 | Li et al. |
| 11,640,388 B2 | 5/2023 | Yang et al. |
| 11,647,034 B2 | 5/2023 | Levin et al. |
| 11,658,990 B2 | 5/2023 | Shapoury |
| 11,669,571 B2 | 6/2023 | Binkley et al. |
| 11,693,958 B1 | 7/2023 | Steiman |
| 11,722,554 B2 | 8/2023 | Keren et al. |
| 11,734,351 B2 | 8/2023 | Binkley et al. |
| 11,734,419 B1 | 8/2023 | Mackle |
| 11,748,473 B2 | 9/2023 | Araujo et al. |
| 11,755,576 B1 | 9/2023 | Jiang et al. |
| 11,755,602 B2 | 9/2023 | Smith et al. |
| 11,769,098 B2 | 9/2023 | Adinarayan et al. |
| 11,770,387 B1 | 9/2023 | Shivamoggi et al. |
| 2002/0059531 A1 | 5/2002 | Lai |
| 2002/0161889 A1 | 10/2002 | Gamache et al. |
| 2003/0233361 A1 | 12/2003 | Cady |
| 2004/0225929 A1 | 11/2004 | Agha et al. |
| 2005/0060287 A1 | 3/2005 | Hellman et al. |
| 2005/0102365 A1 | 5/2005 | Moore et al. |
| 2005/0108142 A1 | 5/2005 | Beadle et al. |
| 2005/0231760 A1 | 10/2005 | Minato |
| 2005/0246288 A1 | 11/2005 | Kimura et al. |
| 2005/0246521 A1 | 11/2005 | Bade et al. |
| 2006/0025987 A1 | 2/2006 | Baisley et al. |
| 2006/0026419 A1 | 2/2006 | Arndt et al. |
| 2006/0036896 A1 | 2/2006 | Gamache et al. |
| 2006/0090095 A1 | 4/2006 | Massa et al. |
| 2006/0109271 A1 | 5/2006 | Lomask |
| 2007/0130330 A1 | 6/2007 | Ridel et al. |
| 2007/0162605 A1 | 7/2007 | Chalasani et al. |
| 2007/0162963 A1 | 7/2007 | Penet et al. |
| 2007/0168696 A1 | 7/2007 | Ridel et al. |
| 2007/0169175 A1 | 7/2007 | Hall et al. |
| 2007/0214111 A1 | 9/2007 | Jin et al. |
| 2007/0225956 A1 | 9/2007 | Pratt et al. |
| 2007/0266425 A1 | 11/2007 | Cho |
| 2007/0282916 A1 | 12/2007 | Albahari et al. |

(56)  References Cited

U.S. PATENT DOCUMENTS

| | | |
|---|---|---|
| 2008/0034411 A1 | 2/2008 | Aoyama |
| 2008/0065879 A1 | 3/2008 | Song et al. |
| 2008/0072062 A1 | 3/2008 | Pearson et al. |
| 2008/0109730 A1 | 5/2008 | Coffman et al. |
| 2008/0147707 A1 | 6/2008 | Jin et al. |
| 2008/0155335 A1 | 6/2008 | Klein et al. |
| 2008/0244718 A1 | 10/2008 | Frost et al. |
| 2008/0263643 A1 | 10/2008 | Jaiswal et al. |
| 2008/0270451 A1 | 10/2008 | Thomsen et al. |
| 2009/0006843 A1 | 1/2009 | Bade et al. |
| 2009/0007010 A1 | 1/2009 | Kriss et al. |
| 2009/0063857 A1 | 3/2009 | Bade et al. |
| 2009/0165109 A1 | 6/2009 | Hird |
| 2009/0177573 A1 | 7/2009 | Beadle et al. |
| 2009/0222740 A1 | 9/2009 | Yuan |
| 2009/0287720 A1 | 11/2009 | Herter et al. |
| 2009/0307651 A1 | 12/2009 | Senthil et al. |
| 2009/0327328 A1 | 12/2009 | Woodall et al. |
| 2010/0042823 A1 | 2/2010 | Arndt et al. |
| 2010/0217860 A1 | 8/2010 | Naidu et al. |
| 2010/0309206 A1 | 12/2010 | Xie et al. |
| 2010/0329162 A1 | 12/2010 | Kadous et al. |
| 2011/0023098 A1 | 1/2011 | Pearson et al. |
| 2011/0029952 A1 | 2/2011 | Harrington |
| 2011/0119100 A1 | 5/2011 | Ruhl et al. |
| 2011/0154287 A1 | 6/2011 | Mukkamala et al. |
| 2011/0302631 A1 | 12/2011 | Sureshchandra et al. |
| 2012/0054732 A1 | 3/2012 | Jain et al. |
| 2012/0089875 A1 | 4/2012 | Faust et al. |
| 2012/0102029 A1 | 4/2012 | Larson et al. |
| 2012/0143898 A1 | 6/2012 | Bruno et al. |
| 2012/0158858 A1 | 6/2012 | Gkantsidis et al. |
| 2012/0159333 A1 | 6/2012 | Mital et al. |
| 2012/0173541 A1 | 7/2012 | Venkataramani |
| 2012/0317149 A1 | 12/2012 | Jagota et al. |
| 2013/0024412 A1 | 1/2013 | Gong et al. |
| 2013/0067100 A1 | 3/2013 | Kuzin et al. |
| 2013/0081118 A1 | 3/2013 | Ge |
| 2013/0086667 A1 | 4/2013 | Haven |
| 2013/0097320 A1 | 4/2013 | Ritter et al. |
| 2013/0151453 A1 | 6/2013 | Bhanot et al. |
| 2013/0173915 A1 | 7/2013 | Haulund |
| 2013/0219295 A1 | 8/2013 | Feldman et al. |
| 2013/0269007 A1 | 10/2013 | Yoshigaki et al. |
| 2014/0041005 A1 | 2/2014 | He |
| 2014/0067750 A1 | 3/2014 | Ranganathan et al. |
| 2014/0098101 A1 | 4/2014 | Friedlander et al. |
| 2014/0125672 A1 | 5/2014 | Winternitz et al. |
| 2014/0181944 A1 | 6/2014 | Ahmed et al. |
| 2014/0279779 A1 | 9/2014 | Zou et al. |
| 2014/0325631 A1 | 10/2014 | Pearson et al. |
| 2014/0379716 A1 | 12/2014 | Branch et al. |
| 2015/0058619 A1 | 2/2015 | Sweet et al. |
| 2015/0161201 A1 | 6/2015 | Sadikov et al. |
| 2015/0213598 A1 | 7/2015 | Madabhushi et al. |
| 2015/0310649 A1 | 10/2015 | Winternitz et al. |
| 2016/0063226 A1 | 3/2016 | Singh et al. |
| 2016/0120070 A1 | 4/2016 | Myrah et al. |
| 2016/0203411 A1 | 7/2016 | Sadikov et al. |
| 2016/0261544 A1 | 9/2016 | Conover |
| 2016/0330183 A1 | 11/2016 | Mcdowell et al. |
| 2016/0330206 A1 | 11/2016 | Xu |
| 2016/0357521 A1 | 12/2016 | Zhang et al. |
| 2016/0373428 A1 | 12/2016 | Shi |
| 2017/0063830 A1 | 3/2017 | Huang |
| 2017/0063888 A1 | 3/2017 | Muddu et al. |
| 2017/0063903 A1 | 3/2017 | Muddu et al. |
| 2017/0063905 A1 | 3/2017 | Muddu et al. |
| 2017/0063906 A1 | 3/2017 | Muddu et al. |
| 2017/0063908 A1 | 3/2017 | Muddu et al. |
| 2017/0063909 A1 | 3/2017 | Muddu et al. |
| 2017/0063910 A1 | 3/2017 | Muddu et al. |
| 2017/0063911 A1 | 3/2017 | Muddu et al. |
| 2017/0063912 A1 | 3/2017 | Muddu et al. |
| 2017/0070594 A1 | 3/2017 | Oetting et al. |
| 2017/0076206 A1 | 3/2017 | Lastras-Montano et al. |
| 2017/0085553 A1 | 3/2017 | Gordon et al. |
| 2017/0086069 A1 | 3/2017 | Liu |
| 2017/0102961 A1 | 4/2017 | Hilemon et al. |
| 2017/0111245 A1 | 4/2017 | Ishakian et al. |
| 2017/0116315 A1 | 4/2017 | Xiong et al. |
| 2017/0118099 A1 | 4/2017 | Huang |
| 2017/0142140 A1 | 5/2017 | Muddu et al. |
| 2017/0148197 A1 | 5/2017 | Winternitz et al. |
| 2017/0155570 A1 | 6/2017 | Maheshwari et al. |
| 2017/0155672 A1 | 6/2017 | Muthukrishnan et al. |
| 2017/0163666 A1 | 6/2017 | Venkatramani |
| 2017/0223036 A1 | 8/2017 | Muddu et al. |
| 2017/0230183 A1 | 8/2017 | Sweet et al. |
| 2017/0249069 A1 | 8/2017 | Zamir |
| 2017/0257358 A1 | 9/2017 | Ebrahimi et al. |
| 2017/0262521 A1 | 9/2017 | Cho et al. |
| 2017/0277553 A1 | 9/2017 | Zada et al. |
| 2017/0277997 A1 | 9/2017 | Zong et al. |
| 2017/0286190 A1 | 10/2017 | Ishakian et al. |
| 2017/0330096 A1 | 11/2017 | Gupta et al. |
| 2017/0337262 A1 | 11/2017 | Smith et al. |
| 2017/0346683 A1 | 11/2017 | Li et al. |
| 2017/0353853 A1 | 12/2017 | Zha et al. |
| 2017/0359361 A1 | 12/2017 | Modani |
| 2018/0004835 A1 | 1/2018 | Piechowicz et al. |
| 2018/0004859 A1 | 1/2018 | Piechowicz et al. |
| 2018/0007145 A1 | 1/2018 | Piechowicz et al. |
| 2018/0013650 A1 | 1/2018 | Khanal et al. |
| 2018/0019932 A1 | 1/2018 | Giura et al. |
| 2018/0025361 A1 | 1/2018 | Ferrarons Llagostera et al. |
| 2018/0039688 A1 | 2/2018 | Ahn et al. |
| 2018/0067981 A1 | 3/2018 | Ahuja et al. |
| 2018/0069885 A1 | 3/2018 | Patterson et al. |
| 2018/0084069 A1 | 3/2018 | Be'Ery et al. |
| 2018/0089132 A1 | 3/2018 | Atta et al. |
| 2018/0096047 A1 | 4/2018 | Childress et al. |
| 2018/0097793 A1 | 4/2018 | Agarwal et al. |
| 2018/0123864 A1 | 5/2018 | Tucker et al. |
| 2018/0139200 A1 | 5/2018 | Gordon et al. |
| 2018/0191781 A1 | 7/2018 | Palani et al. |
| 2018/0211425 A1 | 7/2018 | Winternitz et al. |
| 2018/0219888 A1 | 8/2018 | Apostolopoulos |
| 2018/0219897 A1 | 8/2018 | Muddu et al. |
| 2018/0227286 A1 | 8/2018 | Ohsumi |
| 2018/0336351 A1* | 11/2018 | Jeffries .................. G06F 21/53 |
| 2018/0359162 A1 | 12/2018 | Savov et al. |
| 2019/0042879 A1 | 2/2019 | Munoz |
| 2019/0042950 A1 | 2/2019 | Lin et al. |
| 2019/0050445 A1 | 2/2019 | Griffith et al. |
| 2019/0058626 A1 | 2/2019 | Knowles et al. |
| 2019/0075126 A1 | 3/2019 | Muddu et al. |
| 2019/0087480 A1 | 3/2019 | Palanciuc |
| 2019/0101622 A1 | 4/2019 | Wilson |
| 2019/0149553 A1 | 5/2019 | Xu |
| 2019/0158524 A1 | 5/2019 | Zadeh et al. |
| 2019/0163555 A1 | 5/2019 | Zheng et al. |
| 2019/0227860 A1 | 7/2019 | Gefen et al. |
| 2019/0312796 A1 | 10/2019 | Giura et al. |
| 2019/0312898 A1 | 10/2019 | Verma et al. |
| 2019/0327251 A1 | 10/2019 | Muddu et al. |
| 2019/0342282 A1 | 11/2019 | Carbune et al. |
| 2019/0342307 A1 | 11/2019 | Gamble et al. |
| 2019/0342311 A1 | 11/2019 | Muddu et al. |
| 2019/0354554 A1 | 11/2019 | Piechowicz et al. |
| 2019/0356555 A1 | 11/2019 | Bai et al. |
| 2019/0364067 A1 | 11/2019 | Yona et al. |
| 2020/0014718 A1 | 1/2020 | Durairaj et al. |
| 2020/0021607 A1 | 1/2020 | Muddu et al. |
| 2020/0065857 A1 | 2/2020 | Lagi et al. |
| 2020/0074341 A1 | 3/2020 | He et al. |
| 2020/0080856 A1 | 3/2020 | Ho et al. |
| 2020/0175042 A1 | 6/2020 | Batruni |
| 2020/0175361 A1 | 6/2020 | Che et al. |
| 2020/0228555 A1 | 7/2020 | Wittenschlaeger |
| 2020/0287923 A1 | 9/2020 | Raghavendra et al. |
| 2020/0287927 A1 | 9/2020 | Zadeh et al. |
| 2020/0320106 A1 | 10/2020 | Goldfarb |
| 2020/0334293 A1 | 10/2020 | Piechowicz et al. |

(56) References Cited

U.S. PATENT DOCUMENTS

| | | |
|---|---|---|
| 2020/0351151 A1 | 11/2020 | Dang et al. |
| 2020/0404008 A1 | 12/2020 | Venkatramani et al. |
| 2020/0412752 A1 | 12/2020 | Shapoury |
| 2021/0019209 A1 | 1/2021 | Krishnaswamy et al. |
| 2021/0232420 A1 | 7/2021 | Dhruvakumar et al. |
| 2021/0286798 A1 | 9/2021 | Li et al. |
| 2021/0294798 A1 | 9/2021 | Binkley et al. |
| 2021/0329019 A1 | 10/2021 | Shua |
| 2021/0336976 A1 | 10/2021 | Shua |
| 2021/0377287 A1 | 12/2021 | Shua |
| 2021/0406917 A1 | 12/2021 | Erickson et al. |
| 2022/0004718 A1 | 1/2022 | Quamar et al. |
| 2022/0050840 A1 | 2/2022 | Parravicini et al. |
| 2022/0058193 A1 | 2/2022 | Smith et al. |
| 2022/0067186 A1 | 3/2022 | Thakur et al. |
| 2022/0086179 A1 | 3/2022 | Levin et al. |
| 2022/0092481 A1 | 3/2022 | Neithalath et al. |
| 2022/0121741 A1 | 4/2022 | Araujo et al. |
| 2022/0124108 A1 | 4/2022 | Gamble et al. |
| 2022/0129803 A1 | 4/2022 | Bikumala et al. |
| 2022/0191226 A1 | 6/2022 | Chan et al. |
| 2022/0327119 A1 | 10/2022 | Gasper et al. |
| 2022/0342690 A1 | 10/2022 | Shua |
| 2022/0345480 A1 | 10/2022 | Shua |
| 2022/0345481 A1 | 10/2022 | Shua |
| 2022/0345483 A1 | 10/2022 | Shua |
| 2022/0350789 A1 | 11/2022 | Yang et al. |
| 2022/0350931 A1 | 11/2022 | Shua |
| 2022/0374800 A1 | 11/2022 | Adinarayan et al. |
| 2022/0376970 A1 | 11/2022 | Chawathe et al. |
| 2022/0382611 A1 | 12/2022 | Kapish et al. |
| 2022/0394082 A1 | 12/2022 | Keren et al. |
| 2022/0414072 A1 | 12/2022 | Tandon et al. |
| 2022/0414105 A1 | 12/2022 | Umay et al. |
| 2023/0025252 A1 | 1/2023 | Erickson et al. |
| 2023/0039566 A1 | 2/2023 | Ghag et al. |
| 2023/0052827 A1 | 2/2023 | Araujo et al. |
| 2023/0088960 A1 | 3/2023 | Popelka et al. |
| 2023/0096930 A1 | 3/2023 | Dasdan |
| 2023/0101773 A1 | 3/2023 | Katahanas et al. |
| 2023/0138371 A1 | 5/2023 | Bandukwala et al. |
| 2023/0244523 A1 | 8/2023 | Gorantla et al. |
| 2023/0251960 A1 | 8/2023 | Sharma et al. |
| 2023/0275909 A1 | 8/2023 | Shivamoggi et al. |
| 2023/0291755 A1 | 9/2023 | Siebel et al. |

OTHER PUBLICATIONS

Analyzing server snapshots with kernel snapshot . . . Feb. 4, 2019.*

Amidon, et al., "Program Fracture and Recombination for Efficient Automatic Code Reuse", 2015 IEEE High Performance Extreme Computing Conference (HPEC), (2015), pp. 1-6, doi: 10.1109/HPEC.2015.7396314.

Long, et al., "Automatic Input Rectification", 2012 34th International Conference on Software Engineering (ICSE), (2012), pp. 80-90, doi: 10.1109/ICSE.2012.6227204.

Perkins, et al., "Automatically Patching Errors in Deployed Software", SOSP '09: Proceedings of the ACM SIGOPS 22nd symposium on Operating systems principles, Oct. 2009, p. 87-102, https://doi.org/10.1145/1629575.1629585.

Rinard, "Living in the Comfort Zone", OOPSLA'07, Oct. 21-25, 2007, Montreal, Quebec, Canada, pp. 611-622.

Rinard, "Manipulating Program Functionality to Eliminate Security Vulnerabilities", Moving Target Defense. Springer, New York, NY, (2011). pp. 109-115.

Samuel, et al., "Let's Parse to Prevent Pwnage Invited Position Paper", LEET'12: Proceedings of the 5th USENIX conference on Large-Scale Exploits and Emergent Threats, Apr. 2012, pp. 3-6.

Shen, et al., "Active Learning for Inference and Regeneration of Applications that Access Databases", ACM Trans. Program. Lang. Syst. 42, 4, Article 18 (Jan. 2021), 119 pages, https://doi.org/10.1145/3430952.

Vasilakis, et al., "Supply-Chain Vulnerability Elimination via Active Learning and Regeneration", Proceedings of the 2021 Acm Sigsac Conference on Computer and Communications Security (CCS '21), Nov. 15-19, 2021, Virtual Event, Republic of Korea. ACM, New York, Ny, USA, 16 pages, https://doi.org/10.1145/3460120.3484736.

* cited by examiner

200

Receive packet.                                                                                      201

Get connection information associated with packet.                                                   202

Determine process associated with connection.                                                        203

Determine information about process (e.g., parents, binary, user).                                   204

Transmit information.                                                                                 205

227

Connections: 7
Sent:10.5 KB
Received: 29.3 KB

TCP: 100%

228

Update_engine (7)

Update.core-os.net

225

226

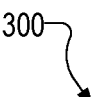
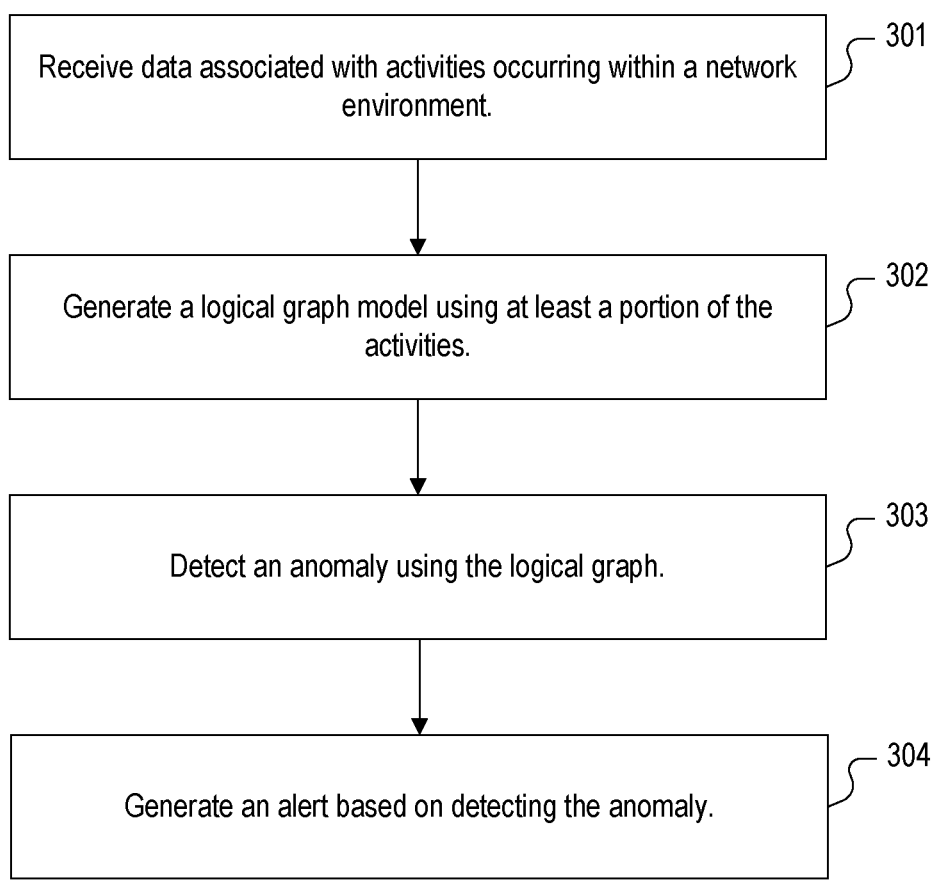
Receive data associated with activities occurring within a network environment.    301
Generate a logical graph model using at least a portion of the activities.    302
Detect an anomaly using the logical graph.    303
Generate an alert based on detecting the anomaly.    304
Fig. 3A

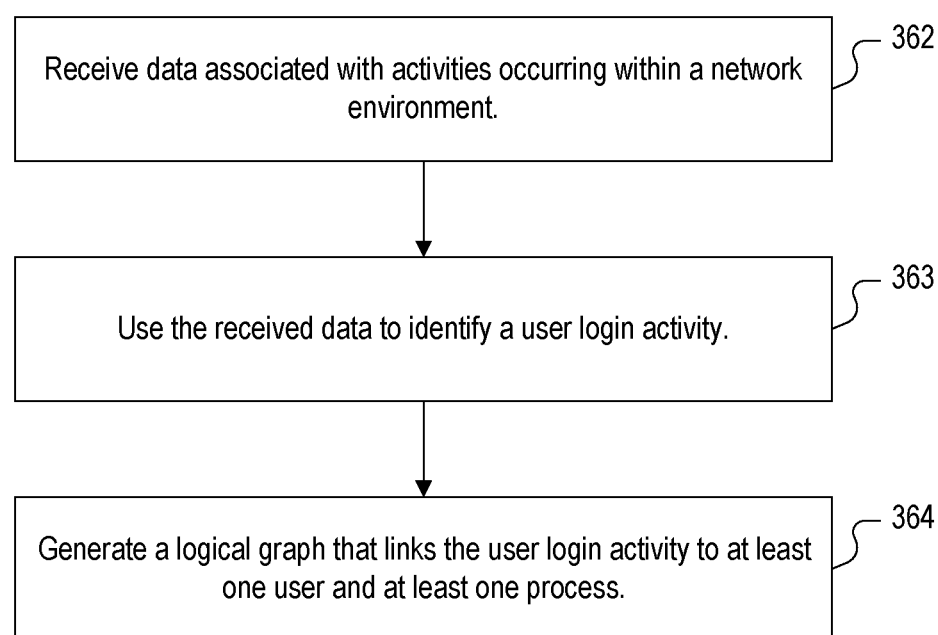
361
Receive data associated with activities occurring within a network environment.    362
Use the received data to identify a user login activity.    363
Generate a logical graph that links the user login activity to at least one user and at least one process.    364
Fig. 3H

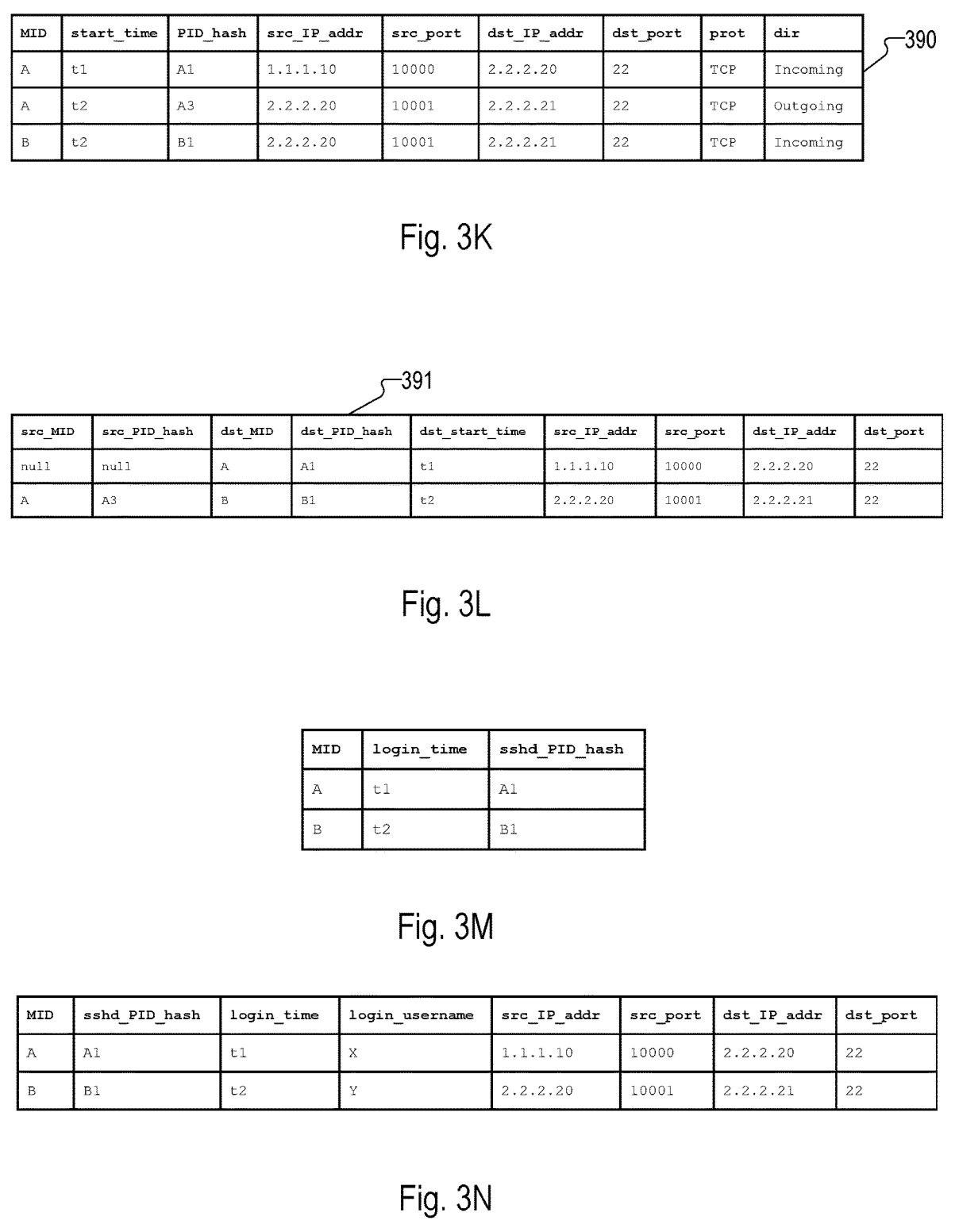

| MID | start_time | PID_hash | src_IP_addr | src_port | dst_IP_addr | dst_port | prot | dir |
|-----|-----------|----------|-------------|----------|-------------|----------|------|-----|
| A | t1 | A1 | 1.1.1.10 | 10000 | 2.2.2.20 | 22 | TCP | Incoming |
| A | t2 | A3 | 2.2.2.20 | 10001 | 2.2.2.21 | 22 | TCP | Outgoing |
| B | t2 | B1 | 2.2.2.20 | 10001 | 2.2.2.21 | 22 | TCP | Incoming |

| src_MID | src_PID_hash | dst_MID | dst_PID_hash | dst_start_time | src_IP_addr | src_port | dst_IP_addr | dst_port |
|---------|--------------|---------|--------------|----------------|-------------|----------|-------------|----------|
| null | null | A | A1 | t1 | 1.1.1.10 | 10000 | 2.2.2.20 | 22 |
| A | A3 | B | B1 | t2 | 2.2.2.20 | 10001 | 2.2.2.21 | 22 |

Fig. 3L

| MID | login_time | sshd_PID_hash |
|-----|-----------|---------------|
| A | t1 | A1 |
| B | t2 | B1 |

Fig. 3M

| MID | sshd_PID_hash | login_time | login_username | src_IP_addr | src_port | dst_IP_addr | dst_port |
|-----|---------------|-----------|----------------|-------------|----------|-------------|----------|
| A | A1 | t1 | X | 1.1.1.10 | 10000 | 2.2.2.20 | 22 |
| B | B1 | t2 | Y | 2.2.2.20 | 10001 | 2.2.2.21 | 22 |

Fig. 3N

| MID | start_time | PID_hash | exe_path | parent_PID_hash |
|-----|-----------|----------|----------|-----------------|
| A | t1 | A1 | /usr/sbin/sshd | A0 |
| A | t1 | A2 | /bin/bash | A1 |
| A | t2 | A3 | /usr/bin/ssh | A2 |
| B | t2 | B1 | /usr/sbin/sshd | B0 |
| B | t2 | B2 | /bin/bash | B1 |
| B | t3 | B3 | /usr/bin/curl | B2 |

Fig. 3O

| MID | sshd_PID_hash | PID_hash |
|-----|---------------|----------|
| A | A1 | A1 |
| A | A1 | A2 |
| A | A1 | A3 |
| B | B1 | B1 |
| B | B1 | B2 |
| B | B1 | B3 |

Fig. 3P

| parent_MID | parent_sshd_PID_hash | child_MID | origin_sshd_PID_hash |
|------------|----------------------|-----------|----------------------|
| A | A1 | B | B1 |

Fig. 3Q

| MID | sshd_PID_hash | parent_MID | parent_sshd_PID_hash | origin_MID | origin_sshd_PID_hash |
|-----|---------------|------------|----------------------|------------|----------------------|
| A | A1 | null | null | A | A1 |
| B | B1 | A | A1 | A | A1 |

393 — Receive log data associated with at least one user session associated with an original user.

394 — Use the received log data to generate a logical graph.

395 — Use the logical graph to detect an anomaly.

396 — Generate alert.

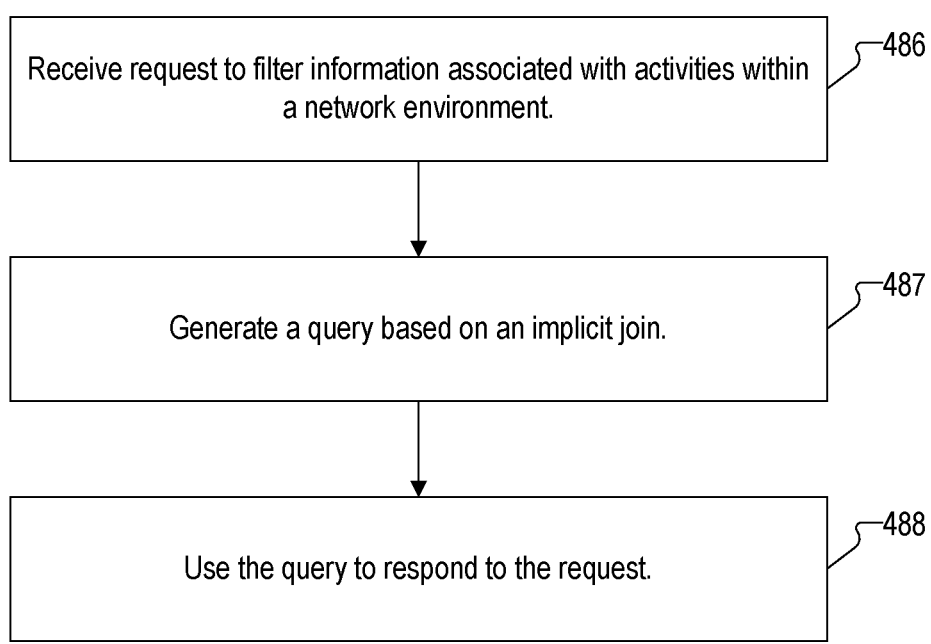
485
Receive request to filter information associated with activities within a network environment.    486
Generate a query based on an implicit join.    487
Use the query to respond to the request.    488
Fig. 4L

COMPUTE ENVIRONMENT SECURITY MONITORING USING A LIVE STATE SNAPSHOT OF A COMPUTE RESOURCE

RELATED APPLICATIONS

This application is a continuation-in-part application of U.S. patent application Ser. No. 18/119,045 filed on Mar. 8, 2023, which is a continuation of U.S. patent application Ser. No. 17/510,179 filed on Oct. 25, 2021, now U.S. Pat. No. 11,637,849, which is a continuation of U.S. patent application Ser. No. 16/786,822 filed Feb. 10, 2020, now U.S. Pat. No. 11,157,502, which is a continuation of U.S. patent application Ser. No. 16/134,806 filed Sep. 18, 2018, now U.S. Pat. No. 10,614,071, which claims priority to U.S. Provisional Patent Application No. 62/590,986 filed Nov. 27, 2017 and U.S. Provisional Patent Application No. 62/650,971 filed Mar. 30, 2018, each of which is hereby incorporated by reference in its entirety. This application also claims priority under 35 U.S.C. § 119(e) to U.S. Provisional Patent Application No. 63/400,999, filed Aug. 25, 2022, which is incorporated herein by reference in its entirety.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 2I illustrates an example of a portion of a polygraph as rendered in an interface.

FIG. 2O illustrates an example of a machine server graph as rendered in an interface.

FIG. 3A illustrates an example of a process for detecting anomalies in a network environment.

FIG. 3H illustrates an example of a process for performing extended user tracking.

FIG. 3K illustrates example records.

FIG. 3L illustrates example output from performing an ssh connection match.

FIG. 3M illustrates example records.

FIG. 3N illustrates example records.

FIG. 3O illustrates example records.

FIG. 3P illustrates example records.

FIG. 3Q illustrates an adjacency relationship between two login sessions.

FIG. 3R illustrates example records.

FIG. 4I illustrates an example of a dossier for an event.

FIG. 4L illustrates an example of a process for dynamically generating and executing a query.

DETAILED DESCRIPTION

Various illustrative embodiments are described herein with reference to the accompanying drawings. It will, however, be evident that various modifications and changes may be made thereto, and additional embodiments may be implemented, without departing from the scope of the invention as set forth in the claims. For example, certain features of one embodiment described herein may be combined with or substituted for features of another embodiment described herein. The description and drawings are accordingly to be regarded in an illustrative rather than a restrictive sense.

Figure 1A:
FIG. 1A shows an illustrative configuration in which a data platform is configured to perform various operations with respect to a cloud environment that includes a plurality of compute assets.

FIG. 1A shows an illustrative configuration 10 in which a data platform 12 is configured to perform various operations with respect to a cloud environment 14 that includes a plurality of compute assets 16-1 through 16-N (collectively "compute assets 16"). For example, data platform 12 may include data ingestion resources 18 configured to ingest data from cloud environment 14 into data platform 12, data processing resources 20 configured to perform data processing operations with respect to the data, and user interface resources 22 configured to provide one or more external users and/or compute resources (e.g., computing device 24) with access to an output of data processing resources 20. Each of these resources are described in detail herein.

Cloud environment 14 may include any suitable network-based computing environment as may serve a particular application. For example, cloud environment 14 may be implemented by one or more compute resources provided and/or otherwise managed by one or more cloud service providers, such as Amazon Web Services (AWS), Google Cloud Platform (GCP), Microsoft Azure, and/or any other cloud service provider configured to provide public and/or private access to network-based compute resources. While FIG. 1A shows that compute assets 16 are included in a cloud environment, compute assets 16 may be may be deployed in any compute environment such as cloud environment 14 and/or a non-cloud environment (e.g., a local datacenter).

Compute assets 16 may include, but are not limited to, containers (e.g., container images, deployed and executing container instances, etc.), virtual machines, workloads, applications, processes, physical machines, compute nodes, clusters of compute nodes, software runtime environments (e.g., container runtime environments), and/or any other virtual and/or physical compute resource that may reside in and/or be executed by one or more computer resources in cloud environment 14. In some examples, one or more compute assets 16 may reside in one or more datacenters.

A compute asset 16 may be associated with (e.g., owned, deployed, or managed by) a particular entity, such as a customer or client of cloud environment 14 and/or data platform 12. Accordingly, for purposes of the discussion herein, cloud environment 14 may be used by one or more entities.

Data platform 12 may be configured to perform one or more data security monitoring and/or remediation services, compliance monitoring services, anomaly detection services, DevOps services, compute asset management services, and/or any other type of data analytics service as may serve a particular implementation. Data platform 12 may be managed or otherwise associated with any suitable data platform provider, such as a provider of any of the data analytics services described herein. The various resources included in data platform 12 may reside in the cloud and/or be located on-premises and be implemented by any suitable combination of physical and/or virtual compute resources, such as one or more computing devices, microservices, applications, etc.

Data ingestion resources 18 may be configured to ingest data from cloud environment 14 into data platform 12. This may be performed in various ways, some of which are described in detail herein. For example, as illustrated by arrow 26, data ingestion resources 18 may be configured to receive the data from one or more agents deployed within cloud environment 14, utilize an event streaming platform (e.g., Kafka) to obtain the data, and/or pull data (e.g., configuration data) from cloud environment 14. In some examples, data ingestion resources 18 may obtain the data using one or more agentless configurations.

The data ingested by data ingestion resources 18 from cloud environment 14 may include any type of data as may serve a particular implementation. For example, the data may include data representative of configuration information associated with compute assets 16, information about one or more processes running on compute assets 16, network activity information, information about events (creation events, modification events, communication events, user-initiated events, etc.) that occur with respect to compute assets 16, etc. In some examples, the data may or may not include actual customer data processed or otherwise generated by compute assets 16.

As illustrated by arrow 28, data ingestion resources 18 may be configured to load the data ingested from cloud environment 14 into a data store 30. Data store 30 is illustrated in FIG. 1A as being separate from and communicatively coupled to data platform 12. However, in some alternative embodiments, data store 30 is included within data platform 12.

Data store 30 may be implemented by any suitable data warehouse, data lake, data mart, and/or other type of database structure as may serve a particular implementation. Such data stores may be proprietary or may be embodied as vendor provided products or services such as, for example, Snowflake, Google BigQuery, Druid, Amazon Redshift, IBM Db2, Dremio, Databricks Lakehouse Platform, Cloudera, Azure Synapse Analytics, and others.

Although the examples described herein largely relate to embodiments where data is collected from agents and ultimately stored in a data store such as those provided by Snowflake, in other embodiments data that is collected from agents and other sources may be stored in different ways. For example, data that is collected from agents and other sources may be stored in a data warehouse, data lake, data mart, and/or any other data store.

A data warehouse may be embodied as an analytic database (e.g., a relational database) that is created from two or more data sources. Such a data warehouse may be leveraged to store historical data, often on the scale of petabytes. Data warehouses may have compute and memory resources for running complicated queries and generating reports. Data warehouses may be the data sources for business intelligence ('BI') systems, machine learning applications, and/or other applications. By leveraging a data warehouse, data that has been copied into the data warehouse may be indexed for good analytic query performance, without affecting the write performance of a database (e.g., an Online Transaction Processing ('OLTP') database). Data warehouses also enable joining data from multiple sources for analysis. For example, a sales OLTP application probably has no need to know about the weather at various sales locations, but sales predictions could take advantage of that data. By adding historical weather data to a data warehouse, it would be possible to factor it into models of historical sales data.

Data lakes, which store files of data in their native format, may be considered as "schema on read" resources. As such, any application that reads data from the lake may impose its own types and relationships on the data. Data warehouses, on the other hand, are "schema on write," meaning that data types, indexes, and relationships are imposed on the data as it is stored in an enterprise data warehouse (EDW). "Schema on read" resources may be beneficial for data that may be used in several contexts and poses little risk of losing data. "Schema on write" resources may be beneficial for data that has a specific purpose, and good for data that must relate properly to data from other sources. Such data stores may include data that is encrypted using homomorphic encryption, data encrypted using privacy-preserving encryption, smart contracts, non-fungible tokens, decentralized finance, and other techniques.

Data marts may contain data oriented towards a specific business line whereas data warehouses contain enterprise-wide data. Data marts may be dependent on a data warehouse, independent of the data warehouse (e.g., drawn from an operational database or external source), or a hybrid of the two. In embodiments described herein, different types of data stores (including combinations thereof) may be leveraged.

Data processing resources 20 may be configured to perform various data processing operations with respect to data ingested by data ingestion resources 18, including data ingested and stored in data store 30. For example, data processing resources 20 may be configured to perform one or more data security monitoring and/or remediation operations, compliance monitoring operations, anomaly detection operations, DevOps operations, compute asset management operations, and/or any other type of data analytics operation as may serve a particular implementation. Various examples of operations performed by data processing resources 20 are described herein.

As illustrated by arrow 32, data processing resources 20 may be configured to access data in data store 30 to perform the various operations described herein. In some examples, this may include performing one or more queries with respect to the data stored in data store 30. Such queries may be generated using any suitable query language.

In some examples, the queries provided by data processing resources 20 may be configured to direct data store 30 to perform one or more data analytics operations with respect to the data stored within data store 30. These data analytics operations may be with respect to data specific to a particular entity (e.g., data residing in one or more silos within data store 30 that are associated with a particular customer) and/or data associated with multiple entities. For example, data processing resources 20 may be configured to analyze data associated with a first entity and use the results of the analysis to perform one or more operations with respect to a second entity.

One or more operations performed by data processing resources 20 may be performed periodically according to a predetermined schedule. For example, one or more operations may be performed by data processing resources 20 every hour or any other suitable time interval. Additionally or alternatively, one or more operations performed by data processing resources 20 may be performed in substantially real-time (or near real-time) as data is ingested into data platform 12. In this manner, the results of such operations (e.g., one or more detected anomalies in the data) may be provided to one or more external entities (e.g., computing device 24 and/or one or more users) in substantially real-time and/or in near real-time.

User interface resources 22 may be configured to perform one or more user interface operations, examples of which are described herein. For example, user interface resources 22 may be configured to present one or more results of the data processing performed by data processing resources 20 to one or more external entities (e.g., computing device 24 and/or one or more users), as illustrated by arrow 34. As illustrated by arrow 36, user interface resources 22 may access data in data store 30 to perform the one or more user interface operations.

Figure 1B:
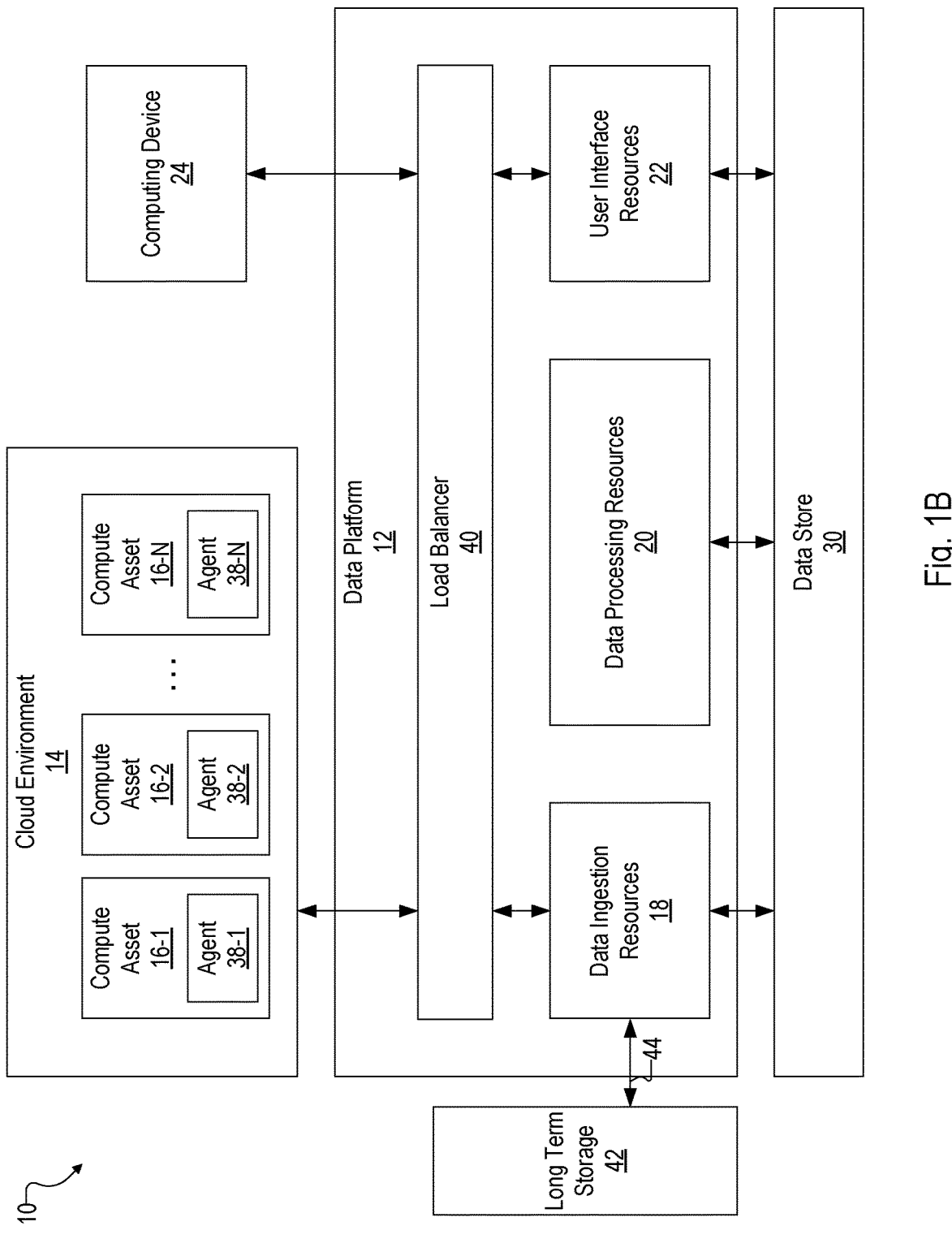
FIG. 1B shows an illustrative implementation of the configuration of FIG. 1A.

FIG. 1B illustrates an implementation of configuration 10 in which an agent 38 (e.g., agent 38-1 through agent 38-N) is installed on each of compute assets 16. As used herein, an agent may include a self-contained binary and/or other type of code or application that can be run on any appropriate platforms, including within containers and/or other virtual compute assets. Agents 38 may monitor the nodes on which they execute for a variety of different activities, including but not limited to, connection, process, user, machine, and file activities. In some examples, agents 38 can be executed in user space, and can use a variety of kernel modules (e.g., auditd, iptables, netfilter, pcap, etc.) to collect data. Agents can be implemented in any appropriate programming language, such as C or Golang, using applicable kernel APIs.

Agents 38 may be deployed in any suitable manner. For example, an agent 38 may be deployed as a containerized application or as part of a containerized application. As described herein, agents 38 may selectively report information to data platform 12 in varying amounts of detail and/or with variable frequency.

Also shown in FIG. 1B is a load balancer 40 configured to perform one or more load balancing operations with respect to data ingestion operations performed by data ingestion resources 18 and/or user interface operations performed by user interface resources 22. Load balancer 40 is shown to be included in data platform 12. However, load balancer 40 may alternatively be located external to data platform 12. Load balancer 40 may be implemented by any suitable microservice, application, and/or other computing resources. In some alternative examples, data platform 12 may not utilize a load balancer such as load balancer 40.

Also shown in FIG. 1B is long term storage 42 with which data ingestion resources 18 may interface, as illustrated by arrow 44. Long term storage 42 may be implemented by any suitable type of storage resources, such as cloud-based storage (e.g., AWS S3, etc.) and/or on-premises storage and may be used by data ingestion resources 18 as part of the data ingestion process. Examples of this are described herein. In some examples, data platform 12 may not utilize long term storage 42.

The embodiments described herein can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the principles described herein. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 1C:
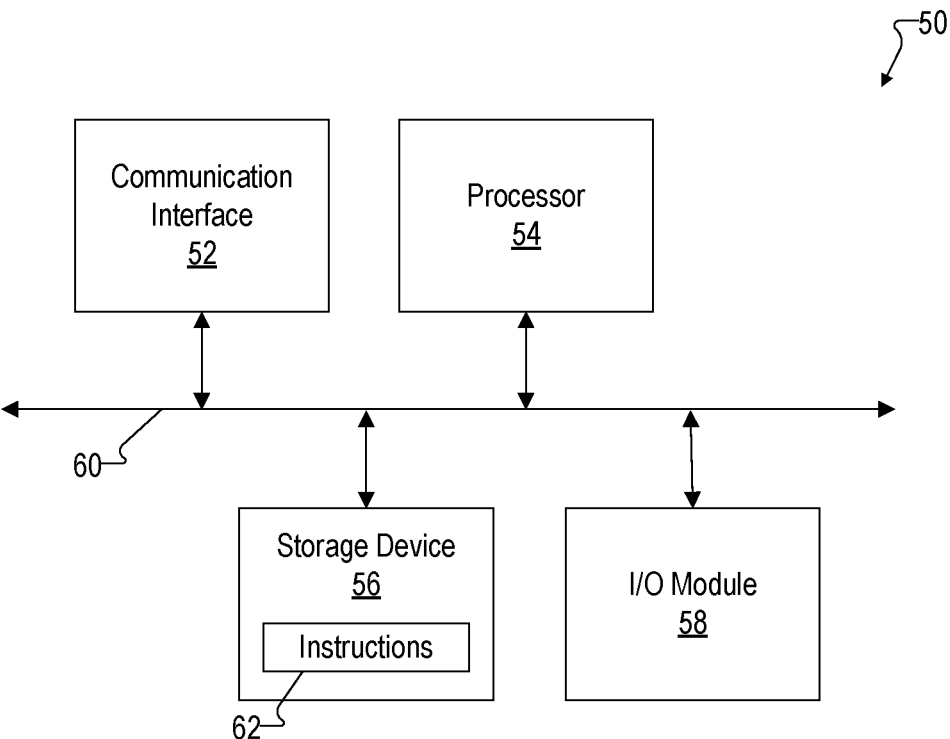
FIG. 1C illustrates an example computing device.

FIG. 1C illustrates an example computing device 50 that may be specifically configured to perform one or more of the processes described herein. Any of the systems, microservices, computing devices, and/or other components described herein may be implemented by computing device 50.

As shown in FIG. 1C, computing device 50 may include a communication interface 52, a processor 54, a storage device 56, and an input/output ("I/O") module 58 communicatively connected one to another via a communication infrastructure 60. While an exemplary computing device 50 is shown in FIG. 1C, the components illustrated in FIG. 1C are not intended to be limiting. Additional or alternative components may be used in other embodiments. Components of computing device 50 shown in FIG. 1C will now be described in additional detail.

Communication interface 52 may be configured to communicate with one or more computing devices. Examples of communication interface 52 include, without limitation, a wired network interface (such as a network interface card), a wireless network interface (such as a wireless network interface card), a modem, an audio/video connection, and any other suitable interface.

Processor 54 generally represents any type or form of processing unit capable of processing data and/or interpreting, executing, and/or directing execution of one or more of the instructions, processes, and/or operations described herein. Processor 54 may perform operations by executing computer-executable instructions 62 (e.g., an application, software, code, and/or other executable data instance) stored in storage device 56.

Storage device 56 may include one or more data storage media, devices, or configurations and may employ any type, form, and combination of data storage media and/or device. For example, storage device 56 may include, but is not limited to, any combination of the non-volatile media and/or volatile media described herein. Electronic data, including data described herein, may be temporarily and/or permanently stored in storage device 56. For example, data representative of computer-executable instructions 62 configured to direct processor 54 to perform any of the operations described herein may be stored within storage device 56. In some examples, data may be arranged in one or more databases residing within storage device 56.

I/O module 58 may include one or more I/O modules configured to receive user input and provide user output. I/O module 58 may include any hardware, firmware, software, or combination thereof supportive of input and output capabilities. For example, I/O module 58 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 58 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 58 is configured to provide graphical data to a display for presentation to a user. The graphical data may be representative of one or more graphical user interfaces and/or any other graphical content as may serve a particular implementation.

Figure 1D:
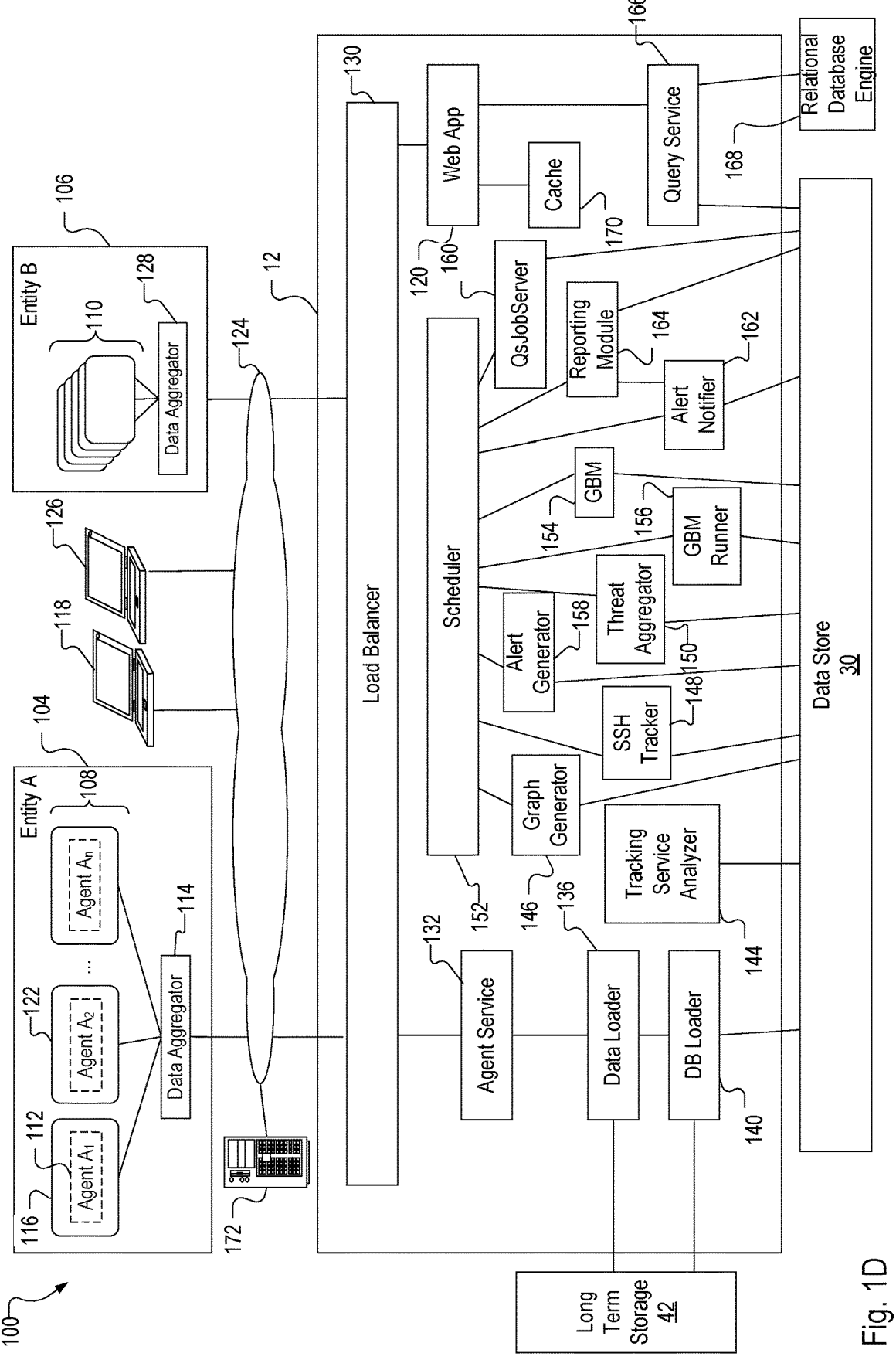
FIG. 1D illustrates an example of an environment in which activities that occur within datacenters are modeled.

FIG. 1D illustrates an example implementation 100 of configuration 10. As such, one or more components shown in FIG. 1D may implement one or more components shown in FIG. 1A and/or FIG. 1B. In particular, implementation 100 illustrates an environment in which activities that occur within datacenters are modeled using data platform 12. Using techniques described herein, a baseline of datacenter activity can be modeled, and deviations from that baseline can be identified as anomalous. Anomaly detection can be beneficial in a security context, a compliance context, an asset management context, a DevOps context, and/or any other data analytics context as may serve a particular implementation.

Two example datacenters (104 and 106) are shown in FIG. 1D, and are associated with (e.g., belong to) entities named entity A and entity B, respectively. A datacenter may include dedicated equipment (e.g., owned and operated by entity A, or owned/leased by entity A and operated exclusively on entity A's behalf by a third party). A datacenter can also include cloud-based resources, such as infrastructure as a service (IaaS), platform as a service (PaaS), and/or software as a service (SaaS) elements. The techniques described herein can be used in conjunction with multiple types of datacenters, including ones wholly using dedicated equipment, ones that are entirely cloud-based, and ones that use a mixture of both dedicated equipment and cloud-based resources.

Both datacenter 104 and datacenter 106 include a plurality of nodes, depicted collectively as set of nodes 108 and set of nodes 110, respectively, in FIG. 1D. These nodes may implement compute assets 16. Installed on each of the nodes are in-server/in-virtual-machine (VM)/embedded-in-IoT device agents (e.g., agent 112), which are configured to collect data and report it to data platform 12 for analysis. As described herein, agents may be small, self-contained binaries that can be run on any appropriate platforms, including virtualized ones (and, as applicable, within containers). Agents may monitor the nodes on which they execute for a variety of different activities, including: connection, process, user, machine, and file activities. Agents can be executed in user space, and can use a variety of kernel modules (e.g., auditd, iptables, netfilter, pcap, etc.) to collect data. Agents can be implemented in any appropriate programming language, such as C or Golang, using applicable kernel APIs.

As described herein, agents can selectively report information to data platform 12 in varying amounts of detail and/or with variable frequency. As is also described herein, the data collected by agents may be used by data platform 12 to create polygraphs, which are graphs of logical entities, connected by behaviors. In some embodiments, agents report information directly to data platform 12. In other embodiments, at least some agents provide information to a data aggregator, such as data aggregator 114, which in turn provides information to data platform 12. The functionality of a data aggregator can be implemented as a separate binary or other application (distinct from an agent binary), and can also be implemented by having an agent execute in an "aggregator mode" in which the designated aggregator node acts as a Layer 7 proxy for other agents that do not have access to data platform 12. Further, a chain of multiple aggregators can be used, if applicable (e.g., with agent 112 providing data to data aggregator 114, which in turn provides data to another aggregator (not pictured) which provides data to data platform 12). An example way to implement an aggregator is through a program written in an appropriate language, such as C or Golang.

Use of an aggregator can be beneficial in sensitive environments (e.g., involving financial or medical transactions) where various nodes are subject to regulatory or other architectural requirements (e.g., prohibiting a given node from communicating with systems outside of datacenter 104). Use of an aggregator can also help to minimize security exposure more generally. As one example, by limiting communications with data platform 12 to data aggregator 114, individual nodes in nodes 108 need not make external network connections (e.g., via Internet 124), which can potentially expose them to compromise (e.g., by other external devices, such as device 118, operated by a criminal). Similarly, data platform 12 can provide updates, configuration information, etc., to data aggregator 114 (which in turn distributes them to nodes 108), rather than requiring nodes 108 to allow incoming connections from data platform 12 directly.

Another benefit of an aggregator model is that network congestion can be reduced (e.g., with a single connection being made at any given time between data aggregator 114 and data platform 12, rather than potentially many different connections being open between various of nodes 108 and data platform 12). Similarly, network consumption can also be reduced (e.g., with the aggregator applying compression techniques/bundling data received from multiple agents).

One example way that an agent (e.g., agent 112, installed on node 116) can provide information to data aggregator 114 is via a REST API, formatted using data serialization protocols such as Apache Avro. One example type of information sent by agent 112 to data aggregator 114 is status information. Status information may be sent by an agent periodically (e.g., once an hour or once any other predetermined amount of time). Alternatively, status information may be sent continuously or in response to occurrence of one or more events. The status information may include, but is not limited to, a. an amount of event backlog (in bytes) that has not yet been transmitted, b. configuration information, c. any data loss period for which data was dropped, d. a cumulative count of errors encountered since the agent started, e. version information for the agent binary, and/or f. cumulative statistics on data collection (e.g., number of network packets processed, new processes seen, etc.).

A second example type of information that may be sent by agent 112 to data aggregator 114 is event data (described in more detail herein), which may include a UTC timestamp for each event. As applicable, the agent can control the amount of data that it sends to the data aggregator in each call (e.g., a maximum of 10 MB) by adjusting the amount of data sent to manage the conflicting goals of transmitting data as soon as possible, and maximizing throughput. Data can also be compressed or uncompressed by the agent (as applicable) prior to sending the data.

Each data aggregator may run within a particular customer environment. A data aggregator (e.g., data aggregator 114) may facilitate data routing from many different agents (e.g., agents executing on nodes 108) to data platform 12. In various embodiments, data aggregator 114 may implement a SOCKS 5 caching proxy through which agents can connect to data platform 12. As applicable, data aggregator 114 can encrypt (or otherwise obfuscate) sensitive information prior to transmitting it to data platform 12, and can also distribute key material to agents which can encrypt the information (as applicable). Data aggregator 114 may include a local storage, to which agents can upload data (e.g., pcap packets). The storage may have a key-value interface. The local storage can also be omitted, and agents configured to upload data to a cloud storage or other storage area, as applicable. Data aggregator 114 can, in some embodiments, also cache locally and distribute software upgrades, patches, or configuration information (e.g., as received from data platform 12).

Various examples associated with agent data collection and reporting will now be described.

In the following example, suppose that a user (e.g., a network administrator) at entity A (hereinafter "user A") has decided to begin using the services of data platform 12. In some embodiments, user A may access a web frontend (e.g., web app 120) using a computer 126 and enrolls (on behalf of entity A) an account with data platform 12. After enrollment is complete, user A may be presented with a set of installers, pre-built and customized for the environment of entity A, that user A can download from data platform 12 and deploy on nodes 108. Examples of such installers include, but are not limited to, a Windows executable file, an iOS app, a Linux package (e.g., .deb or .rpm), a binary, or a container (e.g., a Docker container). When a user (e.g., a network administrator) at entity B (hereinafter "user B") also signs up for the services of data platform 12, user B may be similarly presented with a set of installers that are pre-built and customized for the environment of entity B.

User A deploys an appropriate installer on each of nodes 108 (e.g., with a Windows executable file deployed on a Windows-based platform or a Linux package deployed on a Linux platform, as applicable). As applicable, the agent can be deployed in a container. Agent deployment can also be performed using one or more appropriate automation tools, such as Chef, Puppet, Salt, and Ansible. Deployment can also be performed using managed/hosted container management/orchestration frameworks such as Kubernetes, Mesos, and/or Docker Swarm.

In various embodiments, the agent may be installed in the user space (i.e., is not a kernel module), and the same binary is executed on each node of the same type (e.g., all Windows-based platforms have the same Windows-based binary installed on them). An illustrative function of an agent, such as agent 112, is to collect data (e.g., associated with node 116) and report it (e.g., to data aggregator 114). Other tasks that can be performed by agents include data configuration and upgrading.

One approach to collecting data as described herein is to collect virtually all information available about a node (and, e.g., the processes running on it). Alternatively, the agent may monitor for network connections, and then begin collecting information about processes associated with the network connections, using the presence of a network packet associated with a process as a trigger for collecting additional information about the process. As an example, if a user of node 116 executes an application, such as a calculator application, which does not typically interact with the network, no information about use of that application may be collected by agent 112 and/or sent to data aggregator 114. If, however, the user of node 116 executes an ssh command (e.g., to ssh from node 116 to node 122), agent 112 may collect information about the process and provide associated information to data aggregator 114. In various embodiments, the agent may always collect/report information about certain events, such as privilege escalation, irrespective of whether the event is associated with network activity.

Figure 2A:
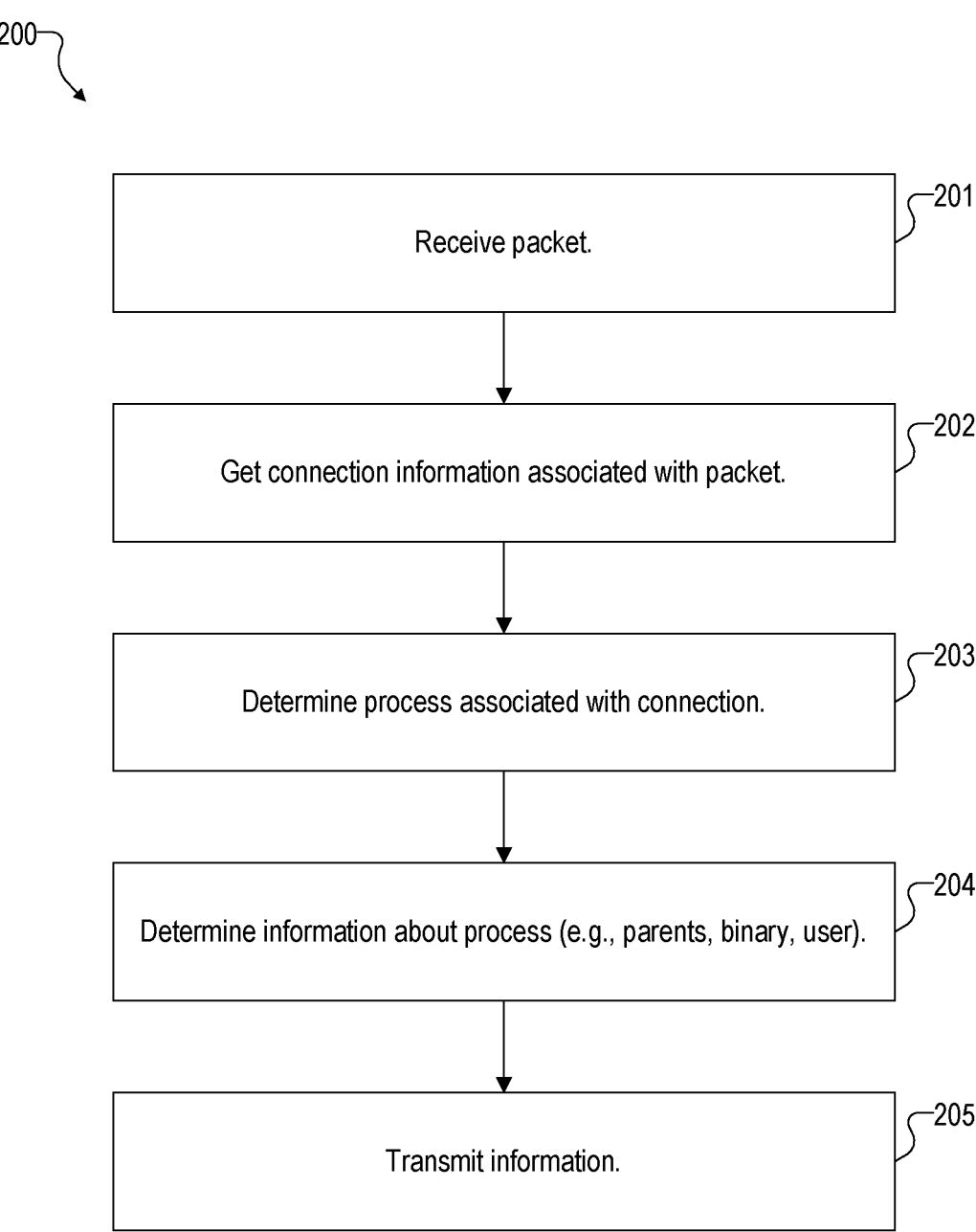
FIG. 2A illustrates an example of a process, used by an agent, to collect and report information about a client.

An approach to collecting information (e.g., by an agent) is as follows, and described in conjunction with process 200 depicted in FIG. 2A. An agent (e.g., agent 112) monitors its node (e.g., node 116) for network activity. One example way that agent 112 can monitor node 116 for network activity is by using a network packet capture tool (e.g., listening using libpcap). As packets are received (201), the agent obtains and maintains (e.g., in an in-memory cache) connection information associated with the network activity (202). Examples of such information include DNS query/response, TCP, UDP, and IP information.

The agent may also determine a process associated with the network connection (203). One example approach is for the agent to use a kernel network diagnostic API (e.g., netlink_diag) to obtain inode/process information from the kernel. Another example approach is for the agent to scan using netstat (e.g., on/proc/net/tcp, /proc/net/tcp6, /proc/net/udp, and/proc/net/udp6) to obtain sockets and relate them to processes. Information such as socket state (e.g., whether a socket is connected, listening, etc.) can also be collected by the agent.

One way an agent can obtain a mapping between a given inode and a process identifier is to scan within the/proc/pid directory. For each of the processes currently running, the agent examines each of their file descriptors. If a file descriptor is a match for the inode, the agent can determine that the process associated with the file descriptor owns the inode. Once a mapping is determined between an inode and a process identifier, the mapping is cached. As additional packets are received for the connection, the cached process information is used (rather than a new search being performed).

In some cases, exhaustively scanning for an inode match across every file descriptor may not be feasible (e.g., due to CPU limitations). In various embodiments, searching through file descriptors is accordingly optimized. User filtering is one example of such an optimization. A given socket is owned by a user. Any processes associated with the socket will be owned by the same user as the socket. When matching an inode (identified as relating to a given socket) against processes, the agent can filter through the processes and only examine the file descriptors of processes sharing the same user owner as the socket. In various embodiments, processes owned by root are always searched against (e.g., even when user filtering is employed).

Another example of an optimization is to prioritize searching the file descriptors of certain processes over others. One such prioritization is to search through the subdirectories of/proc/starting with the youngest process. One approximation of such a sort order is to search through/proc/in reverse order (e.g., examining highest numbered processes first). Higher numbered processes are more likely to be newer (i.e., not long-standing processes), and thus more likely to be associated with new connections (i.e., ones for which inode-process mappings are not already cached). In some cases, the most recently created process may not have the highest process identifier (e.g., due to the kernel wrapping through process identifiers).

Another example prioritization is to query the kernel for an identification of the most recently created process and to search in a backward order through the directories in/proc/ (e.g., starting at the most recently created process and working backwards, then wrapping to the highest value (e.g., 32768) and continuing to work backward from there). An alternate approach is for the agent to keep track of the newest process that it has reported information on (e.g., to data aggregator 114), and begin its search of/proc/in a forward order starting from the PID of that process.

Another example prioritization is to maintain, for each user actively using node 116, a list of the five (or any other number) most recently active processes. Those processes are more likely than other processes (less active, or passive) on node 116 to be involved with new connections, and can thus be searched first. For many processes, lower valued file descriptors tend to correspond to non-sockets (e.g., stdin, stdout, stderr). Yet another optimization is to preferentially search higher valued file descriptors (e.g., across processes) over lower valued file descriptors (that are less likely to yield matches).

In some cases, while attempting to locate a process identifier for a given inode, an agent may encounter a socket that does not correspond to the inode being matched against and is not already cached. The identity of that socket (and its corresponding inode) can be cached, once discovered, thus removing a future need to search for that pair.

In some cases, a connection may terminate before the agent is able to determine its associated process (e.g., due to a very short-lived connection, due to a backlog in agent processing, etc.). One approach to addressing such a situation is to asynchronously collect information about the connection using the audit kernel API, which streams information to user space. The information collected from the audit API (which can include PID/inode information) can be matched by the agent against pcap/inode information. In some embodiments, the audit API is always used, for all connections. However, due to CPU utilization considerations, use of the audit API can also be reserved for short/otherwise problematic connections (and/or omitted, as applicable).

Once the agent has determined which process is associated with the network connection (203), the agent can then collect additional information associated with the process (204). As will be described in more detail below, some of the collected information may include attributes of the process (e.g., a process parent hierarchy, and an identification of a binary associated with the process). As will also be described in more detail below, other of the collected information is derived (e.g., session summarization data and hash values).

The collected information is then transmitted (205), e.g., by an agent (e.g., agent 112) to a data aggregator (e.g., data aggregator 114), which in turn provides the information to data platform 12. In some embodiments, all information collected by an agent may be transmitted (e.g., to a data aggregator and/or to data platform 12). In other embodiments, the amount of data transmitted may be minimized (e.g., for efficiency reasons), using various techniques.

One approach to minimizing the amount of data flowing from agents (such as agents installed on nodes 108) to data platform 12 is to use a technique of implicit references with unique keys. The keys can be explicitly used by data platform 12 to extract/derive relationships, as necessary, in a data set at a later time, without impacting performance.

As previously mentioned, some data collected about a process is constant and does not change over the lifetime of the process (e.g., attributes), and some data changes (e.g., statistical information and other variable information). Constant data can be transmitted (205) once, when the agent first becomes aware of the process. And, if any changes to the constant data are detected (e.g., a process changes its parent), a refreshed version of the data can be transmitted (205) as applicable.

In some examples, an agent may collect variable data (e.g., data that may change over the lifetime of the process). In some examples, variable data can be transmitted (205) at periodic (or other) intervals. Alternatively, variable data may be transmitted in substantially real time as it is collected. In some examples, the variable data may indicate a thread count for a process, a total virtual memory used by the process, the total resident memory used by the process, the total time spent by the process executing in user space, and/or the total time spent by the process executing in kernel space. In some examples, the data may include a hash that may be used within data platform 12 to join process creation time attributes with runtime attributes to construct a full dataset.

Below are additional examples of data that an agent, such as agent 112, can collect and provide to data platform 12.

1. User Data

Core User Data: user name, UID (user ID), primary group, other groups, home directory.

Failed Login Data: IP address, hostname, username, count.

User Login Data: user name, hostname, IP address, start time, TTY (terminal), UID (user ID), GID (group ID), process, end time.

2. Machine Data

Dropped Packet Data: source IP address, destination IP address, destination port, protocol, count.

Machine Data: hostname, domain name, architecture, kernel, kernel release, kernel version, OS, OS version, OS description, CPU, memory, model number, number of cores, last boot time, last boot reason, tags (e.g., Cloud provider tags such as AWS, GCP, or Azure tags), default router, interface name, interface hardware address, interface IP address and mask, promiscuous mode.

3. Network Data

Network Connection Data: source IP address, destination IP address, source port, destination port, protocol, start time, end time, incoming and outgoing bytes, source process, destination process, direction of connection, histograms of packet length, inter packet delay, session lengths, etc.

Listening Ports in Server: source IP address, port number, protocol, process.

Dropped Packet Data: source IP address, destination IP address, destination port, protocol, count.

Arp Data: source hardware address, source IP address, destination hardware address, destination IP address.

DNS Data: source IP address, response code, response string, question (request), packet length, final answer (response).

4. Application Data

Package Data: exe path, package name, architecture, version, package path, checksums (MD5, SHA-1, SHA-256), size, owner, owner ID.

Application Data: command line, PID (process ID), start time, UID (user ID), EUID (effective UID), PPID (parent process ID), PGID (process group ID), SID (session ID), exe path, username, container ID.

5. Container Data

Container Image Data: image creation time, parent ID, author, container type, repo, (AWS) tags, size, virtual size, image version.

Container Data: container start time, container type, container name, container ID, network mode, privileged, PID mode, IP addresses, listening ports, volume map, process ID.

6. File Data

File path, file data hash, symbolic links, file creation data, file change data, file metadata, file mode.

As mentioned above, an agent, such as agent 112, can be deployed in a container (e.g., a Docker container), and can also be used to collect information about containers. Collection about a container can be performed by an agent irrespective of whether the agent is itself deployed in a container or not (as the agent can be deployed in a container running in a privileged mode that allows for monitoring).

Agents can discover containers (e.g., for monitoring) by listening for container create events (e.g., provided by Docker), and can also perform periodic ordered discovery scans to determine whether containers are running on a node. When a container is discovered, the agent can obtain attributes of the container, e.g., using standard Docker API calls (e.g., to obtain IP addresses associated with the container, whether there's a server running inside, what port it is listening on, associated PIDs, etc.). Information such as the parent process that started the container can also be collected, as can information about the image (which comes from the Docker repository).

In various embodiments, agents may use namespaces to determine whether a process is associated with a container. Namespaces are a feature of the Linux kernel that can be used to isolate resources of a collection of processes. Examples of namespaces include process ID (PID) namespaces, network namespaces, and user namespaces. Given a process, the agent can perform a fast lookup to determine whether the process is part of the namespace the container claims to be its namespace.

As mentioned, agents can be configured to report certain types of information (e.g., attribute information) once, when the agent first becomes aware of a process. In various embodiments, such static information is not reported again (or is reported once a day, every twelve hours, etc.), unless it changes (e.g., a process changes its parent, changes its owner, or a SHA-1 of the binary associated with the process changes).

In contrast to static/attribute information, certain types of data change constantly (e.g., network-related data). In various embodiments, agents are configured to report a list of current connections every minute (or other appropriate time interval). In that connection list will be connections that started in that minute interval, connections that ended in that minute interval, and connections that were ongoing throughout the minute interval (e.g., a one minute slice of a one hour connection).

In various embodiments, agents are configured to collect/compute statistical information about connections (e.g., at the one minute level of granularity and or at any other time interval). Examples of such information include, for the time interval, the number of bytes transferred, and in which direction. Another example of information collected by an agent about a connection is the length of time between packets. For connections that span multiple time intervals (e.g., a seven minute connection), statistics may be calculated for each minute of the connection. Such statistical information (for all connections) can be reported (e.g., to a data aggregator) once a minute.

In various embodiments, agents are also configured to maintain histogram data for a given network connection, and provide the histogram data (e.g., in the Apache Avro data exchange format) under the Connection event type data. Examples of such histograms include: 1. a packet length histogram (packet_len_hist), which characterizes network packet distribution; 2. a session length histogram (session_len_hist), which characterizes a network session length; 3. a session time histogram (session_time_hist), which characterizes a network session time; and 4. a session switch time histogram (session_switch_time_hist), which characterizes network session switch time (i.e., incoming→outgoing and vice versa). For example, histogram data may include one or more of the following fields: 1. count, which provides a count of the elements in the sampling; 2. sum, which provides a sum of elements in the sampling; 3. max, which provides the highest value element in the sampling; 4. std_dev, which provides the standard deviation of elements in the sampling; and 5. buckets, which provides a discrete sample bucket distribution of sampling data (if applicable).

For some protocols (e.g., HTTP), typically, a connection is opened, a string is sent, a string is received, and the connection is closed. For other protocols (e.g., NFS), both sides of the connection engage in a constant chatter. Histograms allow data platform 12 to model application behavior (e.g., using machine learning techniques), for establishing baselines, and for detecting deviations. As one example, suppose that a given HTTP server typically sends/receives 1,000 bytes (in each direction) whenever a connection is made with it. If a connection generates 500 bytes of traffic, or 2,000 bytes of traffic, such connections would be considered within the typical usage pattern of the server. Suppose, however, that a connection is made that results in 10G of traffic. Such a connection is anomalous and can be flagged accordingly.

Returning to FIG. 1D, as previously mentioned, data aggregator 114 may be configured to provide information (e.g., collected from nodes 108 by agents) to data platform 12. Data aggregator 128 may be similarly configured to provide information to data platform 12. As shown in FIG. 1D, both aggregator 114 and aggregator 128 may connect to a load balancer 130, which accepts connections from aggregators (and/or as applicable, agents), as well as other devices, such as computer 126 (e.g., when it communicates with web app 120), and supports fair balancing. In various embodiments, load balancer 130 is a reverse proxy that load balances accepted connections internally to various microservices (described in more detail below), allowing for services provided by data platform 12 to scale up as more agents are added to the environment and/or as more entities subscribe to services provided by data platform 12. Example ways to implement load balancer 130 include, but are not limited to, using HaProxy, using nginx, and using elastic load balancing (ELB) services made available by Amazon.

Agent service 132 is a microservice that is responsible for accepting data collected from agents (e.g., provided by aggregator 114). In various embodiments, agent service 132 uses a standard secure protocol, such as HTTPS to communicate with aggregators (and, as applicable, agents), and receives data in an appropriate format such as Apache Avro. When agent service 132 receives an incoming connection, it can perform a variety of checks, such as to see whether the data is being provided by a current customer, and whether the data is being provided in an appropriate format. If the data is not appropriately formatted (and/or is not provided by a current customer), it may be rejected.

If the data is appropriately formatted, agent service 132 may facilitate copying the received data to a streaming data stable storage using a streaming service (e.g., Amazon Kinesis and/or any other suitable streaming service). Once the ingesting into the streaming service is complete, agent service 132 may send an acknowledgement to the data provider (e.g., data aggregator 114). If the agent does not receive such an acknowledgement, it is configured to retry sending the data to data platform 12. One way to implement agent service 132 is as a REST API server framework (e.g., Java DropWizard), configured to communicate with Kinesis (e.g., using a Kinesis library).

In various embodiments, data platform 12 uses one or more streams (e.g., Kinesis streams) for all incoming customer data (e.g., including data provided by data aggregator 114 and data aggregator 128), and the data is sharded based on the node (also referred to herein as a "machine") that originated the data (e.g., node 116 vs. node 122), with each node having a globally unique identifier within data platform 12. Multiple instances of agent service 132 can write to multiple shards.

Kinesis is a streaming service with a limited period (e.g., 1-7 days). To persist data longer than a day, the data may be copied to long term storage 42 (e.g., S3). Data loader 136 is a microservice that is responsible for picking up data from a data stream (e.g., a Kinesis stream) and persisting it in long term storage 42. In one example embodiment, files collected by data loader 136 from the Kinesis stream are placed into one or more buckets, and segmented using a combination of a customer identifier and time slice. Given a particular time segment, and a given customer identifier, the corresponding file (stored in long term storage) contains five minutes (or another appropriate time slice) of data collected at that specific customer from all of the customer's nodes. Data loader 136 can be implemented in any appropriate programming language, such as Java or C, and can be configured to use a Kinesis library to interface with Kinesis. In various embodiments, data loader 136 uses the Amazon Simple Queue Service (SQS) (e.g., to alert DB loader 140 that there is work for it to do).

DB loader 140 is a microservice that is responsible for loading data into an appropriate data store 30, such as SnowflakeDB or Amazon Redshift, using individual per-customer databases. In particular, DB loader 140 is configured to periodically load data into a set of raw tables from files created by data loader 136 as per above. DB loader 140 manages throughput, errors, etc., to make sure that data is loaded consistently and continuously. Further, DB loader 140 can read incoming data and load into data store 30 data that is not already present in tables of data store 30 (also referred to herein as a database). DB loader 140 can be implemented in any appropriate programming language, such as Java or C, and an SQL framework such as jOOQ (e.g., to manage SQLs for insertion of data), and SQL/JDBC libraries. In some examples, DB loader 140 may use Amazon S3 and Amazon Simple Queue Service (SQS) to manage files being transferred to and from data store 30.

Customer data included in data store 30 can be augmented with data from additional data sources, such as AWS Cloud-Trail and/or other types of external tracking services. To this end, data platform may include a tracking service analyzer 144, which is another microservice. Tracking service analyzer 144 may pull data from an external tracking service (e.g., Amazon CloudTrail) for each applicable customer account, as soon as the data is available. Tracking service analyzer 144 may normalize the tracking data as applicable, so that it can be inserted into data store 30 for later querying/analysis. Tracking service analyzer 144 can be written in any appropriate programming language, such as Java or C. Tracking service analyzer 144 also makes use of SQL/JDBC libraries to interact with data store 30 to insert/query data.

As described herein, data platform 12 can model activities that occur within datacenters, such as datacenters 104 and 106. The model may be stable over time, and differences, even subtle ones (e.g., between a current state of the datacenter and the model) can be surfaced. The ability to surface such anomalies can be particularly beneficial in datacenter environments where rogue employees and/or external attackers may operate slowly (e.g., over a period of months), hoping that the elastic nature of typical resource use (e.g., virtualized servers) will help conceal their nefarious activities.

Using techniques described herein, data platform 12 can automatically discover entities (which may implement compute assets 16) deployed in a given datacenter. Examples of entities include workloads, applications, processes, machines, virtual machines, containers, files, IP addresses, domain names, and users. The entities may be grouped together logically (into analysis groups) based on behaviors, and temporal behavior baselines can be established. In particular, using techniques described herein, periodic graphs can be constructed (also referred to herein as poly-graphs), in which the nodes are applicable logical entities, and the edges represent behavioral relationships between the logical entities in the graph. Baselines can be created for every node and edge.

Communication (e.g., between applications/nodes) is one example of a behavior. A model of communications between processes is an example of a behavioral model. As another example, the launching of applications is another example of a behavior that can be modeled. The baselines may be periodically updated (e.g., hourly) for every entity. Additionally or alternatively, the baselines may be continuously updated in substantially real-time as data is collected by agents. Deviations from the expected normal behavior can then be detected and automatically reported (e.g., as anomalies or threats detected). Such deviations may be due to a desired change, a misconfiguration, or malicious activity. As applicable, data platform 12 can score the detected deviations (e.g., based on severity and threat posed). Additional examples of analysis groups include models of machine communications, models of privilege changes, and models of insider behaviors (monitoring the interactive behavior of human users as they operate within the datacenter).

Two example types of information collected by agents are network level information and process level information. As previously mentioned, agents may collect information about every connection involving their respective nodes. And, for each connection, information about both the server and the client may be collected (e.g., using the connection-to-process identification techniques described above). DNS queries and responses may also be collected. The DNS query information can be used in logical entity graphing (e.g., collapsing many different IP addresses to a single service—e.g., s3.amazon.com). Examples of process level information collected by agents include attributes (user ID, effective user ID, and command line). Information such as what user/application is responsible for launching a given process and the binary being executed (and its SHA-256 values) may also be provided by agents.

The dataset collected by agents across a datacenter can be very large, and many resources (e.g., virtual machines, IP addresses, etc.) are recycled very quickly. For example, an IP address and port number used at a first point in time by a first process on a first virtual machine may very rapidly be used (e.g., an hour later) by a different process/virtual machine.

Figure 2B:
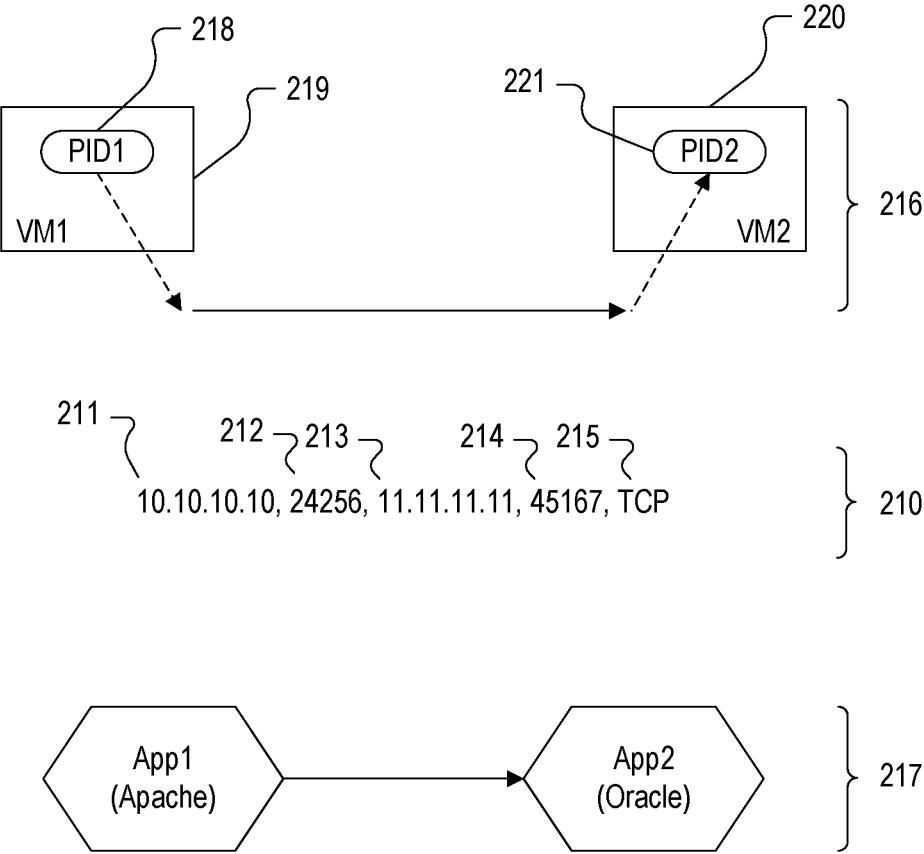
FIG. 2B illustrates a 5-tuple of data collected by an agent, physically and logically.

A dataset (and elements within it) can be considered at both a physical level, and a logical level, as illustrated in FIG. 2B. In particular, FIG. 2B illustrates an example 5-tuple of data 210 collected by an agent, represented physically (216) and logically (217). The 5-tuple includes a source address 211, a source port 212, a destination address 213, a destination port 214, and a protocol 215. In some cases, port numbers (e.g., 212, 214) may be indicative of the nature of a connection (e.g., with certain port usage standardized). However, in many cases, and in particular in datacenters, port usage is ephemeral. For example, a Docker container can listen on an ephemeral port, which is unrelated to the service it will run. When another Docker container starts (for the same service), the port may well be different. Similarly, particularly in a virtualized environment, IP addresses may be recycled frequently (and are thus also potentially ephemeral) or could be NATed, which makes identification difficult.

A physical representation of the 5-tuple is depicted in region 216. A process 218 (executing on machine 219) has opened a connection to machine 220. In particular, process 218 is in communication with process 221. Information such as the number of packets exchanged between the two machines over the respective ports can be recorded.

As previously mentioned, in a datacenter environment, portions of the 5-tuple may change—potentially frequently—but still be associated with the same behavior. Namely, one application (e.g., Apache) may frequently be in communication with another application (e.g., Oracle), using ephemeral datacenter resources. Further, either/both of Apache and Oracle may be multi-homed. This can lead to potentially thousands of 5-tuples (or more) that all correspond to Apache communicating with Oracle within a datacenter. For example, Apache could be executed on a single machine, and could also be executed across fifty machines, which are variously spun up and down (with different IP addresses each time). An alternate representation of the 5-tuple of data 210 is depicted in region 217, and is logical. The logical representation of the 5-tuple aggregates the 5-tuple (along with other connections between Apache and Oracle having other 5-tuples) as logically representing the same connection. By aggregating data from raw physical connection information into logical connection information, using techniques described herein, a size reduction of six orders of magnitude in the data set can be achieved.

Figure 2C:
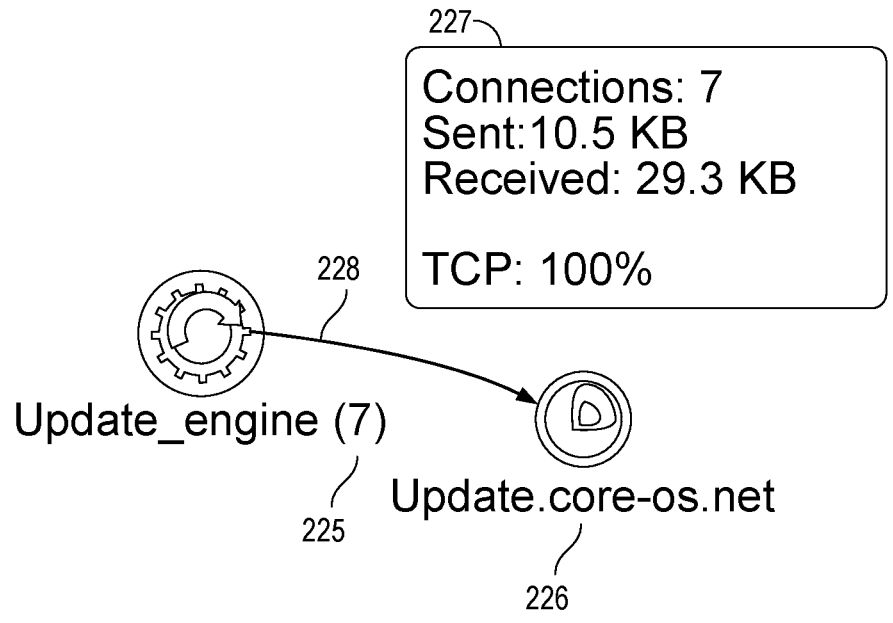
FIG. 2C illustrates a portion of a polygraph.

FIG. 2C depicts a portion of a logical polygraph. Suppose a datacenter has seven instances of the application update_engine 225, executing as seven different processes on seven different machines, having seven different IP addresses, and using seven different ports. The instances of update_engine variously communicate with update.core-os.net 226, which may have a single IP address or many IP addresses itself, over the one hour time period represented in the polygraph. In the example shown in FIG. 2C, update_engine is a client, connecting to the server update.core-os.net, as indicated by arrow 228.

Behaviors of the seven processes are clustered together, into a single summary. As indicated in region 227, statistical information about the connections is also maintained (e.g., number of connections, histogram information, etc.). A polygraph such as is depicted in FIG. 2C can be used to establish a baseline of behavior (e.g., at the one-hour level), allowing for the future detection of deviations from that baseline. As one example, suppose that statistically an update_engine instance transmits data at 11 bytes per second. If an instance were instead to transmit data at 1000 bytes per second, such behavior would represent a deviation from the baseline and could be flagged accordingly. Similarly, changes that are within the baseline (e.g., an eighth instance of update_engine appears, but otherwise behaves as the other instances; or one of the seven instances disappears) are not flagged as anomalous. Further, datacenter events, such as failover, autobalancing, and A-B refresh are unlikely to trigger false alarms in a polygraph, as at the logical level, the behaviors remain the same.

Figure 2D:
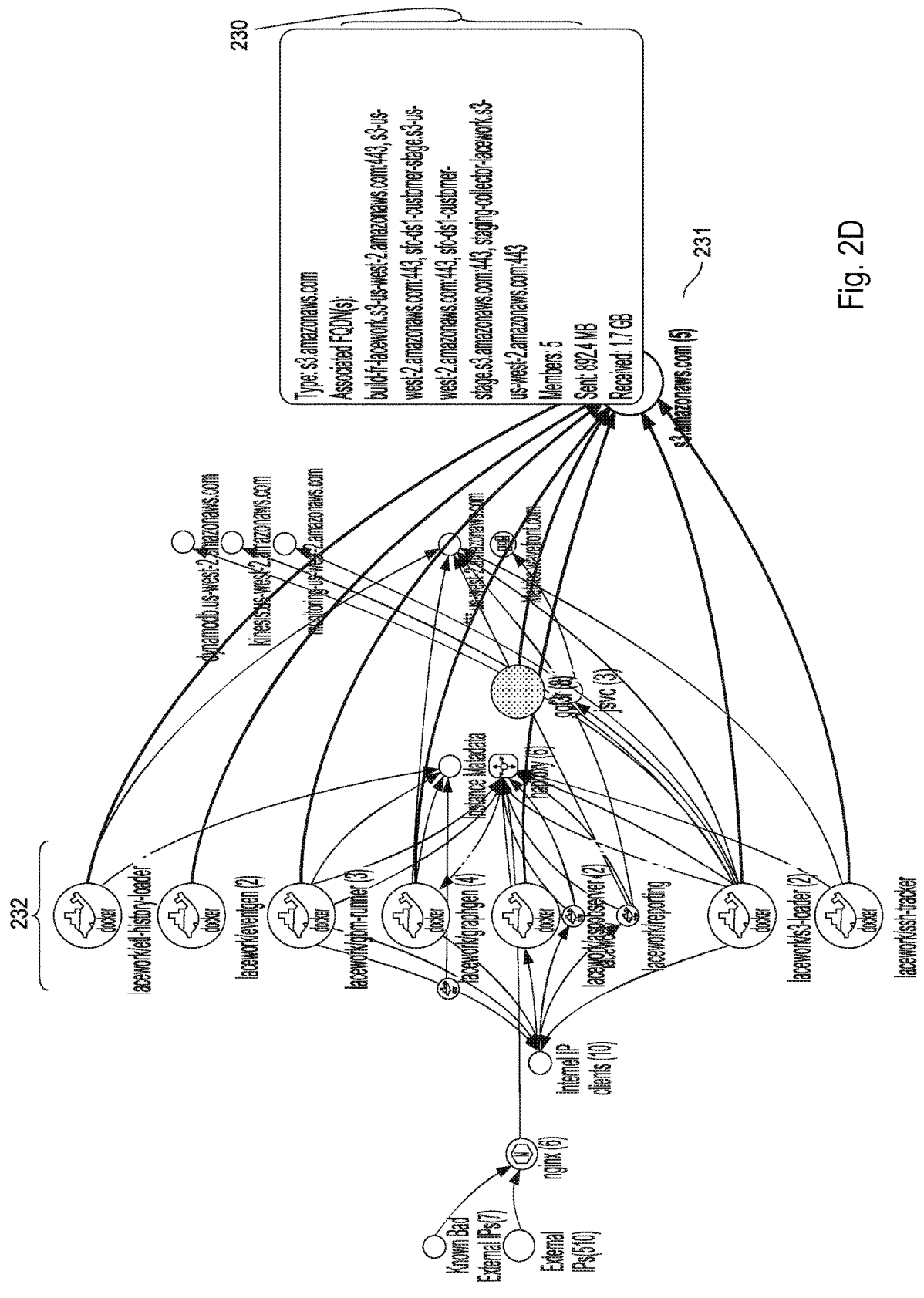
FIG. 2D illustrates a portion of a polygraph.

In various embodiments, polygraph data is maintained for every application in a datacenter, and such polygraph data can be combined to make a single datacenter view across all such applications. FIG. 2D illustrates a portion of a polygraph for a service that evidences more complex behaviors than are depicted in FIG. 2C. In particular, FIG. 2D illustrates the behaviors of S3 as a service (as used by a particular customer datacenter). Clients within the datacenter variously connect to the S3 service using one of five fully qualified domains (listed in region 230). Contact with any of the domains is aggregated as contact with S3 (as indicated in region 231). Depicted in region 232 are various containers which (as clients) connect with S3. Other containers (which do not connect with S3) are not included. As with the polygraph portion depicted in FIG. 2C, statistical information about the connections is known and summarized, such as the number of bytes transferred, histogram information, etc.

Figure 2E:
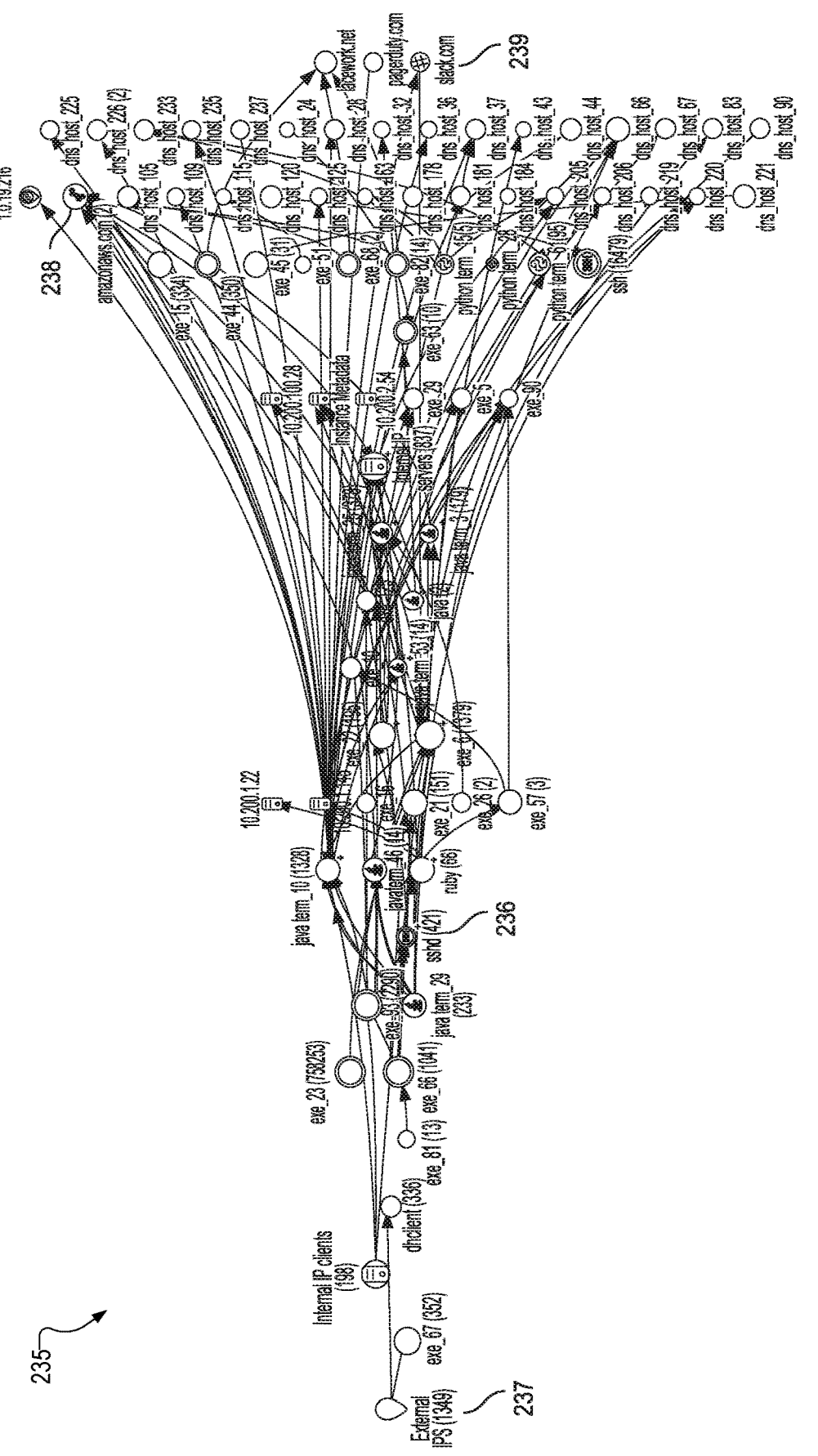
FIG. 2E illustrates an example of a communication polygraph.

FIG. 2E illustrates a communication polygraph for a datacenter. In particular, the polygraph indicates a one hour summary of approximately 500 virtual machines, which collectively run one million processes, and make 100 million connections in that hour. As illustrated in FIG. 2E, a polygraph represents a drastic reduction in size (e.g., from tracking information on 100 million connections in an hour, to a few hundred nodes and a few hundred edges). Further, as a datacenter scales up (e.g., from using 10 virtual machines to 100 virtual machines as the datacenter uses more workers to support existing applications), the polygraph for the datacenter will tend to stay the same size (with the 100 virtual machines clustering into the same nodes that the 10 virtual machines previously clustered into). As new applications are added into the datacenter, the polygraph may automatically scale to include behaviors involving those applications.

In the particular polygraph shown in FIG. 2E, nodes generally correspond to workers, and edges correspond to communications the workers engage in (with connection activity being the behavior modeled in polygraph 235). Another example polygraph could model other behavior, such as application launching. The communications graphed in FIG. 2E include traffic entering the datacenter, traffic exiting the datacenter, and traffic that stays wholly within the datacenter (e.g., traffic between workers). One example of a node included in polygraph 235 is the sshd application, depicted as node 236. As indicated in FIG. 2E, 421 instances of sshd were executing during the one hour time period of data represented in polygraph 235. As indicated in region 237, nodes within the datacenter communicated with a total of 1349 IP addresses outside of the datacenter (and not otherwise accounted for, e.g., as belonging to a service such as Amazon AWS 238 or Slack 239).

In the following examples, suppose that user B, an administrator of datacenter 106, is interacting with data platform 12 to view visualizations of polygraphs in a web browser (e.g., as served to user B via web app 120). One type of polygraph user B can view is an application-communication polygraph, which indicates, for a given one hour window (or any other suitable time interval), which applications communicated with which other applications. Another type of polygraph user B can view is an application launch polygraph. User B can also view graphs related to user behavior, such as an insider behavior graph which tracks user connections (e.g., to internal and external applications, including chains of such behavior), a privilege change graph which tracks how privileges change between processes, and a user login graph, which tracks which (logical) machines a user logs into.

Figure 2F:
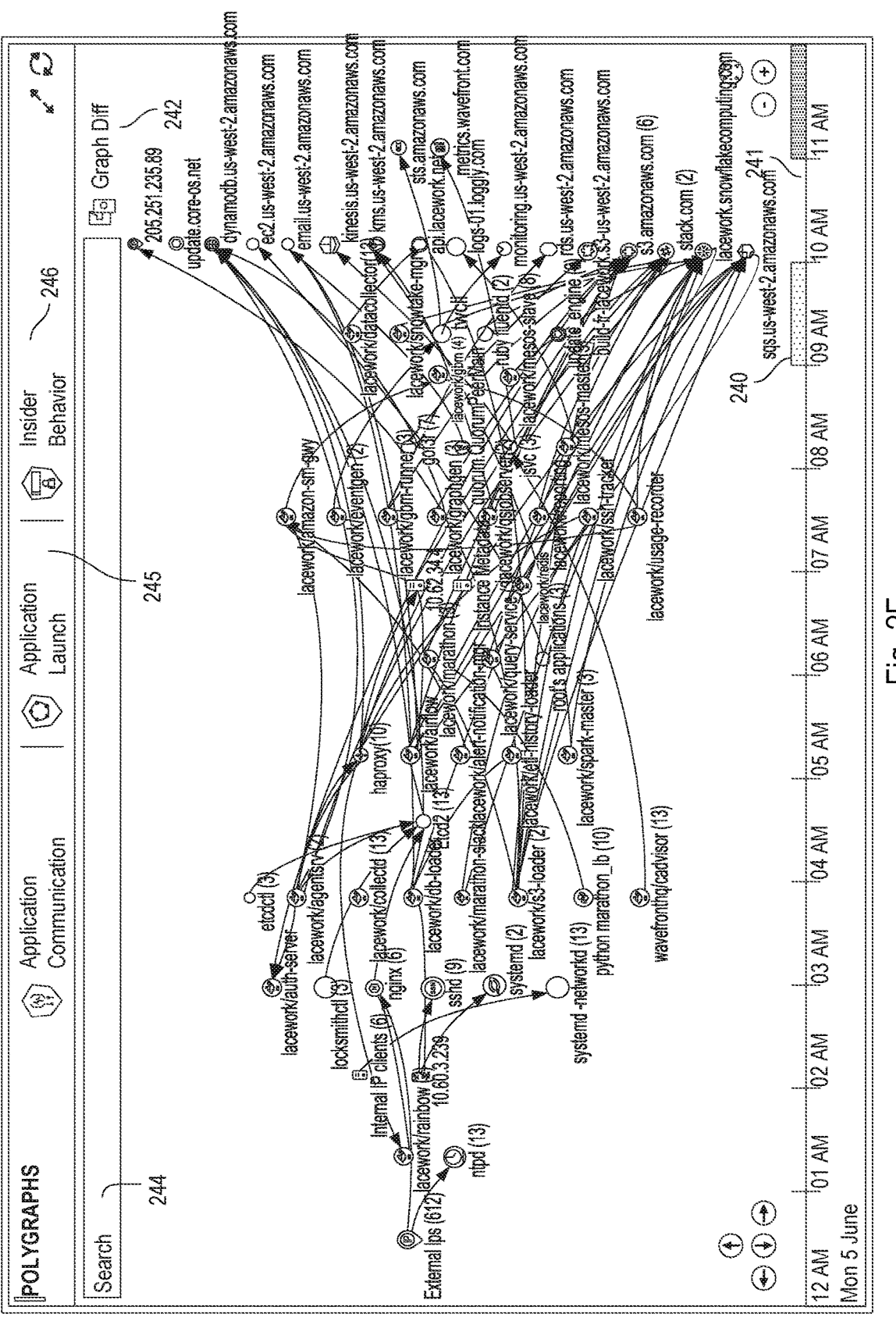
FIG. 2F illustrates an example of a polygraph.

FIG. 2F illustrates an example of an application-communication polygraph for a datacenter (e.g., datacenter 106) for the one hour period of 9 am-10 am on June 5. The time slice currently being viewed is indicated in region 240. If user B clicks his mouse in region 241, user B will be shown a representation of the application-communication polygraph as generated for the following hour (10 am-11 am on June 5).

Figure 2G:
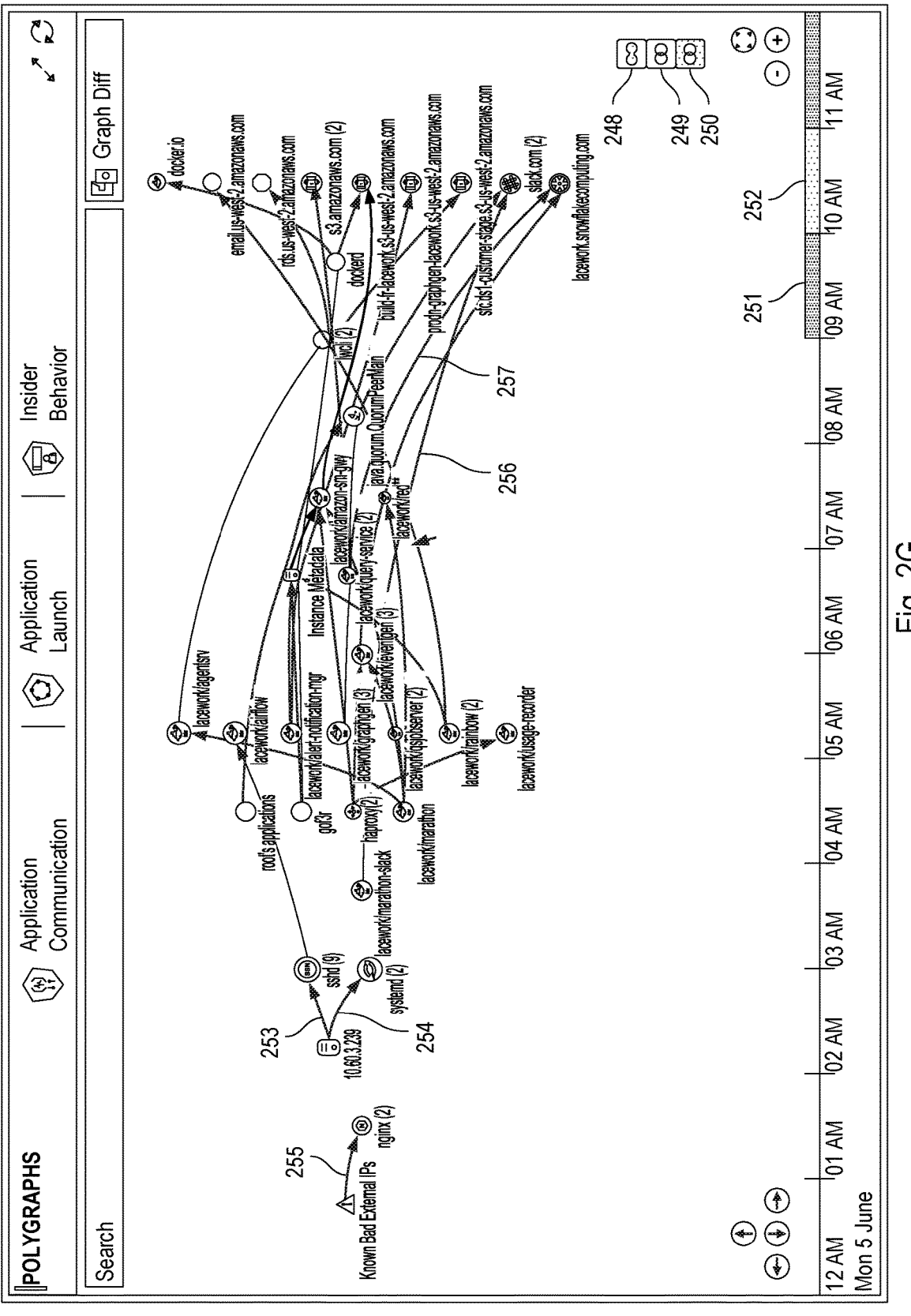
FIG. 2G illustrates an example of a polygraph as rendered in an interface.

FIG. 2G depicts what is shown in user B's browser after he has clicked on region 241, and has further clicked on region 242. The selection in region 242 turns on and off the ability to compare two time intervals to one another. User B can select from a variety of options when comparing the 9 am-10 am and 10 am-11 am time intervals. By clicking region 248, user B will be shown the union of both graphs (i.e., any connections that were present in either time interval). By clicking region 249, user B will be shown the intersection of both graphs (i.e., only those connections that were present in both time intervals).

As shown in FIG. 2G, user B has elected to click on region 250, which depicts connections that are only present in the 9 am-10 am polygraph in a first color 251, and depicts connections that are only present in the 10 am-11 am polygraph in a second color 252. Connections present in both polygraphs are omitted from display. As one example, in the 9 am-10 am polygraph (corresponding to connections made during the 9 am-10 am time period at datacenter 106), a connection was made by a server to sshd (253) and also to systemd (254). Both of those connections ended prior to 10 am and are thus depicted in the first color. As another example, in the 10 am-11 am polygraph (corresponding to connections made during the 10 am-11 am time period at datacenter 106), a connection was made from a known bad external IP to nginx (255). The connection was not present during the 9 am-10 am time slice and thus is depicted in the second color. As yet another example, two different connections were made to a Slack service between 9 am and 11 am. However, the first was made by a first client during the 9 am-10 am time slice (256) and the second was made by a different client during the 10 am-11 am slice (257), and so the two connections are depicted respectively in the first and second colors and blue.

Figure 2H:
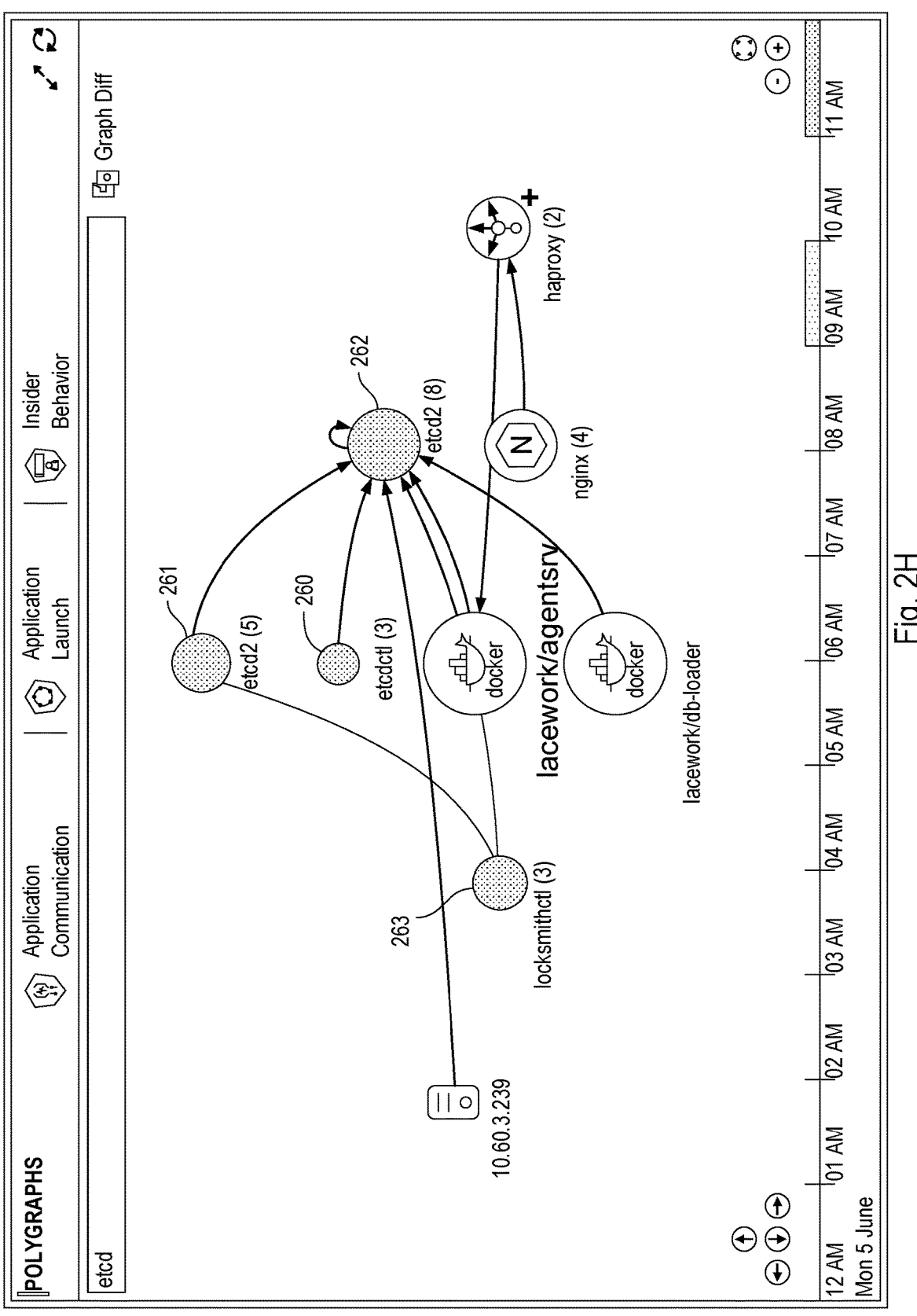
FIG. 2H illustrates an example of a portion of a polygraph as rendered in an interface.
Figure 21:
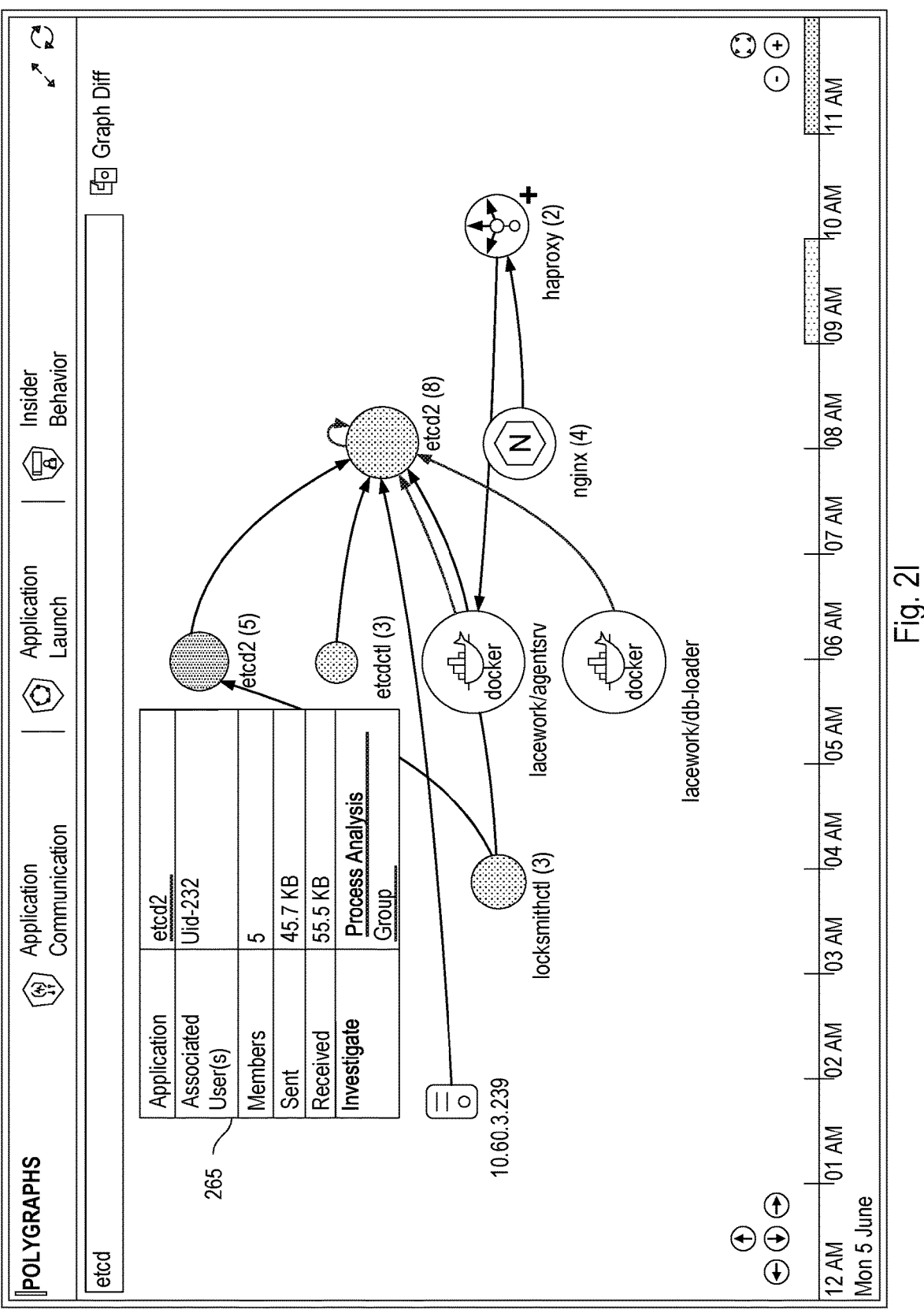

Returning to the polygraph depicted in FIG. 2F, suppose user B enters "etcd" into the search box located in region 244. User B will then be presented with the interface illustrated in FIG. 2H. As shown in FIG. 2H, three applications containing the term "etcd" were engaged in communications during the 9 am-10 am window. One application is etcdctl, a command line client for etcd. As shown in FIG. 2H, a total of three different etcdctl processes were executed during the 9 am-10 am window, and were clustered together (260). FIG. 2H also depicts two different clusters that are both named etcd2. The first cluster includes (for the 9 am-10 am window) five members (261) and the second cluster includes (for the same window) eight members (262). The reason for these two distinct clusters is that the two groups of applications behave differently (e.g., they exhibit two distinct sets of communication patterns). Specifically, the instances of etcd2 in cluster 261 only communicate with locksmithctl (263) and other etcd2 instances (in both clusters 261 and 262). The instances of etcd2 in cluster 262 communicate with additional entities, such as etcdctl and Docker containers. As desired, user B can click on one of the clusters (e.g., cluster 261) and be presented with summary information about the applications included in the cluster, as is shown in FIG. 2I (e.g., in region 265). User B can also double click on a given cluster (e.g., cluster 261) to see details on each of the individual members of the cluster broken out.

Figure 2J:
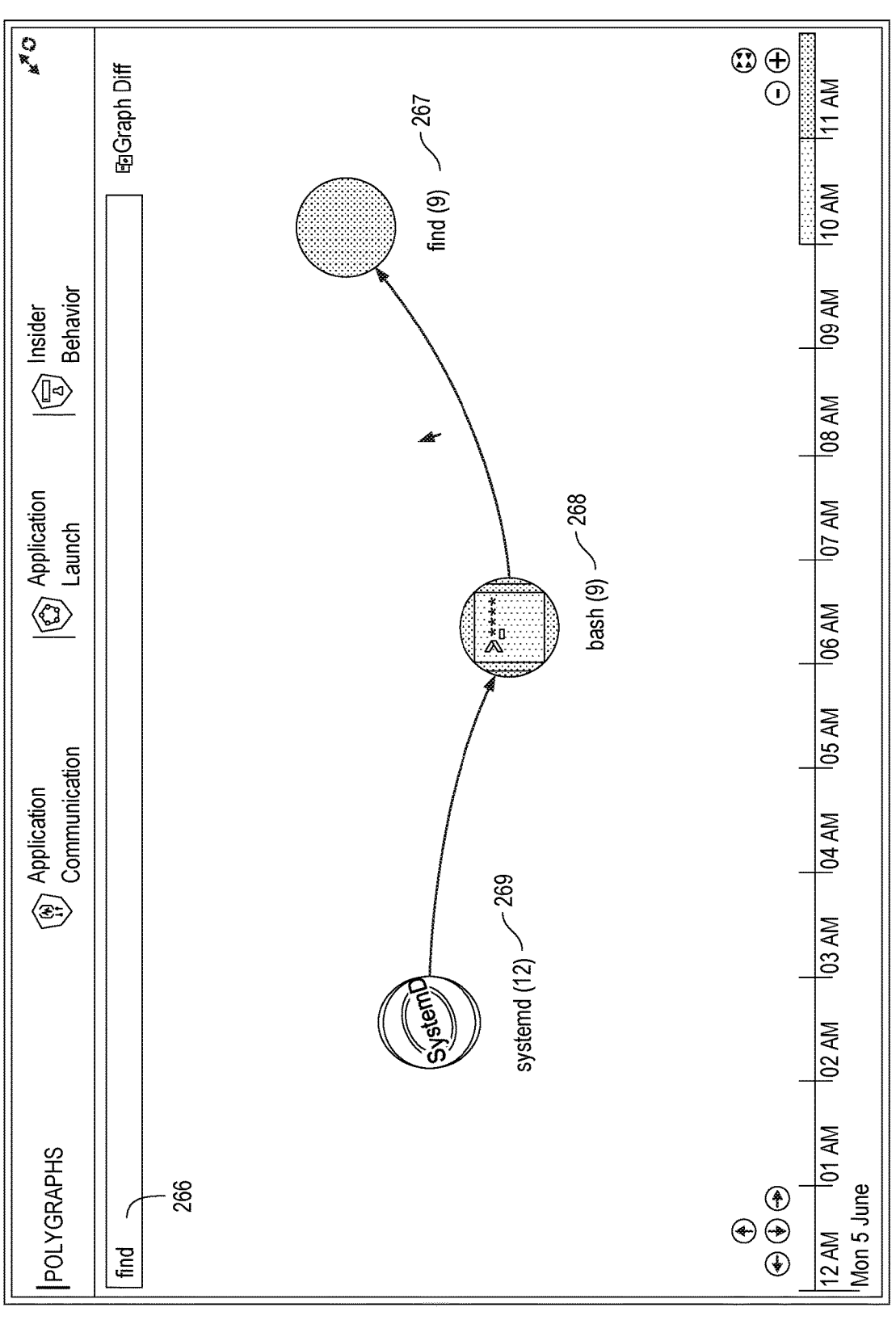
FIG. 2J illustrates an example of a portion of a polygraph as rendered in an interface.

Suppose user B now clicks on region 245 of the interface shown in FIG. 2F. User B will then be shown an application launch polygraph. Launching an application is another example of a behavior. The launch polygraph models how applications are launched by other applications. FIG. 2J illustrates an example of a portion of a launch polygraph. In particular, user B has typed "find" into region 266, to see how the "find" application is being launched. As shown in FIG. 2J, in the launch polygraph for the 10 am-11 am time period, find applications (267) are always launched by bash (268), which is in turn always launched by systemd (269). If find is launched by a different application, this would be anomalous behavior.

Figure 2K:
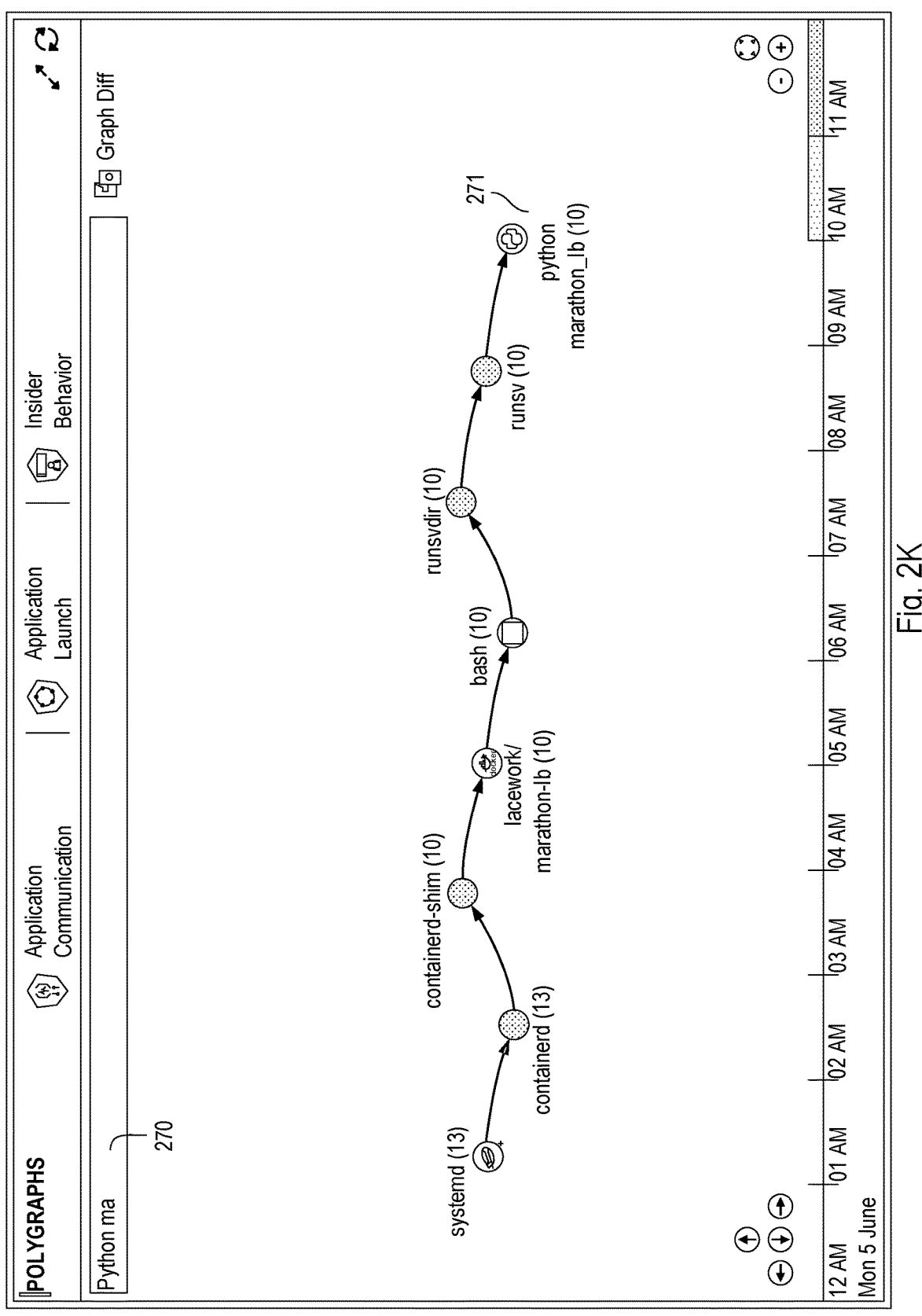
FIG. 2K illustrates an example of a portion of a polygraph as rendered in an interface.

FIG. 2K illustrates another example of a portion of an application launch polygraph. In FIG. 2K, user B has searched (270) for "python ma" to see how "python marathon_lb" (271) is launched. As shown in FIG. 2K, in each case (during the one hour time slice of 10 am-11 am), python marathon_lb is launched as a result of a chain of the same seven applications each time. If python marathon_lb is ever launched in a different manner, this indicates anomalous behavior. The behavior could be indicative of malicious activities, but could also be due to other reasons, such as a misconfiguration, a performance-related issue, and/or a failure, etc.

Suppose user B now clicks on region 246 of the interface shown in FIG. 2F. User B will then be shown an insider behavior graph. The insider behavior graph tracks information about behaviors such as processes started by a user interactively using protocols such as ssh or telnet, and any processes started by those processes. As one example, suppose an administrator logs into a first virtual machine in datacenter 106 (e.g., using sshd via an external connection he makes from a hotel), using a first set of credentials (e.g., first.last@example.com and an appropriate password). From the first virtual machine, the administrator connects to a second virtual machine (e.g., using the same credentials), then uses the sudo command to change identities to those of another user, and then launches a program. Graphs built by data platform 12 can be used to associate the administrator with each of his actions, including launching the program using the identity of another user.

Figure 2L:
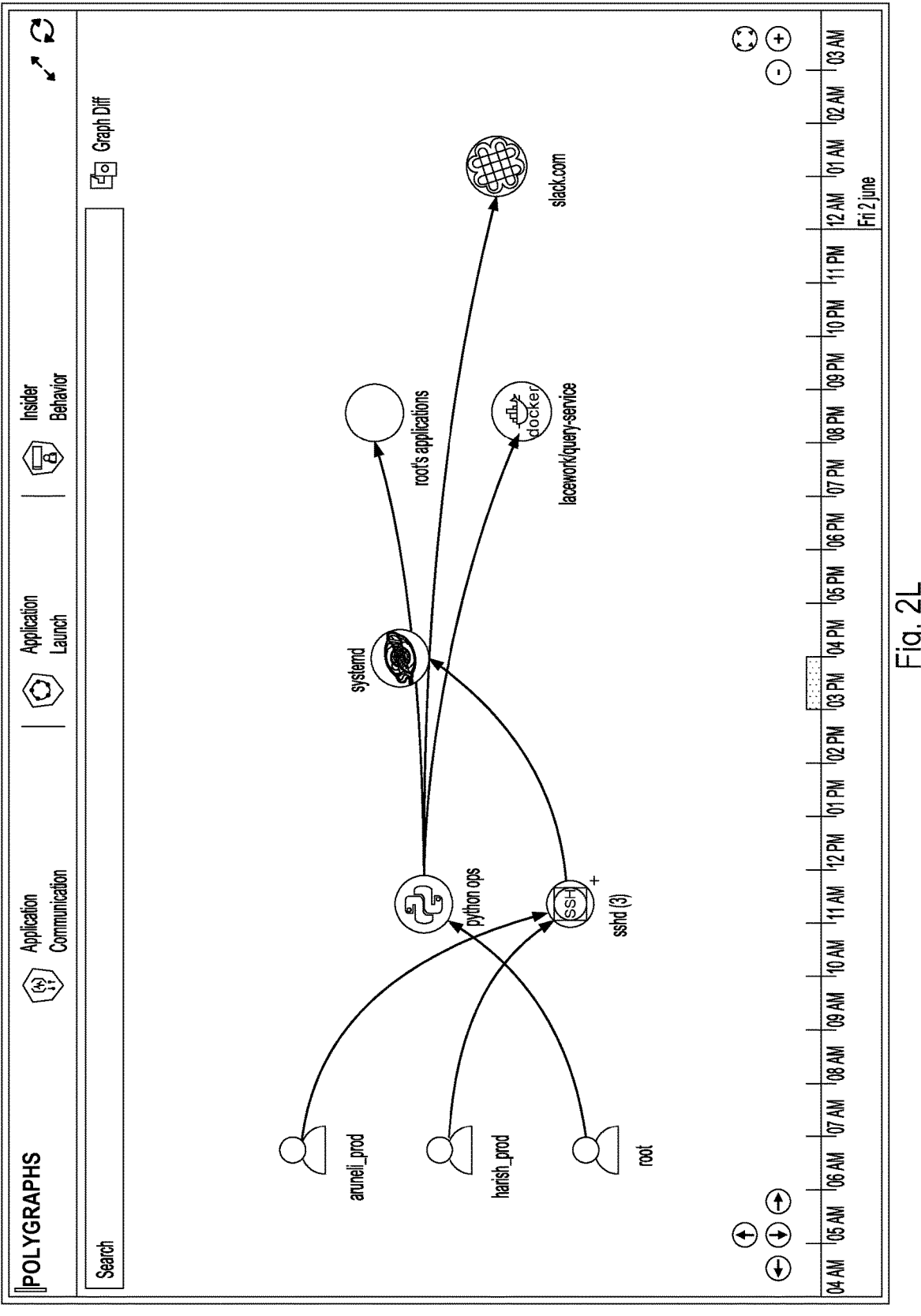
FIG. 2L illustrates an example of an insider behavior graph as rendered in an interface.

FIG. 2L illustrates an example of a portion of an insider behavior graph. In particular, in FIG. 2L, user B is viewing a graph that corresponds to the time slice of 3 pm-4 pm on June 1. FIG. 2L illustrates the internal/external applications that users connected to during the one hour time slice. If a user typically communicates with particular applications, that information will become part of a baseline. If the user deviates from his baseline behavior (e.g., using new applications, or changing privilege in anomalous ways), such anomalies can be surfaced.

Figure 2M:
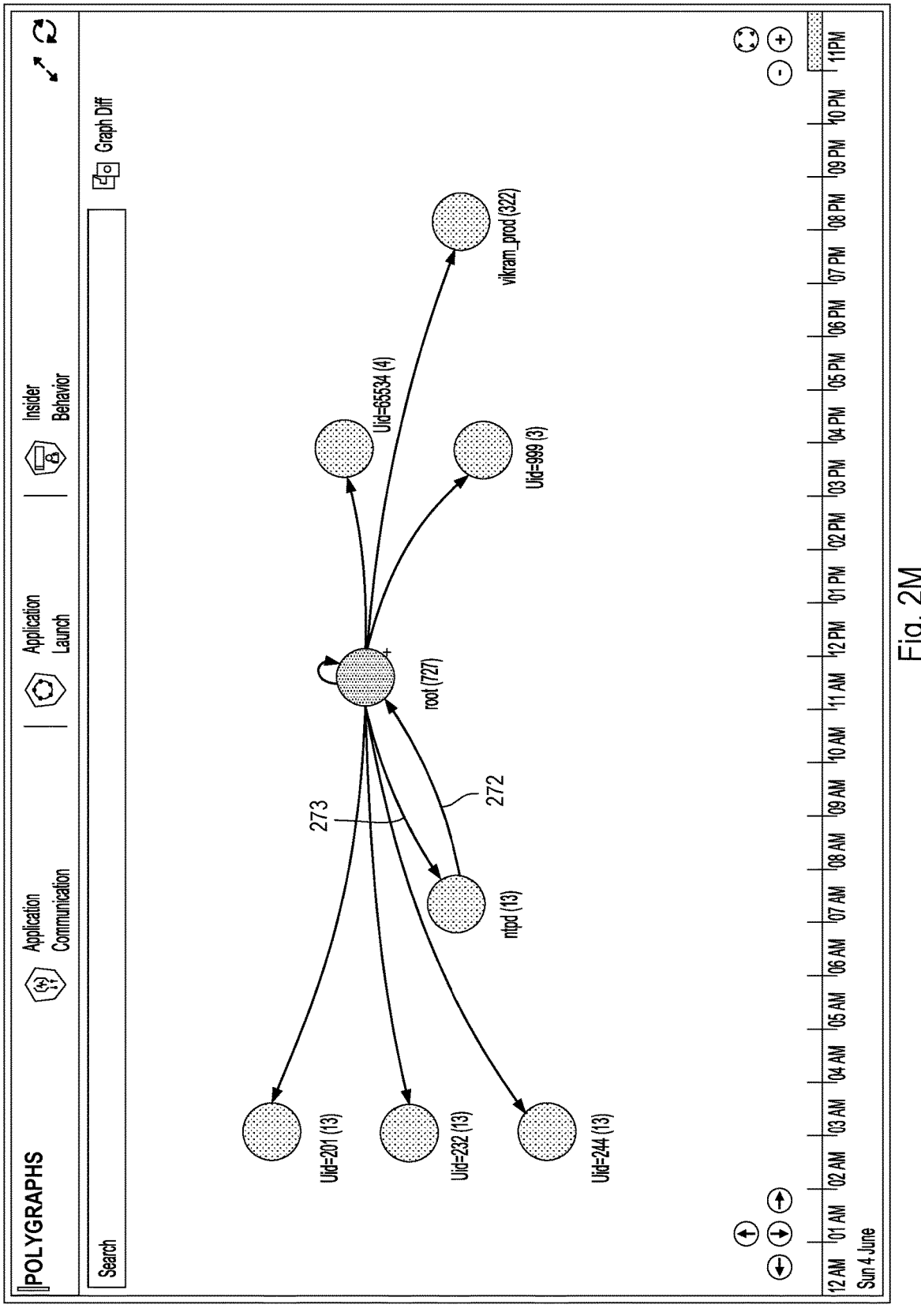
FIG. 2M illustrates an example of a privilege change graph as rendered in an interface.

FIG. 2M illustrates an example of a portion of a privilege change graph, which identifies how privileges are changed between processes. Typically, when a user launches a process (e.g., "ls"), the process inherits the same privileges that the user has. And, while a process can have fewer privileges than the user (i.e., go down in privilege), it is rare (and generally undesirable) for a user to escalate in privilege. Information included in the privilege change graph can be determined by examining the parent of each running process, and determining whether there is a match in privilege between the parent and the child. If the privileges are different, a privilege change has occurred (whether a change up or a change down). The application ntpd is one rare example of a scenario in which a process escalates (272) to root, and then returns back (273). The sudo command is another example (e.g., used by an administrator to temporarily have a higher privilege). As with the other examples, ntpd's privilege change actions, and the legitimate actions of various administrators (e.g., using sudo) will be incorporated into a baseline model by data platform 12. When deviations occur, such as where a new application that is not ntpd escalates privilege, or where an individual that has not previously/does not routinely use sudo does so, such behaviors can be identified as anomalous.

Figure 2N:
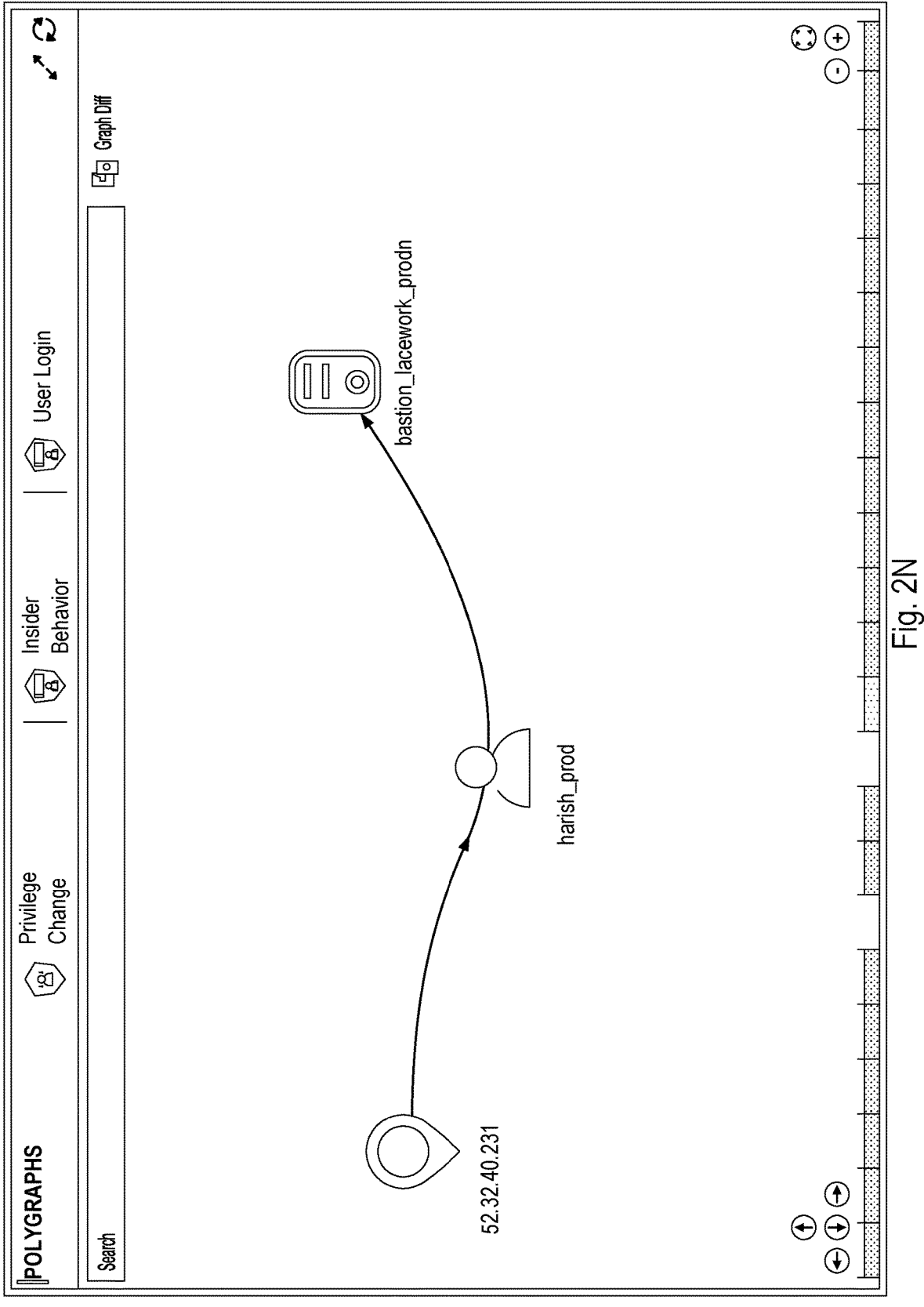
FIG. 2N illustrates an example of a user login graph as rendered in an interface.
Figure 20:
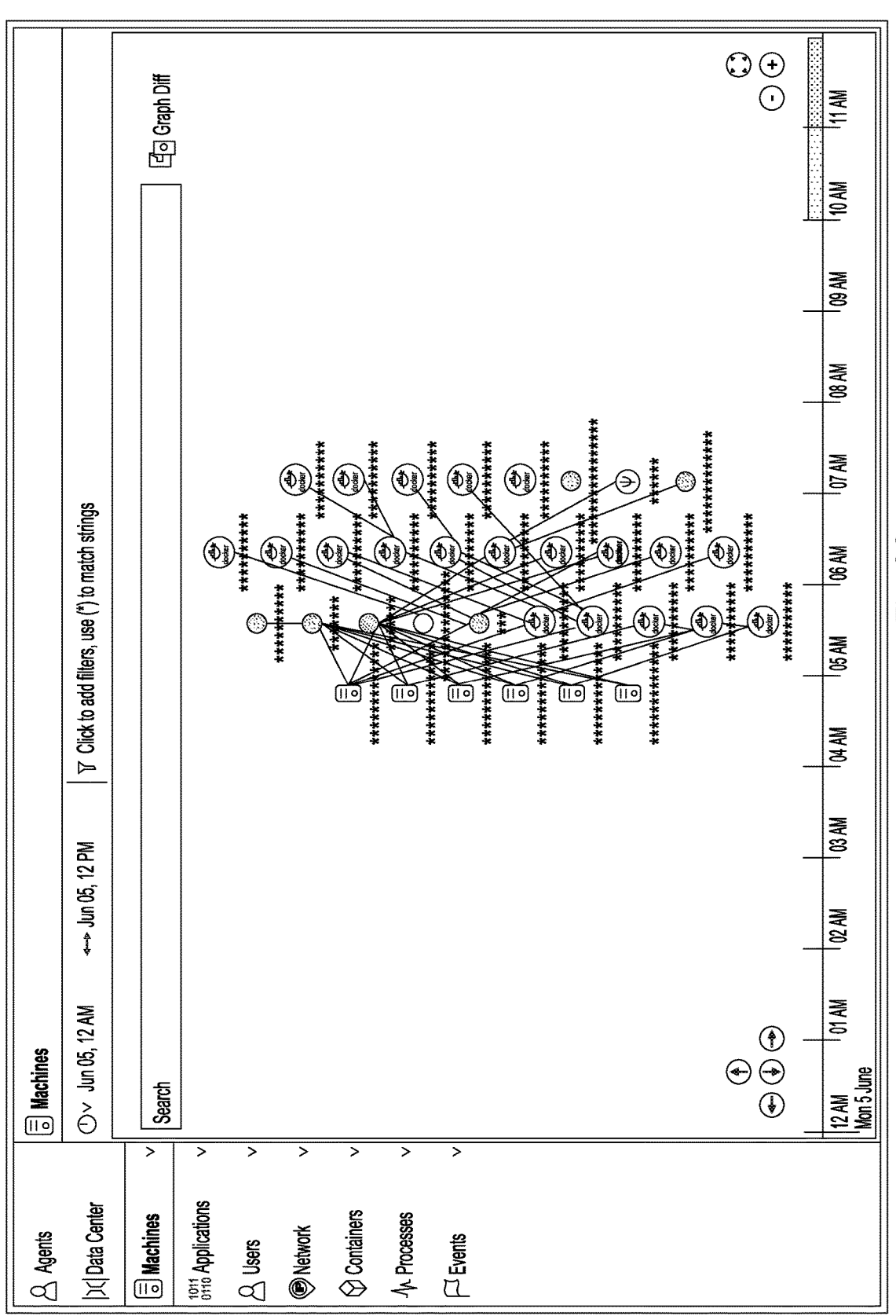

FIG. 2N illustrates an example of a portion of a user login graph, which identifies which users log into which logical nodes. Physical nodes (whether bare metal or virtualized) are clustered into a logical machine cluster, for example, using yet another graph, a machine-server graph, an example of which is shown in FIG. 2O. For each machine, a determination is made as to what type of machine it is, based on what kind(s) of workflows it runs. As one example, some machines run as master nodes (having a typical set of workflows they run, as master nodes) and can thus be clustered as master nodes. Worker nodes are different from master nodes, for example, because they run Docker containers, and frequently change as containers move around. Worker nodes can similarly be clustered.

As previously mentioned, the polygraph depicted in FIG. 2E corresponds to activities in a datacenter in which, in a given hour, approximately 500 virtual machines collectively run one million processes, and make 100 million connections in that hour. The polygraph represents a drastic reduction in size (e.g., from tracking information on 100 million connections in an hour, to a few hundred nodes and a few hundred edges). Using techniques described herein, such a polygraph can be constructed (e.g., using commercially available computing infrastructure) in less than an hour (e.g., within a few minutes). Thus, ongoing hourly snapshots of a datacenter can be created within a two hour moving window (i.e., collecting data for the time period 8 am-9 am, while also generating a snapshot for the time previous time period 7 am-8 am). The following describes various example infrastructure that can be used in polygraph construction, and also describes various techniques that can be used to construct polygraphs.

Returning to FIG. 1D, embodiments of data platform 12 may be built using any suitable infrastructure as a service (IaaS) (e.g., AWS). For example, data platform 12 can use Simple Storage Service (S3) for data storage, Key Management Service (KMS) for managing secrets, Simple Queue Service (SQS) for managing messaging between applications, Simple Email Service (SES) for sending emails, and Route 53 for managing DNS. Other infrastructure tools can also be used. Examples include: orchestration tools (e.g., Kubernetes or Mesos/Marathon), service discovery tools (e.g., Mesos-DNS), service load balancing tools (e.g., marathon-LB), container tools (e.g., Docker or rkt), log/metric tools (e.g., collectd, fluentd, kibana, etc.), big data processing systems (e.g., Spark, Hadoop, AWS Redshift, Snowflake etc.), and distributed key value stores (e.g., Apache Zookeeper or etcd2).

As previously mentioned, in various embodiments, data platform 12 may make use of a collection of microservices. Each microservice can have multiple instances, and may be configured to recover from failure, scale, and distribute work amongst various such instances, as applicable. For example, microservices are auto-balancing for new instances, and can distribute workload if new instances are started or existing instances are terminated. In various embodiments, microservices may be deployed as self-contained Docker containers. A Mesos-Marathon or Spark framework can be used to deploy the microservices (e.g., with Marathon monitoring and restarting failed instances of microservices as needed). The service etcd2 can be used by microservice instances to discover how many peer instances are running, and used for calculating a hash-based scheme for workload distribution. Microservices may be configured to publish various health/status metrics to either an SQS queue, or etcd2, as applicable. In some examples, Amazon DynamoDB can be used for state management.

Additional information on various microservices used in embodiments of data platform 12 is provided below.

Graph generator 146 is a microservice that may be responsible for generating raw behavior graphs on a per customer basis periodically (e.g., once an hour). In particular, graph generator 146 may generate graphs of entities (as the nodes in the graph) and activities between entities (as the edges). In various embodiments, graph generator 146 also performs other functions, such as aggregation, enrichment (e.g., geolocation and threat), reverse DNS resolution, TF-IDF based command line analysis for command type extraction, parent process tracking, etc.

Graph generator 146 may perform joins on data collected by the agents, so that both sides of a behavior are linked. For example, suppose a first process on a first virtual machine (e.g., having a first IP address) communicates with a second process on a second virtual machine (e.g., having a second IP address). Respective agents on the first and second virtual machines may each report information on their view of the communication (e.g., the PID of their respective processes, the amount of data exchanged and in which direction, etc.). When graph generator performs a join on the data provided by both agents, the graph will include a node for each of the processes, and an edge indicating communication between them (as well as other information, such as the directionality of the communication—i.e., which process acted as the server and which as the client in the communication).

In some cases, connections are process to process (e.g., from a process on one virtual machine within the cloud environment associated with entity A to another process on a virtual machine within the cloud environment associated with entity A). In other cases, a process may be in communication with a node (e.g., outside of entity A) which does not have an agent deployed upon it. As one example, a node within entity A might be in communication with node 172, outside of entity A. In such a scenario, communications with node 172 are modeled (e.g., by graph generator 146) using the IP address of node 172. Similarly, where a node within entity A does not have an agent deployed upon it, the IP address of the node can be used by graph generator in modeling.

Graphs created by graph generator 146 may be written to data store 30 and cached for further processing. A graph may be a summary of all activity that happened in a particular time interval. As each graph corresponds to a distinct period of time, different rows can be aggregated to find summary information over a larger timestamp. In some examples, picking two different graphs from two different timestamps can be used to compare different periods. If necessary, graph generator 146 can parallelize its workload (e.g., where its backlog cannot otherwise be handled within a particular time period, such as an hour, or if is required to process a graph spanning a long time period).

Graph generator 146 can be implemented in any appropriate programming language, such as Java or C, and machine learning libraries, such as Spark's MLLib. Example ways that graph generator computations can be implemented include using SQL or Map-R, using Spark or Hadoop.

SSH tracker 148 is a microservice that may be responsible for following ssh connections and process parent hierarchies to determine trails of user ssh activity. Identified ssh trails are placed by the SSH tracker 148 into data store 30 and cached for further processing.

SSH tracker 148 can be implemented in any appropriate programming language, such as Java or C, and machine libraries, such as Spark's MLLib. Example ways that SSH tracker computations can be implemented include using SQL or Map-R, using Spark or Hadoop.

Threat aggregator 150 is a microservice that may be responsible for obtaining third party threat information from various applicable sources, and making it available to other micro-services. Examples of such information include reverse DNS information, GeoIP information, lists of known bad domains/IP addresses, lists of known bad files, etc. As applicable, the threat information is normalized before insertion into data store 30. Threat aggregator 150 can be implemented in any appropriate programming language, such as Java or C, using SQL/JDBC libraries to interact with data store 30 (e.g., for insertions and queries).

Scheduler 152 is a microservice that may act as a scheduler and that may run arbitrary jobs organized as a directed graph. In some examples, scheduler 152 ensures that all jobs for all customers are able to run during a given time interval (e.g., every hour). Scheduler 152 may handle errors and retrying for failed jobs, track dependencies, manage appropriate resource levels, and/or scale jobs as needed. Scheduler 152 can be implemented in any appropriate programming language, such as Java or C. A variety of components can also be used, such as open source scheduler frameworks (e.g., Airflow), or AWS services (e.g., the AWS Data pipeline) which can be used for managing schedules.

Graph Behavior Modeler (GBM) 154 is a microservice that may compute polygraphs. In particular, GBM 154 can be used to find clusters of nodes in a graph that should be considered similar based on some set of their properties and relationships to other nodes. As described herein, the clusters and their relationships can be used to provide visibility into a datacenter environment without requiring user specified labels. GBM 154 may track such clusters over time persistently, allowing for changes to be detected and alerts to be generated.

GBM 154 may take as input a raw graph (e.g., as generated by graph generator 146). Nodes are actors of a behavior, and edges are the behavior relationship itself. For example, in the case of communication, example actors include processes, which communicate with other processes. The GBM 154 clusters the raw graph based on behaviors of actors and produces a summary (the polygraph). The polygraph summarizes behavior at a datacenter level. The GBM 154 also produces "observations" that represent changes detected in the datacenter. Such observations may be based on differences in cumulative behavior (e.g., the baseline) of the datacenter with its current behavior. The GBM 154 can be implemented in any appropriate programming language, such as Java, C, or Golang, using appropriate libraries (as applicable) to handle distributed graph computations (handling large amounts of data analysis in a short amount of time). Apache Spark is another example tool that can be used to compute polygraphs. The GBM 154 can also take feedback from users and adjust the model according to that feedback. For example, if a given user is interested in relearning behavior for a particular entity, the GBM 154 can be instructed to "forget" the implicated part of the polygraph.

GBM runner 156 is a microservice that may be responsible for interfacing with GBM 154 and providing GBM 154 with raw graphs (e.g., using a query language, such as SQL, to push any computations it can to data store 30). GBM runner 156 may also insert polygraph output from GBM 154 to data store 30. GBM runner 156 can be implemented in any appropriate programming language, such as Java or C, using SQL/JDBC libraries to interact with data store 30 to insert and query data.

Alert generator 158 is a microservice that may be responsible for generating alerts. Alert generator 158 may examine observations (e.g., produced by GBM 154) in aggregate, deduplicate them, and score them. Alerts may be generated for observations with a score exceeding a threshold. Alert generator 158 may also compute (or retrieve, as applicable) data that a customer (e.g., user A or user B) might need when reviewing the alert. Examples of events that can be detected by data platform 12 (and alerted on by alert generator 158) include, but are not limited to the following:

new user: This event may be created the first time a user (e.g., of node 116) is first observed by an agent within a datacenter.

user launched new binary: This event may be generated when an interactive user launches an application for the first time.

new privilege escalation: This event may be generated when user privileges are escalated and a new application is run.

new application or container: This event may be generated when an application or container is seen for the first time.

new external connection: This event may be generated when a connection to an external IP/domain is made from a new application.

new external host or IP: This event may be generated when a new external host or IP is involved in a connection with a datacenter.

new internal connection: This event may be generated when a connection between internal-only applications is seen for the first time.

new external client: This event may be generated when a new external connection is seen for an application which typically does not have external connections.

new parent: This event may be generated when an application is launched by a different parent.

connection to known bad IP/domain: Data platform 12 maintains (or can otherwise access) one or more reputation feeds. If an environment makes a connection to a known bad IP or domain, an event will be generated.

login from a known bad IP/domain: An event may be generated when a successful connection to a datacenter from a known bad IP is observed by data platform 12.

Alert generator 158 can be implemented in any appropriate programming language, such as Java or C, using SQL/JDBC libraries to interact with data store 30 to insert and query data. In various embodiments, alert generator 158 also uses one or more machine learning libraries, such as Spark's MLLib (e.g., to compute scoring of various observations). Alert generator 158 can also take feedback from users about which kinds of events are of interest and which to suppress.

QsJobServer 160 is a microservice that may look at all the data produced by data platform 12 for an hour, and compile a materialized view (MV) out of the data to make queries faster. The MV helps make sure that the queries customers most frequently run, and data that they search for, can be easily queried and answered. QsJobServer 160 may also precompute and cache a variety of different metrics so that they can quickly be provided as answers at query time. QsJobServer 160 can be implemented using any appropriate programming language, such as Java or C, using SQL/JDBC libraries. In some examples, QsJobServer 160 is able to compute an MV efficiently at scale, where there could be a large number of joins. An SQL engine, such as Oracle, can be used to efficiently execute the SQL, as applicable.

Alert notifier 162 is a microservice that may take alerts produced by alert generator 158 and send them to customers' integrated Security Information and Event Management (SIEM) products (e.g., Splunk, Slack, etc.). Alert notifier 162 can be implemented using any appropriate programming language, such as Java or C. Alert notifier 162 can be configured to use an email service (e.g., AWS SES or pagerduty) to send emails. Alert notifier 162 may also provide templating support (e.g., Velocity or Moustache) to manage templates and structured notifications to SIEM products.

Reporting module 164 is a microservice that may be responsible for creating reports out of customer data (e.g., daily summaries of events, etc.) and providing those reports to customers (e.g., via email). Reporting module 164 can be implemented using any appropriate programming language, such as Java or C. Reporting module 164 can be configured to use an email service (e.g., AWS SES or pagerduty) to send emails. Reporting module 164 may also provide templating support (e.g., Velocity or Moustache) to manage templates (e.g., for constructing HTML-based email).

Web app 120 is a microservice that provides a user interface to data collected and processed on data platform 12. Web app 120 may provide login, authentication, query, data visualization, etc. features. Web app 120 may, in some embodiments, include both client and server elements. Example ways the server elements can be implemented are using Java DropWizard or Node.Js to serve business logic, and a combination of JSON/HTTP to manage the service. Example ways the client elements can be implemented are using frameworks such as React, Angular, or Backbone. JSON, jQuery, and JavaScript libraries (e.g., underscore) can also be used.

Query service 166 is a microservice that may manage all database access for web app 120. Query service 166 abstracts out data obtained from data store 30 and provides a JSON-based REST API service to web app 120. Query service 166 may generate SQL queries for the REST APIs that it receives at run time. Query service 166 can be implemented using any appropriate programming language, such as Java or C and SQL/JDBC libraries, or an SQL framework such as jOOQ. Query service 166 can internally make use of a variety of types of databases, including a relational database engine 168 (e.g., AWS Aurora) and/or data store 30 to manage data for clients. Examples of tables that query service 166 manages are OLTP tables and data warehousing tables.

Cache 170 may be implemented by Redis and/or any other service that provides a key-value store. Data platform 12 can use cache 170 to keep information for frontend services about users. Examples of such information include valid tokens for a customer, valid cookies of customers, the last time a customer tried to login, etc.

FIG. 3A illustrates an example of a process for detecting anomalies in a network environment. In various embodiments, process 300 is performed by data platform 12. The process begins at 301 when data associated with activities occurring in a network environment (such as entity A's datacenter) is received. One example of such data that can be received at 301 is agent-collected data described above (e.g., in conjunction with process 200).

At 302, a logical graph model is generated, using at least a portion of the monitored activities. A variety of approaches can be used to generate such logical graph models, and a variety of logical graphs can be generated (whether using the same, or different approaches). The following is one example of how data received at 301 can be used to generate and maintain a model.

During bootstrap, data platform 12 creates an aggregate graph of physical connections (also referred to herein as an aggregated physical graph) by matching connections that occurred in the first hour into communication pairs. Clustering is then performed on the communication pairs. Examples of such clustering, described in more detail below, include performing Matching Neighbor clustering and similarity (e.g., SimRank) clustering. Additional processing can also be performed (and is described in more detail below), such as by splitting clusters based on application type, and annotating nodes with DNS query information. The resulting graph (also referred to herein as a base graph or common graph) can be used to generate a variety of models, where a subset of node and edge types (described in more detail below) and their properties are considered in a given model. One example of a model is a UID to UID model (also referred to herein as a Uid2Uid model) which clusters together processes that share a username and show similar privilege change behavior. Another example of a model is a CType model, which clusters together processes that share command line similarity. Yet another example of a model is a PType model, which clusters together processes that share behaviors over time.

Each hour (or any other predetermined time interval) after bootstrap, a new snapshot is taken (i.e., data collected about a datacenter in the last hour is processed) and information from the new snapshot is merged with existing data to create and (as additional data is collected/processed) maintain a cumulative graph. The cumulative graph (also referred to herein as a cumulative PType graph and a polygraph) is a running model of how processes behave over time. Nodes in the cumulative graph are PType nodes, and provide information such as a list of all active processes and PIDs in the last hour, the number of historic total processes, the average number of active processes per hour, the application type of the process (e.g., the CType of the PType), and historic CType information/frequency. Edges in the cumulative graph can represent connectivity and provide information such as connectivity frequency. The edges can be weighted (e.g., based on number of connections, number of bytes exchanged, etc.). Edges in the cumulative graph (and snapshots) can also represent transitions.

One approach to merging a snapshot of the activity of the last hour into a cumulative graph is as follows. An aggregate graph of physical connections is made for the connections included in the snapshot (as was previously done for the original snapshot used during bootstrap). And, clustering/splitting is similarly performed on the snapshot's aggregate graph. Next, PType clusters in the snapshot's graph are compared against PType clusters in the cumulative graph to identify commonality.

One approach to determining commonality is, for any two nodes that are members of a given CmdType (described in more detail below), comparing internal neighbors and calculating a set membership Jaccard distance. The pairs of nodes are then ordered by decreasing similarity (i.e., with the most similar sets first). For nodes with a threshold amount of commonality (e.g., at least 66% members in common), any new nodes (i.e., appearing in the snapshot's graph but not the cumulative graph) are assigned the same PType identifier as is assigned to the corresponding node in the cumulative graph. For each node that is not classified (i.e., has not been assigned a PType identifier), a network signature is generated (i.e., indicative of the kinds of network connections the node makes, who the node communicates with, etc.). The following processing is then performed until convergence. If a match of the network signature is found in the cumulative graph, the unclassified node is assigned the PType identifier of the corresponding node in the cumulative graph. Any nodes which remain unclassified after convergence are new PTypes and are assigned new identifiers and added to the cumulative graph as new. As applicable, the detection of a new PType can be used to generate an alert. If the new PType has a new CmdType, a severity of the alert can be increased. If any surviving nodes (i.e., present in both the cumulative graph and the snapshot graph) change PTypes, such change is noted as a transition, and an alert can be generated. Further, if a surviving node changes PType and also changes Cmd-Type, a severity of the alert can be increased.

Changes to the cumulative graph (e.g., a new PType or a new edge between two PTypes) can be used (e.g., at 303) to detect anomalies (described in more detail below). Two example kinds of anomalies that can be detected by data platform 12 include security anomalies (e.g., a user or process behaving in an unexpected manner) and devops/root cause anomalies (e.g., network congestion, application failure, etc.). Detected anomalies can be recorded and surfaced (e.g., to administrators, auditors, etc.), such as through alerts which are generated at 304 based on anomaly detection.

Additional detail regarding processing performed, by various components depicted in FIG. 1D (whether performed individually or in combination), in conjunction with model/polygraph construction (e.g., as performed at 302) are provided below.

As explained above, an aggregated physical graph can be generated on a per customer basis periodically (e.g., once an hour) from raw physical graph information, by matching connections (e.g., between two processes on two virtual machines). In various embodiments, a deterministic fixed approach is used to cluster nodes in the aggregated physical graph (e.g., representing processes and their communications). As one example, Matching Neighbors Clustering (MNC) can be performed on the aggregated physical graph to determine which entities exhibit identical behavior and cluster such entities together.

Figure 3B:
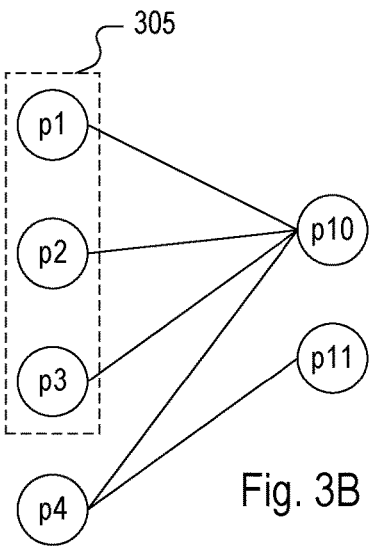
FIG. 3B depicts a set of example processes communicating with other processes.

FIG. 3B depicts a set of example processes (p1, p2, p3, and p4) communicating with other processes (p10 and p11). FIG. 3B is a graphical representation of a small portion of an aggregated physical graph showing (for a given time period, such as an hour) which processes in a datacenter communicate with which other processes. Using MNC, processes p1, p2, and p3 will be clustered together (305), as they exhibit identical behavior (they communicate with p10 and only p10). Process p4, which communicates with both p10 and p11, will be clustered separately.

In MNC, only those processes exhibiting identical (communication) behavior will be clustered. In various embodiments, an alternate clustering approach can also/instead be used, which uses a similarity measure (e.g., constrained by a threshold value, such as a 60% similarity) to cluster items. In some embodiments, the output of MNC is used as input to SimRank, in other embodiments, MNC is omitted.

Figure 3C:
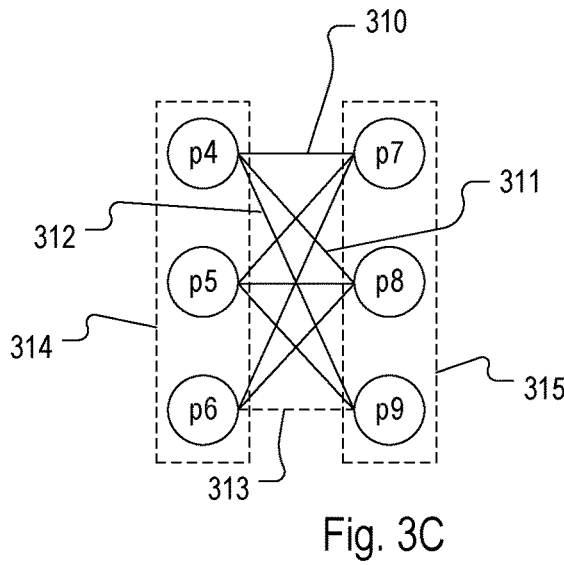
FIG. 3C depicts a set of example processes communicating with other processes.

FIG. 3C depicts a set of example processes (p4, p5, p6) communicating with other processes (p7, p8, p9). As illustrated, most of nodes p4, p5, and p6 communicate with most of nodes p7, p8, and p9 (as indicated in FIG. 3C with solid connection lines). As one example, process p4 communicates with process p7 (310), process p8 (311), and process p9 (312). An exception is process p6, which communicates with processes p7 and p8, but does not communicate with process p9 (as indicated by dashed line 313). If MNC were applied to the nodes depicted in FIG. 3C, nodes p4 and p5 would be clustered (and node p6 would not be included in their cluster).

One approach to similarity clustering is to use SimRank. In an embodiment of the SimRank approach, for a given node v in a directed graph, $I(v)$ and $O(v)$ denote the respective set of in-neighbors and out-neighbors of v. Individual in-neighbors are denoted as $I_i(v)$, for $1 \leq i \leq |I(v)|$, and individual out-neighbors are denoted as $O_i(v)$, for $1 \leq i \leq |O(v)|$. The similarity between two objects a and b can be denoted by $s(a,b) \in [1,0]$. A recursive equation (hereinafter "the SimRank equation") can be written for $s(a,b)$, where, if a-b, then $s(a,b)$ is defined as 1, otherwise, $$s(a, b) = \frac{C}{|I(a)||I(b)|} \sum_{i=1}^{|I(a)|} \sum_{j=1}^{|I(b)|} s(I_i(a), I_j(b))$$

where C is a constant between 0 and 1. One example value for the decay factor C is 0.8 (and a fixed number of iterations such as five). Another example value for the decay factor C is 0.6 (and/or a different number of iterations). In the event that a or b has no in-neighbors, similarity is set to s (a,b)=0, so the summation is defined to be 0 when $I(a)=\emptyset$ or $I(b)=\emptyset$.

The SimRank equations for a graph G can be solved by iteration to a fixed point. Suppose n is the number of nodes in G. For each iteration k, $n^2$ entries $s_k(*,*)$ are kept, where $s_k(a,b)$ gives the score between a and b on iteration k. Successive computations of $s_{k+1}(*,*)$ are made based on $s_k(*,*)$. Starting with $s_0(*,*)$, where each $s_0(a,b)$ is a lower bound on the actual SimRank score $$s(a, b): s_0(a, b) = \begin{cases} 1, \text{ if } a = b, \\ 0, \text{ if } a \neq b. \end{cases}$$

The SimRank equation can be used to compute $s_{k+1}(a,b)$ from $s_k(*,*)$ with $$s_{k+1}(a, b) = \frac{C}{|I(a)||I(b)|} \sum_{i=1}^{|I(a)|} \sum_{j=1}^{|I(b)|} s_k(I_i(a), I_j(b)) \text{ for } a \neq b,$$

and $s_{k+1}(a,b)=1$ for a=b. On each iteration k+1, the similarity of (a,b) is updated using the similarity scores of the neighbors of (a,b) from the previous iteration k according to the SimRank equation. The values $s_k(*,*)$ are nondecreasing as k increases.

Returning to FIG. 3C, while MNC would cluster nodes p4 and p5 together (and not include node p6 in their cluster), application of SimRank would cluster nodes p4-p6 into one cluster (314) and also cluster nodes p7-p9 into another cluster (315).

Figure 3D:
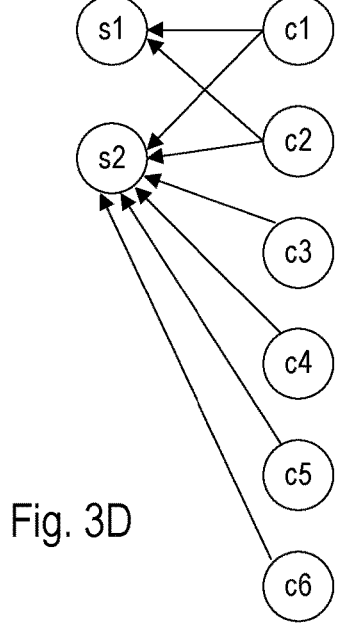
FIG. 3D depicts a set of example processes communicating with other processes.

FIG. 3D depicts a set of processes, and in particular server processes s1 and s2, and client processes c1, c2, c3, c4, c5, and c6. Suppose only nodes s1, s2, c1, and c2 are present in the graph depicted in FIG. 3D (and the other nodes depicted are omitted from consideration). Using MNC, nodes s1 and s2 would be clustered together, as would nodes c1 and c2.

Performing SimRank clustering as described above would also result in those two clusters (s1 and s2, and c1 and c2). As previously mentioned, in MNC, identical behavior is required. Thus, if node c3 were now also present in the graph, MNC would not include c3 in a cluster with c2 and c1 because node c3 only communicates with node s2 and not node s1. In contrast, a SimRank clustering of a graph that includes nodes s1, s2, c1, c2, and c3 would result (based, e.g., on an applicable selected decay value and number of iterations) in a first cluster comprising nodes s1 and s2, and a second cluster of c1, c2, and c3. As an increasing number of nodes which communicate with server process s2, and do not also communicate with server process s1, are included in the graph (e.g., as c4, c5, and c6 are added), under SimRank, nodes s1 and s2 will become decreasingly similar (i.e., their intersection is reduced).

In various embodiments, SimRank is modified (from what is described above) to accommodate differences between the asymmetry of client and server connections. As one example, SimRank can be modified to use different thresholds for client communications (e.g., an 80% match among nodes c1-c6) and for server communications (e.g., a 60% match among nodes s1 and s2). Such modification can also help achieve convergence in situations such as where a server process dies on one node and restarts on another node.

The application of MNC/SimRank to an aggregated physical graph results in a smaller graph, in which processes which are determined to be sufficiently similar are clustered together. Typically, clusters generated as output of MNC will be underinclusive. For example, for the nodes depicted in FIG. 3C, process p6 will not be included in a cluster with processes p4 and p5, despite substantial similarity in their communication behaviors. The application of SimRank (e.g., to the output of MNC) helps mitigate the underinclusiveness of MNC, but can result in overly inclusive clusters. As one example, suppose (returning to the nodes depicted in FIG. 3B) that as a result of applying SimRank to the depicted nodes, nodes p1-p4 are all included in a single cluster. Both MNC and SimRank operate agnostically of which application a given process belongs to. Suppose processes p1-p3 each correspond to a first application (e.g., an update engine), and process p4 corresponds to a second application (e.g., sshd). Further suppose process p10 corresponds to contact with AWS. Clustering all four of the processes together (e.g., as a result of SimRank) could be problematic, particularly in a security context (e.g., where granular information useful in detecting threats would be lost).

As previously mentioned, data platform 12 may maintain a mapping between processes and the applications to which they belong. In various embodiments, the output of SimRank (e.g., SimRank clusters) is split based on the applications to which cluster members belong (such a split is also referred to herein as a "CmdType split"). If all cluster members share a common application, the cluster remains. If different cluster members originate from different applications, the cluster members are split along application-type (CmdType) lines. Using the nodes depicted in FIG. 3D as an example, suppose that nodes c1, c2, c3, and c5 all share "update engine" as the type of application to which they belong (sharing a CmdType). Suppose that node c4 belongs to "ssh," and suppose that node c6 belongs to "bash." As a result of SimRank, all six nodes (c1-c6) might be clustered into a single cluster. After a CmdType split is performed on the cluster, however, the single cluster will be broken into three clusters (c1, c2, c3, c5; c4; and c6). Specifically, the resulting clusters comprise processes associated with the same type of application, which exhibit similar behaviors (e.g., communication behaviors). Each of the three clusters resulting from the CmdType split represents, respectively, a node (also referred to herein as a PType) of a particular CmdType. Each PType is given a persistent identifier and stored persistently as a cumulative graph.

A variety of approaches can be used to determine a CmdType for a given process. As one example, for some applications (e.g., sshd), a one-to-one mapping exists between the CmdType and the application/binary name. Thus, processes corresponding to the execution of sshd will be classified using a CmdType of sshd. In various embodiments, a list of common application/binary names (e.g., sshd, apache, etc.) is maintained by data platform 12 and manually curated as applicable. Other types of applications (e.g., Java, Python, and Ruby) are multi-homed, meaning that several very different applications may all execute using the binary name, "java." For these types of applications, information such as command line/execution path information can be used in determining a CmdType. In particular, the subapplication can be used as the CmdType of the application, and/or term frequency analysis (e.g., TF/IDF) can be used on command line information to group, for example, any marathon related applications together (e.g., as a python.marathon CmdType) and separately from other Python applications (e.g., as a python.airflow CmdType).

In various embodiments, machine learning techniques are used to determine a CmdType. The CmdType model is constrained such that the execution path for each CmdType is unique. One example approach to making a CmdType model is a random forest based approach. An initial CmdType model is bootstrapped using process parameters (e.g., available within one minute of process startup) obtained using one hour of information for a given customer (e.g., entity A). Examples of such parameters include the command line of the process, the command line of the process's parent(s) (if applicable), the uptime of the process, UID/EUID and any change information, TTY and any change information, listening ports, and children (if any). Another approach is to perform term frequency clustering over command line information to convert command lines into cluster identifiers.

The random forest model can be used (e.g., in subsequent hours) to predict a CmdType for a process (e.g., based on features of the process). If a match is found, the process can be assigned the matching CmdType. If a match is not found, a comparison between features of the process and its nearest CmdType (e.g., as determined using a Levenstein distance) can be performed. The existing CmdType can be expanded to include the process, or, as applicable, a new CmdType can be created (and other actions taken, such as generating an alert). Another approach to handling processes which do not match an existing CmdType is to designate such processes as unclassified, and once an hour, create a new random forest seeded with process information from a sampling of classified processes (e.g., 10 or 100 processes per CmdType) and the new processes. If a given new process winds up in an existing set, the process is given the corresponding CmdType. If a new cluster is created, a new CmdType can be created.

Conceptually, a polygraph represents the smallest possible graph of clusters that preserve a set of rules (e.g., in which nodes included in the cluster must share a CmdType and behavior). As a result of performing MNC, SimRank, and cluster splitting (e.g., CmdType splitting) many processes are clustered together based on commonality of behavior (e.g., communication behavior) and commonality of application type. Such clustering represents a significant reduction in graph size (e.g., compared to the original raw physical graph). Nonetheless, further clustering can be performed (e.g., by iterating on the graph data using the GBM to achieve such a polygraph). As more information within the graph is correlated, more nodes can be clustered together, reducing the size of the graph, until convergence is reached and no further clustering is possible.

Figure 3E:
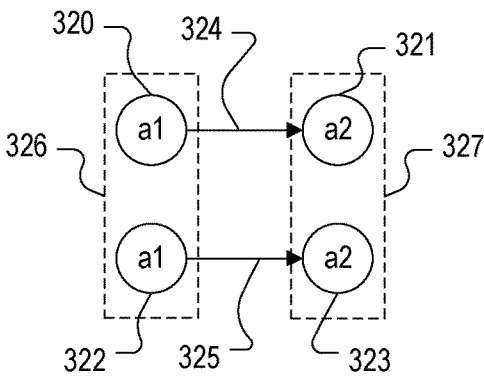
FIG. 3E depicts two pairs of clusters.

FIG. 3E depicts two pairs of clusters. In particular, cluster 320 represents a set of client processes sharing the same CmdType ("a1"), communicating (collectively) with a server process having a CmdType ("a2"). Cluster 322 also represents a set of client processes having a CmdType a1 communicating with a server process having a CmdType a2. The nodes in clusters 320 and 322 (and similarly nodes in 321 and 323) remain separately clustered (as depicted) after MNC/SimRank/CmdType splitting-isolated islands. One reason this could occur is where server process 321 corresponds to processes executing on a first machine (having an IP address of 1.1.1.1). The machine fails and a new server process 323 starts, on a second machine (having an IP address of 2.2.2.2) and takes over for process 321.

Communications between a cluster of nodes (e.g., nodes of cluster 320) and the first IP address can be considered different behavior from communications between the same set of nodes and the second IP address, and thus communications 324 and 325 will not be combined by MNC/SimRank in various embodiments. Nonetheless, it could be desirable for nodes of clusters 320/322 to be combined (into cluster 326), and for nodes of clusters 321/323 to be combined (into cluster 327), as representing (collectively) communications between a1 and a2. One task that can be performed by data platform 12 is to use DNS query information to map IP addresses to logical entities. As will be described in more detail below, GBM 154 can make use of the DNS query information to determine that graph nodes of cluster 320 and graph nodes of cluster 322 both made DNS queries for "appserverabc.example.com," which first resolved to 1.1.1.1 and then to 2.2.2.2, and to combine nodes 320/322 and 321/323 together into a single pair of nodes (326 communicating with 327).

In various embodiments, GBM 154 operates in a batch manner in which it receives as input the nodes and edges of a graph for a particular time period along with its previous state, and generates as output clustered nodes, cluster membership edges, cluster-to-cluster edges, events, and its next state.

GBM 154 may not try to consider all types of entities and their relationships that may be available in a conceptual common graph all at once. Instead, GBM uses a concept of models where a subset of node and edge types and their properties are considered in a given model. Such an approach is helpful for scalability, and also to help preserve detailed information (of particular importance in a security context)—as clustering entities in a more complex and larger graph could result in less useful results. In particular, such an approach allows for different types of relationships between entities to be preserved/more easily analyzed.

While GBM 154 can be used with different models corresponding to different subgraphs, core abstractions remain the same across types of models.

For example, each node type in a GBM model is considered to belong to a class. The class can be thought of as a way for the GBM to split nodes based on the criteria it uses for the model. The class for a node is represented as a string whose value is derived from the node's key and properties depending on the GBM Model. Note that different GBM models may create different class values for the same node.

For each node type in a given GBM model, GBM 154 can generate clusters of nodes for that type. A GBM generated cluster for a given member node type cannot span more than one class for that node type. GBM 154 generates edges between clusters that have the same types as the edges between source and destination cluster node types.

Additionally or alternatively, the processes described herein as being used for a particular model can be used (can be the same) across models, and different models can also be configured with different settings.

Additionally or alternatively, the node types and the edge types may correspond to existing types in the common graph node and edge tables but this is not necessary. Even when there is a correspondence, the properties provided to GBM 154 are not limited to the properties that are stored in the corresponding graph table entries. They can be enriched with additional information before being passed to GBM 154.

Logically, the input for a GBM model can be characterized in a manner that is similar to other graphs. Edge triplets can be expressed, for example, as an array of source node type, edge type, and destination node type. And, each node type is associated with node properties, and each edge type is associated with edge properties. Other edge triplets can also be used (and/or edge triplets can be extended) in accordance with various embodiments.

Note that the physical input to the GBM model need not (and does not, in various embodiments) conform to the logical input. For example, the edges in the PtypeConn model correspond to edges between Matching Neighbors (MN) clusters, where each process node has an MN cluster identifier property. In the User ID to User ID model (also referred to herein as the Uid2Uid model), edges are not explicitly provided separately from nodes (as the euid array in the node properties serves the same purpose). In both cases, however, the physical information provides the applicable information necessary for the logical input.

The state input for a particular GBM model can be stored in a file, a database, or other appropriate storage. The state file (from a previous run) is provided, along with graph data, except for when the first run for a given model is performed, or the model is reset. In some cases, no data may be available for a particular model in a given time period, and GBM may not be run for that time period. As data becomes available at a future time, GBM can run using the latest state file as input.

GBM 154 outputs cluster nodes, cluster membership edges, and inter-cluster relationship edges that are stored (in some embodiments) in the graph node tables: node_c, node_cm, and node_icr, respectively. The type names of nodes and edges may conform to the following rules:

A given node type can be used in multiple different GBM models. The type names of the cluster nodes generated by two such models for that node type will be different. For instance, process type nodes will appear in both PtypeConn and Uid2Uid models, but their cluster nodes will have different type names.

The membership edge type name is "MemberOf."

The edge type names for cluster-to-cluster edges will be the same as the edge type names in the underlying node-to-node edges in the input.

The following are example events GBM 154 can generate: new class, new cluster, new edge from class to class, split class (the notion that GBM 154 considers all nodes of a given type and class to be in the same cluster initially and if GBM 154 splits them into multiple clusters, it is splitting a class), new edge from cluster and class, new edge between cluster and cluster, and/or new edge from class to cluster.

One underlying node or edge in the logical input can cause multiple types of events to be generated. Conversely, one event can correspond to multiple nodes or edges in the input. Not every model generates every event type.

Additional information regarding examples of data structures/models that can be used in conjunction with models used by data platform 12 is now provided.

In some examples, a PTypeConn Model clusters nodes of the same class that have similar connectivity relationships. For example, if two processes had similar incoming neighbors of the same class and outgoing neighbors of the same class, they could be clustered.

The node input to the PTypeConn model for a given time period includes non-interactive (i.e., not associated with tty) process nodes that had connections in the time period and the base graph nodes of other types (IP Service Endpoint (IPSep) comprising an IP address and a port, DNS Service Endpoint (DNSSep) and IP Address) that have been involved in those connections. The base relationship is the connectivity relationship for the following type triplets:

Process, ConnectedTo, Process

Process, ConnectedTo, IP Service Endpoint (IPSep)

Process, ConnectedTo, DNS Service Endpoint (DNSSep)

IP Address, ConnectedTo, ProcessProcess, DNS, ConnectedTo, Process

The edge inputs to this model are the ConnectedTo edges from the MN cluster, instead of individual node-to-node ConnectedTo edges from the base graph. The membership edges created by this model refer to the base graph node type provided in the input.

Class Values:

The class values of nodes are determined as follows depending on the node type (e.g., Process nodes, IPSep nodes, DNSSep nodes, and IP Address nodes).

Process Nodes:

if exe_path contains java then "java <cmdline_term_1> . . . "

else if exe_path contains python then "python <cmdline_term 1> . . . "

else "last_part_of_exe_path"

IPSep nodes:

if IP_internal then "IntIPS"

else if severity=0 then "<IP_addr>:<protocol>:<port>"

else "<IP_addr>:<port>BadIP"

DNSSep nodes:

if IP_internal=1 then "<hostname>"

else if severity=0 then "<hostname>:<protocol>:port"

else "<hostname>:<port>_BadIP"

IPAddress nodes (will appear only on client side):

if IP_internal=1 then "IPIntC"

else if severity=0 then "ExtIPC"

else "ExtBadIPC"

Events:

A new class event in this model for a process node is equivalent to seeing a new CType being involved in a connection for the first time. Note that this does not mean the CType was not seen before. It is possible that it was previously seen but did not make a connection at that time.

A new class event in this model for an IPSep node with IP_internal=0 is equivalent to seeing a connection to a new external IP address for the first time.

A new class event in this model for a DNSSep node is equivalent to seeing a connection to a new domain for the first time.

A new class event in this model for an IPAddress node with IP_internal=0 and severity=0 is equivalent to seeing a connection from any external IP address for the first time.

A new class event in this model for an IPAddress node with IP_internal=0 and severity>0 is equivalent to seeing a connection from any bad external IP address for the first time.

A new class to class to edge from a class for a process node to a class for a process node is equivalent to seeing a communication from the source CType making a connection to the destination CType for the first time.

A new class to class to edge from a class for a process node to a class for a DNSSep node is equivalent to seeing a communication from the source CType making a connection to the destination domain name for the first time.

An IntPConn Model may be similar to the PtypeConn Model, except that connection edges between parent/child processes and connections between processes where both sides are not interactive are filtered out.

A Uid2Uid Model may cluster processes with the same username that show similar privilege change behavior. For instance, if two processes with the same username had similar effective user values, launched processes with similar usernames, and were launched by processes with similar usernames, then they could be clustered.

An edge between a source cluster and destination cluster generated by this model means that all of the processes in the source cluster had a privilege change relationship to at least one process in the destination cluster.

The node input to this model for a given time period includes process nodes that are running in that period. The value of a class of process nodes is "<username>".

The base relationship that is used for clustering is privilege change, either by the process changing its effective user ID, or by launching a child process which runs with a different user.

The physical input for this model includes process nodes (only), with the caveat that the complete ancestor hierarchy of process nodes active (i.e., running) for a given time period is provided as input even if an ancestor is not active in that time period. Note that effective user IDs of a process are represented as an array in the process node properties, and launch relationships are available from ppid_hash fields in the properties as well.

A new class event in this model is equivalent to seeing a user for the first time.

A new class to class edge event is equivalent to seeing the source user making a privilege change to the destination user for the first time.

A Ct2Ct Model may cluster processes with the same CType that show similar launch behavior. For instance, if two processes with the same CType have launched processes with similar CTypes, then they could be clustered.

The node input to this model for a given time period includes process nodes that are running in that period. The value class of process nodes is CType (similar to how it is created for the PtypeConn Model).

The base relationship that is used for clustering is a parent process with a given CType launching a child process with another given destination CType.

The physical input for this model includes process nodes (only) with the caveat that the complete ancestor hierarchy active process nodes (i.e., that are running) for a given time period is provided as input even if an ancestor is not active in that time period. Note that launch relationships are available from ppid_hash fields in the process node properties.

An edge between a source cluster and destination cluster generated by this model means that all of the processes in the source cluster launched at least one process in the destination cluster.

A new class event in this model is equivalent to seeing a CType for the first time. Note that the same type of event will be generated by the PtypeConn Model as well.

A new class to class edge event is equivalent to seeing the source CType launching the destination CType for the first time.

An MTypeConn Model may cluster nodes of the same class that have similar connectivity relationships. For example, if two machines had similar incoming neighbors of the same class and outgoing neighbors of the same class, they could be clustered.

A new class event in this model will be generated for external IP addresses or (as applicable) domain names seen for the first time. Note that a new class to class to edge Machine, class to class for an IPSep or DNSName node will also be generated at the same time.

The membership edges generated by this model will refer to Machine, IPAddress, DNSName, and IPSep nodes in the base graph. Though the nodes provided to this model are IPAddress nodes instead of IPSep nodes, the membership edges it generates will refer to IPSep type nodes. Alternatively, the base graph can generate edges between Machine and IPSep node types. Note that the Machine to IPAddress edges have tcp_dst_ports/udp_dst_ports properties that can be used for this purpose.

The node input to this model for a given time period includes machine nodes that had connections in the time period and the base graph nodes of other types (IPAddress and DNSName) that were involved in those connections.

The base relationship is the connectivity relationship for the following type triplets:

Machine, ConnectedTo, Machine
Machine, ConnectedTo, IPAddress
Machine, ConnectedTo, DNSName
IPAddress, ConnectedTo, Machine, DNS, ConnectedTo, Machine The edge inputs to this model are the corresponding ConnectedTo edges in the base graph.

Class Values:

Machine:

The class value for all Machine nodes is "Machine."

The machine_terms property in the Machine nodes is used, in various embodiments, for labeling machines that are clustered together. If a majority of the machines clustered together share a term in the machine_terms, that term can be used for labeling the cluster.

IPSep:

The class value for IPSep nodes is determined as follows:
if IP_internal then "IntIPS"
else
if severity=0 then "<ip_addr>:<protocol>:<port>"
else "<IP_addr_BadIP>"

IP Address:

The class value for IpAddress nodes is determined as follows:
if IP_internal then "IntIPC"
else
if severity=0 then "ExtIPC"
else "ExtBadIPC"

DNSName:

The class value for DNSName nodes is determined as follows:
if severity=0 then "<hostname>"
else then "<hostname>BadIP"

An example structure for a New Class Event is now described.

The key field for this event type looks as follows (using the PtypeConn model as an example):

```
{
"node": {
"class": {
"cid": "httpd"
},
"key": {
"cid": "29654"
},
"type": "PtypeConn"
}
}
```

It contains the class value and also the ID of the cluster where that class value is observed. Multiple clusters can be observed with the same value in a given time period. It contains the class value and also the ID of the cluster where that class value is observed. Multiple clusters can be observed with the same value in a given time period. Accordingly, in some embodiments, GBM 154 generates multiple events of this type for the same class value.

The properties field looks as follows:

```
{
"set_size": 5
}
```

The set_size indicates the size of the cluster referenced in the keys field.

Conditions:

For a given model and time period, multiple NewClass events can be generated if there is more than one cluster in that class. NewNode events will not be generated separately in this case. Example New Class to Class Edge Event structure:

The key field for this event type looks as follows (using the PtypeConn model as an example):

```
"edge": {
"dst_node": {
"class": {
"cid": "java war"
},
"key": {
"cid": "27635"
},
"type": "PtypeConn"
},
"src_node": {
"class": {
"cid": "IntIPC"
},
"key": {
"cid": "20881"
},
"type": "PtypeConn"
},
"type": "ConnectedTo"
}
```

The key field contains source and destination class values and also source and destination cluster identifiers (i.e., the src/dst_node: key.cid represents the src/dst cluster identifier).

In a given time period for a given model, an event of this type could involve multiple edges between different cluster pairs that have the same source and destination class values.

GBM 154 can generate multiple events in this case with different source and destination cluster identifiers.

The props fields look as follows for this event type:

```
{
"dst_set_size": 2,
"src_set_size": 1
}
```

The source and destination sizes represent the sizes of the clusters given in the keys field. Conditions:

For a given model and time period, multiple NewClassTo-Class events can be generated if there are more than one pair of clusters in that class pair. NewNodeToNode events are not generated separately in this case.

Combining Events at the Class Level: for a given model and time period, the following example types of events can represent multiple changes in the underlying GBM cluster level graph in terms of multiple new clusters or multiple new edges between clusters:

NewClass

NewEdgeClassToClass

NewEdgeNodeToClass

NewEdgeClassToNode

Multiple NewClass events with the same model and class can be output if there are multiple clusters in that new class.

Multiple NewEdgeClassToClass events with the same model and class pair can be output if there are multiple new cluster edges within that class pair.

Multiple NewEdgeNodeToClass events with the same model and destination class can be output if there are multiple new edges from the source cluster to the destination clusters in that destination class (the first time seeing this class as a destination cluster class for the source cluster).

Multiple NewEdgeClassToNode events with the same model and source class can be output if there are multiple new edges from source clusters to the destination clusters in that source class (the first time seeing this class as a source cluster class for the destination cluster).

These events may be combined at the class level and treated as a single event when it is desirable to view changes at the class level, e.g., when one wants to know when there is a new CType.

In some examples, different models may have partial overlap in the types of nodes they use from the base graph. Therefore, they can generate NewClass type events for the same class. NewClass events can also be combined across models when it is desirable to view changes at the class level.

Using techniques herein, actions can be associated with processes and (e.g., by associating processes with users) actions can thus also be associated with extended user sessions. Such information can be used to track user behavior correctly, even where a malicious user attempts to hide his trail by changing user identities (e.g., through lateral movement). Extended user session tracking can also be useful in operational use cases without malicious intent, e.g., where users make original logins with distinct usernames (e.g., "charlie" or "dave") but then perform actions under a common username (e.g., "admin" or "support"). One such example is where multiple users with administrator privileges exist, and they need to gain superuser privilege to perform a particular type of maintenance. It may be desirable to know which operations are performed (as the superuser) by which original user when debugging issues. In the following examples describing extended user session tracking, reference is generally made to using the secure shell (ssh) protocol as implemented by openssh (on the server side) as the mechanism for logins. However, extended user session tracking is not limited to the ssh protocol or a particular limitation and the techniques described herein can be extended to other login mechanisms.

On any given machine, there will be a process that listens for and accepts ssh connections on a given port. This process can run the openssh server program running in daemon mode or it could be running another program (e.g., initd on a Linux system). In either case, a new process running openssh will be created for every new ssh login session and this process can be used to identify an ssh session on that machine. This process is called the "privileged" process in openssh.

After authentication of the ssh session, when an ssh client requests a shell or any other program to be run under that ssh session, a new process that runs that program will be created under (i.e., as a child of) the associated privileged process. If an ssh client requests port forwarding to be performed, the connections will be associated with the privileged process.

In modern operating systems such as Linux and Windows, each process has a parent process (except for the very first process) and when a new process is created the parent process is known. By tracking the parent-child hierarchy of processes, one can determine if a particular process is a descendant of a privileged openssh process and thus if it is associated with an ssh login session.

For user session tracking across machines (or on a single machine with multiple logins) in a distributed environment, it is established when two login sessions have a parent-child relationship. After that, the "original" login session, if any, for any given login session can be determined by following the parent relationship recursively.

Figure 3F:
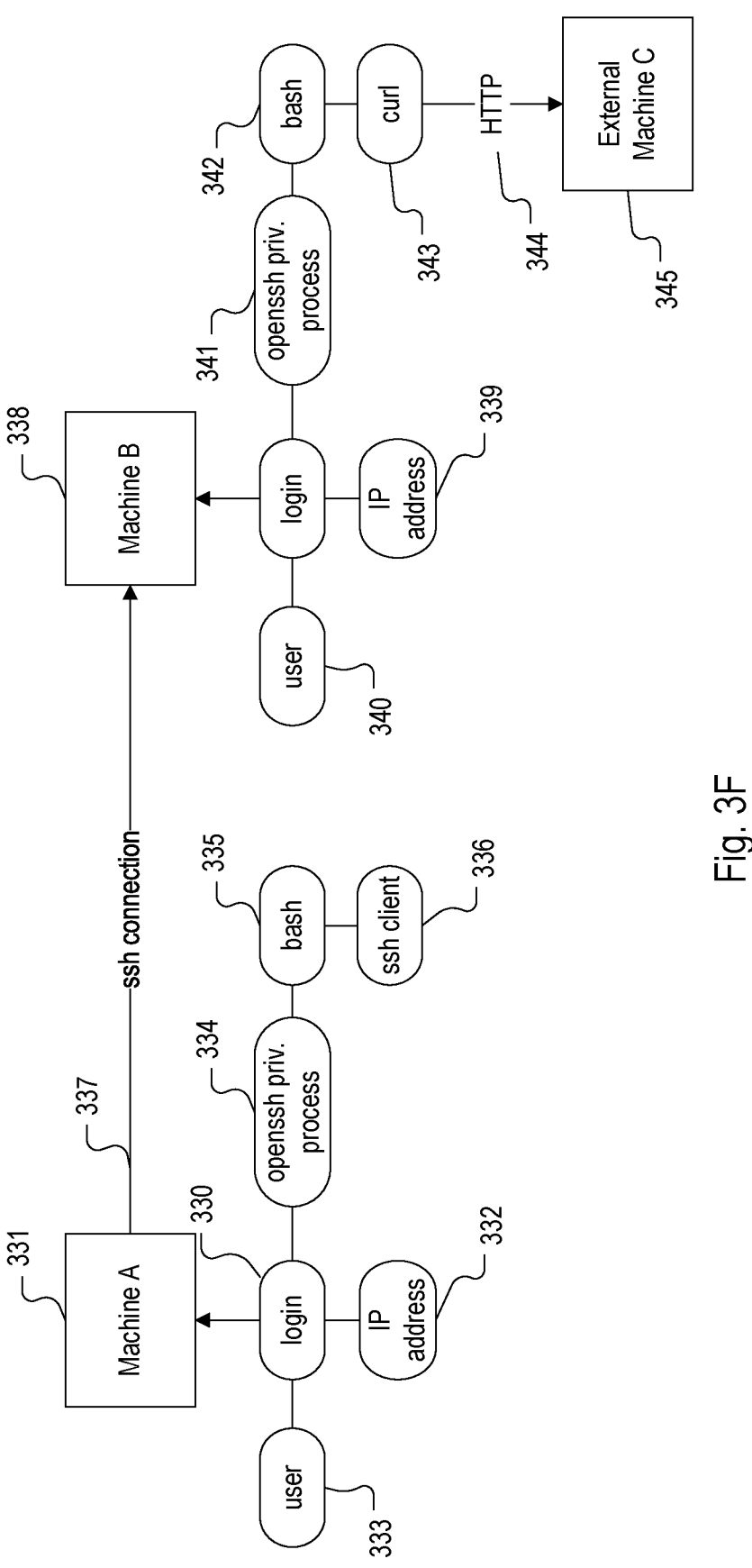
FIG. 3F is a representation of a user logging into a first machine, then into a second machine from the first machine, and then making an external connection.

FIG. 3F is a representation of a user logging into a first machine and then into a second machine from the first machine, as well as information associated with such actions. In the example of FIG. 3F, a user, Charlie, logs into Machine A (331) from a first IP address (332). As part of the login process, he provides a username (333). Once connected to Machine A, an openssh privileged process (334) is created to handle the connection for the user, and a terminal session is created and a bash process (335) is created as a child. Charlie launches an ssh client (336) from the shell, and uses it to connect (337) to Machine B (338). As with the connection he makes to Machine A, Charlie's connection to Machine B will have an associated incoming IP address (339), in this case, the IP address of Machine A. And, as part of the login process with Machine B, Charlie will provide a username (340) which need not be the same as username 333. An openssh privileged process (341) is created to handle the connection, and a terminal session and child bash process (342) will be created. From the command line of Machine B, Charlie launches a curl command (343), which opens an HTTP connection (344) to an external Machine C (345).

Figure 3G:
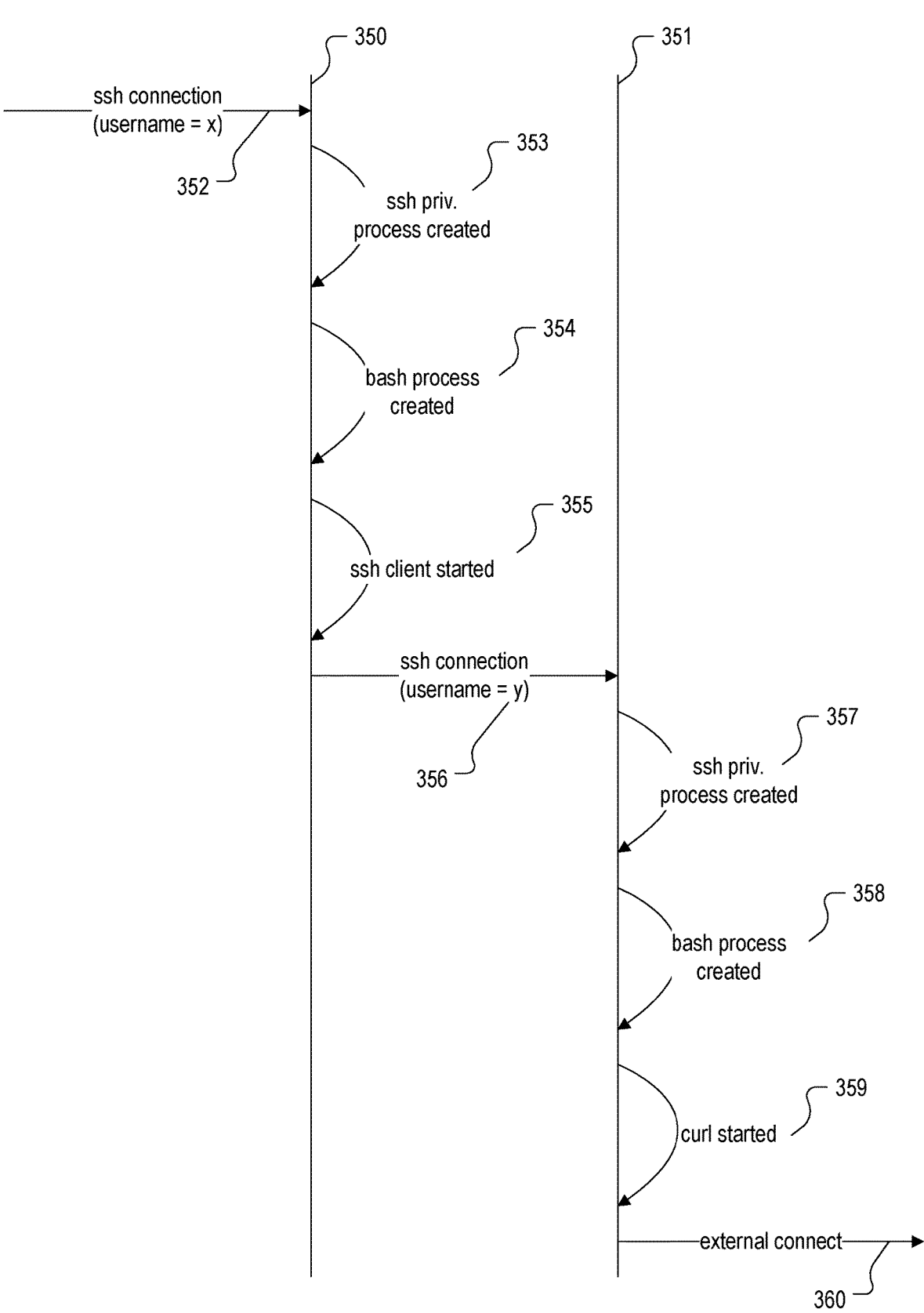
FIG. 3G is an alternate representation of actions occurring in FIG. 3F.

FIG. 3G is an alternate representation of actions occurring in FIG. 3F, where events occurring on Machine A are indicated along line 350, and events occurring on Machine B are indicated along line 351. As shown in FIG. 3G, an incoming ssh connection is received at Machine A (352). Charlie logs in (as user "x") and an ssh privileged process is created to handle Charlie's connection (353). A terminal session is created and a bash process is created (354) as a child of process 353. Charlie wants to ssh to Machine B, and so executes an ssh client on Machine A (355), providing credentials (as user "y") at 356. Charlie logs into Machine B, and an sash privileged process is created to handle Charlie's connection (357). A terminal session is created and a bash process is created (358) as a child of process 357. Charlie then executes curl (359) to download content from an external domain (via connection 360).

The external domain could be a malicious domain, or it could be benign. Suppose the external domain is malicious (and, e.g., Charlie has malicious intent). It would be advantageous (e.g., for security reasons) to be able to trace the contact with the external domain back to Machine A, and then back to Charlie's IP address. Using techniques described herein (e.g., by correlating process information collected by various agents), such tracking of Charlie's activities back to his original login (330) can be accomplished. In particular, an extended user session can be tracked that associates Charlie's ssh processes together with a single original login and thus original user.

As described herein, software agents (such as agent 112) may run on machines (such as a machine that implements one of nodes 116) and detect new connections, processes, and/or logins. As also previously explained, such agents send associated records to data platform 12 which includes one or more datastores (e.g., data store 30) for persistently storing such data. Such data can be modeled using logical tables, also persisted in datastores (e.g., in a relational database that provides an SQL interface), allowing for querying of the data. Other datastores such as graph oriented databases and/or hybrid schemes can also be used.

The following identifiers are commonly used in the tables:
MID
PID_hash

An ssh login session can be identified uniquely by an (MID, PID_hash) tuple. The MID is a machine identifier that is unique to each machine, whether physical or virtual, across time and space. Operating systems use numbers called process identifiers (PIDs) to identify processes running at a given time. Over time processes may die and new processes may be started on a machine or the machine itself may restart. The PID is not necessarily unique across time in that the same PID value can be reused for different processes at different times. In order to track process descendants across time, one should therefore account for time as well. In order to be able to identify a process on a machine uniquely across time, another number called a PID_hash is generated for the process. In various embodiments, the PID_hash is generated using a collision-resistant hash function that takes the PID, start time, and (in various embodiments, as applicable) other properties of a process.

Input data collected by agents comprises the input data model and is represented by the following logical tables:
connections
processes
logins A connections table may maintain records of TCP/IP connections observed on each machine. Example columns included in a connections table are as follows:

| Column Name | Description |
| --- | --- |
| MID | Identifier of the machine that the connection was observed on. |
| start_time | Connection start time. |
| PID_hash | Identifier of the process that was associated with the connection. |
| src_IP_addr | Source IP address (the connection was initiated from this IP address). |
| src_port | Source port. |
| dst_IP_addr | Destination IP address (the connection was made to this IP address). |
| dst_port | Destination port. |
| Prot | Protocol (TCP or UDP). |
| Dir | Direction of the connection (incoming or outgoing) with respect to this machine. |

The source fields (IP address and port) correspond to the side from which the connection was initiated. On the destination side, the agent associates an ssh connection with the privileged ssh process that is created for that connection.

For each connection in the system, there will be two records in the table, assuming that the machines on both sides of the connection capture the connection. These records can be matched based on equality of the tuple (src_IP_addr, src_port, dst_IP_addr, dst_port, Prot) and proximity of the start_time fields (e.g., with a one minute upper threshold between the start_time fields).

A processes table maintains records of processes observed on each machine. It may have the following columns:

| Column Name | Description |
| --- | --- |
| MID | Identifier of the machine that the process was observed on. |
| PID_hash | Identifier of the process. |
| start_time | Start time of the process. |
| exe_path | The executable path of the process. |
| PPID_hash | Identifier of the parent process. |

A logins table may maintain records of logins to machines. It may have the following columns:

| Column Name | Description |
| --- | --- |
| MID | Identifier of the machine that the login was observed on. |
| sshd_PID_hash | Identifier of the sshd privileged process associated with login. |
| login_time | Time of login. |
| login_username | Username used in login. |

Output data generated by session tracking is represented with the following logical tables:
login-local-descendant
login-connection
login-lineage Using data in these tables, it is possible to determine descendant processes of a given ssh login session across the environment (i.e., spanning machines). Conversely, given a process, it is possible to determine if it is an ssh login descendant as well as the original ssh login session for it if so.

A login-local-descendant table maintains the local (i.e., on the same machine) descendant processes of each ssh login session. It may have the following columns:

| Column Name | Description |
| --- | --- |
| MID | Identifier of the machine that the login was observed on. |
| sshd_PID_hash | Identifier of the sshd privileged process associated with login. |

-continued

| Column Name | Description |
| --- | --- |
| login_time | Time of login. |
| login_username | Username used in login. |

A login-connections table may maintain the connections associated with ssh logins. It may have the following columns:

| Column Name | Description |
| --- | --- |
| MID | Identifier of the machine that the process was observed on. |
| sshd_PID_hash | Identifier of the sshd privileged process associated with the login. |
| login_time | Time of login. |
| login_username | The username used in the login. |
| src_IP_addr | Source IP address (connection was initiated from this IP address). |
| src_port | Source port. |
| dst_IP_addr | Destination IP address (connection was made to this IP address). |
| dst_port | Destination port. |

A login-lineage table may maintain the lineage of ssh login sessions. It may have the following columns:

| Column Name | Description |
| --- | --- |
| MID | Identifier of the machine that the ssh login was observed on. |
| sshd_PID_hash | Identifier of the sshd privileged process associated with the login. |
| parent_MID | Identifier of the machine that the parent ssh login was observed on. |
| parent_sshd_PID_hash | Identifier of the sshd privileged process associated with the parent login. |
| origin_MID | Identifier of the machine that the origin ssh login was observed on. |
| origin_sshd_PID_hash | Identifier of the sshd privileged process associated with the origin login. |

The parent_MID and parent_sshd_PID_hash columns can be null if there is no parent ssh login. In that case, the (MID, sshd_PID_hash) tuple will be the same as the (origin_MID, origin_sshd_PID_hash) tuple.

FIG. 3H illustrates an example of a process for performing extended user tracking. In various embodiments, process 361 is performed by data platform 12. The process begins at 362 when data associated with activities occurring in a network environment (such as entity A's datacenter) is received. One example of such data that can be received at 362 is agent-collected data described above (e.g., in conjunction with process 200). At 363, the received network activity is used to identify user login activity. And, at 364, a logical graph that links the user login activity to at least one user and at least one process is generated (or updated, as applicable). Additional detail regarding process 361, and in particular, portions 363 and 364 of process 361 are described in more detail below (e.g., in conjunction with discussion of FIG. 3J).

Figure 3I:
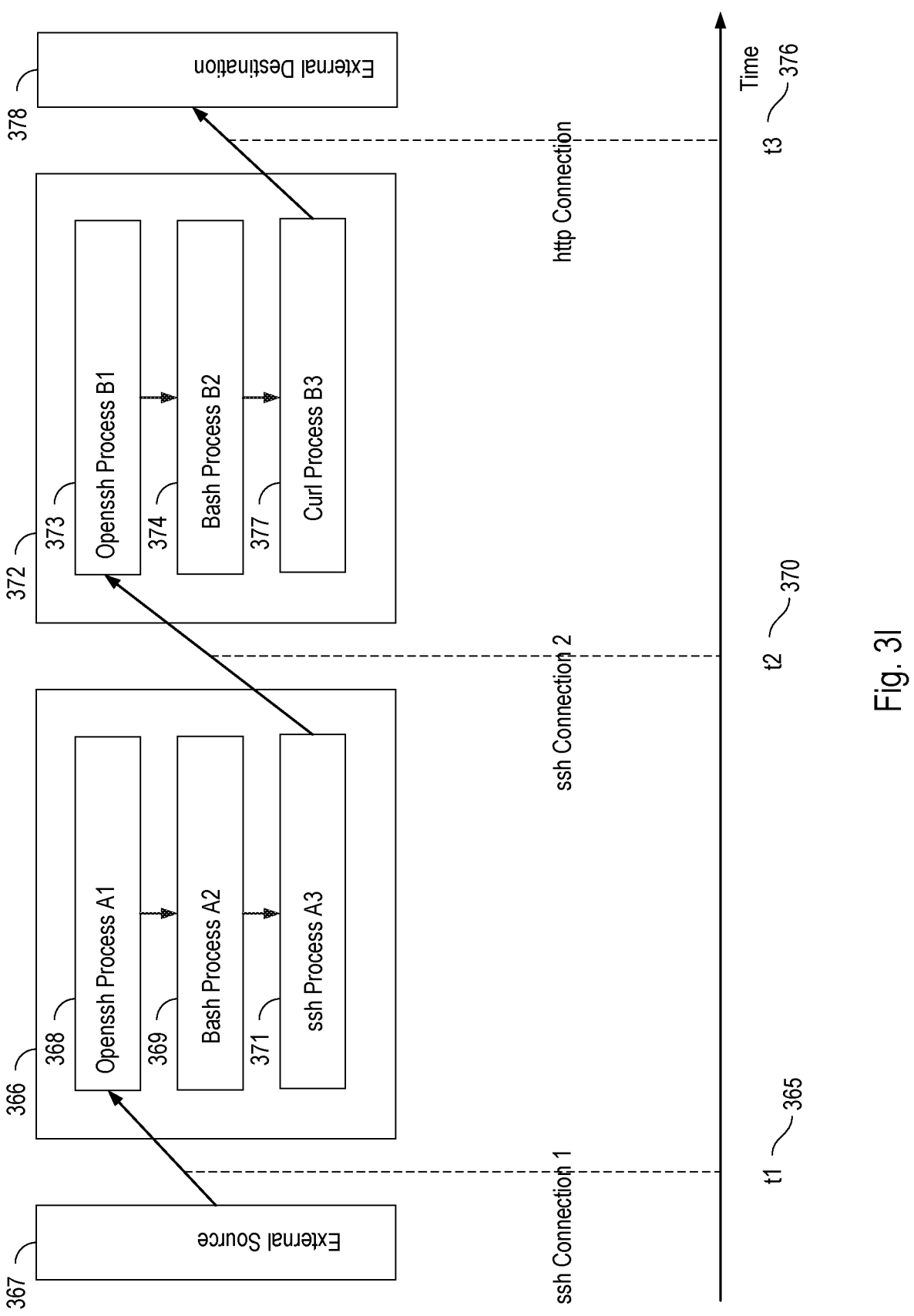
FIG. 3I is a representation of a user logging into a first machine, then into a second machine from the first machine, and then making an external connection.

FIG. 3I depicts a representation of a user logging into a first machine, then into a second machine from the first machine, and then making an external connection. The scenario depicted in FIG. 3I is used to describe an example of processing that can be performed on data collected by agents to generate extended user session tracking information. FIG. 3I is an alternate depiction of the information shown in FIGS. 3F and 3G.

At time t1 (365), a first ssh connection is made to Machine A (366) from an external source (367) by a user having a username of "X." In the following example, suppose the external source has an IP address of 1.1.1.10 and uses source port 10000 to connect to Machine A (which has an IP address of 2.2.2.20 and a destination port 22). External source 367 is considered an external source because its IP address is outside of the environment being monitored (e.g., is a node outside of entity A's datacenter, connecting to a node inside of entity A's datacenter).

A first ssh login session LS1 is created on machine A for user X. The privileged openssh process for this login is A1 (368). Under the login session LS1, the user creates a bash shell process with PID_hash A2 (369).

At time t2 (370), inside the bash shell process A2, the user runs an ssh program under a new process A3 (371) to log in to machine B (372) with a different username ("Y"). In particular, an ssh connection is made from source IP address 2.2.2.20 and source port 10001 (Machine A's source information) to destination IP address 2.2.2.21 and destination port 22 (Machine B's destination information).

A second ssh login session LS2 is created on machine B for user Y. The privileged openssh process for this login is B1 (373). Under the login session LS2, the user creates a bash shell process with PID_hash B2 (374).

At time t3 (376), inside the bash shell process B2, the user runs a curl command under a new process B3 (377) to download a file from an external destination (378). In particular, an HTTPS connection is made from source IP address 2.2.2.21 and source port 10002 (Machine B's source information) to external destination IP address 3.3.3.30 and destination port 443 (the external destination's information).

Using techniques described herein, it is possible to determine the original user who initiated the connection to external destination 378, which in this example is a user having the username X on machine A (where the extended user session can be determined to start with ssh login session LS1).

Based on local descendant tracking, the following determinations can be on machine A and B without yet having performed additional processing (described in more detail below):

A3 is a descendant of A1 and thus associated with LS1.
The connection to the external domain from machine B is initiated by B3.
B3 is a descendant of B1 and is thus associated with LS2.
Connection to the external domain is thus associated with LS2.

An association between A3 and LS2 can be established based on the fact that LS2 was created based on an ssh connection initiated from A3. Accordingly, it can be determined that LS2 is a child of LS1.

To determine the user responsible for making the connection to the external destination (e.g., if it were a known bad destination), first, the process that made the connection would be traced, i.e., from B3 to LS2. Then LS2 would be traced to LS1 (i.e., LS1 is the origin login session for LS2). Thus the user for this connection is the user for LS1, i.e., X. As represented in FIG. 3I, one can visualize the tracing by following the links (in the reverse direction of arrows) from external destination 378 to A1 (368).

In the example scenario, it is assumed that both ssh connections occur in the same analysis period. However, the approaches described herein will also work for connections and processes that are created in different time periods.

Figure 3J:
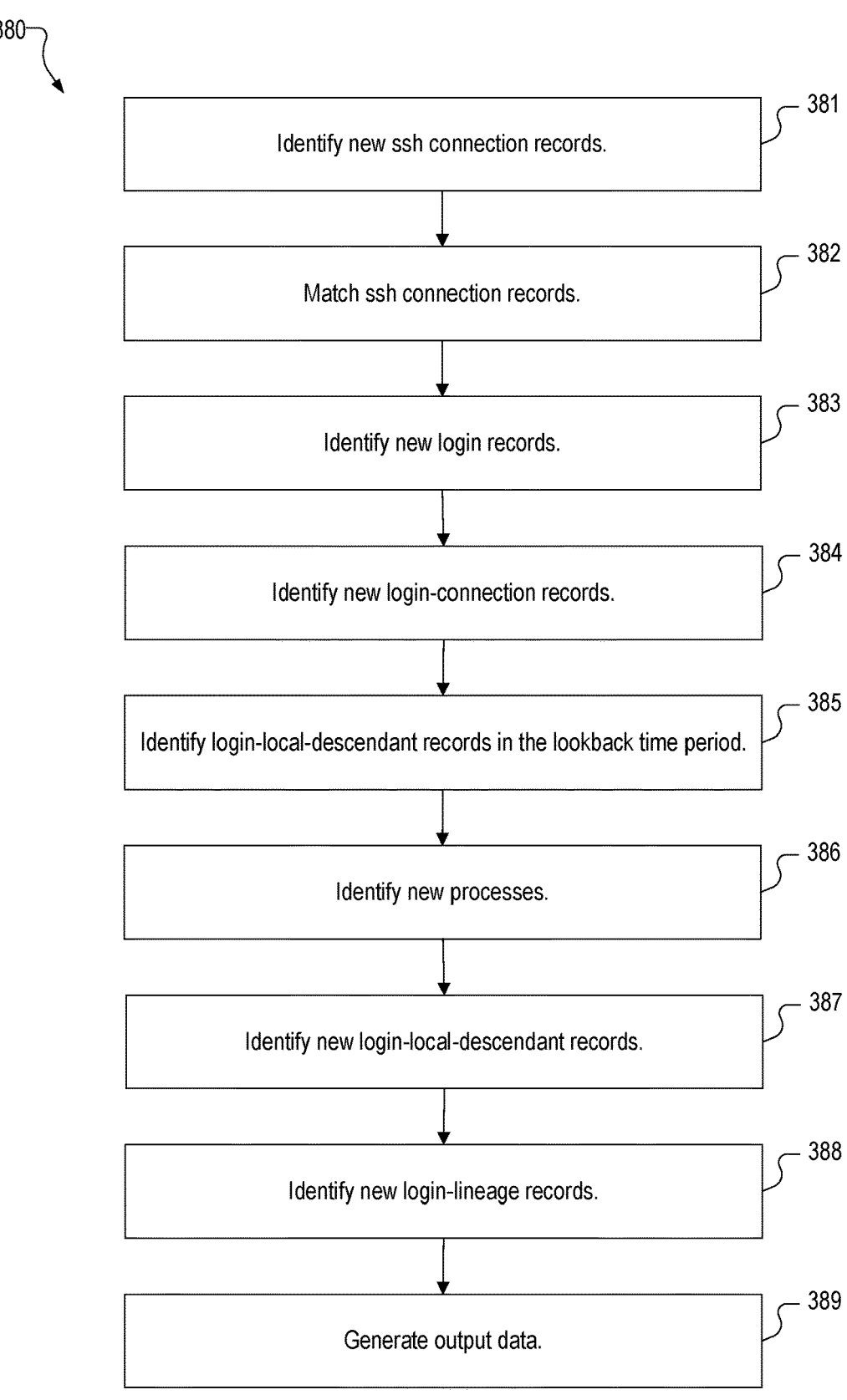
FIG. 3J illustrates an example of a process for performing extended user tracking.

FIG. 3J illustrates an example of a process for performing extended user tracking. In various embodiments, process 380 is performed periodically (e.g., once an hour in a batch fashion) by ssh tracker 148 to generate new output data. In general, batch processing allows for efficient analysis of large volumes of data. However, the approach can be adapted, as applicable, to process input data on a record-by-record fashion while maintaining the same logical data processing flow. As applicable the results of a given portion of process 380 are stored for use in a subsequent portion.

The process begins at 381 when new ssh connection records are identified. In particular, new ssh connections started during the current time period are identified by querying the connections table. The query uses filters on the start_time and dst_port columns. The values of the range filter on the start_time column are based on the current time period. The dst_port column is checked against ssh listening port(s). By default, the ssh listening port number is 22. However, as this could vary across environments, the port(s) that openssh servers are listening to in the environment can be determined by data collection agents dynamically and used as the filter value for the dst_port as applicable. In the scenario depicted in FIG. 3I, the query result will generate the records shown in FIG. 3K. Note that for the connection between machine A and B, the two machines are likely to report start_time values that are not exactly the same but close enough to be considered matching (e.g., within one minute or another appropriate amount of time). In the above table, they are shown to be the same for simplicity.

At 382, ssh connection records reported from source and destination sides of the same connection are matched. The ssh connection records (e.g., returned from the query at 381) are matched based on the following criteria:

The five tuples (src_IP, dst_IP, IP_port, src_port, dst_port) of the connection records must match.
The delta between the start times of the connections must be within a limit that would account for the worst case clock difference expected between two machines in the environment and typical connection setup latency.
If there are multiple matches possible, then the match with the smallest time delta is chosen.

Note that record 390 from machine A for the incoming connection from the external source cannot be matched with another record as there is an agent only on the destination side for this connection. Example output of portion 382 of process 380 is shown in FIG. 3L. The values in the dst_PID_hash column (391) are that of the sshd privileged process associated with ssh logins.

At 383, new logins during the current time period are identified by querying the logins table. The query uses a range filter on the login_time column with values based on the current time period. In the example depicted in FIG. 3I, the query result will generate the records depicted in FIG. 3M.

At 384, matched ssh connection records created at 382 and new login records created at 383 are joined to create new records that will eventually be stored in the login-connection table. The join condition is that dst_MID of the matched connection record is equal to the MID of the login record and the dst_PID_hash of the matched connection record is equal to the sshd_PID_hash of the login record. In the example depicted in FIG. 3I, the processing performed at 384 will generate the records depicted in FIG. 3N.

At 385, login-local-descendant records in the lookback time period are identified. It is possible that a process that is created in a previous time period makes an ssh connection in the current analysis batch period. Although not depicted in the example illustrated in FIG. 3I, consider a case where bash process A2 does not create ssh process A3 right away but instead that the ssh connection A3 later makes to machine B is processed in a subsequent time period than the one where A2 was processed. While processing this subsequent time period in which processes A3 and B1 are seen, knowledge of A2 would be useful in establishing that B1 is associated with A3 (via ssh connection) which is associated with A2 (via process parentage) which in turn would be useful in establishing that the parent of the second ssh login is the first ssh login. The time period for which look back is performed can be limited to reduce the amount of historical data that is considered. However, this is not a requirement (and the amount of look back can be determined, e.g., based on available processing resources). The login local descendants in the lookback time period can be identified by querying the login-local-descendant table. The query uses a range filter on the login_time column where the range is from start_time_of_current_period-lookback_time to start_time_of_current_period. (No records as a result of performing 385 on the scenario depicted in FIG. 3I are obtained, as only a single time period is applicable in the example scenario.)

At 386, new processes that are started in the current time period are identified by querying the processes table. The query uses a range filter on the start_time column with values based on the current time period. In the example depicted in FIG. 3I, the processing performed at 386 will generate the records depicted in FIG. 3O.

At 387, new login-local-descendant records are identified. The purpose is to determine whether any of the new processes in the current time period are descendants of an ssh login process and if so to create records that will be stored in the login-local-descendant table for them. In order to do so, the parent-child relationships between the processes are recursively followed. Either a top down or bottom up approach can be used. In a top down approach, the ssh local descendants in the lookback period identified at 385, along with new ssh login processes in the current period identified at 384 are considered as possible ancestors for the new processes in the current period identified at 386.

Conceptually, the recursive approach can be considered to include multiple sub-steps where new processes that are identified to be ssh local descendants in the current sub-step are considered as ancestors for the next step. In the example scenario depicted in FIG. 3I, the following descendancy relationships will be established in two sub-steps:

Sub-Step 1:

Process A2 is a local descendant of LS1 (i.e., MID=A, sshd_PID_hash=A1) because it is a child of process A1 which is the login process for LS1.

Process B2 is a local descendant of LS2 (i.e., MID=B, sshd_PID_hash=B1) because it is a child of process BI which is the login process for LS2.

Sub-Step 2:

Process A3 is a local descendant of LS1 because it is a child of process A2 which is associated to LS1 in sub-step 1.

Process B3 is a local descendant of LS2 because it is a child of process B1 which is associated to LS2 in sub-step 1.

Implementation portion 387 can use a datastore that supports recursive query capabilities, or, queries can be constructed to process multiple conceptual sub-steps at once. In the example depicted in FIG. 3I, the processing performed at 387 will generate the records depicted in FIG. 3P. Note that the ssh privileged processes associated with the logins are also included as they are part of the login session.

At 388, the lineage of new ssh logins created in the current time period is determined by associating their ssh connections to source processes that may be descendants of other ssh logins (which may have been created in the current period or previous time periods). In order to do so, first an attempt is made to join the new ssh login connections in the current period (identified at 384) with the combination of the login local descendants in the lookback period (identified at 385) and the login local descendants in the current time period (identified at 386). This will create adjacency relationships between child and parent logins. In the example depicted in FIG. 3I, the second ssh login connection will be associated with process A3 and an adjacency relationship between the two login sessions will be created (as illustrated in FIG. 3Q).

Next, the adjacency relationships are used to find the original login sessions. While not shown in the sample scenario, there could be multiple ssh logins in a chain in the current time period, in which case a recursive approach (as in 387) could be used. At the conclusion of portion 388, the login lineage records depicted in FIG. 3R will be generated.

Finally, at 389, output data is generated. In particular, the new login-connection, login-local-descendant, and login-lineage records generated at 384, 387, and 388 are inserted into their respective output tables (e.g., in a transaction manner).

An alternate approach to matching TCP connections between machines running an agent is for the client to generate a connection GUID and send it in the connection request (e.g., the SYN packet) it sends and for the server to extract the GUID from the request. If two connection records from two machines have the same GUID, they are for the same connection. Both the client and server will store the GUID (if if exists) in the connection records they maintain and report. On the client side, the agent can configure the network stack (e.g. using IP tables functionality on Linux) to intercept an outgoing TCP SYN packet and modify it to add the generated GUID as a TCP option. On the server side, the agent already extracts TCP SYN packets and thus can look for this option and extract the GUID if it exists.

Example graph-based user tracking and threat detection embodiments associated with data platform 12 will now be described. Administrators and other users of network environments (e.g., entity A's datacenter 104) often change roles to perform tasks. As one example, suppose that at the start of a workday, an administrator (hereinafter "Joe Smith") logs in to a console, using an individualized account (e.g., username=joe.smith). Joe performs various tasks as himself (e.g., answering emails, generating status reports, writing code, etc.). For other tasks (e.g., performing updates), Joe may require different/additional permission than his individual account has (e.g., root privileges). One way Joe can gain access to such permissions is by using sudo, which will allow Joe to run a single command with root privileges. Another way Joe can gain access to such permissions is by su or otherwise logging into a shell as root. After gaining root privileges, another thing that Joe can do is switch identities. As one example, to perform administrative tasks, Joe may use "su help" or "su database-admin" to become (respectively) the help user or the database-admin user on a system. He may also connect from one machine to another, potentially changing identities along the way (e.g., logging in as joe.smith at a first console, and connecting to a database server as database-admin). When he's completed various administrative tasks, Joe can relinquish his root privileges by closing out of any additional shells created, reverting back to a shell created for user joe.smith.

While there are many legitimate reasons for Joe to change his identity throughout the day, such changes may also correspond to nefarious activity. Joe himself may be nefarious, or Joe's account (joe.smith) may have been compromised by a third party (whether an "outsider" outside of entity A's network, or an "insider"). Using techniques described herein, the behavior of users of the environment can be tracked (including across multiple accounts and/or multiple machines) and modeled (e.g., using various graphs described herein). Such models can be used to generate alerts (e.g., to anomalous user behavior). Such models can also be used forensically, e.g., helping an investigator visualize various aspects of a network and activities that have occurred, and to attribute particular types of actions (e.g., network connections or file accesses) to specific users.

In a typical day in a datacenter, a user (e.g., Joe Smith) will log in, run various processes, and (optionally) log out. The user will typically log in from the same set of IP addresses, from IP addresses within the same geographical area (e.g., city or country), or from historically known IP addresses/geographical areas (i.e., ones the user has previously/occasionally used). A deviation from the user's typical (or historical) behavior indicates a change in login behavior. However, it does not necessarily mean that a breach has occurred. Once logged into a datacenter, a user may take a variety of actions. As a first example, a user might execute a binary/script. Such binary/script might communicate with other nodes in the datacenter, or outside of the datacenter, and transfer data to the user (e.g., executing "curl" to obtain data from a service external to the datacenter). As a second example, the user can similarly transfer data (e.g., out of the datacenter), such as by using POST. As a third example, a user might change privilege (one or more times), at which point the user can send/receive data as per above. As a fourth example, a user might connect to a different machine within the datacenter (one or more times), at which point the user can send/receive data as per the above.

In various embodiments, the above information associated with user behavior is broken into four tiers. The tiers represent example types of information that data platform 12 can use in modeling user behavior:

1. The user's entry point (e.g., domains, IP addresses, and/or geolocation information such as country/city) from which a user logs in.
2. The login user and machine class.
3. Binaries, executables, processes, etc. a user launches.
4. Internal servers with which the user (or any of the user's processes, child processes, etc.) communicates, and external contacts (e.g., domains, IP addresses, and/or geolocation information such as country/city) with which the user communicates (i.e., transfers data).

In the event of a security breach, being able to concretely answer questions about such information can be very important. And, collectively, such information is useful in providing an end-to-end path (e.g., for performing investigations).

In the following example, suppose a user ("UserA") logs into a machine ("Machine01") from a first IP address ("IP01"). Machine01 is inside a datacenter. UserA then launches a script ("runnable.sh") on Machine01. From Machine01, UserA next logs into a second machine ("Machine02") via ssh, also as UserA, also within the datacenter.

On Machine02, UserA again launches a script ("new_runnable.sh"). On Machine02, UserA then changes privilege, becoming root on Machine02. From Machine02, UserA (now as root) logs into a third machine ("Machine03") in the datacenter via ssh, as root on Machine03. As root on Machine03, the user executes a script ("collect_data.sh") on Machine03. The script internally communicates (as root) to a MySQL-based service internal to the datacenter, and downloads data from the MySQL-based service. Finally, as root on Machine03, the user externally communicates with a server outside the datacenter ("External01"), using a POST command. To summarize what has occurred, in this example, the source/entry point is IP01. Data is transferred to an external server External01. The machine performing the transfer to External01 is Machine03. The user transferring the data is "root" (on Machine03), while the actual user (hiding behind root) is UserA.

In the above scenario, the "original user" (ultimately responsible for transmitting data to External01) is UserA, who logged in from IP01. Each of the processes ultimately started by UserA, whether started at the command line (tty) such as "runnable.sh" or started after an ssh connection such as "new_runnable.sh," and whether as UserA, or as a subsequent identity, are all examples of child processes which can be arranged into a process hierarchy.

As previously mentioned, machines can be clustered together logically into machine clusters. One approach to clustering is to classify machines based on information such as the types of services they provide/binaries they have installed upon them/processes they execute. Machines sharing a given machine class (as they share common binaries/services/etc.) will behave similarly to one another. Each machine in a datacenter can be assigned to a machine cluster, and each machine cluster can be assigned an identifier (also referred to herein as a machine class). One or more tags can also be assigned to a given machine class (e.g., database_servers_west or prod_web_frontend). One approach to assigning a tag to a machine class is to apply term frequency analysis (e.g., TF/IDF) to the applications run by a given machine class, selecting as tags those most unique to the class. Data platform 12 can use behavioral baselines taken for a class of machines to identify deviations from the baseline (e.g., by a particular machine in the class).

Figure 3S:
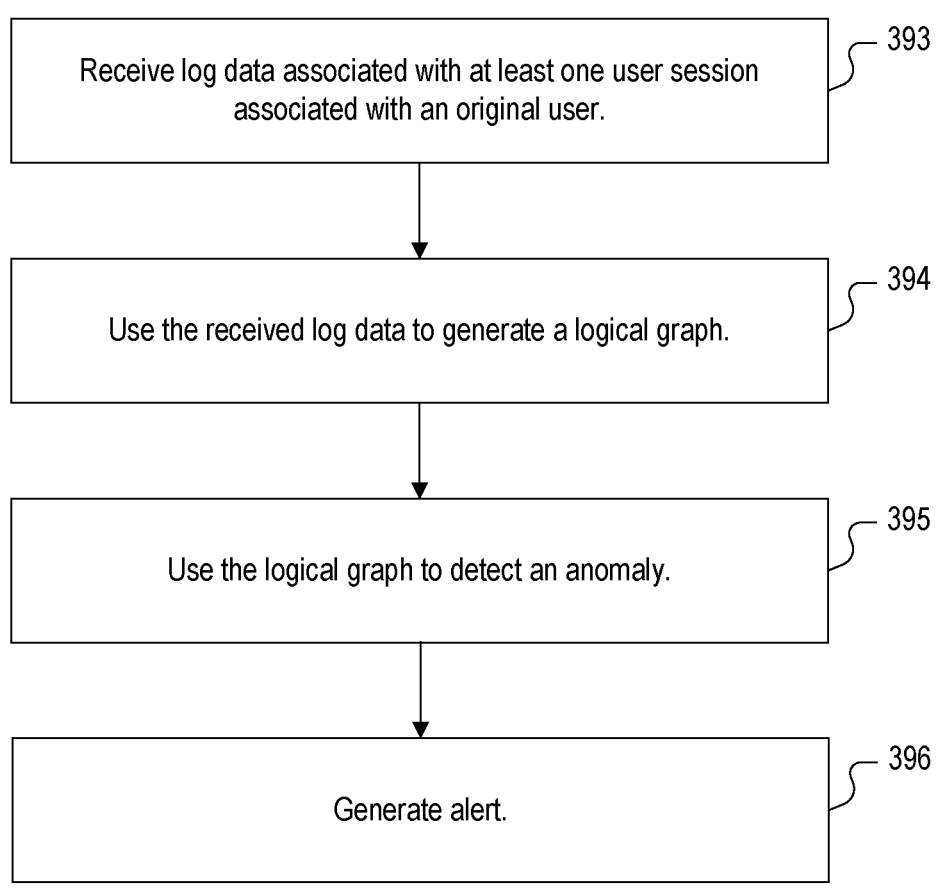
FIG. 3S illustrates an example of a process for detecting anomalies.

FIG. 3S illustrates an example of a process for detecting anomalies. In various embodiments, process 392 is performed by data platform 12. As explained above, a given session will have an original user. And, each action taken by the original user can be tied back to the original user, despite privilege changes and/or lateral movement throughout a datacenter. Process 392 begins at 393 when log data associated with a user session (and thus an original user) is received. At 394, a logical graph is generated, using at least a portion of the collected data. When an anomaly is detected (395), it can be recorded, and as applicable, an alert is generated (396). The following are examples of graphs that can be generated (e.g., at 394), with corresponding examples of anomalies that can be detected (e.g., at 395) and alerted upon (e.g., at 396).

Figure 4A:
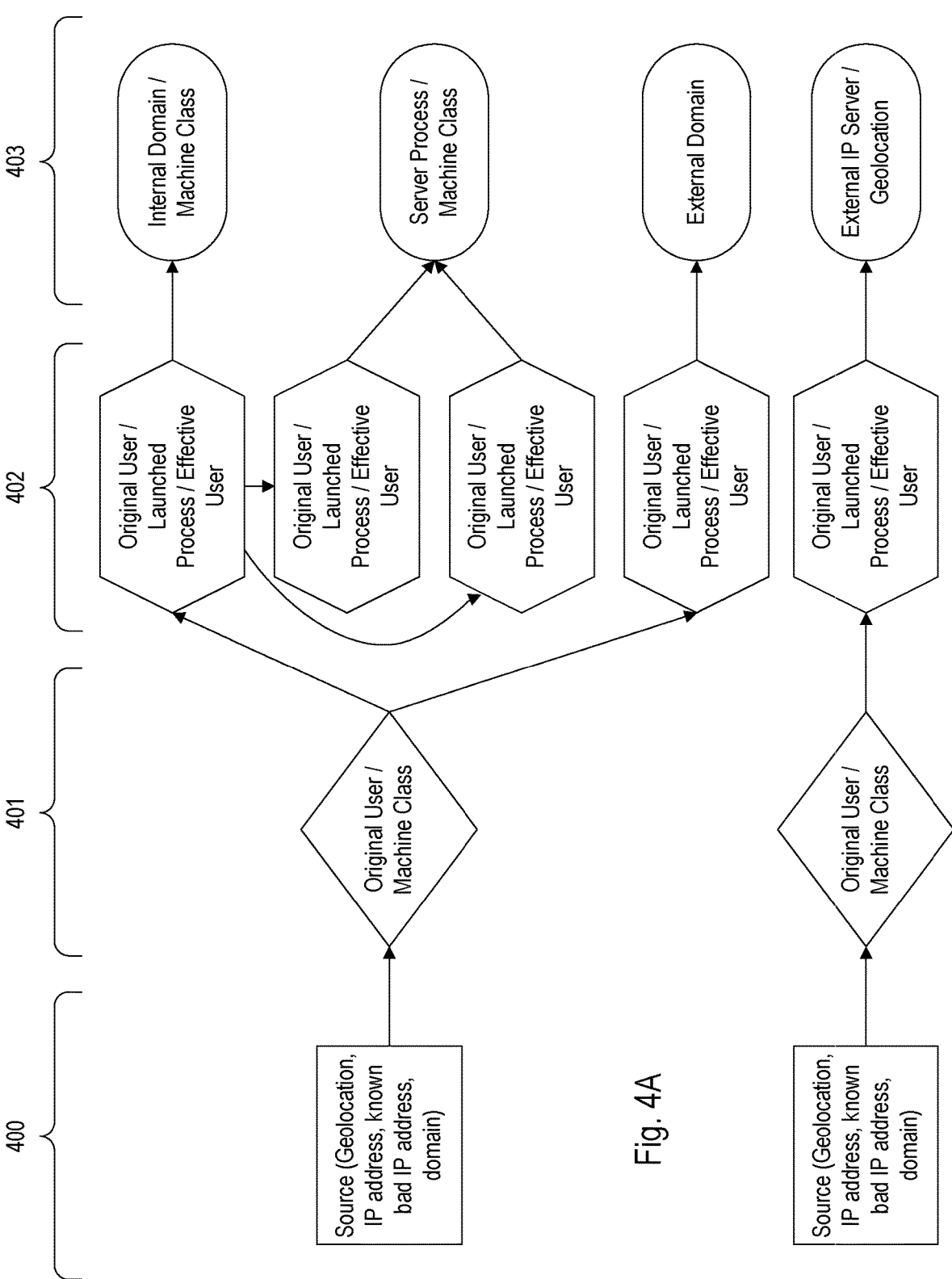
FIG. 4A illustrates a representation of an embodiment of an insider behavior graph.

FIG. 4A illustrates a representation of an embodiment of an insider behavior graph. In the example of FIG. 4A, each node in the graph can be: (1) a cluster of users; (2) a cluster of launched processes; (3) a cluster of processes/servers running on a machine class; (4) a cluster of external IP addresses (of incoming clients); or (5) a cluster of external servers based on DNS/IP/etc. As depicted in FIG. 4A, graph data is vertically tiered into four tiers. Tier 0 (400) corresponds to entry point information (e.g., domains, IP addresses, and/or geolocation information) associated with a client entering the datacenter from an external entry point. Entry points are clustered together based on such information. Tier 1 (401) corresponds to a user on a machine class, with a given user on a given machine class represented as a node. Tier 2 (402) corresponds to launched processes, child processes, and/or interactive processes. Processes for a given user and having similar connectivity (e.g., sharing the processes they launch and the machines with which they communicate) are grouped into nodes. Finally, Tier 3 (403) corresponds to the services/servers/domains/IP addresses with which processes communicate. A relationship between the tiers can be stated as follows: Tier 0 nodes log in to tier 1 nodes. Tier 1 nodes launch tier 2 nodes. Tier 2 nodes connect to tier 3 nodes.

The inclusion of an original user in both Tier 1 and Tier 2 allows for horizontal tiering. Such horizontal tiering ensures that there is no overlap between any two users in Tier 1 and Tier 2. Such lack of overlap provides for faster searching of an end-to-end path (e.g., one starting with a Tier 0 node and terminating at a Tier 3 node). Horizontal tiering also helps in establishing baseline insider behavior. For example, by building an hourly insider behavior graph, new edges/changes in edges between nodes in Tier 1 and Tier 2 can be identified. Any such changes correspond to a change associated with the original user. And, any such changes can be surfaced as anomalous and alerts can be generated.

As explained above, Tier 1 corresponds to a user (e.g., user "U") logging into a machine having a particular machine class (e.g., machine class "M"). Tier 2 is a cluster of processes having command line similarity (e.g., CType "C"), having an original user "U," and running as a particular effective user (e.g., user "U1"). The value of U1 may be the same as U (e.g., joe.smith in both cases), or the value of U1 may be different (e.g., U=joe.smith and U1=root). Thus, while an edge may be present from a Tier 1 node to a Tier 2 node, the effective user in the Tier 2 node may or may not match the original user (while the original user in the Tier 2 node will match the original user in the Tier 1 node).

A change from a user U into a user U1 can take place in a variety of ways. Examples include where U becomes U1 on the same machine (e.g., via su), and also where U sshes to other machine(s). In both situations, U can perform multiple changes, and can combine approaches. For example, U can become U1 on a first machine, ssh to a second machine (as U1), become U2 on the second machine, and ssh to a third machine (whether as user U2 or user U3). In various embodiments, the complexity of how user U ultimately becomes U3 (or U5, etc.) is hidden from a viewer of an insider behavior graph, and only an original user (e.g., U) and the effective user of a given node (e.g., U5) are depicted. As applicable (e.g., if desired by a viewer of the insider behavior graph), additional detail about the path (e.g., an end-to-end path of edges from user U to user U5) can be surfaced (e.g., via user interactions with nodes).

Figure 4B:
FIG. 4B illustrates an embodiment of a portion of an insider behavior graph.

FIG. 4B illustrates an example of a portion of an insider behavior graph (e.g., as rendered in a web browser). In the example shown, node 405 (the external IP address, 52.32.40.231) is an example of a Tier 0 node, and represents an entry point into a datacenter. As indicated by directional arrows 406 and 407, two users, "user1_prod" and "user2_prod," both made use of the source IP 52.32.40.231 when logging in between 5 μm and 6 pm on Sunday July 30 (408). Nodes 409 and 410 are examples of Tier 1 nodes, having user1_prod and user2_prod as associated respective original users. As previously mentioned, Tier 1 nodes correspond to a combination of a user and a machine class. In the example depicted in FIG. 4B, the machine class associated with nodes 409 and 410 is hidden from view to simplify visualization, but can be surfaced to a viewer of interface 404 (e.g., when the user clicks on node 409 or 410).

Nodes 414-423 are examples of Tier 2 nodes-processes that are launched by users in Tier 1 and their child, grandchild, etc. processes. Note that also depicted in FIG. 4B is a Tier 1 node 411 that corresponds to a user, "root," that logged in to a machine cluster from within the datacenter (i.e., has an entry point within the datacenter). Nodes 425-1 and 425-2 are examples of Tier 3 nodes-internal/external IP addresses, servers, etc., with which Tier 2 nodes communicate.

In the example shown in FIG. 4B, a viewer of interface 404 has clicked on node 423. As indicated in region 426, the user running the marathon container is "root." However, by following the directional arrows in the graph backwards from node 423 (i.e. from right to left), the viewer can determine that the original user, responsible for node 423, is "user1_prod," who logged into the datacenter from IP 52.32.40.231.

The following are examples of changes that can be tracked using an insider behavior graph model:

A user logs in from a new IP address.

A user logs in from a geolocation not previously used by that user.

A user logs into a new machine class.

A user launches a process not previously used by that user.

A user connects to an internal server to which the user has not previously connected.

An original user communicates with an external server (or external server known to be malicious) with which that user has not previously communicated.

A user communicates with an external server which has a geolocation not previously used by that user.

Such changes can be surfaced as alerts, e.g., to help an administrator determine when/what anomalous behavior occurs within a datacenter. Further, the behavior graph model can be used (e.g., during forensic analysis) to answer questions helpful during an investigation. Examples of such questions include:

Was there any new login activity (Tier 0) in the timeframe being investigated? As one example, has a user logged in from an IP address with unknown geolocation information? Similarly, has a user started communicating externally with a new Tier 3 node (e.g., one with unknown geolocation information).

Has there been any suspicious login activity (Tier 0) in the timeframe being investigated? As one example, has a user logged in from an IP address that corresponds to a known bad IP address as maintained by Threat aggregator 150? Similarly, has there been any suspicious Tier 3 activity?

Were any anomalous connections made within the datacenter during the timeframe being investigated? As one example, suppose a given user ("Frank") typically enters a datacenter from a particular IP address (or range of IP addresses), and then connects to a first machine type (e.g., bastion), and then to a second machine type (e.g., database_prod). If Frank has directly connected to database_prod (instead of first going through bastion) during the timeframe, this can be surfaced using the insider graph.

Who is (the original user) responsible for running a particular process?

Figure 4C:
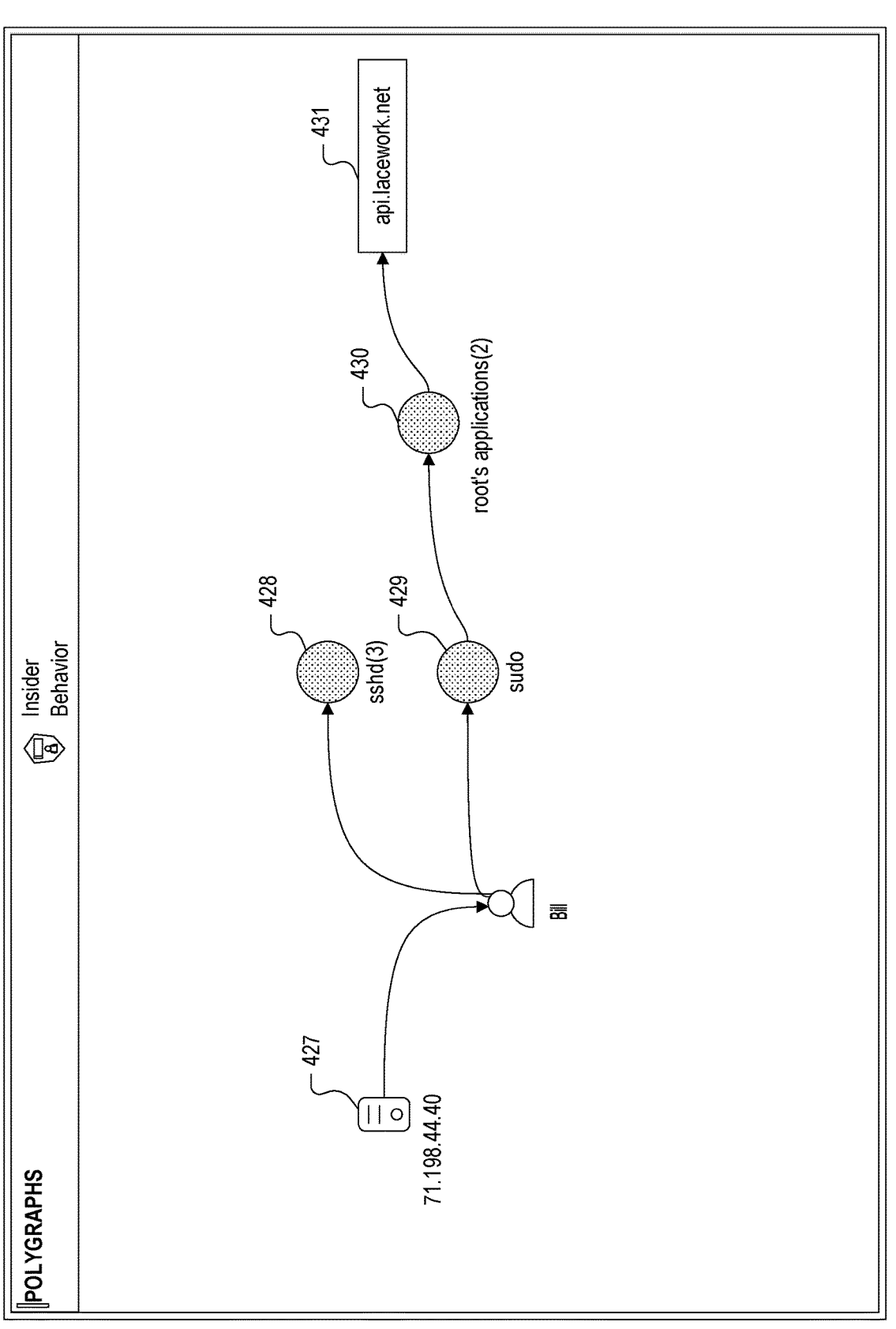
FIG. 4C illustrates an embodiment of a portion of an insider behavior graph.
Figure 4D:
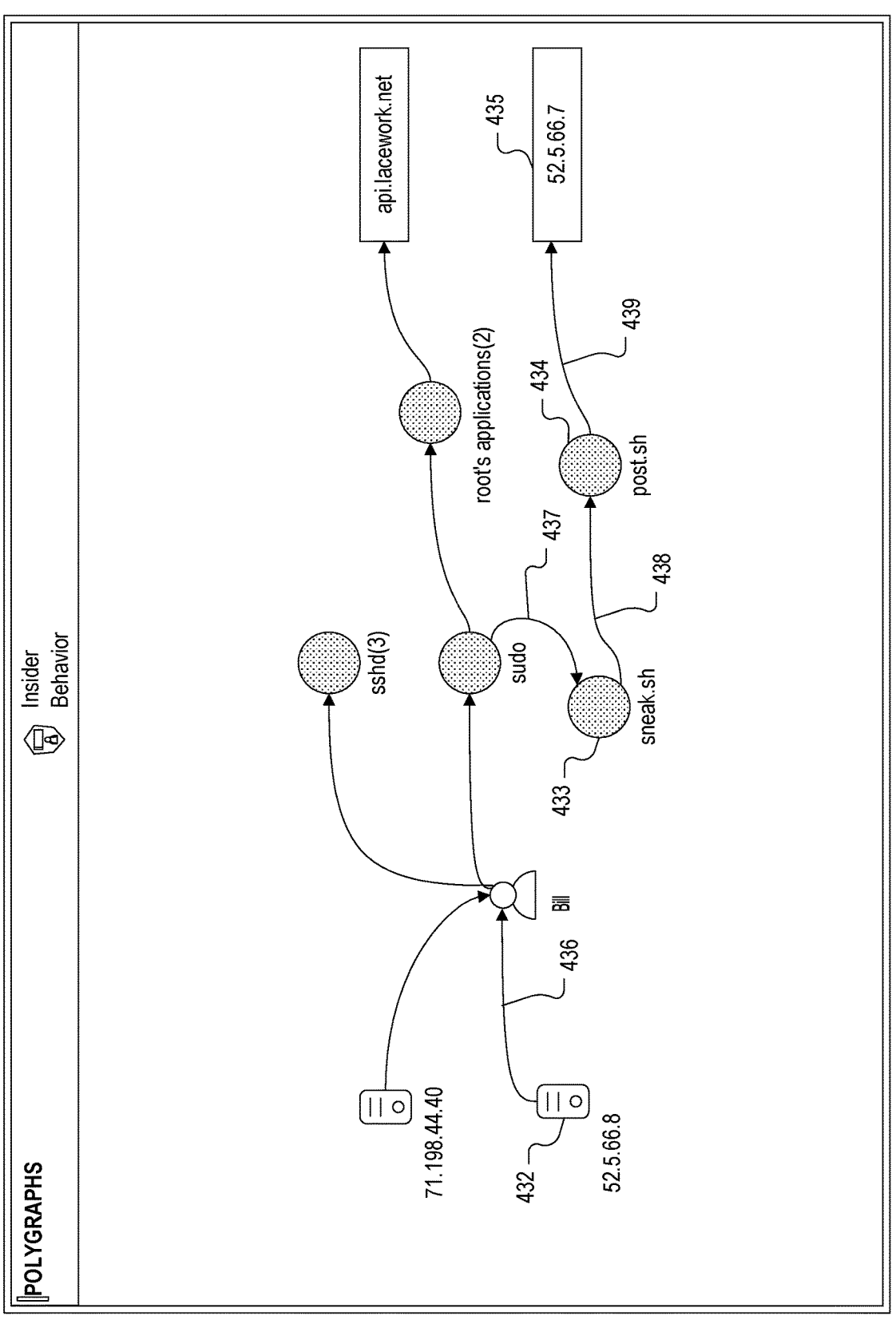
FIG. 4D illustrates an embodiment of a portion of an insider behavior graph.

An example of an insider behavior graph being used in an investigation is depicted in FIGS. 4C and 4D. FIG. 4C depicts a baseline of behavior for a user, "Bill." As shown in FIG. 4C, Bill typically logs into a datacenter from the IP address, 71.198.44.40 (427). He typically makes use of ssh (428), and sudo (429), makes use of a set of typical applications (430) and connects (as root) with the external service, api.lacework.net (431).

Suppose Bill's credentials are compromised by a nefarious outsider ("Eddie"). FIG. 4D depicts an embodiment of how the graph depicted in FIG. 4C would appear once Eddie begins exfiltrating data from the datacenter. Eddie logs into the datacenter (using Bill's credentials) from 52.5.66.8 (432). As Bill, Eddie escalates her privilege to root (e.g., via su), and then becomes a different user, Alex (e.g., via su alex). As Alex, Eddie executes a script, "sneak.sh" (433), which launches another script, "post.sh" (434), which contacts external server 435 which has an IP address of 52.5.66.7, and transmits data to it. Edges 436-439 each represent changes in Bill's behavior. As previously mentioned, such changes can be detected as anomalies and associated alerts can be generated. As a first example, Bill logging in from an IP address he has not previously logged in from (436) can generate an alert. As a second example, while Bill does typically make use of sudo (429), he has not previously executed sneak.sh (433) or post.sh (434) and the execution of those scripts can generate alerts as well. As a third example, Bill has not previously communicated with server 435, and an alert can be generated when he does so (439). Considered individually, each of edges 436-439 may indicate nefarious behavior, or may be benign. As an example of a benign edge, suppose Bill begins working from a home office two days a week. The first time he logs in from his home office (i.e., from an IP address that is not 71.198.44.40), an alert can be generated that he has logged in from a new location. Over time, however, as Bill continues to log in from his home office but otherwise engages in typical activities, Bill's graph will evolve to include logins from both 71.198.44.40 and his home office as baseline behavior. Similarly, if Bill begins using a new tool in his job, an alert can be generated the first time he executes the tool, but over time will become part of his baseline.

In some cases, a single edge can indicate a serious threat. For example, if server 432 (or 435) is included in a known bad IP listing, edge 436 (or 439) indicates compromise. An alert that includes an appropriate severity level (e.g., "threat level high") can be generated. In other cases, a combination of edges could indicate a threat (where a single edge might otherwise result in a lesser warning). In the example shown in FIG. 4D, the presence of multiple new edges is indicative of a serious threat. Of note, even though "sneak.sh" and "post.sh" were executed by Alex, because data platform 12 also keeps track of an original user, the compromise of user B's account will be discovered.

Figure 4E:
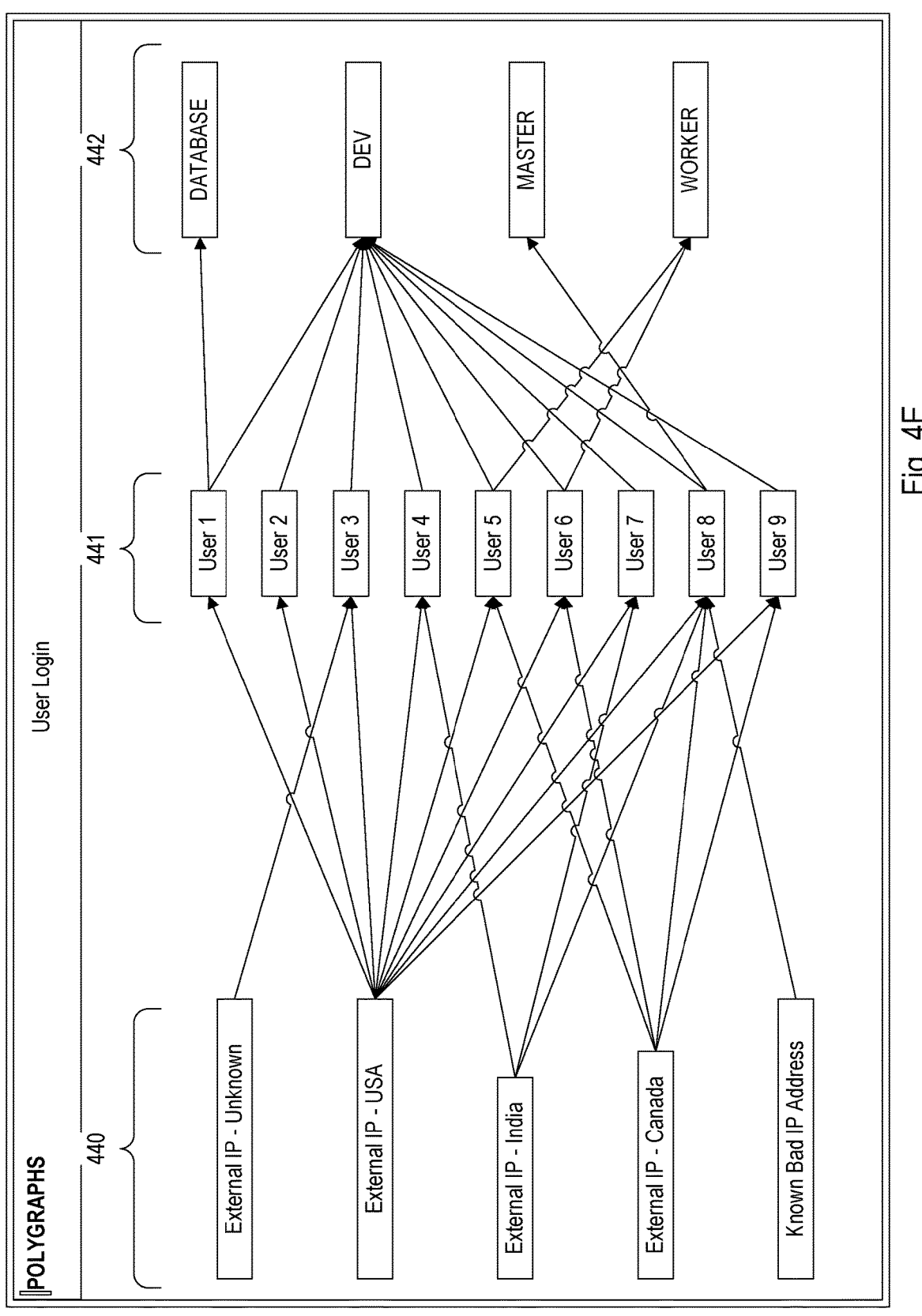
FIG. 4E illustrates a representation of an embodiment of a user login graph.

FIG. 4E illustrates a representation of an embodiment of a user login graph. In the example of FIG. 4E, tier 0 (440) clusters source IP addresses as belonging to a particular country (including an "unknown" country) or as a known bad IP. Tier 1 (441) clusters user logins, and tier 2 (442) clusters type of machine class into which a user is logging in. The user login graph tracks the typical login behavior of users. By interacting with a representation of the graph, answers to questions such as the following can be obtained:
   Where is a user logging in from?
   Have any users logged in from a known bad address?
   Have any non-developer users accessed development machines?
   Which machines does a particular user access?

Examples of alerts that can be generated using the user login graph include:
   A user logs in from a known bad IP address.
   A user logs in from a new country for the first time.
   A new user logs into the datacenter for the first time.
   A user accesses a machine class that the user has not previously accessed.

One way to track privilege changes in a datacenter is by monitoring a process hierarchy of processes. To help filter out noisy commands/processes such as "su-u," the hierarchy of processes can be constrained to those associated with network activity. In a *nix system, each process has two identifiers assigned to it, a process identifier (PID) and a parent process identifier (PPID). When such a system starts, the initial process is assigned a PID 0. Each user process has a corresponding parent process.

Using techniques described herein, a graph can be constructed (also referred to herein as a privilege change graph) which models privilege changes. In particular, a graph can be constructed which identifies where a process P1 launches a process P2, where P1 and P2 each have an associated user U1 and U2, with U1 being an original user, and U2 being an effective user. In the graph, each node is a cluster of processes (sharing a CType) executed by a particular (original) user. As all the processes in the cluster belong to the same user, a label that can be used for the cluster is the user's username. An edge in the graph, from a first node to a second node, indicates that a user of the first node changed its privilege to the user of the second node.

Figure 4F:
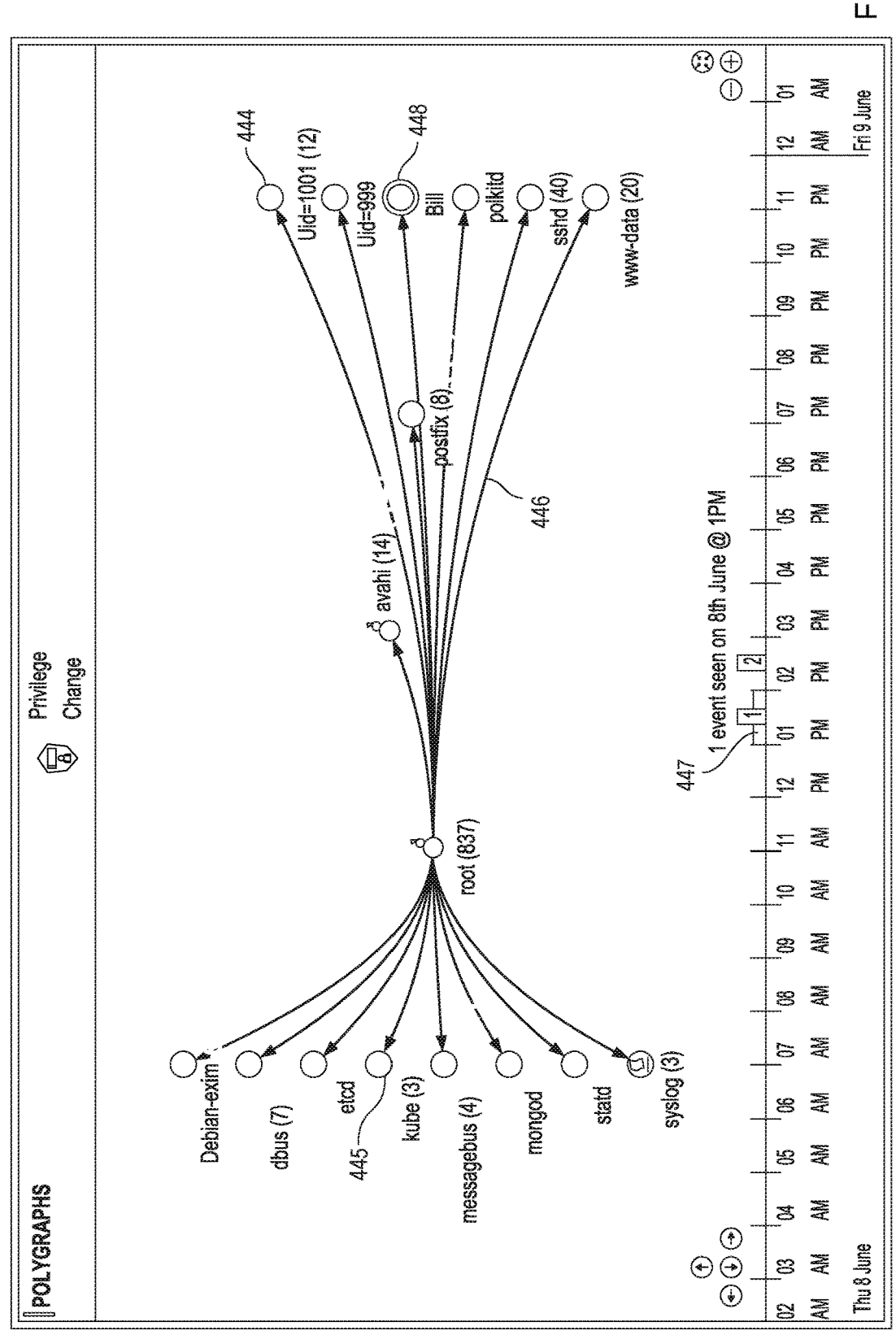
FIG. 4F illustrates an example of a privilege change graph.

FIG. 4F illustrates an example of a privilege change graph. In the example shown in FIG. 4F, each node (e.g., nodes 444 and 445) represents a user. Privilege changes are indicated by edges, such as edge 446.

As with other graphs, anomalies in graph 443 can be used to generate alerts. Three examples of such alerts are as follows:
   New user entering the datacenter. Any time a new user enters the datacenter and runs a process, the graph will show a new node, with a new CType. This indicates a new user has been detected within the datacenter. FIG. 4F is a representation of an example of an interface that depicts such an alert. Specifically, as indicated in region 447, an alert for the time period 1 pm-2 pm on June 8 was generated. The alert identifies that a new user, Bill (448) executed a process.
   Privilege change. As explained above, a new edge, from a first node (user A) to a second node (user B) indicates that user A has changed privilege to user B.
   Privilege escalation. Privilege escalation is a particular case of privilege change, in which the first user becomes root.

Figure 4G:
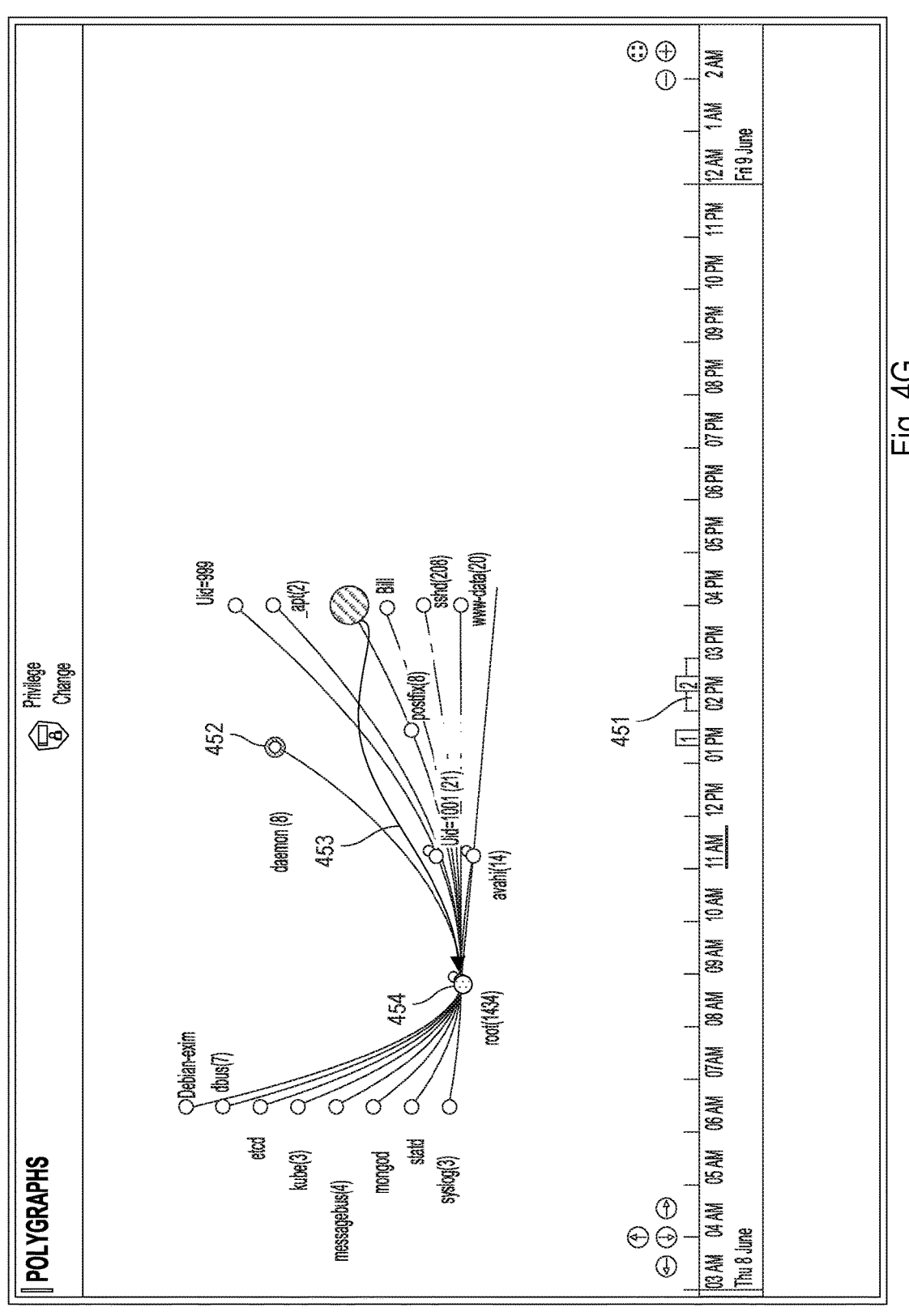
FIG. 4G illustrates an example of a privilege change graph.

An example of an anomalous privilege change and an example of an anomalous privilege escalation are each depicted in graph 450 of FIG. 4G. In particular, as indicated in region 451, two alerts for the time period 2 pm-3 pm on June 8 were generated (corresponding to the detection of the two anomalous events). In region 452, root has changed privilege to the user "daemon," which root has not previously done. This anomaly is indicated to the user by highlighting the daemon node (e.g., outlining it in a particular color, e.g., red). As indicated by edge 453, Bill has escalated his privilege to the user root (which can similarly be highlighted in region 454). This action by Bill represents a privilege escalation.

An Extensible query interface for dynamic data compositions and filter applications will now be described.

As described herein, datacenters are highly dynamic environments. And, different customers of data platform 12 (e.g., entity A vs. entity B) may have different/disparate needs/requirements of data platform 12, e.g., due to having different types of assets, different applications, etc. Further, as time progresses, new software tools will be developed, new types of anomalous behavior will be possible (and should be detectable), etc. In various embodiments, data platform 12 makes use of predefined relational schema (including by having different predefined relational schema for different customers). However, the complexity and cost of maintaining/updating such predefined relational schema can rapidly become problematic-particularly where the schema includes a mix of relational, nested, and hierarchical (graph) datasets. In other embodiments, the data models and filtering applications used by data platform 12 are extensible. As will be described in more detail below, in various embodiments, data platform 12 supports dynamic query generation by automatic discovery of join relations via static or dynamic filtering key specifications among composable data sets. This allows a user of data platform 12 to be agnostic to modifications made to existing data sets as well as creation of new data sets. The extensible query interface also provides a declarative and configurable specification for optimizing internal data generation and derivations.

As will also be described in more detail below, data platform 12 is configured to dynamically translate user interactions (e.g., received via web app 120) into SQL queries (and without the user needing to know how to write queries). Such queries can then be performed (e.g., by query service 166) against any compatible backend (e.g., data store 30).

Figure 4H:
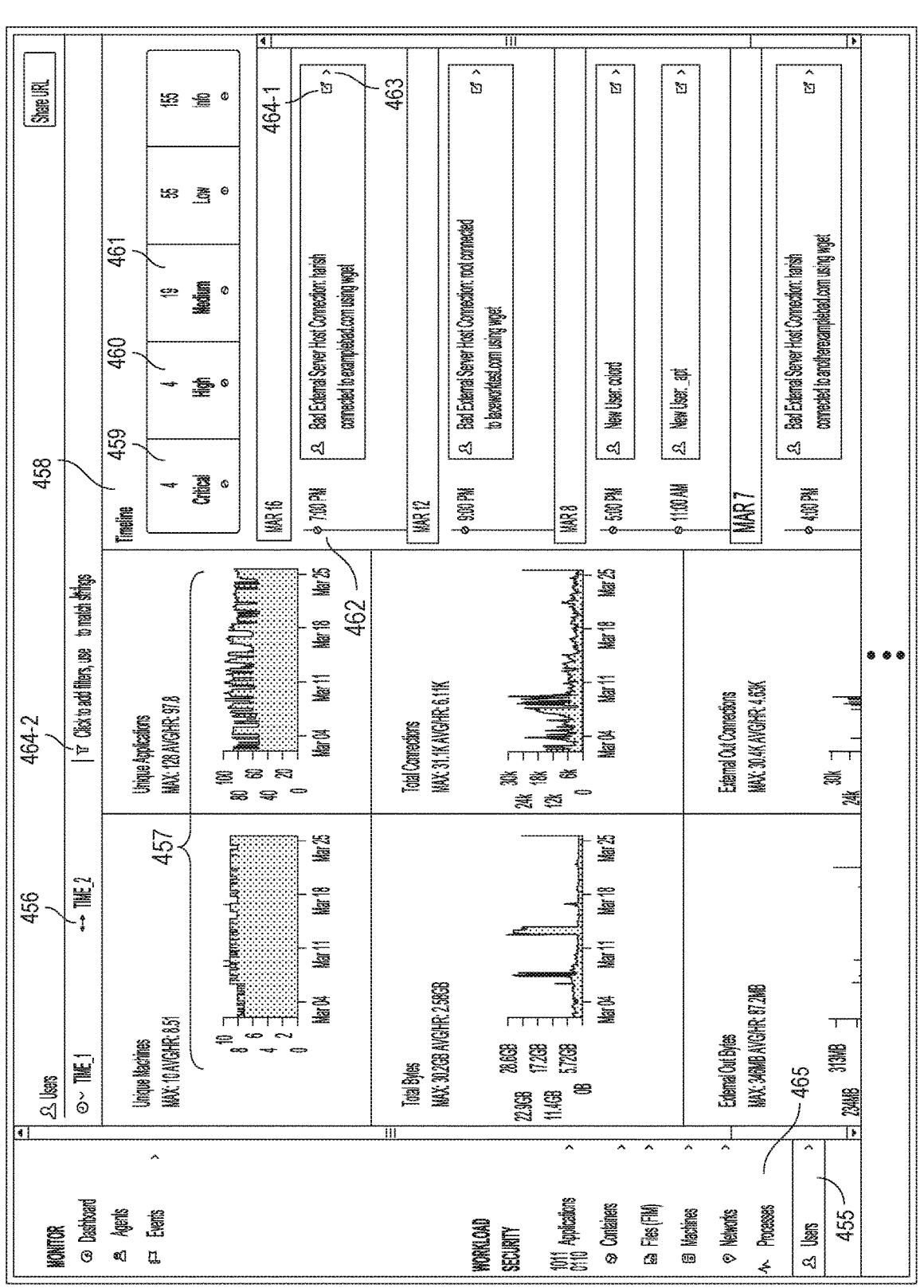
FIG. 4H illustrates an example of a user interacting with a portion of an interface.
Figure 41:
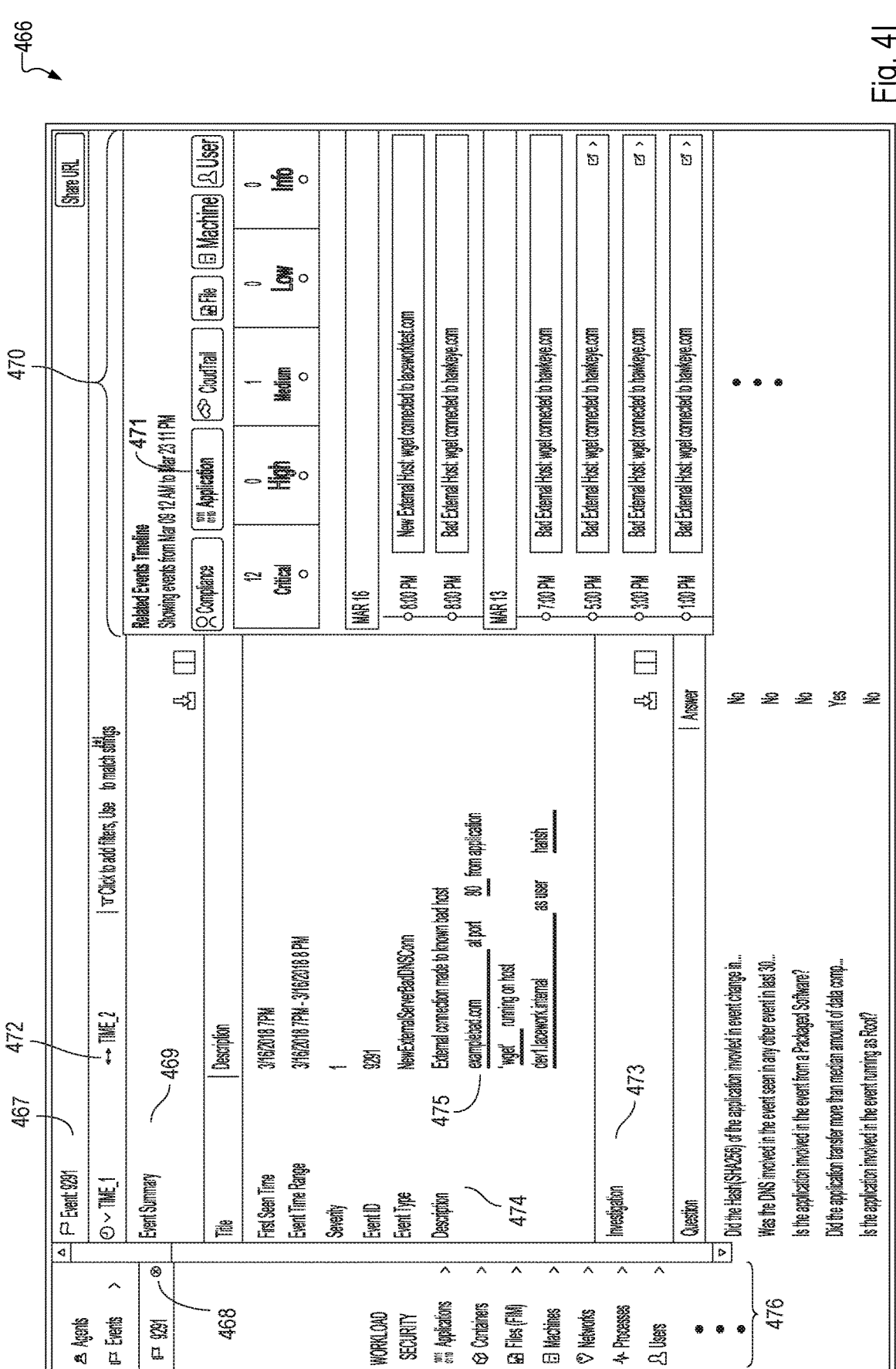

FIG. 4H illustrates an example of a user interacting with a portion of an interface. When a user visits data platform 12 (e.g., via web app 120 using a browser), data is extracted from data store 30 as needed (e.g., by query service 166), to provide the user with information, such as the visualizations depicted variously herein. As the user continues to interact with such visualizations (e.g., clicking on graph nodes, entering text into search boxes, navigating between tabs (e.g., tab 455 vs. 465)), such interactions act as triggers that cause query service 166 to continue to obtain information from data store 30 as needed (and as described in more detail below).

In the example shown in FIG. 4H, user A is viewing a dashboard that provides various information about entity A users (455), during the time period March 2 at midnight-March 25 at 7 pm (which she selected by interacting with region 456). Various statistical information is presented to user A in region 457. Region 458 presents a timeline of events that occurred during the selected time period. User A has opted to list only the critical, high, and medium events during the time period by clicking on the associated boxes (459-461). A total of 55 low severity, and 155 info-only events also occurred during the time period. Each time user A interacts with an element in FIG. 4H (e.g., clicks on box 461, clicks on link 464-1, or clicks on tab 465), her actions are translated/formalized into filters on the data set and used to dynamically generate SQL queries. The SQL queries are generated transparently to user A (and also to a designer of the user interface shown in FIG. 4H).

User A notes in the timeline (462) that a user, UserA, connected to a known bad server (examplebad.com) using wget, an event that has a critical severity level. User A can click on region 463 to expand details about the event inline (which will display, for example, the text "External connection made to known bad host examplebad.com at port 80 from application 'wget' running on host dev1.lacework.internal as user userA") directly below timeline 462. User A can also click on link 464-1, which will take her to a dossier for the event (depicted in FIG. 4I). As will be described in more detail below, a dossier is a template for a collection of visualizations.

As shown in interface 466, the event of UserA using wget to contact examplebad.com on March 16 was assigned an event ID of 9291 by data platform 12 (467). For convenience to user A, the event is also added to her dashboard in region 476 as a bookmark (468). A summary of the event is depicted in region 469. By interacting with boxes shown in region 470, user A can see a timeline of related events. In this case, user A has indicated that she would like to see other events involving the wget application (by clicking box 471). Events of critical and medium security involving wget occurred during the one hour window selected in region 472.

Figure 4J:
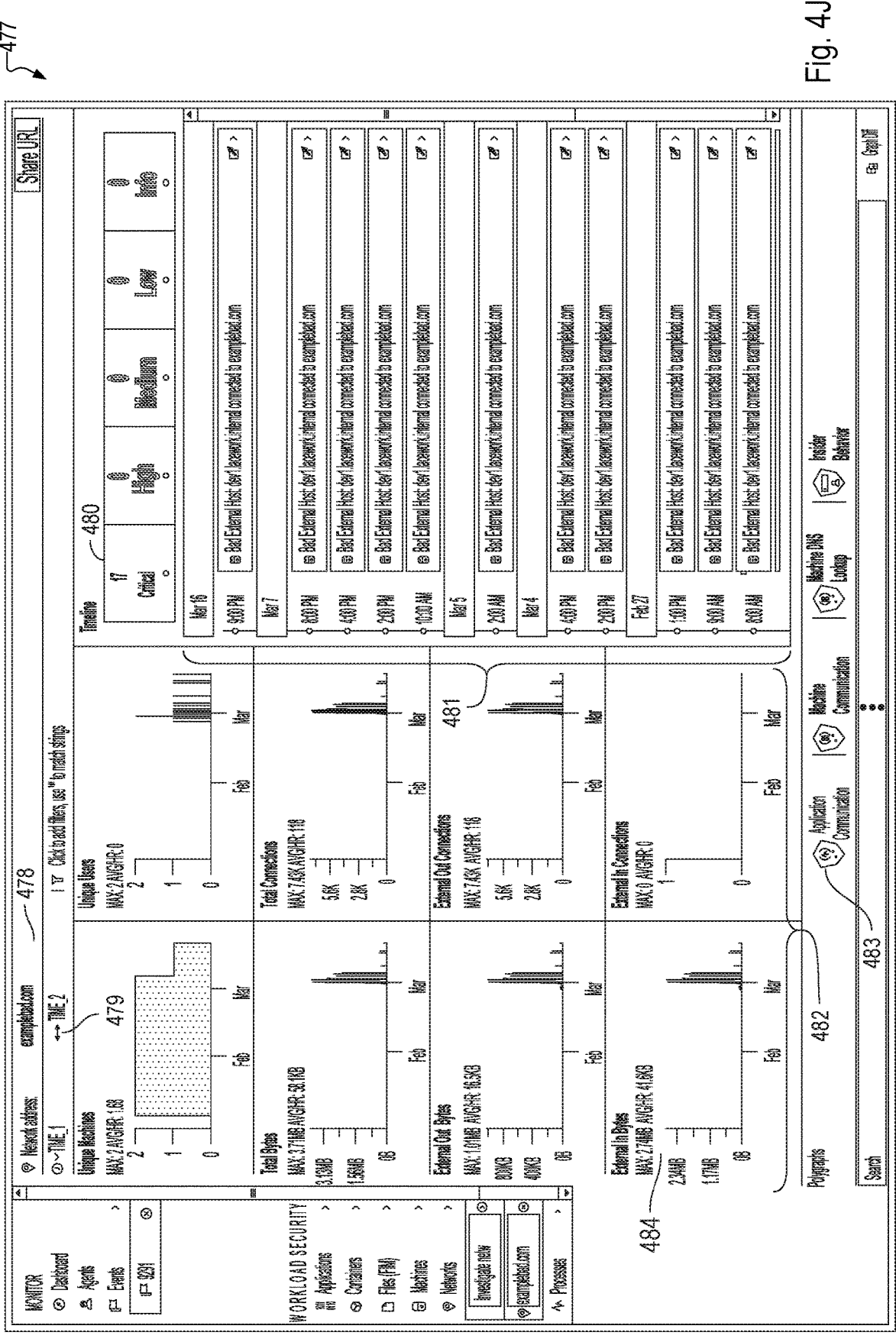
FIG. 4J illustrates an example of a dossier for a domain.

Region 473 automatically provides user A with answers to questions that may be helpful to have answers to while investigating event 9291. If user A clicks on any of the links in the event description (474), she will be taken to a corresponding dossier for the link. As one example, suppose user A clicks on link 475. She will then be presented with interface 477 shown in FIG. 4J.

Interface 477 is an embodiment of a dossier for a domain. In this example, the domain is "examplebad.com," as shown in region 478. Suppose user A would like to track down more information about interactions entity A resources have made with examplebad.com between January 1 and March 20. She selects the appropriate time period in region 479 and information in the other portions of interface 477 automatically update to provide various information corresponding to the selected time frame. As one example, user A can see that contact was made with examplebad.com a total of 17 times during the time period (480), as well as a list of each contact (481). Various statistical information is also included in the dossier for the time period (482). If she scrolls down in interface 477, user A will be able to view various polygraphs associated with examplebad.com, such as an application-communication polygraph (483).

Data stored in data store 30 can be internally organized as an activity graph. In the activity graph, nodes are also referred to as Entities. Activities generated by Entities are modeled as directional edges between nodes. Thus, each edge is an activity between two Entities. One example of an Activity is a "login" Activity, in which a user Entity logs into a machine Entity (with a directed edge from the user to the machine). A second example of an Activity is a "launch" Activity, in which a parent process launches a child process (with a directed edge from the parent to the child). A third example of an Activity is a "DNS query" Activity, in which either a process or a machine performs a query (with a directed edge from the requestor to the answer, e.g., an edge from a process to www.example.com). A fourth example of an Activity is a network "connected to" Activity, in which processes, IP addresses, and listen ports can connect to each other (with a directed edge from the initiator to the server).

As will be described in more detail below, query service 166 provides either relational views or graph views on top of data stored in data store 30. Typically, a user will want to see data filtered using the activity graph. For example, if an entity was not involved in an activity in a given time period, that entity should be filtered out of query results. Thus, a request to show "all machines" in a given time frame will be interpreted as "show distinct machines that were active" during the time frame.

Query service 166 relies on three main data model elements: fields, entities, and filters. As used herein, a field is a collection of values with the same type (logical and physical). A field can be represented in a variety of ways, including: 1. a column of relations (table/view), 2. a return field from another entity, 3. an SQL aggregation (e.g., COUNT, SUM, etc.), 4. an SQL expression with the references of other fields specified, and 5. a nested field of a JSON object. As viewed by query service 166, an entity is a collection of fields that describe a data set. The data set can be composed in a variety of ways, including: 1. a relational table, 2. a parameterized SQL statement, 3. DynamicSQL created by a Java function, and 4. join/project/aggregate/ subclass of other entities. Some fields are common for all entities. One example of such a field is a "first observed" timestamp (when first use of the entity was detected). A second example of such a field is the entity classification type (e.g., one of: 1. Machine (on which an agent is installed), 2. Process, 3. Binary, 4. UID, 5. IP, 6. DNS Information, 7. ListenPort, and 8. PType). A third example of such a field is a "last observed" timestamp.

A filter is an operator that: 1. takes an entity and field values as inputs, 2. a valid SQL expression with specific reference(s) of entity fields, or 3. is a conjunct/disjunct of filters. As will be described in more detail below, filters can be used to filter data in various ways, and limit data returned by query service 166 without changing the associated data set.

As mentioned above, a dossier is a template for a collection of visualizations. Each visualization (e.g., the box including chart 484) has a corresponding card, which identifies particular target information needed (e.g., from data store 30) to generate the visualization. In various embodiments, data platform 12 maintains a global set of dossiers/ cards. Users of data platform 12 such as user A can build their own dashboard interfaces using preexisting dossiers/ cards as components, and/or they can make use of a default dashboard (which incorporates various of such dossiers/ cards).

A JSON file can be used to store multiple cards (e.g., as part of a query service catalog). A particular card is represented by a single JSON object with a unique name as a field name. Each card may be described by the following named fields:

TYPE: the type of the card. Example values include:

Entity (the default type)

SQL

Filters

DynamicSQL graphFilter graph

Function

Template

PARAMETERS: a JSON array object that contains an array of parameter objects with the following fields:

name (the name of the parameter)

required (a Boolean flag indicating whether the parameter is required or not)

default (a default value of the parameter)

props (a generic JSON object for properties of the parameter. Possible values are: "utype" (a user defined type), and "scope" (an optional property to configure a namespace of the parameter))

value (a value for the parameter-non-null to override the default value defined in nested source entities)

SOURCES: a JSON array object explicitly specifying references of input entities. Each source reference has the following attributes:

name (the card/entity name or fully-qualified Table name)

type (required for base Table entity)

alias (an alias to access this source entity in other fields (e.g., returns, filters, groups, etc))

RETURNS: a required JSON array object of a return field object. A return field object can be described by the following attributes:

field (a valid field name from a source entity)

expr (a valid SQL scalar expression. References to input fields of source entities are specified in the format of #{Entity. Field}. Parameters can also be used in the expression in the format of $ {ParameterName})

type (the type of field, which is required for return fields specified by expr. It is also required for all return fields of an Entity with an SQL type)

alias (the unique alias for return field)

aggr (possible aggregations are: COUNT, COUNT_DISTINCT, DISTINCT, MAX, MIN, AVG, SUM, FIRST_VALUE, LAST_VALUE)

case (JSON array object represents conditional expressions "when" and "expr")

fieldsFrom, and, except (specification for projections from a source entity with excluded fields)

props (general JSON object for properties of the return field. Possible properties include: "filterGroup," "title," "format," and "utype")

PROPS: generic JSON objects for other entity properties

SQL: a JSON array of string literals for SQL statements. Each string literal can contain parameterized expressions $ {ParameterName} and/or composable entity by #{Entity Name} GRAPH: required for graph entity. Has the following required fields:

source (including "type," "props," and "keys")

target (including "type," "props," and "keys")

edge (including "type" and "props")

JOINS: a JSON array of join operators. Possible fields for a join operator include:

type (possible join types include: "loj"-Left Outer Join, "join"-Inner Join, "in"-Semi Join, "implicit"-Implicit Join)

left (a left hand side field of join)

right (a right hand side field of join)

keys (key columns for multi-way joins)

order (a join order of multi-way joins)

FKEYS: a JSON array of FilterKey(s). The fields for a FilterKey are:

type (type of FilterKey)

fieldRefs (reference(s) to return fields of an entity defined in the sources field)

alias (an alias of the FilterKey, used in implicit join specification)

FILTERS: a JSON array of filters (conjunct). Possible fields for a filter include:

type (types of filters, including: "eq"—equivalent to SQL=, "ne"—equivalent to SQL < >, "ge"—equivalent to SQL >=, "gt"—equivalent to SQL >, "le"—equivalent to SQL <=, "lt"—equivalent to SQL <, "like"— equivalent to SQL LIKE, "not_like"—equivalent to SQL NOT LIKE, "rlike"—equivalent to SQL RLIKE (Snowflake specific), "not_rlike"—equivalent to SQL NOT RLIKE (Snowflake specific), "in"—equivalent to SQL IN, "not_in"—equivalent to SQL NOT IN)

expr (generic SQL expression)

field (field name)

value (single value)

values (for both IN and NOT IN)

ORDERS: a JSON array of ORDER BY for returning fields. Possible attributes for the ORDER BY clause include:

field (field ordinal index (1 based) or field alias)

order (asc/desc, default is ascending order)

GROUPS: a JSON array of GROUP BY for returning fields. Field attributes are:

field (ordinal index (1 based) or alias from the return fields)

LIMIT: a limit for the number of records to be returned

OFFSET: an offset of starting position of returned data. Used in combination with limit for pagination.

Suppose customers of data platform 12 (e.g., entity A and entity B) request new data transformations or a new aggregation of data from an existing data set (as well as a corresponding visualization for the newly defined data set). As mentioned above, the data models and filtering applications used by data platform 12 are extensible. Thus, two example scenarios of extensibility are (1) extending the filter data set, and (2) extending a FilterKey in the filter data set.

Data platform 12 includes a query service catalog that enumerates cards available to users of data platform 12. New cards can be included for use in data platform 12 by being added to the query service catalog (e.g., by an operator of data platform 12). For reusability and maintainability, a single external-facing card (e.g., available for use in a dossier) can be composed of multiple (nested) internal cards. Each newly added card (whether external or internal) will also have associated FilterKey(s) defined. A user interface (UI) developer can then develop a visualization for the new data set in one or more dossier templates. The same external card can be used in multiple dossier templates, and a given external card can be used multiple times in the same dossier (e.g., after customization). Examples of external card customization include customization via parameters, ordering, and/or various mappings of external data fields (columns).

As mentioned above, a second extensibility scenario is one in which a FilterKey in the filter data set is extended (i.e., existing template functions are used to define a new data set). As also mentioned above, data sets used by data platform 12 are composable/reusable/extensible, irrespective of whether the data sets are relational or graph data sets. One example data set is the User Tracking polygraph, which is generated as a graph data set (comprising nodes and edges). Like other polygraphs, User Tracking is an external data set that can be visualized both as a graph (via the nodes and edges) and can also be used as a filter data set for other cards, via the cluster identifier (CID) field.

As mentioned above, as users such as user A navigate through/interact with interfaces provided by data platform 12 (e.g., as shown in FIG. 4H), such interactions trigger query service 166 to generate and perform queries against data store 30. Dynamic composition of filter datasets can be implemented using FilterKeys and FilterKey Types. A FilterKey can be defined as a list of columns and/or fields in a nested structure (e.g., JSON). Instances of the same Filter-Key Type can be formed as an Implicit Join Group. The same instance of a FilterKey can participate in different Implicit Join Groups. A list of relationships among all possible Implicit Join Groups is represented as a Join graph for the entire search space to create a final data filter set by traversing edges and producing Join Path(s).

Each card (e.g., as stored in the query service catalog and used in a dossier) can be introspected by a/card/describe/CardID REST request.

Figure 4K:
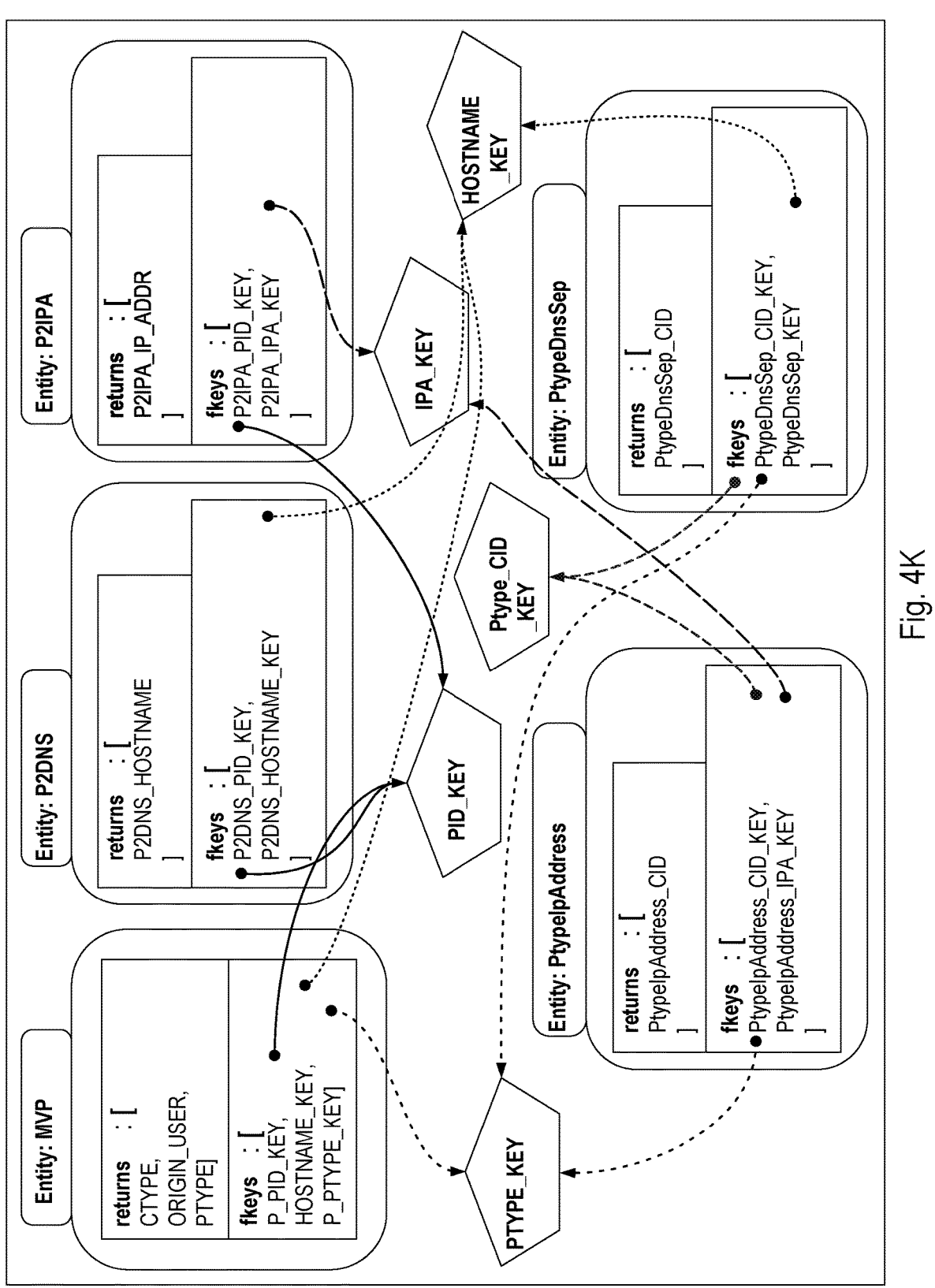
FIG. 4K depicts an example of an Entity Join graph by FilterKey and FilterKey Group (implicit join).

At runtime (e.g., whenever it receives a request from web app 120), query service 166 parses the list of implicit joins and creates a Join graph to manifest relationships of Filter-Keys among Entities. A Join graph (an example of which is depicted in FIG. 4K) comprises a list of Join Link(s). A Join Link represents each implicit join group by the same Fil-terKey type. A Join Link maintains a reverse map (Entity-to-FilterKey) of FilterKeys and their Entities. As previously mentioned, Entities can have more than one FilterKey defined. The reverse map guarantees one FilterKey per Entity can be used for each JoinLink. Each JoinLink also maintains a list of entities for the priority order of joins. Each JoinLink is also responsible for creating and adding directional edge(s) to graphs. An edge represents a possible join between two Entities.

At runtime, each Implicit Join uses the Join graph to find all possible join paths. The search of possible join paths starts with the outer FilterKey of an implicit join. One approach is to use a shortest path approach, with breadth first traversal and subject to the following criteria:

Use the priority order list of Join Links for all entities in the same implicit join group.

Stop when a node (Entity) is reached which has local filter(s).

Include all join paths at the same level (depth).

Exclude join paths based on the predefined rules (path of edges).

FIG. 4L illustrates an example of a process for dynamically generating and executing a query. In various embodiments, process 485 is performed by data platform 12. The process begins at 486 when a request is received to filter information associated with activities within a network environment. One example of such a request occurs in response to user A clicking on tab 465. Another example of such a request occurs in response to user A clicking on link 464-1. Yet another example of such a request occurs in response to user A clicking on link 464-2 and selecting (e.g., from a dropdown) an option to filter (e.g., include, exclude) based on specific criteria that she provides (e.g., an IP address, a username, a range of criteria, etc.).

At 487, a query is generated based on an implicit join. One example of processing that can be performed at 487 is as follows. As explained above, one way dynamic composition of filter datasets can be implemented is by using FilterKeys and FilterKey Types. And, instances of the same FilterKey Type can be formed as an Implicit Join Group. A Join graph for the entire search space can be constructed from a list of all relationships among all possible Join Groups. And, a final data filter set can be created by traversing edges and producing one or more Join Paths. Finally, the shortest path in the join paths is used to generate an SQL query string.

One approach to generating an SQL query string is to use a query building library (authored in an appropriate language such as Java). For example, a common interface "sqlGen" may be used in conjunction with process 485 is as follows. First, a card/entity is composed by a list of input cards/entities, where each input card recursively is composed by its own list of input cards. This nested structure can be visualized as a tree of query blocks (SELECT) in standard SQL constructs. SQL generation can be performed as the traversal of the tree from root to leaf entities (top-down), calling the sqlGen of each entity. Each entity can be treated as a subclass of the Java class (Entity). An implicit join filter (EntityFilter) is implemented as a subclass of Entity, similar to the right hand side of a SQL semi-join operator. Unlike the static SQL semi-join construct, it is conditionally and recursively generated even if it is specified in the input sources of the JSON specification. Another recursive interface can also be used in conjunction with process 485, preSQLGen, which is primarily the entry point for Entity-Filter to run a search and generate nested implicit join filters. During preSQLGen recursive invocations, the applicability of implicit join filters is examined and pushed down to its input subquery list. Another top-down traversal, pullUp-Cachable, can be used to pull up common sub-query blocks, including those dynamically generated by preSQLGen, such that SELECT statements of those cacheable blocks are generated only once at top-level WITH clauses. A recursive interface, sqlWith, is used to generate nested subqueries inside WITH clauses. The recursive calls of a sqlWith function can generate nested WITH clauses as well. An sqlFrom function can be used to generate SQL FROM clauses by referencing those subquery blocks in the WITH clauses. It also produces INNER/OUTER join operators based on the joins in the specification. Another recursive interface, sqlWhere, can be used to generate conjuncts and disjuncts of local predicates and semi-join predicates based on implicit join transformations. Further, sqlProject, sql-GroupBy, sqlOrderBy, and sqlLimitOffset can respectively be used to translate the corresponding directives in JSON spec to SQL SELECT list, GROUP BY, ORDER BY, and LIMIT/OFFSET clauses.

Returning to process 485, at 488, the query (generated at 487) is used to respond to the request. As one example of the processing performed at 488, the generated query is used to query data store 30 and provide (e.g., to web app 120) fact data formatted in accordance with a schema (e.g., as associated with a card associated with the request received at 486).

Although the examples described herein largely relate to embodiments where data is collected from agents and ultimately stored in a data store such as those provided by Snowflake, in other embodiments data that is collected from agents and other sources may be stored in different ways. For example, data that is collected from agents and other sources may be stored in a data warehouse, data lake, data mart, and/or any other data store.

A data warehouse may be embodied as an analytic database (e.g., a relational database) that is created from two or more data sources. Such a data warehouse may be leveraged to store historical data, often on the scale of petabytes. Data warehouses may have compute and memory resources for running complicated queries and generating reports. Data warehouses may be the data sources for business intelligence ('BI') systems, machine learning applications, and/or other applications. By leveraging a data warehouse, data that has been copied into the data warehouse may be indexed for good analytic query performance, without affecting the write performance of a database (e.g., an Online Transaction Processing ('OLTP') database). Data warehouses also enable the joining data from multiple sources for analysis. For example, a sales OLTP application probably has no need to know about the weather at various sales locations, but sales predictions could take advantage of that data. By adding historical weather data to a data warehouse, it would be possible to factor it into models of historical sales data.

Data lakes, which store files of data in their native format, may be considered as "schema on read" resources. As such, any application that reads data from the lake may impose its own types and relationships on the data. Data warehouses, on the other hand, are "schema on write," meaning that data types, indexes, and relationships are imposed on the data as it is stored in the EDW. "Schema on read" resources may be beneficial for data that may be used in several contexts and poses little risk of losing data. "Schema on write" resources may be beneficial for data that has a specific purpose, and good for data that must relate properly to data from other sources. Such data stores may include data that is encrypted using homomorphic encryption, data encrypted using privacy-preserving encryption, smart contracts, non-fungible tokens, decentralized finance, and other techniques.

Data marts may contain data oriented towards a specific business line whereas data warehouses contain enterprise-wide data. Data marts may be dependent on a data warehouse, independent of the data warehouse (e.g., drawn from an operational database or external source), or a hybrid of the two. In embodiments described herein, different types of data stores (including combinations thereof) may be leveraged. Such data stores may be proprietary or may be embodied as vendor provided products or services such as, for example, Google BigQuery, Druid, Amazon Redshift, IBM Db2, Dremio, Databricks Lakehouse Platform, Cloudera, Azure Synapse Analytics, and others.

The deployments (e.g., a customer's cloud deployment) that are analyzed, monitored, evaluated, or otherwise observed by the systems described herein (e.g., systems that include components such as the platform 12 of FIG. 1D, the data collection agents described herein, and/or other components) may be provisioned, deployed, and/or managed using infrastructure as code ('IaC'). IaC involves the managing and/or provisioning of infrastructure through code instead of through manual processes. With IaC, configuration files may be created that include infrastructure specifications. IaC can be beneficial as configurations may be edited and distributed, while also ensuring that environments are provisioned in a consistent manner. IaC approaches may be enabled in a variety of ways including, for example, using IaC software tools such as Terraform by HashiCorp. Through the usage of such tools, users may define and provide data center infrastructure using JavaScript Object Notation ('JSON'), YAML, proprietary formats, or some other format. In some embodiments, the configuration files may be used to emulate a cloud deployment for the purposes of analyzing the emulated cloud deployment using the systems described herein. Likewise, the configuration files themselves may be used as inputs to the systems described herein, such that the configuration files may be inspected to identify vulnerabilities, misconfigurations, violations of regulatory requirements, or other issues. In fact, configuration files for multiple cloud deployments may even be used by the systems described herein to identify best practices, to identify configuration files that deviate from typical configuration files, to identify configuration files with similarities to deployments that have been determined to be deficient in some way, or the configuration files may be leveraged in some other ways to detect vulnerabilities, misconfigurations, violations of regulatory requirements, or other issues prior to deploying an infrastructure that is described in the configuration files. In some embodiments the techniques described herein may be use in multi-cloud, multi-tenant, cross-cloud, cross-tenant, cross-user, industry cloud, digital platform, and other scenarios depending on specific need or situation.

In some embodiments, the deployments that are analyzed, monitored, evaluated, or otherwise observed by the systems described herein (e.g., systems that include components such as the platform 12 of FIG. 1D, the data collection agents described herein, and/or other components) may be monitored to determine the extent to which a particular component has experienced "drift" relative to its associated IaC configuration. Discrepancies between how cloud resources were defined in an IaC configuration file and how they are currently configured in runtime may be identified and remediation workflows may be initiated to generate an alert, reconfigure the deployment, or take some other action. Such discrepancies may occur for a variety of reasons. Such discrepancies may occur, for example, due to maintenance operations being performed, due to incident response tasks being carried out, or for some other reason. Readers will appreciate that while IaC helps avoid initial misconfigurations of a deployment by codifying and enforcing resource creation, resource configuration, security policies, and so on, the systems described herein may prevent unwanted drift from occurring during runtime and after a deployment has been created in accordance with an IaC configuration.

In some embodiments, the deployments (e.g., a customer's cloud deployment) that are analyzed, monitored, evaluated, or otherwise observed by the systems described herein (e.g., systems that include components such as the platform 12 of FIG. 1D, the data collection agents described herein, and/or other components) may also be provisioned, deployed, and/or managed using security as code ('SaC'). SaC extends IaC concepts by defining cybersecurity policies and/or standards programmatically, so that the policies and/or standards can be referenced automatically in the configuration scripts used to provision cloud deployments. Stated differently, SaC can automate policy implementation and cloud deployments may even be compared with the policies to prevent "drift." For example, if a policy is created where all personally identifiable information ('PII') or personal health information ('PHI') must be encrypted when it is stored, that policy is translated into a process that is automatically launched whenever a developer submits code, and code that violates the policy may be automatically rejected.

In some embodiments, SaC may be implemented by initially classifying workloads (e.g., by sensitivity, by criticality, by deployment model, by segment). Policies that can be instantiated as code may subsequently be designed. For example, compute-related policies may be designed, access-related policies may be designed, application-related policies may be designed, network-related policies may be designed, data-related policies may be designed, and so on. Security as code may then be instantiated through architecture and automation, as successful implementation of SaC can benefit from making key architectural-design decisions and executing the right automation capabilities. Next, operating model protections may be built and supported. For example, an operating model may "shift left" to maximize self-service and achieve full-life-cycle security automation (e.g., by standardizing common development toolchains, CI/CD pipelines, and the like). In such an example, security policies and access controls may be part of the pipeline, automatic code review and bug/defect detection may be performed, automated build processes may be performed, vulnerability scanning may be performed, checks against a risk-control framework may be made, and other tasks may be performed all before deploying an infrastructure or components thereof.

The systems described herein may be useful in analyzing, monitoring, evaluating, or otherwise observing a GitOps environment. In a GitOps environment, Git may be viewed as the one and only source of truth. As such, GitOps may require that the desired state of infrastructure (e.g., a customer's cloud deployment) be stored in version control such that the entire audit trail of changes to such infrastructure can be viewed or audited. In a GitOps environment, all changes to infrastructure are embodied as fully traceable commits that are associated with committer information, commit IDs, time stamps, and/or other information. In such an embodiment, both an application and the infrastructure (e.g., a customer's cloud deployment) that supports the execution of the application are therefore versioned artifacts and can be audited using the gold standards of software development and delivery. Readers will appreciate that while the systems described herein are described as analyzing, monitoring, evaluating, or otherwise observing a GitOps environment, in other embodiments other source control mechanisms may be utilized for creating infrastructure, making changes to infrastructure, and so on. In these embodiments, the systems described herein may similarly be used for analyzing, monitoring, evaluating, or otherwise observing such environments.

As described in other portions of the present disclosure, the systems described herein may be used to analyze, monitor, evaluate, or otherwise observe a customer's cloud deployment. While securing traditional datacenters requires managing and securing an IP-based perimeter with networks and firewalls, hardware security modules ('HSMs'), security information and event management ('SIEM') technologies, and other physical access restrictions, such solutions are not particularly useful when applied to cloud deployments. As such, the systems described herein may be configured to interact with and even monitor other solutions that are appropriate for cloud deployments such as, for example, "zero trust" solutions.

A zero trust security model (a.k.a., zero trust architecture) describes an approach to the design and implementation of IT systems. A primary concept behind zero trust is that devices should not be trusted by default, even if they are connected to a managed corporate network such as the corporate LAN and even if they were previously verified. Zero trust security models help prevent successful breaches by eliminating the concept of trust from an organization's network architecture. Zero trust security models can include multiple forms of authentication and authorization (e.g., machine authentication and authorization, human/user authentication and authorization) and can also be used to control multiple types of accesses or interactions (e.g., machine-to-machine access, human-to-machine access).

In some embodiments, the systems described herein may be configured to interact with zero trust solutions in a variety of ways. For example, agents that collect input data for the systems described herein (or other components of such systems) may be configured to access various machines, applications, data sources, or other entity through a zero trust solution, especially where local instances of the systems described herein are deployed at edge locations. Likewise, given that zero trust solutions may be part of a customer's cloud deployment, the zero trust solution itself may be monitored to identify vulnerabilities, anomalies, and so on. For example, network traffic to and from the zero trust solution may be analyzed, the zero trust solution may be monitored to detect unusual interactions, log files generated by the zero trust solution may be gathered and analyzed, and so on.

In some embodiments, the systems described herein may leverage various tools and mechanisms in the process of performing its primary tasks (e.g., monitoring a cloud deployment). For example, Linux eBPF is mechanism for writing code to be executed in the Linux kernel space. Through the usage of eBPF, user mode processes can hook into specific trace points in the kernel and access data structures and other information. For example, eBPF may be used to gather information that enables the systems described herein to attribute the utilization of networking resources or network traffic to specific processes. This may be useful in analyzing the behavior of a particular process, which may be important for observability/SIEM.

The systems described may be configured to collect security event logs (or any other type of log or similar record of activity) and telemetry in real time for threat detection, for analyzing compliance requirements, or for other purposes. In such embodiments, the systems described herein may analyze telemetry in real time (or near real time), as well as historical telemetry, to detect attacks or other activities of interest. The attacks or activities of interest may be analyzed to determine their potential severity and impact on an organization. In fact, the attacks or activities of interest may be reported, and relevant events, logs, or other information may be stored for subsequent examination.

In one embodiment, systems described herein may be configured to collect security event logs (or any other type of log or similar record of activity) and telemetry in real time to provide customers with a SIEM or SIEM-like solution. SIEM technology aggregates event data produced by security devices, network infrastructure, systems, applications, or other source. Centralizing all of the data that may be generated by a cloud deployment may be challenging for a traditional SIEM, however, as each component in a cloud deployment may generate log data or other forms of machine data, such that the collective amount of data that can be used to monitor the cloud deployment can grow to be quite large. A traditional SIEM architecture, where data is centralized and aggregated, can quickly result in large amounts of data that may be expensive to store, process, retain, and so on. As such, SIEM technologies may frequently be implemented such that silos are created to separate the data.

In some embodiments of the present disclosure, data that is ingested by the systems described herein may be stored in a cloud-based data warehouse such as those provided by Snowflake and others. Given that companies like Snowflake offer data analytics and other services to operate on data that is stored in their data warehouses, in some embodiments one or more of the components of the systems described herein may be deployed in or near Snowflake as part of a secure data lake architecture (a.k.a., a security data lake architecture, a security data lake/warehouse). In such an embodiment, components of the systems described herein may be deployed in or near Snowflake to collect data, transform data, analyze data for the purposes of detecting threats or vulnerabilities, initiate remediation workflows, generate alerts, or perform any of the other functions that can be performed by the systems described herein. In such embodiments, data may be received from a variety of sources (e.g., EDR or EDR-like tools that handle endpoint data, cloud access security broker ('CASB') or CASB-like tools that handle data describing interactions with cloud applications, Identity and Access Management ('IAM') or IAM-like tools, and many others), normalized for storage in a data warehouse, and such normalized data may be used by the systems described herein. In fact, the systems described herein may actually implement the data sources (e.g., an EDR tool, a CASB tool, an IAM tool) described above.

In some embodiments one data source that is ingested by the systems described herein is log data, although other forms of data such as network telemetry data (flows and packets) and/or many other forms of data may also be utilized. In some embodiments, event data can be combined with contextual information about users, assets, threats, vulnerabilities, and so on, for the purposes of scoring, prioritization and expediting investigations. In some embodiments, input data may be normalized, so that events, data, contextual information, or other information from disparate sources can be analyzed more efficiently for specific purposes (e.g., network security event monitoring, user activity monitoring, compliance reporting). The embodiments described here offer real-time analysis of events for security monitoring, advanced analysis of user and entity behaviors, querying and long-range analytics for historical analysis, other support for incident investigation and management, reporting (for compliance requirements, for example), and other functionality.

In some embodiments, the systems described herein may be part of an application performance monitoring ('APM') solution. APM software and tools enable the observation of application behavior, observation of its infrastructure dependencies, observation of users and business key performance indicators ('KPIs') throughout the application's life cycle, and more. The applications being observed may be developed internally, as packaged applications, as software as a service ('SaaS'), or embodied in some other ways. In such embodiments, the systems described herein may provide one or more of the following capabilities:

The ability to operate as an analytics platform that ingests, analyzes, and builds context from traces, metrics, logs, and other sources.

Automated discovery and mapping of an application and its infrastructure components.

Observation of an application's complete transactional behavior, including interactions over a data communications network.

Monitoring of applications running on mobile (native and browser) and desktop devices.

Identification of probable root causes of an application's performance problems and their impact on business outcomes.

Integration capabilities with automation and service management tools.

Analysis of business KPIs and user journeys (for example, login to check-out).

Domain-agnostic analytics capabilities for integrating data from third-party sources.

Endpoint monitoring to understand the user experience and its impact on business outcomes.

Support for virtual desktop infrastructure ('VDI') monitoring.

In embodiments where the systems described herein are used for APM, some components of the system may be modified, other components may be added, some components may be removed, and other components may remain the same. In such an example, similar mechanisms as described elsewhere in this disclosure may be used to collect information from the applications, network resources used by the application, and so on. The graph based modelling techniques may also be leveraged to perform some of the functions mentioned above, or other functions as needed.

In some embodiments, the systems described herein may be part of a solution for developing and/or managing artificial intelligence ('AI') or machine learning ('ML') applications. For example, the systems described herein may be part of an AutoML tool that automate the tasks associated with developing and deploying ML models. In such an example, the systems described herein may perform various functions as part of an AutoML tool such as, for example, monitoring the performance of a series of processes, microservices, and so on that are used to collectively form the AutoML tool. In other embodiments, the systems described herein may perform other functions as part of an AutoML tool or may be used to monitor, analyze, or otherwise observe an environment that the AutoML tool is deployed within.

In some embodiments, the systems described herein may be used to manage, analyze, or otherwise observe deployments that include other forms of AI/ML tools. For example, the systems described herein may manage, analyze, or otherwise observe deployments that include AI services. AI services are, like other resources in an as-a-service model, ready-made models and AI applications that are consumable as services and made available through APIs. In such an example, rather than using their own data to build and train models for common activities, organizations may access pre-trained models that accomplish specific tasks. Whether an organization needs natural language processing ('NLP'), automatic speech recognition ('ASR'), image recognition, or some other capability, AI services simply plug-and-play into an application through an API. Likewise, the systems described herein may be used to manage, analyze, or otherwise observe deployments that include other forms of AI/ML tools such as Amazon Sagemaker (or other cloud machine-learning platform that enables developers to create, train, and deploy ML models) and related services such as Data Wrangler (a service to accelerate data prep for ML) and Pipelines (a CI/CD service for ML).

In some embodiments, the systems described herein may be used to manage, analyze, or otherwise observe deployments that include various data services. For example, data services may include secure data sharing services, data marketplace services, private data exchanges services, and others. Secure data sharing services can allow access to live data from its original location, where those who are granted access to the data simply reference the data in a controlled and secure manner, without latency or contention from concurrent users. Because changes to data are made to a single version, data remains up-to-date for all consumers, which ensures data models are always using the latest version of such data. Data marketplace services operate as a single location to access live, ready-to-query data (or data that is otherwise ready for some other use). A data marketplace can even include a "feature stores," which can allow data scientists to repurpose existing work. For example, once a data scientist has converted raw data into a metric (e.g., costs of goods sold), this universal metric can be found quickly and used by other data scientists for quick analysis against that data.

In some embodiments, the systems described herein may be used to manage, analyze, or otherwise observe deployments that include distributed training engines or similar mechanisms such as, for example, such as tools built on Dask. Dask is an open source library for parallel computing that is written in Python. Dask is designed to enable data scientists to improve model accuracy faster, as Dask enables data scientists can do everything in Python end-to-end, which means that they no longer need to convert their code to execute in environments like Apache Spark. The result is reduced complexity and increased efficiency. The systems described herein may also be used to manage, analyze, or otherwise observe deployments that include technologies such as RAPIDS (an open source Python framework which is built on top of Dask). RAPIDS optimizes compute time and speed by providing data pipelines and executing data science code entirely on graphics processing units (GPUs) rather than CPUs. Multi-cluster, shared data architecture, DataFrames, Java user-defined functions (UDF) are supported to enable trained models to run within a data warehouse.

In some embodiments, the systems described herein may be leveraged for the specific use case of detecting and/or remediating ransomware attacks and/or other malicious action taken with respect to data, systems, and/or other resources associated with one or more entities. Ransomware is a type of malware from cryptovirology that threatens to publish the victim's data or perpetually block access to such data unless a ransom is paid. In such embodiments, ransomware attacks may be carried out in a manner such that patterns (e.g., specific process-to-process communications, specific data access patterns, unusual amounts of encryption/re-encryption activities) emerge, where the systems described herein may monitor for such patterns. Alternatively, ransomware attacks may involve behavior that deviates from normal behavior of a cloud deployment that is not experiencing a ransomware attack, such that the mere presence of unusual activity may trigger the systems described herein to generate alerts or take some other action, even without explicit knowledge that the unusual activity is associated with a ransomware attack.

In some embodiments, particular policies may be put in place the systems described herein may be configured to enforce such policies as part of an effort to thwart ransomware attacks. For example, particular network sharing protocols (e.g., Common Internet File System ('CIFS'), Network File System ('NFS')) may be avoided when implementing storage for backup data, policies that protect backup systems may be implemented and enforced to ensure that usable backups are always available, multifactor authentication for particular accounts may be utilized and accounts may be configured with the minimum privilege required to function, isolated recovery environments may be created and isolation may be monitored and enforced to ensure the integrity of the recovery environment, and so on. As described in the present disclosure, the systems described herein may be configured to explicitly enforce such policies or may be configured to detect unusual activity that represents a violation of such policies, such that the mere presence of unusual activity may trigger the systems described herein to generate alerts or take some other action, even without explicit knowledge that the unusual activity is associated with a violation of a particular policy.

Readers will appreciate that ransomware attacks are often deployed as part of a larger attack that may involve, for example:

Penetration of the network through means such as, for example, stolen credentials and remote access malware.

Stealing of credentials for critical system accounts, including subverting critical administrative accounts that control systems such as backup, Active Directory ('AD'), DNS, storage admin consoles, and/or other key systems.

Attacks on a backup administration console to turn off or modify backup jobs, change retention policies, or even provide a roadmap to where sensitive application data is stored.

Data theft attacks.

As a result of the many aspects that are part of a ransomware attack, embodiments of the present disclosure may be configured as follows:

The systems may include one or more components that detect malicious activity based on the behavior of a process.

The systems may include one or more components that store indicator of compromise ('IOC') or indicator of attack ('IOA') data for retrospective analysis.

The systems may include one or more components that detect and block fileless malware attacks.

The systems may include one or more components that remove malware automatically when detected.

The systems may include a cloud-based, SaaS-style, multi-titenant infrastructure.

The systems may include one or more components that identify changes made by malware and provide the recommended remediation steps or a rollback capability.

The systems may include one or more components that detect various application vulnerabilities and memory exploit techniques.

The systems may include one or more components that continue to collect suspicious event data even when a managed endpoint is outside of an organization's network.

The systems may include one or more components that perform static, on-demand malware detection scans of folders, drives, devices, or other entities.

The systems may include data loss prevention (DLP) functionality.

In some embodiments, the systems described herein may manage, analyze, or otherwise observe deployments that include deception technologies. Deception technologies allow for the use of decoys that may be generated based on scans of true network areas and data. Such decoys may be deployed as mock networks running on the same infrastructure as the real networks, but when an intruder attempts to enter the real network, they are directed to the false network and security is immediately notified. Such technologies may be useful for detecting and stopping various types of cyber threats such as, for example, Advanced Persistent Threats ('APTs'), malware, ransomware, credential dumping, lateral movement and malicious insiders. To continue to outsmart increasingly sophisticated attackers, these solutions may continuously deploy, support, refresh and respond to deception alerts.

In some embodiments, the systems described herein may manage, analyze, or otherwise observe deployments that include various authentication technologies, such as multi-factor authentication and role-based authentication. In fact, the authentication technologies may be included in the set of resources that are managed, analyzed, or otherwise observed as interactions with the authentication technologies may be monitored. Likewise, log files or other information retained by the authentication technologies may be gathered by one or more agents and used as input to the systems described herein.

In some embodiments, the systems described herein may be leveraged for the specific use case of detecting supply chain attacks. More specifically, the systems described herein may be used to monitor a deployment that includes software components, virtualized hardware components, and other components of an organization's supply chain such that interactions with an outside partner or provider with access to an organization's systems and data can be monitored. In such embodiments, supply chain attacks may be carried out in a manner such that patterns (e.g., specific interactions between internal and external systems) emerge, where the systems described herein may monitor for such patterns. Alternatively, supply chain attacks may involve behavior that deviates from normal behavior of a cloud deployment that is not experiencing a supply chain attack, such that the mere presence of unusual activity may trigger the systems described herein to generate alerts or take some other action, even without explicit knowledge that the unusual activity is associated with a supply chain attack.

In some embodiments, the systems described herein may be leveraged for other specific use cases such as, for example, detecting the presence of (or preventing infiltration from) cryptocurrency miners (e.g., bitcoin miners), token miners, hashing activity, non-fungible token activity, other viruses, other malware, and so on. As described in the present disclosure, the systems described herein may monitor for such threats using known patterns or by detecting unusual activity, such that the mere presence of unusual activity may trigger the systems described herein to generate alerts or take some other action, even without explicit knowledge that the unusual activity is associated with a particular type of threat, intrusion, vulnerability, and so on.

The systems described herein may also be leveraged for endpoint protection, such the systems described herein form all of or part of an endpoint protection platform. In such an embodiment, agents, sensors, or similar mechanisms may be deployed on or near managed endpoints such as computers, servers, virtualized hardware, internet of things ('IoT') devices, mobile devices, phones, tablets, watches, other personal digital devices, storage devices, thumb drives, secure data storage cards, or some other entity. In such an example, the endpoint protection platform may provide functionality such as:

Prevention and protection against security threats including malware that uses file-based and fileless exploits.

The ability to apply control (allow/block) to access of software, scripts, processes, microservices, and so on.

The ability to detect and prevent threats using behavioral analysis of device activity, application activity, user activity, and/or other data.

The ability for facilities to investigate incidents further and/or obtain guidance for remediation when exploits evade protection controls The ability to collect and report on inventory, configuration and policy management of the endpoints.

The ability to manage and report on operating system security control status for the monitored endpoints.

The ability to scan systems for vulnerabilities and report/manage the installation of security patches.

The ability to report on internet, network and/or application activity to derive additional indications of potentially malicious activity.

Example embodiments are described in which policy enforcement, threat detection, or some other function is carried out by the systems described herein by detecting unusual activity, such that the mere presence of unusual activity may trigger the systems described herein to generate alerts or take some other action, even without explicit knowledge that the unusual activity is associated with a particular type of threat, intrusion, vulnerability, and so on. Although these examples are largely described in terms of identifying unusual activity, in these examples the systems described herein may be configured to learn what constitutes 'normal activity'—where 'normal activity' is activity observed, modeled, or otherwise identified in the absence of a particular type of threat, intrusion, vulnerability, and so on. As such, detecting 'unusual activity' may alternatively be viewed as detecting a deviation from 'normal activity' such that 'unusual activity' does not need to be identified and sought out. Instead, deviations from 'normal activity' may be assumed to be 'unusual activity'.

Readers will appreciate that while specific examples of the functionality that the systems described herein can provide are included in the present disclosure, such examples are not to be interpreted as limitations as to the functionality that the systems described herein can provide.

Other functionality may be provided by the systems described herein, all of which are within the scope of the present disclosure. For the purposes of illustration and not as a limitation, additional examples can include governance, risk, and compliance ('GRC'), threat detection and incident response, identity and access management, network and infrastructure security, data protection and privacy, identity and access management ('IAM'), and many others.

In order to provide the functionality described above, the systems described herein or the deployments that are monitored by such systems may implement a variety of techniques. For example, the systems described herein or the deployments that are monitored by such systems may tag data and logs to provide meaning or context, persistent monitoring techniques may be used to monitor a deployment at all times and in real time, custom alerts may be generated based on rules, tags, and/or known baselines from one or more polygraphs, and so on.

Although examples are described above where data may be collected from one or more agents, in some embodiments other methods and mechanisms for obtaining data may be utilized. For example, some embodiments may utilize agentless deployments where no agent (or similar mechanism) is deployed on one or more customer devices, deployed within a customer's cloud deployment, or deployed at another location that is external to the data platform. In such embodiments, the data platform may acquire data through one or more APIs such as the APIs that are available through various cloud services. For example, one or more APIs that enable a user to access data captured by Amazon CloudTrail may be utilized by the data platform to obtain data from a customer's cloud deployment without the use of an agent that is deployed on the customer's resources. In some embodiments, agents may be deployed as part of a data acquisition service or tool that does not utilize a customer's resources or environment. In some embodiments, agents (deployed on a customer's resources or elsewhere) and mechanisms in the data platform that can be used to obtain data from through one or more APIs such as the APIs that are available through various cloud services may be utilized. In some embodiments, one or more cloud services themselves may be configured to push data to some entity (deployed anywhere), which may or may not be an agent. In some embodiments, other data acquisition techniques may be utilized, including combinations and variations of the techniques described above, each of which is within the scope of the present disclosure.

Readers will appreciate that while specific examples of the cloud deployments that may be monitored, analyzed, or otherwise observed by the systems described herein have been provided, such examples are not to be interpreted as limitations as to the types of deployments that may be monitored, analyzed, or otherwise observed by the systems described herein. Other deployments may be monitored, analyzed, or otherwise observed by the systems described herein, all of which are within the scope of the present disclosure. For the purposes of illustration and not as a limitation, additional examples can include multi-cloud deployments, on-premises environments, hybrid cloud environments, sovereign cloud environments, heterogeneous environments, DevOps environments, DevSecOps environments, GitOps environments, quantum computing environments, data fabrics, composable applications, composable networks, decentralized applications, and many others.

Readers will appreciate that while specific examples of the types of data that may be collected, transformed, stored, and/or analyzed by the systems described herein have been provided, such examples are not to be interpreted as limitations as to the types of data that may be collected, transformed, stored, and/or analyzed by the systems described herein. Other types of data can include, for example, data collected from different tools (e.g., DevOps tools, DevSecOps, GitOps tools), different forms of network data (e.g., routing data, network translation data, message payload data, Wifi data, Bluetooth data, personal area networking data, payment device data, near field communication data, metadata describing interactions carried out over a network, and many others), data describing processes executing in a container, lambda, EC2 instance, virtual machine, or other execution environment, data associated with a virtualization platform (e.g., VMWare vSphere, VMware vCenter servers, vSphere plug-ins, etc.), data associated with a virtual machine monitor (e.g., hypervisors, ESXi hosts, etc.), information describing the execution environment itself, and many other types of data. In some embodiments, various backup images may also be collected, transformed, stored, and/or analyzed by the systems described herein for the purposes of identifying anomalies. Such backup images can include backup images of an entire cloud deployment, backup images of some subset of a cloud deployment, backup images of some other system or device(s), and so on. In such a way, backup images may serve as a separate data source that can be analyzed for detecting various anomalies.

Advantages and features of the present disclosure can be further described by the following statements:

1. A method comprising: collecting, by a sub-kernel component of a data collection system communicatively coupled to a data platform configured to perform security monitoring of a compute environment, sub-kernel data accessible from a sub-kernel space below an operating system of a compute resource in the compute environment; manipulating, by the data collection system, the collected sub-kernel data to prepare the sub-kernel data to be used by the data platform in performing the security monitoring of the compute environment; and communicating, by the data collection system, the manipulated sub-kernel data to the data platform.

2. The method of any of the preceding statements, wherein the manipulating of the collected sub-kernel data includes reducing the collected sub-kernel data by deduplicating the collected sub-kernel data to remove redundant data 3. The method of any of the preceding statements, wherein the manipulating of the collected sub-kernel data includes reducing the collected sub-kernel data by at least one of: filtering the collected sub-kernel data to remove data that is characterized by a first criterion; or filtering the collected sub-kernel data to remove data that is not characterized by a second criterion 4. The method of any of the preceding statements, wherein: the manipulating of the collected sub-kernel data includes converting, without assistance from any component of the data collection system operating in a kernel space or a user space of the compute resource, the collected sub-kernel data into event data that represents one or more events occurring with respect to the compute resource; and the manipulated sub-kernel data communicated to the data platform includes the event data.

5. The method of any of the preceding statements, wherein the converting of the collected sub-kernel data into the event data includes: detecting, within the sub-kernel data, a change to a page table pointer within the operating system; and identifying, based on the change to the page table pointer, a process of the operating system that is responsible for at least one of the one or more events occurring with respect to the compute resource.

6. The method of any of the preceding statements, wherein: the manipulating of the collected sub-kernel data includes converting, with assistance from at least one of a kernel component operating in a kernel space of the compute resource or an application component operating in a user space of the compute resource, the collected sub-kernel data into event data that represents one or more events occurring with respect to the compute resource; the converting of the collected sub-kernel data into the event data is performed based on the collected sub-kernel data and at least one of: kernel data accessible from the kernel space by the kernel component, or application data accessible from the user space by the application component; and the manipulated sub-kernel data communicated to the data platform includes the event data.

7. The method of any of the preceding statements, wherein: the manipulating of the collected sub-kernel data includes converting, with assistance from a privileged component operating in a kernel space of the compute resource, the collected sub-kernel data into event data that represents one or more events occurring with respect to the compute resource; the converting of the collected sub-kernel data into the event data is performed based on the collected sub-kernel data and kernel data accessible from the kernel space by the privileged component; and the manipulated sub-kernel data communicated to the data platform includes the event data.

8. The method of any of the preceding statements, wherein the privileged component operates in the kernel space using eBPF technology and is deployed to the kernel space from the sub-kernel space.

9. The method of any of the preceding statements, wherein the privileged component is deployed to the kernel space by the sub-kernel component by: gaining control of an idle process operating in the kernel space, and co-opting the idle process to perform operating system calls associated with deploying the privileged component.

10. The method of any of the preceding statements, wherein the sub-kernel component operates in the sub-kernel space and the sub-kernel space is associated with a hypervisor configured to manage the compute resource in the compute environment.

11. The method of any of the preceding statements, wherein the sub-kernel component is secured within the sub-kernel space using web assembly (WASM) code and a sandboxing technique configured to isolate the sub-kernel component.

12. The method of any of the preceding statements, wherein: the compute resource is associated with a virtual machine executing on a processor that includes a plurality of processor cores; the method further comprises: gaining control, by the sub-kernel component, of one or more processor cores of the plurality of processor cores; and dedicating, by the sub-kernel component, the one or more processor cores to be used exclusively for operation of the sub-kernel component by assigning non-operational busywork to fill any extra bandwidth that the one or more processor cores have beyond the operation of the sub-kernel component.

13. The method of any of the preceding statements, wherein the manipulated sub-kernel data is communicated to the data platform for use by the data platform in performing the security monitoring by: constructing a graph based on the manipulated sub-kernel data, the graph comprising a plurality of nodes connected by a plurality of edges, wherein each node of the plurality of nodes represents a logical entity and each edge of the plurality of edges represents a behavioral relationship between nodes connected by the edge; and identifying, based on the graph, a security threat associated with the compute resource within the compute environment.

14. A computer program product embodied in a non-transitory computer-readable storage medium and comprising computer instructions configured to direct a data collection system to perform a process comprising: collecting, by a sub-kernel component of the data collection system, sub-kernel data accessible from a sub-kernel space below an operating system of a compute resource, the compute resource included in a compute environment for which a data platform communicatively coupled to the data collection system performs security monitoring; manipulating the collected sub-kernel data to prepare the sub-kernel data to be used by the data platform in performing the security monitoring of the compute environment; and communicating the manipulated sub-kernel data to the data platform.

15. The computer program product of any of the preceding statements, wherein the manipulating of the collected sub-kernel data includes reducing the collected sub-kernel data by deduplicating the collected sub-kernel data to remove redundant data.

16. The computer program product of any of the preceding statements, wherein the manipulating of the collected sub-kernel data includes reducing the collected sub-kernel data by at least one of: filtering the collected sub-kernel data to remove data that is characterized by a first criterion; or filtering the collected sub-kernel data to remove data that is not characterized by a second criterion.

17. The computer program product of any of the preceding statements, wherein: the manipulating of the collected sub-kernel data includes converting, without assistance from any component of the data collection system operating in a kernel space or a user space of the compute resource, the collected sub-kernel data into event data that represents one or more events occurring with respect to the compute resource; and the manipulated sub-kernel data communicated to the data platform includes the event data.

18. The computer program product of any of the preceding statements, wherein: the manipulating of the collected sub-kernel data includes converting, with assistance from at least one of a kernel component operating in a kernel space of the compute resource or an application component operating in a user space of the compute resource, the collected sub-kernel data into event data that represents one or more events occurring with respect to the compute resource; the converting of the collected sub-kernel data into the event data is performed based on the collected sub-kernel data and at least one of: kernel data accessible from the kernel space by the kernel component, or application data accessible from the user space by the application component; and the manipulated sub-kernel data communicated to the data platform includes the event data.

19. The computer program product of any of the preceding statements, wherein: the manipulating of the collected sub-kernel data includes converting, with assistance from a privileged component operating in a kernel space of the compute resource, the collected sub-kernel data into event data that represents one or more events occurring with respect to the compute resource; the converting of the collected sub-kernel data into the event data is performed based on the collected sub-kernel data and kernel data accessible from the kernel space by the privileged component; and the manipulated sub-kernel data communicated to the data platform includes the event data.

20. The computer program product of any of the preceding statements, wherein the privileged component operates in the kernel space using eBPF technology and is deployed to the kernel space from the sub-kernel space.

21. The computer program product of any of the preceding statements, wherein the privileged component is deployed to the kernel space by the sub-kernel component by: gaining control of an idle process operating in the kernel space, and co-opting the idle process to perform operating system calls associated with deploying the privileged component.

22. A method comprising: receiving, by a data platform from a data collection system with which the data platform is communicatively coupled, sub-kernel data that is: collected by a sub-kernel component of the data collection system from a sub-kernel space below an operating system of a compute resource in a compute environment, and manipulated by the data collection system to prepare the sub-kernel data to be used by the data platform in performing security monitoring of the compute environment; and performing the security monitoring of the compute environment by: constructing a graph based on the received sub-kernel data, the graph comprising a plurality of nodes connected by a plurality of edges, wherein each node of the plurality of nodes represents a logical entity and each edge of the plurality of edges represents a behavioral relationship between nodes connected by the edge, and identifying, based on the graph, a security threat associated with the compute resource within the compute environment.

23. A method comprising: live capturing, by a sub-kernel component of a data collection system communicatively coupled to a data platform configured to perform security monitoring of a compute environment, a state snapshot of a compute resource within the compute environment, the live capturing performed by updating a master state snapshot with one or more delta state snapshots so as to avoid detectable disruption to the compute resource during the live capturing; determining, by the data collection system and based on the state snapshot, event data that represents one or more events occurring with respect to the compute resource; and providing, by the data collection system, the event data to the data platform for use by the data platform in performing the security monitoring of the compute environment.

24. The method of any of the preceding statements, further comprising: constructing, by the data collection system and based on the state snapshot, a virtualized mirror instance of the compute resource hosted on an additional compute resource; wherein the determining of the event data based on the state snapshot is performed by analyzing the virtualized mirror instance of the compute resource.

25. The method of any of the preceding statements, wherein the constructing of the virtualized mirror instance of the compute resource includes: transmitting, during a first time period subsequent to a master capture time represented by the master state snapshot, the master state snapshot to the additional compute resource; transmitting, during a second time period subsequent to the first time period, a first delta state snapshot of the one or more delta state snapshots to the additional compute resource, the first delta state snapshot indicating changes to the compute resource that occurred during the first time period subsequent to the master capture time; and transmitting, during a third time period subsequent to the second time period, a second delta state snapshot of the one or more delta state snapshots to the additional compute resource, the second delta state snapshot indicating changes to the compute resource that occurred during the second time period subsequent to the first time period.

26. The method of any of the preceding statements, wherein the compute resource is paused during the third time period and the third time period is shorter than a time threshold configured to ensure the avoiding of the detectable disruption to the compute resource.

27. The method of any of the preceding statements, wherein: the data platform operates at a first site associated with a platform side of a network communicatively coupling the data platform and the compute environment; the compute environment operates at a second site associated with an environment side of the network, the second site physically remote from the first site; the additional compute resource hosting the virtualized mirror instance is included, along with the compute resource, within the compute environment operating on the environment side of the network at the second site; and the analyzing of the virtualized mirror instance is performed by one or more of: the sub-kernel component of the data collection system operating on the environment side of the network in a sub-kernel space below an operating system of the compute resource, a kernel component of the data collection system operating on the environment side of the network in a kernel space of the operating system of the compute resource, or an application component of the data collection system operating on the environment side of the network in a user space of the operating system of the compute resource.

28. The method of any of the preceding statements, wherein: the data platform operates at a first site associated with a platform side of a network communicatively coupling the data platform and the compute environment; the compute environment operates at a second site associated with an environment side of the network, the second site physically remote from the first site; the additional compute resource hosting the virtualized mirror instance operates on the platform side of the network at the first site; and the analyzing of the virtualized mirror instance is performed by a backend component of the data collection system, the backend component operating on the platform side of the network.

29. The method of any of the preceding statements, wherein the analyzing of the virtualized mirror instance of the compute resource includes: operating the virtualized mirror instance based on substantially identical input data as is received by the compute resource; and deploying, to a user space of an operating system of the additional compute resource, an agent configured to determine the event data by monitoring the additional compute resource.

30. The method of any of the preceding statements, wherein the analyzing of the virtualized mirror instance of the compute resource further includes: comparing a behavior of the compute resource and a behavior of the virtualized mirror instance as the compute resource and the virtualized mirror instance each operate in accordance with the substantially identical input data; and determining, based on the comparing of the behaviors, a likelihood that an agent-sensitive security threat is operating in the compute environment.

31. The method of any of the preceding statements, wherein: the compute resource is associated with a virtual machine executing on a processor that includes a plurality of processor cores; and the method further comprises: gaining control, by the sub-kernel component, of one or more processor cores of the plurality of processor cores; and dedicating, by the sub-kernel component, the one or more processor cores to be used exclusively for operation of the sub-kernel component by assigning non-operational busywork to fill any extra bandwidth that the one or more processor cores have beyond the operation of the sub-kernel component.

32. The method of any of the preceding statements, wherein the event data is provided to the data platform for use by the data platform in performing the security monitoring by: constructing a graph based on the event data, the graph comprising a plurality of nodes connected by a plurality of edges, wherein each node of the plurality of nodes represents a logical entity and each edge of the plurality of edges represents a behavioral relationship between nodes connected by the edge; and identifying, based on the graph, a security threat associated with the compute resource within the compute environment.

33. A computer program product embodied in a non-transitory computer-readable storage medium and comprising computer instructions configured to direct a data collection system to perform a process comprising: live capturing, by a sub-kernel component of the data collection system, a state snapshot of a compute resource within a compute environment, wherein the compute resource is communicatively coupled to a data platform configured to perform security monitoring of the compute environment, and wherein the live capturing is performed by updating a master state snapshot with one or more delta state snapshots so as to avoid detectable disruption to the compute resource during the live capturing; determining, based on the state snapshot, event data that represents one or more events occurring with respect to the compute resource; and providing the event data to the data platform for use by the data platform in performing the security monitoring of the compute environment.

34. The computer program product of any of the preceding statements, wherein the process further comprises: constructing, based on the state snapshot, a virtualized mirror instance of the compute resource hosted on an additional compute resource; wherein the determining of the event data based on the state snapshot is performed by analyzing the virtualized mirror instance of the compute resource.

35. The computer program product of any of the preceding statements, wherein the constructing of the virtualized mirror instance of the compute resource includes: transmitting, during a first time period subsequent to a master capture time represented by the master state snapshot, the master state snapshot to the additional compute resource; transmitting, during a second time period subsequent to the first time period, a first delta state snapshot of the one or more delta state snapshots to the additional compute resource, the first delta state snapshot indicating changes to the compute resource that occurred during the first time period subsequent to the master capture time; and transmitting, during a third time period subsequent to the second time period, a second delta state snapshot of the one or more delta state snapshots to the additional compute resource, the second delta state snapshot indicating changes to the compute resource that occurred during the second time period subsequent to the first time period.

36. The computer program product of any of the preceding statements, wherein the compute resource is paused during the third time period and the third time period is shorter than a time threshold configured to ensure the avoiding of the detectable disruption to the compute resource.

37. The computer program product of any of the preceding statements, wherein the analyzing of the virtualized mirror instance of the compute resource includes: operating the virtualized mirror instance based on substantially identical input data as is received by the compute resource; and deploying, to a user space of an operating system of the additional compute resource, an agent configured to determine the event data by monitoring the additional compute resource.

38. The computer program product of any of the preceding statements, wherein the analyzing of the virtualized mirror instance of the compute resource further includes: comparing a behavior of the compute resource and a behavior of the virtualized mirror instance as the compute resource and the virtualized mirror instance each operate in accordance with the substantially identical input data; and determining, based on the comparing of the behaviors, a likelihood that an agent-sensitive security threat is operating in the compute environment.

39. The computer program product of any of the preceding statements, wherein: the compute resource is associated with a virtual machine executing on a processor that includes a plurality of processor cores; and the process further comprises: gaining control, by the sub-kernel component, of one or more processor cores of the plurality of processor cores; and dedicating, by the sub-kernel component, the one or more processor cores to be used exclusively for operation of the sub-kernel component by assigning non-operational busywork to fill any extra bandwidth that the one or more processor cores have beyond the operation of the sub-kernel component.

40. A method comprising: receiving, by a data platform configured to perform security monitoring of a compute environment, a live state snapshot of a compute resource within the compute environment, wherein the live state snapshot is live captured by a sub-kernel component of a data collection system communicatively coupled to the data platform, and wherein the live capture of the live state snapshot is performed by updating a master state snapshot with one or more delta state snapshots so as to avoid detectable disruption to the compute resource during the live capture; determining, by the data platform and based on the live state snapshot, event data that represents one or more events occurring with respect to the compute resource; and using, by the data platform, the event data to perform the security monitoring of the compute environment.

41. The method of any of the preceding statements, further comprising: constructing, by the data platform and based on the live state snapshot, a virtualized mirror instance of the compute resource hosted on an additional compute resource associated with the data platform; wherein the determining of the event data based on the live state snapshot is performed by analyzing the virtualized mirror instance of the compute resource.

42. The method of any of the preceding statements, wherein the using of the event data to perform the security monitoring includes: constructing a graph based on the event data, the graph comprising a plurality of nodes connected by a plurality of edges, wherein each node of the plurality of nodes represents a logical entity and each edge of the plurality of edges represents a behavioral relationship between nodes connected by the edge; and identifying, based on the graph, a security threat associated with the compute resource within the compute environment.

As has been described, security monitoring of compute environments (e.g., cloud compute environments such as cloud environment 14 of FIG. 1A, on-premise compute environments, etc.) that include a variety of different compute resources (e.g., compute assets 16 of FIG. 1A) may be performed by data platforms in a variety of ways. For instance, data platforms may be configured to perform functions such as graphing functions, analysis functions, policy making and implementation, and so forth, to facilitate identification of security anomalies, vulnerabilities, compliance issues, and other security threats that may be found within compute environments that the data platforms are monitoring. Referring back to the example of FIG. 1A, for example, data collected from compute assets 16 of cloud environment 14 (e.g., various assets or resources included within a cloud-based or other suitable compute environment) may be provided to data platform 12, and, once ingested by data ingestion resources 18 and stored in data store 30, this data may be analyzed and processed by data processing resources 20 to provide valuable insights to a user of computing device 24 (e.g., by way of user interface resources 22). Such data ingestion and processing may be performed using data collected from the compute environment or data that otherwise is indicative of events as they are occurring and/or of conditions as they exist within the compute environment.

One way such data has been obtained by certain data platforms is by way of "agentless" data collection techniques that do not rely on agent software associated with (e.g., deployed by, created to operate in connection with, etc.) the data platform receiving the data. In agentless configurations, the data obtained for use in assessing conditions and events in a compute environment is data that may be logged within the compute environment automatically rather than being explicitly monitored and provided by an agent. As one example, log data may be obtained that has been automatically logged in response to API calls or other events within certain cloud environments (e.g., CloudTrail data within AWS-based environments, Cloud Audit Logging data within GCP-based environments, etc.). As another example, log data may be obtained that has been generated by containerization technologies (e.g., Docker, Kubernetes, etc.) being used within the compute environment.

Another way that data platforms have obtained data for use in security monitoring of a compute environment has been by procuring event data from software agents (e.g., agents 38 in FIG. 1B) associated with the data platforms and functioning within the workloads hosted by the compute environment. For example, an agent operating in user space of a compute resource (e.g., one of compute assets 16) may be configured to monitor various operating system events, data being communicated to and from the compute resource by way of network interfaces, events and behavior of other user-space processes and applications, and so forth. The event data that an agent may provide may be highly beneficial for a data platform performing security monitoring of a compute environment. For example, the types of events and behaviors represented in agent-provided event data may help reveal or make clear various security threats and anomalies that may be difficult to detect and/or positively register when using agentless data alone.

In spite of these advantages, however, the use of software agents may be associated with certain disadvantages and/or drawbacks for certain types of workloads, within certain compute environments, and/or in light of customer preferences of client entities responsible for securing the computing environments. As one example, certain threat actors (i.e., entities seeking to coordinate an attack or otherwise compromise security of the compute environment in various ways) may adapt or adjust their actions when they determine that security monitoring of a compute environment is underway (e.g., by identifying that an agent is present within a compute resource and is collecting and reporting event data from the compute resource). For instance, they may adjust their attack methodology in an attempt to exploit blind spots of the agent to evade being monitored (thereby possibly leaving a client entity with a false sense of security to the extent the agent can be evaded successfully) or they may attack and/or otherwise attempt to neutralize the agent itself (thereby leaving the environment vulnerable to various types of security threats to the extent the agent is compromised successfully). In other examples, certain drawbacks may apply even when no threat actor actively seeks to compromise the security of the compute environment. For instance, by operating additional agent software in the compute environment alongside the desired workload of the client entity, there may be a risk that unexpected interactions between the workload software and the agent could occur or that the workload could otherwise be affected in undesirable ways (e.g., affecting reliability, etc.). Moreover, there may be resistance by some client entities to installing and/or granting various permissions to conventional agents within their workloads.

For all of these reasons and others, it would be desirable for a data platform to be able to obtain event data that a user-space agent would typically collect but without these potential complications or disadvantages. To this end, compute environment security monitoring will now be described that uses data collected from a sub-kernel space and/or that uses a live state snapshot of a compute resource that is captured from the sub-kernel space. In some embodiments, use of data collected from a sub-kernel space and/or use of a live state snapshot captured from the sub-kernel space may be implemented in a manner that is difficult or impossible to detect by threat actors and malicious software that such threat actors may attempt to deploy.

As will be described, certain embodiments may covertly monitor a compute resource within a compute environment by monitoring it from below the operating system of the compute resource. For example, if the applications executing on top of the operating system are operating in "user space" and various utilities of the operating system itself are operating in "kernel space," at least one component (referred to herein as a "sub-kernel component") of a data collection system providing data to a data platform may be configured to operate below the operating system in "sub-kernel space." Sub-kernel space may refer to a space (e.g., a memory space, a processing space, a networking or other communication space) even closer to the hardware than either the user space or the kernel space. For instance, if the compute resource is a virtual machine running on the hardware of a physical compute node (e.g., a server, etc.), the kernel space of the compute resource may be associated with the kernel (i.e., the operating system) of the virtual machine while the sub-kernel space of the compute resource may be associated with a hypervisor managing the hardware of the physical compute node and hosting at least that virtual machine and possibly hosting other virtual machines.

Various benefits of collecting data from the sub-kernel space may be apparent, including that the sub-kernel component of the data collection system may be undetectable to any software (including malicious software deployed by a threat actor) that may be running in the user space. As such, a sub-kernel component of a data collection system would not be susceptible to tipping off a threat actor to change its behavior or to invite an attack on the data collection system itself. However, as will be described in more detail below, certain challenges also may need to be addressed to realize these benefits. Notable among these challenges, for example, is that the low-level sub-kernel data accessible from the sub-kernel space below the operating system may need to be analyzed, scrutinized, reconstructed, and/or otherwise processed to derive useful event data that a user-space agent might normally provide. Various techniques for manipulating this low-level sub-kernel data (including to convert it to something more readily useful by the data platform, such as event data similar to what a user-space agent would provide) will be described and illustrated below. In some implementations, for instance, the sub-kernel component of the data collection system may be configured to interoperate with other components of the data collection system (e.g., a user-space component serving as a lightweight agent, a kernel component such as a driver, a privileged component such as may be implemented using eBPF technology, etc.) to gain insight to collected sub-kernel data in a way that allows for one or more of the benefits described herein to be realized.

As will further be described, certain embodiments may covertly monitor a compute resource within a compute environment by capturing what is referred to herein as a live state snapshot of the compute resource and by performing monitoring using the snapshot in various ways that will be described. A live state snapshot of a compute resource may include a functionally or behaviorally indistinguishable copy of the memory and storage of a compute resource. As such, the live state snapshot may be used to construct a functional clone of the compute resource (referred to herein as a "virtualized mirror instance" of the compute resource) that may be analyzed in various ways. For instance, the virtualized mirror instance may be supplied with the same input as received by the actual compute resource and then analyzed independently without risk of revealing, to any malicious software that may be operating or "lying in wait"

on the compute resource, that security monitoring of the compute resource is underway. As will be described and illustrated in detail below, a live state snapshot may be captured from the sub-kernel space without detectably disrupting the compute resource in a way that would allow malicious user-space software to determine that the state snapshot is being captured. While such a snapshot may be captured across a finite amount of time as the state of the compute resource continues to change, the snapshotting techniques described herein are said to capture "live" state snapshots since the snapshot is captured in near real time and the compute resource is not paused or suspended for any detectable amount of time (i.e., the compute resource remains operational and live).

A variety of benefits and advantages may be provided by various embodiments described herein (e.g., including compute environment security monitoring embodiments that use data collected from the sub-kernel space and/or that use live state snapshots of the compute resource). First, as mentioned above, one advantage of implementing principles described herein involves capturing timely and useful data for the security monitoring in a covert way that does not tip off potential threat actors and/or malicious software in ways that could trigger them to try to evade or otherwise compromise optimal security monitoring. Moreover, by not requiring a full-fledged agent to operate in the user space (as mentioned, a lightweight user-space component of the data collection system may be used in certain examples), complications arising from interference with a workload in the compute environment may be reduced or eliminated (e.g., since there are no extra processes to deploy, the user-space component is more lightweight if it is employed at all).

Further advantages of collecting data in the ways described herein involve the permissions and privileges that may be required to implement desired security monitoring. Even if a data monitoring system could avoid some of the issues described above for user-space agents by running in the kernel space (e.g., as a driver), permissions issues may complicate the deployment of such a system by certain client entities. For example, certain client entities may not have privileges to install a data collection driver into the kernel or may be inconvenienced by needing to do so. Moreover, any privileged software that can be determined by a threat actor to be executing on the compute resource may pose a certain amount of risk, since one technique that threat actors may employ to try to compromise the compute resource is to "trick" or "confuse" privileged software into performing tasks (using its legitimately-granted privileges) that the malicious software is not privileged to be able to perform on its own. Accordingly, by performing the data collection and/or snapshotting operations from the sub-kernel space (e.g., rather than by relying on overtly-granted privilege within the kernel space), data collection systems described herein may avoid these risks and eliminate or minimize any risk that privileges granted to the data collection system could be a target of exploitation or hijacking for malicious purposes.

Figure 5A:
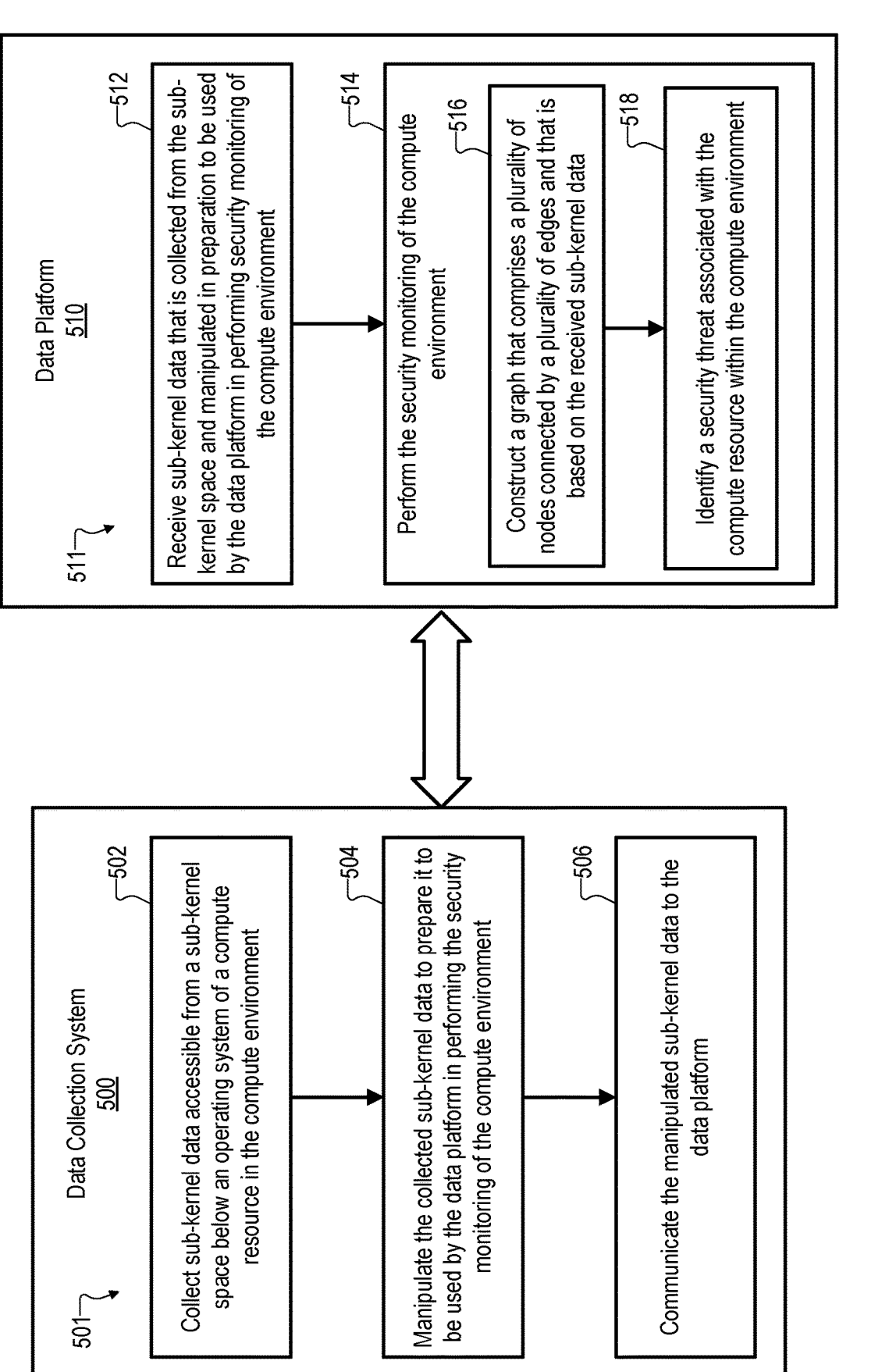
FIG. 5A illustrates an example data collection system communicatively coupled to an example data platform to perform illustrative methods for compute environment security monitoring using data collected from a sub-kernel space.

FIG. 5A illustrates an example data collection system 500 and an example data platform 510 communicatively coupled to one another to perform illustrative methods for compute environment security monitoring using data collected from a sub-kernel space. Specifically, as shown, data collection system 500 may be configured to perform a method 501 that includes a plurality of operations 502, 504, and 506. In connection with method 501, data platform 510 may be configured to perform a method 511, which includes operations 512 and 514. As shown, operation 514 itself may be implemented by certain sub-operations such as an operation 516 and an operation 518.

Method 501 may be performed, in full or in part, by data collection system 500 (e.g., under direction from data platform 510, in certain examples, as described in more detail below), while method 511 may be performed, in full or in part, by data platform 510. As will be described in more detail below, data collection system 500 may include at least a sub-kernel component for performing certain of the operations of method 501. In certain implementations, data collection system 500 may further include one or more other components for assisting with these operations and/or for performing other operations of method 501. Similarly, data platform 510 may include various components described herein and configured to perform the operations of method 511 in any of the ways described herein.

While methods 501 and 511 show illustrative operations according to one implementation, other implementations may omit, add to, reorder, and/or modify any of the operations shown in these methods. In some examples, multiple operations shown in methods 501 and/or 511 may be performed concurrently (e.g., in parallel) with one another, rather than being performed sequentially as illustrated and/or described. One or more of the operations shown in FIG. 5A may be performed by computing resources of compute assets within a compute environment in which data collection system 500 operates (e.g., compute assets 16 of cloud environment 14, etc.) or by other suitable computing resources (e.g., by or under direction from computing resources of a data platform such as data platform 510). Various ways that data collection system 500 and data platform 510 may be implemented have been mentioned and will be described in more detail below.

The operations of method 501 may be performed prior to, in parallel with, or subsequent to operations of method 511 and/or other operations described herein to be performed by data collection systems, agents, data platforms, or the like. Each of operations 502-506 of method 501 will now be described in more detail as the operations may be performed by computing resources associated with data collection system 500 as data collection system 500 facilitates data platform 510 in performing the security monitoring of the compute environment. It will be understood that at least part of data collection system 500 (e.g., a sub-kernel component and possibly other components) may be deployed to a compute environment such as to execute on a particular node or other compute resource within the compute environment. As shown, data collection system 500 may be communicatively coupled to the data platform 510 that is configured to perform the security monitoring of the compute environment.

At operation 502, a sub-kernel component of data collection system 500 (e.g., a component of data collection system 500 that is configured to execute in a sub-kernel space below an operating system of a compute resource in the compute environment) may collect sub-kernel data that is accessible from the sub-kernel space in which the sub-kernel component executes. As has been mentioned, this sub-kernel space may be below the operating system of the compute resource. For example, if the compute resource is implemented as a virtual machine on a particular compute node (e.g., a compute server in a cloud or on-prem compute environment), the sub-kernel component may operate closer to the hardware than the operating system of the virtual machine, such as in a memory space associated with a hypervisor managing how the hardware is used to implement the virtual machine (and, in some examples, additional virtual machines hosted on the same node). From this vantage point, the sub-kernel component may have good visibility into various behaviors and events occurring with respect to the compute resource, even without necessarily having explicit privileges managed by the operating system kernel. However, this vantage point below the operating system and nearer the physical hardware also means that the data visible to the sub-kernel component may be at a low level of abstraction. For example, rather than seeing structured data such as operating system utilities, application processes, system variables, and/or other such structured data that is relatively easy to parse and make sense of, the sub-kernel data collected by the sub-kernel component at operation 502 may be considerably less structured (e.g., reading and writing from memory locations or hardware registers for unspecified reasons, etc.) such that it is more difficult to parse and make sense of.

Accordingly, at operation 504, data collection system 500 (e.g., the sub-kernel component or another suitable component described herein) may be configured to manipulate the collected sub-kernel data (i.e., the sub-kernel data collected at operation 502) to prepare this sub-kernel data to be used by data platform 510 in performing the security monitoring of the compute environment. This manipulation may take any of a variety of forms, as will be described and illustrated in more detail below. As one example, the data manipulation at operation 504 may include preparing the sub-kernel data to be efficiently communicated and further processed by deduplicating and/or filtering the data, stripping out and/or adding metadata to the sub-kernel data, or the like. As another example, the data manipulation at operation 504 may include converting the data from the level of abstraction described above to a higher level of abstraction that will make it easier for follow-on processes (e.g., including processing by data platform 510) to work with and use. For instance, as will be described in more detail below, the data manipulation could include converting the low-level sub-kernel data to higher-level event data similar or identical to what an agent would provide if an agent were to be operating within the compute environment (e.g., within the user space of the compute resource).

At operation 506, data collection system 500 (e.g., the sub-kernel component or another suitable component described herein) may communicate the manipulated sub-kernel data to data platform 510. By providing the manipulated sub-kernel data to data platform 510, data platform 510 may be enabled and/or facilitated in its performing of the security monitoring described herein. For instance, as will be described in more detail below, data platform 510 may be configured to use this manipulated sub-kernel data (e.g., higher-level event data if that is what it has been converted to) in generating representations (e.g., polygraphs, etc.) of the compute environment for use in identifying anomalies, security threats, compliance issues, and so forth as has been described.

Now turning to the method 511 being performed by data platform 510 in connection with the performance of method 501 by data collection system 500, operations 512-518 may be performed concurrently with and/or in response to operations 502-506 of method 501. For instance, in certain implementations, data platform 510 may direct data collection system 500 in its performance of method 501 and may currently perform method 511 as additional sub-kernel data is collected (operation 502), manipulated into something more useful (operation 504), and communicated by data collection system 500 (operation 506).

At operation 512, data platform 510 may receive sub-kernel data from data collection system 500 (with which data platform 510 is communicatively coupled). Specifically, as described above, the sub-kernel data communicated by data collection system 500 at operation 506 and received by data platform 510 at operation 512 may have been collected by the sub-kernel component of data collection system 500 from the sub-kernel space below the operating system of the compute resource in the compute environment (operation 502) and may have then been manipulated by data collection system 500 to prepare the sub-kernel data to be used by data platform 510 in performing the security monitoring of the compute environment (operation 504).

At operation 514, data platform 510 may use the received sub-kernel data to perform the security monitoring of the compute environment. For example, as shown, operation 514 may be carried out by performing sub-operations including operations 516 and 518.

At operation 516, data platform 510 may construct a graph (e.g., a polygraph or other similar data representation described herein) based on the sub-kernel data received at operation 512 as described above. As has been described, this sub-kernel data may have been manipulated by this point (e.g., by data collection system 500 at operation 504 or by data platform 510 itself in certain examples) such that the original low-level sub-kernel data is converted to a higher level of abstraction (e.g., event data, etc.) that can be used in constructing any of the graphs that have been described. For instance, as described in various examples above, the graph constructed at operation 516 may comprise a plurality of nodes connected by a plurality of edges, each node of the plurality of nodes representing a logical entity and each edge of the plurality of edges representing a behavioral relationship between nodes connected by the edge.

At operation 518, data platform 510 may identify, based on the graph constructed at operation 516, a security threat associated with the compute resource within the compute environment. For example, as described above, various types of potential security threats associated with actual attacks, unrecognized anomalies, recognized compliance deficiencies, and so forth, may be identified at operation 518 so that they can be brought to the attention of the appropriate people and/or processes responsible for overseeing security for the compute environment.

Figure 5B:
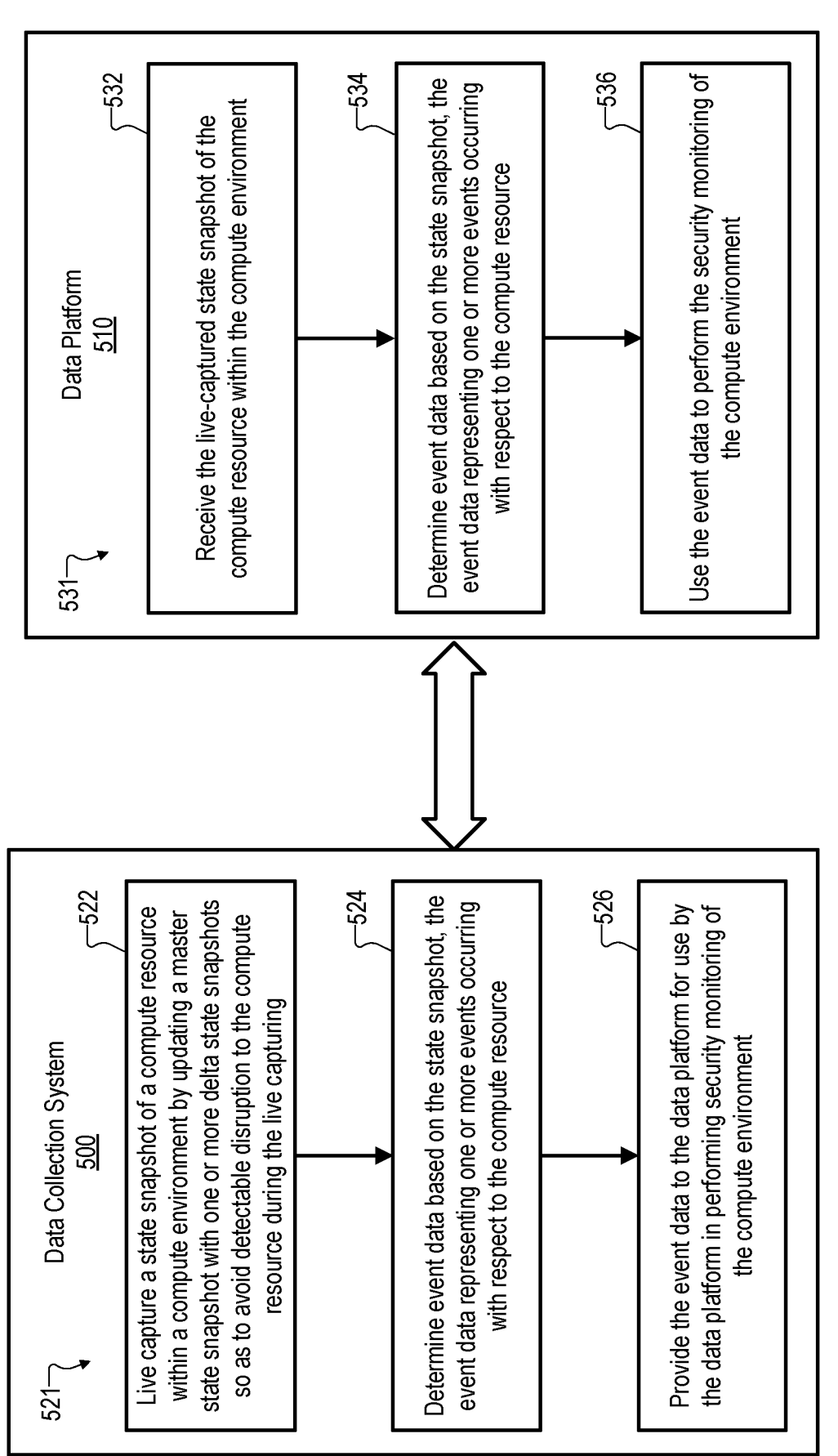
FIG. 5B illustrates an example data collection system communicatively coupled to an example data platform to perform illustrative methods for compute environment security monitoring using a live state snapshot of a compute resource.

FIG. 5B illustrates data collection system 500 communicatively coupled to data platform 510 to perform additional illustrative methods for compute environment security monitoring, in this case using live state snapshots of a compute resource. As shown, data collection system 500 may be configured to perform a method 521 that includes a plurality of operations 522, 524, and 526. In connection with method 521, data platform 510 may be configured to perform method 531, which is shown to include operations 532, 534, and 536.

Similar to method 501, method 521 may be performed, in full or in part, by data collection system 500 (e.g., under direction from data platform 510, in certain examples, as described in more detail below). Similar to method 511, method 531 may be performed, in full or in part, by data platform 510. As mentioned in relation to method 501, a sub-kernel component of data collection system 500 may be used for performing certain of the operations of method 521, while other operations of method 521 may be performed or facilitated by components other than the sub-kernel component in certain implementations. Similarly, as mentioned in relation to method 511, data platform 510 may include various components described herein and configured to perform the operations of method 531 in any of the ways described herein.

While methods 521 and 531 show illustrative operations according to one implementation, other implementations may omit, add to, reorder, and/or modify any of the operations shown in these methods. In some examples, multiple operations shown in methods 521 and/or 531 may be performed concurrently (e.g., in parallel) with one another, rather than being performed sequentially as illustrated and/or described. One or more of the operations shown in FIG. 5A may be performed by computing resources of compute assets within a compute environment in which data collection system 500 operates (e.g., compute assets 16 of cloud environment 14, etc.) or by other suitable computing resources (e.g., by or under direction from computing resources of a data platform such as data platform 510). Various ways that data collection system 500 and data platform 510 may be implemented have been mentioned and will be described in more detail below.

The operations of method 521 may be performed prior to, in parallel with, or subsequent to operations of method 531 and/or other operations described herein to be performed by data collection systems, agents, data platforms, or the like. Each of operations 522-526 of method 521 will now be described in more detail as the operations may be performed by computing resources associated with data collection system 500 as data collection system 500 facilitates data platform 510 in performing the security monitoring of the compute environment. It will be understood that at least part of data collection system 500 (e.g., a sub-kernel component and possibly other components) may be deployed to a compute environment such as to execute on a particular node or other compute resource within the compute environment. As shown, data collection system 500 may be communicatively coupled to the data platform 510 that is configured to perform the security monitoring of the compute environment.

At operation 522, a sub-kernel component of data collection system 500 (e.g., a component of data collection system 500 that is configured to execute in a sub-kernel space below an operating system of a compute resource in the compute environment, as described above) may live capture a state snapshot of a compute resource within the compute environment. As used herein, a "state snapshot" may refer to a representation of memory and storage resources of a compute resource (e.g., a compute node, a virtual machine, a container or cluster, etc.) that is full or complete enough that the state of the compute resource is represented in a way that can be functionally or behaviorally mirrored (e.g., replicated, cloned, etc.). For example, if a snapshot of the memory of a first compute resource is copied into the memory of a second compute resource, a snapshot of the storage of the first compute resource is copied into the storage of the second compute resource, and both compute resources are presented with the same input data, it would be expected that the behaviors and outputs of both compute resources would be functionally identical (i.e., identical in substantively functional ways even if not identical in terms of, for example, identifiers and/or addresses used by the compute resources to allow the compute resources to be differentiated from one another).

A conventional way to capture a state snapshot such as described above would be to temporarily pause (i.e., suspend execution) of the compute resource for long enough that the entire memory and storage contents could be read, copied, and transmitted to another compute resource that holds the state snapshot and/or mirrors the first compute resource, then to unpause (i.e., restart execution of) both machines at once. Unfortunately, it may be undesirable to pause execution of a compute resource for this purpose for a variety of reasons. For one thing, it may be highly disruptive to the computing tasks that the compute resource may be engaged in for the compute resource to be paused for a significant amount of time. Timeouts associated with some of these tasks may trigger after a certain period and various other complications may similarly arise that may be similarly detrimental to the tasks being performed. Moreover, even if execution of the tasks could be temporarily suspended without significant consequence or delay to the tasks themselves, the execution suspension may indicate to malicious software operating in the compute environment that some type of security monitoring (e.g., security monitoring that involves capturing state snapshots) is ongoing within the compute resource. As described above, alerting threat actors and such software to the security monitoring may be undesirable for various reasons, including that the malicious software may be able to adjust its attack strategy to be more effective based on what can be surmised about the security monitoring that is present.

For all of these reasons, it may be complicated and non-ideal at best for state snapshots to be captured using conventional, disruptive techniques. The "live" capture of a state snapshot performed at operation 522, however, may be configured to produce the same type of state snapshot in a manner that avoids the undesirable disruption to the compute resource execution and the undesirable detection of the snapshot capture. As used herein, a "live" state snapshot (or a state snapshot that is said to be "live captured") may refer to a state snapshot that is captured by way of a technique configured to avoid the complications and drawbacks described above. Specifically, the live capturing of the state snapshot at operation 522 may be performed by updating a master state snapshot with one or more delta state snapshots so as to avoid detectable disruption to the compute resource during the live capturing. Master state snapshots and delta state snapshots used to perform this type of live capture of a live state snapshot will be described and illustrated in more detail below.

At operation 524, data collection system 500 (e.g., the sub-kernel component or another suitable component described herein) may be configured to determine event data based on the state snapshot live captured at operation 522. For example, as mentioned above, event data may refer to relatively high-level data (e.g., similar to data that a user-space agent may report if it were operating within the compute environment) that represents of one or more events occurring with respect to the compute resource. The event data may be determined based on the live state snapshot in any suitable way. For example, as will be described and illustrated in more detail below, the live state snapshot may be independently analyzed without interfering with the actual compute resource (which continues running uninterrupted as method 521 is performed), a virtualized mirror instance of the compute resource may be constructed and monitored to determine the event data in various ways described herein, or the like.

At operation 526, data collection system 500 (e.g., the sub-kernel component or another suitable component described herein) may provide the event data determined at operation 524 to data platform 510 for use by data platform 510 in performing the security monitoring of the compute environment. For instance, as mentioned above and as will be described in more detail below, data platform 510 may be configured to use event data to generate representations (e.g., polygraphs, etc.) of the compute environment for use in identifying anomalies, security threats, compliance issues, and so forth.

Now turning to the method 531 being performed by data platform 510 in connection with the performance of method 521 by data collection system 500, operations 532-536 may be performed concurrently with and/or in response to operations 522-526 of method 521. For instance, in certain implementations, data platform 510 may direct data collection system 500 in its performance of method 521 and may currently perform method 531 as live state snapshots are captured (operation 522), as event data is determined (operation 524), and as event data is provided by the data collection system 500 (operation 526).

At operation 532, data platform 510 may receive a live state snapshot from the data collection system 500 with which data platform 510 is communicatively coupled. Specifically, as described above, the live state snapshot may be live captured by a sub-kernel component of the data collection system 500 communicatively coupled to data platform 510 in the ways described herein. For instance, the live capture of the live state snapshot may be performed by updating a master state snapshot with one or more delta state snapshots so as to avoid detectable disruption to the compute resource during the live capture.

At operation 534, data platform 510 may determine, based on the live state snapshot received at operation 532, event data that represents one or more events occurring with respect to the compute resource. For example, data platform 510 may determine the event data based on the live snapshot in a similar way as data collection system 500 was described to determine this event data at operation 524 above. Additionally or alternatively, data platform 510 may receive (along with or instead of receiving the live state snapshot itself) the event data as it has been determined (at operation 524) and provided (at operation 526) by data collection system 500.

In either case (i.e., whether determining the event data based on a received live state snapshot or receiving the event data directly from data collection system 500), data platform 510 may be configured to use the event data, at operation 536, to perform the security monitoring of the compute environment. For example, data platform 510 may perform the security monitoring in any of the ways described herein, such as by performing sub-operations 516 and 518 of operation 514 (described above in relation to FIG. 5A) or in other suitable ways. That is, data platform 510 may construct a graph (e.g., a polygraph or other similar data representation described herein) based on the event data. This graph may comprise a plurality of nodes connected by a plurality of edges, each node of the plurality of nodes representing a logical entity and each edge of the plurality of edges representing a behavioral relationship between nodes connected by the edge. Data platform 510 may then identify, based on the constructed graph, a security threat associated with the compute resource within the compute environment. For example, as has been described, various types of potential security threats associated with actual attacks, unrecognized anomalies, recognized compliance deficiencies, and so forth, may be identified and brought to the attention of the appropriate people and/or processes responsible for overseeing security for the compute environment.

Figure 6:
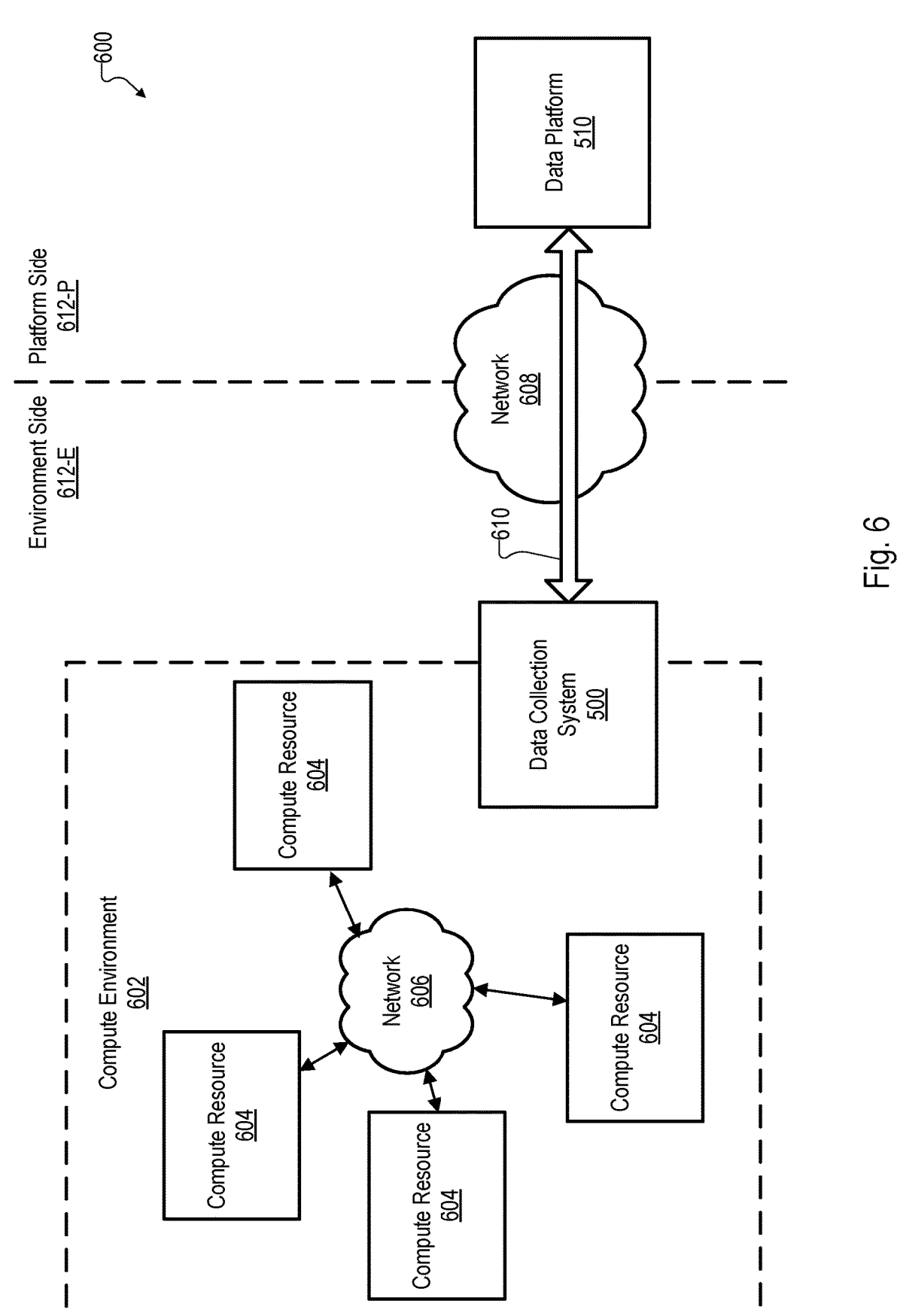
FIG. 6 illustrates an example configuration within which methods described herein for compute environment security monitoring using data collected from a sub-kernel space and/or live state snapshots of a compute resource may be performed by a data collection system and/or by a data platform in communication with the data collection system.

FIG. 6 illustrates an example configuration 600 within which methods described herein for compute environment security monitoring using data collected from a sub-kernel space (e.g., methods 501 and 511) and/or live state snapshots of a compute resource (e.g., methods 521 and 531) may be performed. For example, these methods may be performed, in accordance with principles described herein, by a data collection system (e.g., an implementation of data collection system 500) and/or a data platform (e.g., an implementation of data platform 510) configured to perform security monitoring for a compute environment 602 that includes a variety of compute resources 604 communicatively coupled to one another by way of a network 606.

As shown, configuration 600 includes an implementation of data platform 510 that communicates with a data collection system 500 that is depicted as being at least partially implemented within (and possibly entirely implemented within) compute environment 602. Specifically, data platform 510 may be communicatively coupled to data collection system 500 by way of a network 608 over which various communications 610 may be exchanged in furtherance of the various types of security monitoring described herein. As further illustrated in FIG. 6, and as will be described in more detail below, data platform 510 may operate on a platform side 612-P of network 608, while data collection system 500 partially or fully operates on an environment side 612-E of network 608. In some examples, the difference between platform side 612-P and environment side 612-E may be associated with a geographical separation. For instance, data platform 510 and other components operating on platform side 612-P may be located at a first site while data collection system 500 and the compute resources 604 of the compute environment 602 may be located remotely from the first site at one or more other sites. In other examples, each of the elements shown in FIG. 6 (including both platform side 612-P and environment side 612-E of network 608) may be located near one another, such as in a same data center and/or using the same physical hardware.

Compute environment 602 may be implemented as a cloud environment (e.g., an implementation of cloud environment 14 of FIGS. 1A-1B, provided by a cloud service provider such as AWS, GCP, Azure, etc.), an on-premise compute environment, or another suitable compute environment. The compute resources 604 of compute environment 602 may include resources configured to provide services (e.g., platform as a service, infrastructure as a service, etc.) to users of the compute environment. Examples of such resources include, without limitation, physical computing machines, virtual computing machines, memory, processors, data storage devices, storage management systems, communication networks, network interfaces, operating systems (e.g., Linux, Windows, etc.), hypervisors, virtual machines, container runtime engines, container orchestration systems (e.g., Kubernetes), nodes, clusters of nodes, and so forth. The compute environment may expose endpoints such as APIs for use by applications (e.g., user applications such as containerized applications) to deploy and run in the compute environment.

Certain compute resources 604 may be configured to host an implementation of data collection system 500 that may be used to provide, to data platform 510, data monitored in relation to the compute resource 604. For example, as has been described, implementations of data collection system 500 may provide manipulated sub-kernel data, event data, live state snapshots, and/or any other suitable data as may serve a particular implementation. While not explicitly shown, it will be understood that certain compute resources 604 may host, in addition or as an alternative to an implementation of data collection system 500, an agent operating in the user space of the compute resource 604. Additionally or alternatively, compute resources 604 may provide conventional agentless log data (such as has been described) to data platform 510 along with or instead of data provided by the data collection system and/or the agent. Though individual data collection system instances and communications from these are not explicitly shown for each compute resource 604, it will be understood that each of the illustrated compute resources 604 may implement any of the specific compute resource examples described herein.

Compute resources 604 of configuration 600 are shown to be in communication with other compute resources 604 in compute environment 602 by way of network 606. While network 606 is referred to as a network and may be implemented as such (e.g., similar or identical to network 608 that is used to transport communications 610 between data collection system 500 and data platform 510, as described below), it will be understood that different types of compute resources 604 may intercommunicate via a variety of different means and media, some of which may not typically be referred to or thought of as networks. In any case, network 606 will be understood to represent any hardware, software, interfacing, or other aspects of a communicative fabric by way of which various compute resources 604 within compute environment 602 communicate with one another.

Network 608 may provide a communicative medium by way of which data collection system 500 (as well as other software executing within compute environment 602) may exchange (e.g., provide to and/or receive from) various communications 610 with data platform 510. For example, network 608 may be implemented by any suitable private or public networks (e.g., the Internet, a wide area network (WAN), a local area network (LAN), a provider-specific communications network such as a cellular carrier network operated by a mobile carrier entity, etc.) and may use any communication technologies, devices, media, protocols, or the like, as may serve a particular implementation. Communications 610 exchanged between data platform 510 and data collection system 500 may represent event data, live state snapshots, raw sub-kernel data, and/or other suitable data that may be ingested by data platform 510, processed in accordance with principles described herein (e.g., aggregated, tagged, and/or otherwise processed to create and present graphs or other data representations described herein, etc.), and used to perform security monitoring of compute environment 602 in any of the ways described herein.

Implementations of data collection system 500 may be deployed to one or more of compute resources 604. In some examples, at least one component of a data collection system instance may run on top of an operating system of these resources (e.g., on top of a kernel of a Linux-based operating system, a Windows-based operating system, etc.), such as in a user space of the compute resource. Such a component will be referred to herein as an "application component" or "user component" of the data collection system. Additionally or alternatively, the data collection system instance may include a component that runs in a kernel space of the compute resource 604 and that will be referred to herein as a "kernel component" of the data collection system. In some embodiments, a component of a data collection system may be privileged (e.g., assigned special privileges compared to applications running in the user space) with permission to access certain data regarding the compute resource, such as kernel, process, user, role, and/or network information. Such a component may be referred to herein as a "privileged component" and may have, for example, root permissions in some implementations. In some examples, a privileged component may use eBPF technology to drill down deep and collect data about the compute resource.

As has been mentioned, each instance of data collection system 500 may also include (along with any of the components mentioned above as may be present within a particular implementation) a component configured to run below the operating system in the sub-kernel space. Such components are referred to herein as sub-kernel components of the data collection system and may be used to monitor the compute environment from below the operating system by collecting data from one or more layers underneath everything that is running on the operating system (i.e., below the user space and/or the kernel space of the machine). Sub-kernel components may use virtual machine introspection and/or other suitable techniques and technologies to collect and provide the sub-kernel data and/or to perform other operations described herein. As has been mentioned, monitoring a compute resource 604 from below may give rise to certain benefits such as, for example, reducing or eliminating disturbance to a customer's workload, not having to deploy extra processes, being lightweight, and collecting comprehensive data about compute environment 602.

Figure 7:
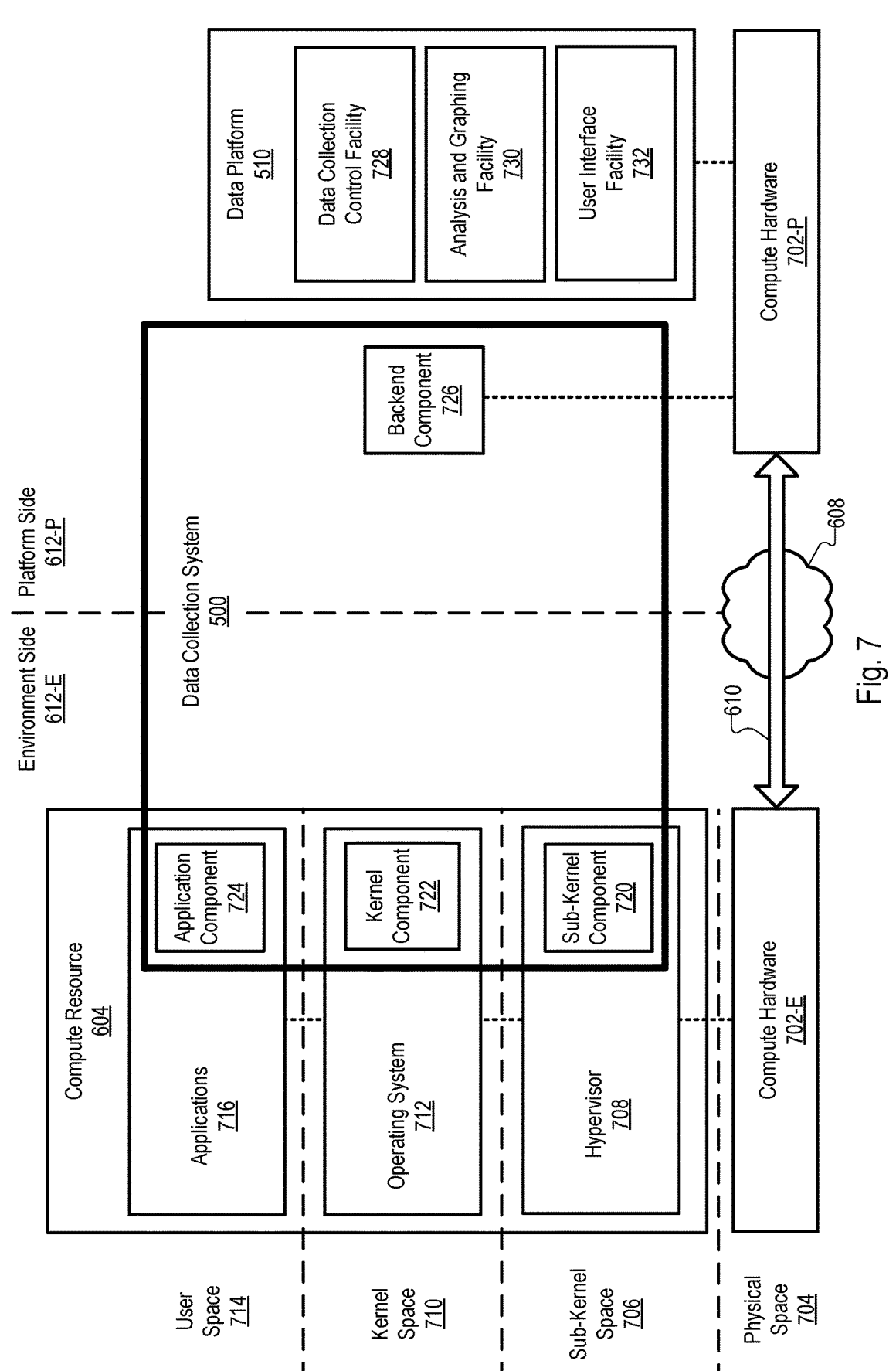
FIG. 7 illustrates example components of illustrative implementations of a data collection system and a data platform communicatively coupled together to perform compute environment security monitoring using data collected from a sub-kernel space and/or using a live state snapshot of a compute resource.

To illustrate some of these principles with more specificity, FIG. 7 shows example components of an illustrative implementation of data collection system 500, as well as certain components that may be included in an illustrative implementation of data platform 510. FIG. 7 further illustrates example aspects of how various components of data collection system 500 may be implemented across distributed compute hardware and/or across different memory spaces of a particular compute resource 604.

As shown in FIG. 7, certain compute hardware 702-E associated with an instance of compute resource 604 is shown on the environment side 612-E of network 608, while other compute hardware 702-P associated with data platform 510 is shown on the platform side 612-P of network 608. As described above, communications 610 between these two sides 612 of the network may be exchanged over network 608 to facilitate methods and operations described herein (e.g., to facilitate data platform 510 in performing security monitoring of the compute resource 604 and/or other compute resources 604 of compute environment 602).

On environment side 612-E, compute hardware 702-E is shown to be associated with a physical space 704 that includes the physical hardware on which various software layers at varying levels of abstraction may operate. At the lowest software layer, directly on top of physical space 704, FIG. 7 shows a sub-kernel space 706 in which a hypervisor 708 of the compute resource 604 runs. Above sub-kernel space 706 is a kernel space 710 in which an operating system 712 may run. Above kernel space 710 is a user space 714 in which various applications 716 may run.

Software running in each of these software layers may assert control over the access that software running in higher layers may have. For example, software running in sub-kernel space 706 (e.g., including hypervisor 708) may have relatively direct access to the hardware and may manage the access that software running in kernel space 710 (e.g., operating system 712) has to resources in physical space 704 (e.g., compute hardware 702-E). In this sense, hypervisor 708 may be said to manage one or more operating systems 712 associated with different virtual machines, compute nodes, or the like. As another example, software running in kernel space 710 (e.g., the kernel and various utilities associated with operating system 712) may manage the access that software running in user space 714 (e.g., applications 716) has to the hypervisor-controlled hardware resources. As such, operating system 712 may be said to manage one or more applications 716, which may be understood to be running on top of the operating system. Certain privileged applications may be endowed with special privileges that increase the freedom of the applications within the kernel space and limit the control that operating system 712 exerts on these processes. Technologies such as eBPF technology may be used to ensure that such privileged applications can exert their privileges safely to facilitate desirable outcomes and limit damage that could be done by a malicious or errant privileged application.

In the context of the different sides 612 of network 608 and the different memory spaces 704-714 in which different instances of software may be configured to operate, FIG. 7 illustrates various aspects of how data collection system 500 may be implemented and distributed across computing resources in certain examples. Specifically, as shown, data collection system 500 may include any or all of a plurality of components including a sub-kernel component 720 configured to operate in the sub-kernel space 706 (e.g., as part of or alongside hypervisor 708), a kernel component 722 configured to operate in the kernel space 710 (e.g., as part of or alongside operating system 712), and an application component 724 configured to operate in the user space 714 of compute resources 604 (e.g., alongside other applications 716). Along with components 720-724 operating in the different memory spaces of compute resources 604 on environment side 612-E of network 608, FIG. 7 also shows that a backend component 726 may be implemented on platform side 612-P of network 608, potentially running on the same compute hardware 702-P as data platform 510. Different memory spaces are not explicitly shown on platform side 612-P, but it will be understood that backend component 726 may be implemented to run in any memory space or combination of memory spaces as may serve a particular implementation.

While the example of data collection system 500 in FIG. 7 is shown to include four different components 720-726, it will be understood that a given implementation of data collection system 500 may include just one such component (e.g., a sub-kernel component 720) or any suitable combination of the components that are illustrated and/or other components as may serve a particular implementation (e.g., a sub-kernel component 720 and a backend component 726, an instance of each of the environment side 612-E components 720-724 but without any backend component 726, etc.). In certain examples, data captured or generated by data collection system 500 on environment side 612-E (e.g., sub-kernel data, event data, live state snapshots, etc.) may be described as being provided to data platform 510 for further processing there on platform side 612-P. While data platform 510 may perform such processing in certain embodiments, the bounds of data collection system 500 may also be defined such that any such processing performed by compute hardware 702-P on platform side 612-P may be considered, by definition, to be performed by backend component 726 of the data collection system 500, rather than being performed by data platform 510 per se. Each of the components of data collection system 500 will now be described in more detail.

As shown, sub-kernel component 720 may operate in sub-kernel space 706, which may be is associated with the hypervisor 708 that is configured to manage compute resource 604 in the compute environment 602. Sub-kernel component 720 may be implemented in the sub-kernel space 706 in any manner as may serve a particular implementation. As one example, sub-kernel component 720 may be secured within sub-kernel space 706 using WebAssembly (WASM) code and/or using a sandboxing technique configured to isolate sub-kernel component 720 from other software running in sub-kernel space 706.

Hypervisor 708 may operate in sub-kernel space 706 to allow one or multiple operating systems (e.g., including operating system 712) to run on the physical compute hardware 702-E. To this end, hypervisor 708 may abstract the hardware resources from operating system 712 to make it appear from the perspective of operating system 712 that it is the only operating system 712 running on the hardware (even if multiple virtual machines in fact share the same compute hardware 702-E). WASM may then be used as a binary instruction format for this stack-based virtual machine, due to its design as a portable, efficient, and secure way for executing code regardless of the underlying hardware. In some examples, WASM code may be smaller than native code and may thus improve the performance and efficiency of hypervisor 708. Additionally, WASM may serve as a sandboxed environment to help protect against security vulnerabilities. Because of the position of sub-kernel component 720 and hypervisor 708 in sub-kernel space 706 below kernel space 710 where operating system 712 runs, sub-kernel component 720 may be configured to make changes to operating system 712 and utilities running in or on top of operating system 712 without needing explicit permissions managed by operating system 712. Essentially, hypervisor 708 and sub-kernel component 720 may make system calls and/or memory changes that appear to the operating system to just occur in the hardware without warning and outside of the operating system's control. This may allow for powerful actions to be performed by sub-kernel component 720 without detection from operating system 712 and/or applications 716 running thereon (e.g., including any malicious applications that may be trying to detect if security monitoring software is present so as to try to evade the security measures).

In some examples, an owner or provider of a compute environment 602 may have control over a base level hypervisor running directly on the provider's hardware, such that security monitoring software (e.g., sub-kernel component 720) may not be able to be installed in connection with this base-level hypervisor. For example, in a cloud environment such as AWS or GCP, the provider (e.g., Amazon or Google in these examples) may operate hypervisors that a provider of data collection system 500 may not be able to access or modify. To implement data collection system 500 in such cases, a nested hypervisor may be employed. For example, a hypervisor 708 in which sub-kernel component 720 is installed may operate on top of another hypervisor that is even closer to the hardware. Such nested hypervisors may not need to be implemented as fully functional, generic hypervisors (e.g., hypervisors capable of running multiple virtual machines, etc.), but may be configured to provide a single virtual machine so that sub-kernel component 720 may be deployed and used for security monitoring of that virtual machine. In other examples in which a provider of data collection system 500 has full access or ownership of the hardware, such nested hypervisors may not be necessary and the sub-kernel component may be deployed directly in a base-level hypervisor 708 such as shown in FIG. 7.

Another way to implement sub-kernel component 720 may involve an emulator or interpreter such as a Quick EMUlator (QEMU). In this example, the emulator may operate within sub-kernel space 706 rather than or in addition to a hypervisor such as hypervisor 708. A processor may be emulated by way of dynamic binary translation so was to provide a set of different hardware and device models for the machine, enabling it to run a variety of guest operating systems including operating system 712.

Whereas sub-kernel component 720 may provide pervasive and efficient visibility from sub-kernel space 706, the tradeoff that may arise with accessing sub-kernel data from this sub-kernel space 706 is that sub-kernel data may be highly complex and difficult to contextualize. It is not until the operating system level (e.g., in kernel space 710) that data structures such as files and processes come into existence. And it is not until the application level (e.g., in user space 714) that multiple processes and files become readily recognizable as being components parts of a greater whole (e.g., a complex application). Accordingly, the view from sub-kernel space 706 is a complex view that may not provide much if any context to the visible data. Rather, at this level, sub-kernel data may appear to just consist of streams of bits and bytes, memory pages, register reads and writes, all without the context of what higher-level processes or applications are being carried out.

As a consequence, in some examples, other components of data collection system 500 may interoperate with sub-kernel component 720 to allow for the pervasiveness, inconspicuousness, and efficiency of sub-kernel data collection (performed by sub-kernel component 720) to be combined with the more straightforward contextualization and less complex view of the monitored data provided by the higher level views (e.g., the view from kernel space 710 in the case of kernel component 722 or the view from user space 714 in the case of application component 724). As will be described in more detail below, higher level components such as kernel component 722 and/or application component 724 may be employed within data collection system 500 to help contextualize sub-kernel data that is captured and monitored from sub-kernel space 706 by sub-kernel component 720. For example, a driver module implementing kernel component 722, a lightweight agent implementing application component 724, an eBPF-based privileged component having privileges within kernel space 710, or another suitable high-level component of data collection system 500 may interoperate with sub-kernel component 720 to efficiently balance the tradeoff between pervasive visibility and manageable complexity/contextualization that has been described.

As mentioned above, backend component 726 may be implemented on platform side 612-P of network 608 along with data platform 510 (e.g., using the same compute hardware 702-P). As such, in examples where data captured from sub-kernel space 706 (e.g., raw or manipulated sub-kernel data, live state snapshots, etc.) is to be converted, deduplicated, filtered, simulated, or otherwise processed on the platform side prior to being ingested and/or used by data platform 510 for security monitoring purposes described herein, backend component 726 may be understood to perform such processing (instead of or in addition to data platform 510 itself). Since backend component 726 is a component of data collection system 500, this processing may still be considered to be performed by data collection system 500.

As has been described, different data platforms such as data platform 510 may perform various roles and include various components configured to perform various operations. In FIG. 7, the illustrated data platform 510 is shown with certain aspects relevant to compute environment security monitoring using data collected from a sub-kernel space and/or using a live state snapshot of a compute resource. Specifically, as shown, data platform 510 is shown to include a data collection control facility 728, an analysis and graphing facility 730, and a user interface facility 732. It will be understood that these various facilities of data platform 510 may be included among other facilities and components that have been described in relation to other data platform embodiments and that all of these facilities and components may be selectively interconnected (e.g., communicatively coupled) in any manner as may serve a particular implementation.

Data collection control facility 728 may be configured to communicate with data collection system 500 and, in some examples, to ingest data received therefrom. Accordingly, upon receiving data from data collection system 500 (e.g., from any of components 720-726), data collection control facility 728 may direct the received data as appropriate within data platform 510 (e.g., providing the data to be analyzed and graphed by other facilities, etc.). In some examples, data collection control facility 728 may also be configured to direct data collection system 500 to perform certain functions and operations in accordance with its data collection role. To these ends, data collection control facility 728 may include any suitable processing and/or communicative resources as may facilitate the controlling and directing of data collection system 500 and/or any other software (e.g., software agents, etc.) configured to collect data within compute environment 602.

Analysis and graphing facility 730 may incorporate, within any of the graphs described herein (e.g., polygraphs and other such data representations), data collected by data collection system 500 in any of the ways described herein. This data may be incorporated into the graphs in any suitable way so as to perform various roles described herein relating to facilitating security monitoring (e.g., data compliance, data security, anomaly discovery, threat detection, etc.) within compute environment 602. For example, analysis and graphing facility 730 may be configured to construct and update, based on data communicated or provided by data collection system 500, a graph based on received event data, manipulated sub-kernel data, a live state snapshot, or the like. As with other such graphs described and illustrated above (e.g., polygraphs), this graph may comprise a plurality of nodes connected by a plurality of edges, wherein each node of the plurality of nodes represents a logical entity and each edge of the plurality of edges represents a behavioral relationship between nodes connected by the edge. Then, based on the constructed and updated graph, analysis and graphing facility 730 may identify one or more security threats associated with the compute resources within the compute environment (e.g., the compute resource 604 shown in FIG. 7).

User interface facility 732 may provide tools for interfacing with users (e.g., human users, automated processes, etc.) associated with client entities interested in the security of the compute environment 602. A user interface provided by this facility may allow users to view alerts related to identified security threats and/or to explore and take action to remedy such threats. User interface facility 732 may be configured to provide informative output to facilitate users in understanding threats and anomalies that are being identified by the data platform. For example, any of the alerts, graphs, notifications, or the like, that are described herein to be generated by data platform 510 may be presented to users by way of a user interface generated by user interface facility 618. As one example, if a threat actor (e.g., a person, group, software program, etc.) attempts to perpetrate a malicious bitcoin mining attack (e.g., an attack whereby computing resources of the compute environment are illegitimately compromised and directed to perform mining-related operations for the benefit of the threat actor) and this attack is detected in real time or near real time based on compute environment security monitoring using data collected from a sub-kernel space and/or using a live state snapshot of a compute resource described herein, the user interface may provide information about the nature of the attack, suggest steps for preventing or putting an end to the attack, advise how harm that has already been done may be remediated, perform measures to automatically dispel the attack, and so forth.

As has been mentioned, it may be advantageous for compute environment security monitoring to be done covertly within the compute environment such that malicious software and/or other attempts by threat actors to compromise the security of the compute environment in some way are not aware of the monitoring that is taking place. There are various reasons that such low-profile security monitoring may be advantageous. For example, one benefit of performing security monitoring without alerting malicious software and/or threat actors to the fact that they are being monitored is that doing so many preclude an opportunity for the malicious software or threat actor to adapt their behavior in response to detecting the monitoring. In response to detecting that the compute environment is being monitored, for instance, a threat approach behavior could be adjusted to be more guarded and effective, more aggressive (e.g., attacking the security software itself), or the like.

While sub-kernel components operating in the sub-kernel space (e.g., sub-kernel component 720 in sub-kernel space 706 described above) may not be directly visible to higher-level software (e.g., applications 716 in user space 714, utilities of operating system 712 in kernel space 710, etc.), other clues may be noticed by sophisticated threat actors that could still tip them off to the possibility that security monitoring may be occurring. As one example, data collection and manipulation described herein may require significant hardware resources to perform. For example, if a compute resource 604 is associated with a virtual machine executing on a processor that includes a plurality of processor cores, it may take much or all of the processing bandwidth of one or more of those processor cores to perform the data monitoring functions described herein. As such, if one or more processor cores are explicitly dedicated to performing the security monitoring functions (i.e., such that the processor cores are indicated to be unavailable to the operating system or higher-level applications above sub-kernel space 706), a threat actor may deduce that the security monitoring is occurring. For instance, if the processor is known or expected to include 16 processor cores and malicious software is only able to see 14 or 15 of the cores, it may be assumed that the 16th core is being dedicated to other tasks, such as security monitoring. Accordingly, along with performing certain data collection functions under the radar within sub-kernel space 706, data collection system 500 and/or other systems described herein for compute environment security monitoring may also reserve needed hardware resources in ways that are more difficult to positively associate with potential security monitoring.

Figure 8:
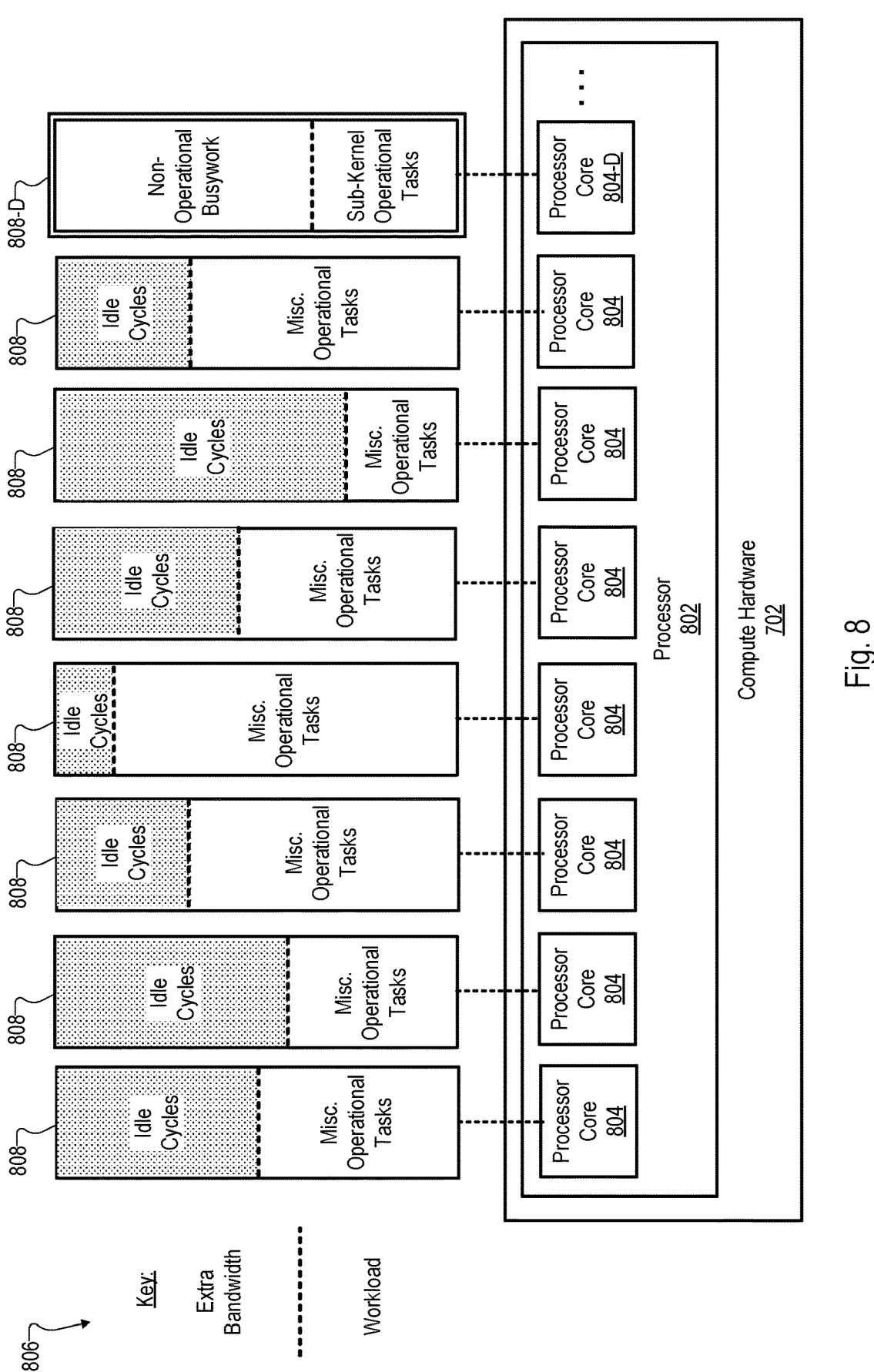
FIG. 8 illustrates example aspects of how compute hardware may be utilized when performing methods described herein for compute environment security monitoring using data collected from a sub-kernel space and/or using a live state snapshot of a compute resource.

To illustrate, FIG. 8 shows example aspects of how compute hardware 702 (e.g., compute hardware 702-E, compute hardware 702-P, etc.) may be utilized when performing methods described herein for compute environment security monitoring using data collected from a sub-kernel space and/or using a live state snapshot of a compute resource. Specifically, for a compute resource 604 utilizing compute hardware 702 to create a virtual machine executing on a processor 802 that includes a plurality of processor cores 804, sub-kernel component 720 may be configured to gain control of one or more processor cores 804-D ('D' for "dedicated") of the plurality of processor cores 804. Sub-kernel component 720 may then dedicate the one or more processor cores 804-D to be used exclusively for operation of the sub-kernel component by assigning non-operational busywork to fill any extra bandwidth that the one or more processor cores 804-D have beyond the operation of the sub-kernel component.

More specifically, as shown by a key 806 in FIG. 8, an assigned workload ("Workload") for each processor core 804 may take up a certain amount (i.e., the amount represented by the white space below the dotted line) of the processor core's total bandwidth 808 (i.e., represented by the entire box). Any additional bandwidth not needed for the workload ("Extra Bandwidth") is then shown to be above the dotted line for the total bandwidth 808 of each processor core 804. For most of the processor cores 804 of processor 802, FIG. 8 shows that miscellaneous operations ("Misc. Operational Tasks") are assigned as a workload to the processor core 804 at a particular moment in time illustrated by FIG. 8. Any additional bandwidth (shaded above the dotted line in each box) is then shown to be idle time ("Idle Cycles") during which the processor core could possibly take on more tasks.

In this case of processor core 804-D, however, the total bandwidth 808-D is shown to be different from the rest of the examples. In total bandwidth 808-D, operational tasks performed by sub-kernel component 720 ("Sub-Kernel Operational Tasks") may be assigned to the workload of this core. However, if there is any extra bandwidth, FIG. 8 shows that, rather than having idle cycles and availability that could be requested by software other than sub-kernel component 720, processor core 804-D is taken over and "hogged" by sub-kernel component 720 so that no other software will be able to use it. Specifically, as shown, non-operational busywork tasks ("Non-Operational Busywork" including any types of tasks that will keep the processor core engaged without necessarily advancing any immediate operational goals of sub-kernel component 720 other than to keep processor core 804-D in reserve) is shown to be performed by processor core 804-D in place of idle cycles. In this way, processor core 804-D will remain dedicated only for use by sub-kernel component 720, while it will not be clearly detectable from the viewpoint of higher-level software (e.g., at the kernel space or user space) that processor core 804-D is effectively dedicated to use by a sub-kernel software component. Instead, it will appear that processor core 804-D remains consistently busy and never seems to have any available extra bandwidth, but there will not be any tip-off like that described above in which a 16-core processor appears to suspiciously only have 15 or fewer cores. While only one processor core is shown to be fully controlled by sub-kernel component 720 in FIG. 8, it will be understood that the same takeover technique could be performed to covertly dedicate more than one processor core in other examples.

As described above in relation to methods 501 and 511, after collecting sub-kernel data accessible from a sub-kernel space below an operating system (e.g., sub-kernel space 706 below operating system 712), data collection system 500 may manipulate the collected sub-kernel data to prepare the sub-kernel data to be used by a data platform (e.g., data platform 510) in performing the security monitoring of a compute environment (e.g., compute environment 602).

This data manipulation may be performed in any suitable manner and, as will now be described, may take a variety of different forms to prepare the sub-kernel data for use by the data platform in a variety of different ways.

To illustrate, FIGS. 9A-9D illustrate various examples of how sub-kernel data 902 (e.g., data collected from a sub-kernel space such as sub-kernel space 706) may be manipulated in furtherance of methods described herein for compute environment security monitoring using such sub-kernel data. In each of FIGS. 9A-9D, sub-kernel component 720 is shown to have collected certain sub-kernel data 902, which is manipulated to form different examples of manipulated sub-kernel data 904 (e.g., manipulated sub-kernel data 904-A in FIG. 9A, manipulated sub-kernel data 904-B in FIG. 9B, manipulated sub-kernel data 904-C in FIG. 9C, and manipulated sub-kernel data 904-D in FIG. 9D). A different data manipulation 906 (data manipulation 906-A in FIG. 9A, data manipulation 906-B in FIG. 9B, data manipulation 906-C in FIG. 9C, and data manipulation 906-D in FIG. 9D) is also shown in the different figures to illustrate different principles that may be employed (individually or in combination with one another) as data collection system 500 manipulates sub-kernel data 902. Additional elements related to the various data manipulations 906 are also shown in the various FIGS. 9A-9D, as will be described in more detail below. Each of the different types of data manipulation 906 will now be described in more detail.

Figure 9A:
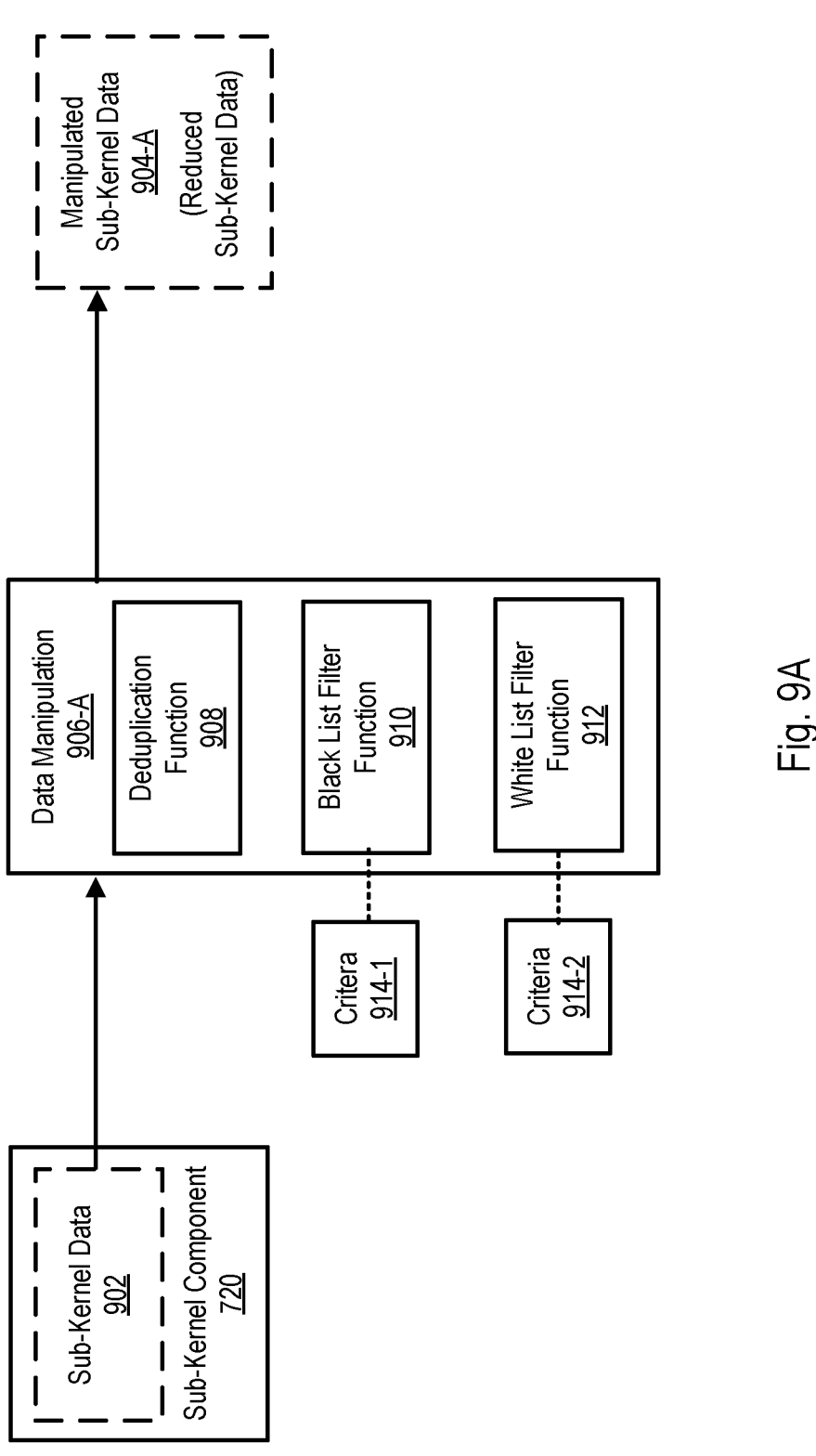
FIG. 9A illustrates certain examples of how data collected from a sub-kernel space may be manipulated in furtherance of methods described herein for compute environment security monitoring using such sub-kernel data.

In FIG. 9A, data manipulation 906-A illustrates that the manipulating of the collected sub-kernel data 902 may include reducing the collected sub-kernel data by at least one of: 1) deduplicating the collected sub-kernel data to remove redundant data (e.g., deduplication function 908), 2) filtering the collected sub-kernel data to remove data that is characterized by a first criterion (e.g., blacklist filter function 910), 3) filtering the collected sub-kernel data to remove data that is not characterized by a second criterion (e.g., whitelist filter function 912), or any other suitable data reduction functions as may serve a particular implementation (e.g., stripping out metadata, etc.). In this example, it will be understood that manipulated sub-kernel data 904-A is similar to the raw sub-kernel data 902 collected by sub-kernel component 720 except that the sub-kernel data is reduced (i.e., some of the data is removed and not communicated with the rest of the data to the data platform).

Deduplication function 908 may involve any deduplication of sub-kernel data as may serve a particular implementation. For instance, any reads or writes to memory that are repeated multiple times may be deduplicated so as to reduce the amount of manipulated sub-kernel data ultimately communicated to the data platform as manipulated sub-kernel data 904-A.

As shown, one or more criteria 914-1 may be accounted for by blacklist filter function 910. For example, any sub-kernel data 902 that meets criteria 914-1 may be considered to be on a "blacklist" that is to be filtered (i.e., removed) from the sub-kernel data 902 before being communicated to the data platform (i.e., such that the sub-kernel data 902 meeting criteria 914-1 is not communicated as part of the manipulated sub-kernel data 904-A).

In contrast, one or more criteria 914-2 may be accounted for by whitelist filter function 912 in a different manner. In this example, any sub-kernel data 902 that meets criteria 914-2 may be considered to be on a "whitelist" that is to be passed through (i.e., not removed) from the sub-kernel data 902 being communicated to the data platform (i.e., such that the sub-kernel data 902 meeting criteria 914-2 is communicated as part of the manipulated sub-kernel data 904-A).

The criteria 914-1 and 914-2 may be any suitable criteria as may serve a particular implementation. For instance, certain variables or files may be of particular interest (such that changes to these may be whitelisted) while changes to other variables or files may not be relevant to the security monitoring (such that changes to these may be blacklisted). Other types of data manipulations that may be performed along these lines may involve matching certain criteria (e.g., criteria 914) or identifying data with predetermined data patterns and using these determinations for purposes other than filtering, such as data packetization, arrangement, ordering, normalizing, and so forth.

Figure 9B:
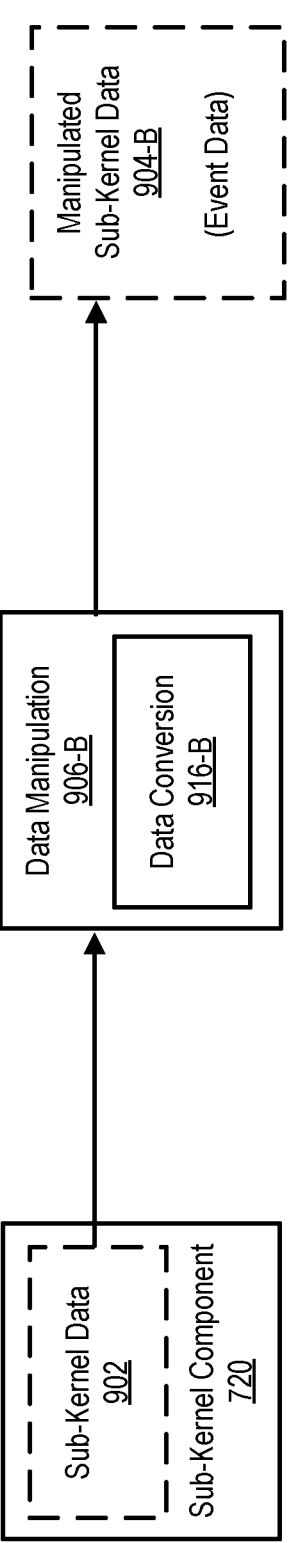
FIG. 9B illustrates additional examples of how data collected from a sub-kernel space may be manipulated in furtherance of methods described herein for compute environment security monitoring using such sub-kernel data.

In FIG. 9B, data manipulation 906-B illustrates that the manipulating of the collected sub-kernel data 902 may include converting the collected sub-kernel data 902 into event data that represents one or more events occurring with respect to the compute resource. As shown, manipulated sub-kernel data 904-B communicated to the data platform includes or is made up of this event data to which the sub-kernel data 902 has been converted. As shown in FIG. 9B, sub-kernel data 902 may be converted into event data without assistance from any component of the data collection system operating in a kernel space or a user space of the compute resource (i.e., without assistance from an additional component of data collection system 500 such as kernel component 722 or application component 724). For example, data conversion 916-B may involve converting of the collected sub-kernel data 902 into the event data by reconstructing higher level data structures such as processes, files, and so forth based on a knowledge that sub-kernel component 720 may have of the underlying hardware, the operating system, and so forth. As one specific example, sub-kernel component 720 may detect, within sub-kernel data 902, a change to a page table pointer within the operating system. Based on the change to the page table pointer (e.g., a change to the root of the page table), sub-kernel component 720 may identify a process of the operating system that is responsible for one or more events occurring with respect to the compute resource. As such, this change to the page table pointer represented by sub-kernel data 902 may be converted to event data that indicates the initiation or termination of a particular process, or an action that the process performs.

As mentioned above, the event data into which sub-kernel data 902 may be converted may be higher level data that the data platform is configured to ingest and process in ways that have been described. For example, the event data may comprise or be similar or analogous to data that a data platform would typically receive from a user-space agent that is monitoring and reporting events in the compute environment. Various techniques similar to the reconstruction of the process events based on the changes to the page table may be used to perform data conversion 916-B without assistance from other components. For example, context enabling sub-kernel component 720 to perform data conversion 916-B may be deduced from network packets that are visible from the sub-kernel space.

Figure 9C:
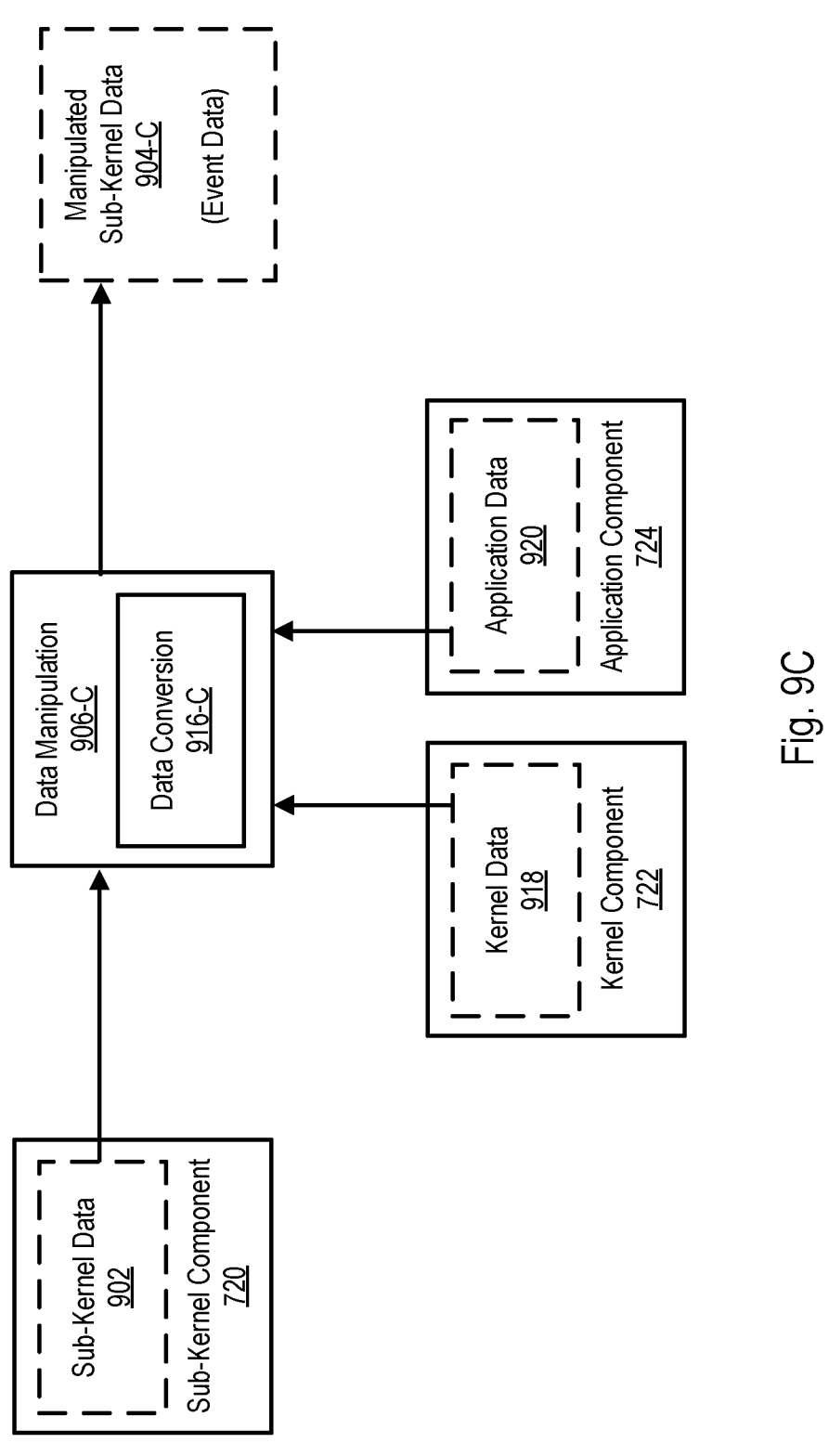
FIG. 9C illustrates additional examples of how data collected from a sub-kernel space may be manipulated in furtherance of methods described herein for compute environment security monitoring using such sub-kernel data.

In other examples, it may be advantageous to perform such data conversion with assistance from other components with different viewpoints of the computing that is taking place. For example, data manipulation 906-C in FIG. 9C illustrates, similar to data manipulation 906-B in FIG. 9B, that the manipulating of the collected sub-kernel data 902 may include converting the collected sub-kernel data 902 into event data that represents one or more events occurring with respect to the compute resource. Unlike data manipulation 906-B, however, the data conversion 916-C of data manipulation 906-C is shown to leverage assistance from at least one of a kernel component 722 (operating in kernel space 710 of the compute resource 604, as described above) or an application component 724 (operating in user space 714 of the compute resource 604, as described above). More particularly, data conversion 916-C may convert collected sub-kernel data 902 into manipulated sub-kernel data 904-C not only based on the sub-kernel data itself but also based on kernel data 918 accessible from the kernel space by kernel component 722, application data 920 accessible from the user space by application component 724, or a combination thereof. Here again, the manipulated sub-kernel data 904-C communicated to the data platform may then include or be entirely made up of this event data into which sub-kernel data 902 is converted by way of data conversion 916-C.

Data collection system 500 may perform monitoring-from-the-middle techniques that involve both sub-kernel data 902 and at least one of kernel data 918 and/or application data 920 in any suitable manner. For instance, kernel data 918 or application data 920 may include information provided by a ProcessChangeEvent that may indicate information about events being initiated, terminated, or performing other functions so that data collection system 500 may more easily and accurately interpret sub-kernel data 902 to generate the event data. As will be described in more detail below, a component such as kernel component 722 may be installed surreptitiously (from the perspective of user-space applications) in the operating system by sub-kernel component 720 using techniques similar to those described below for a privileged (e.g., eBPF-based) component. In this way, data collection system 500 may monitor from below and efficiently and accurately perform data conversion 916-C to derive event data from collected sub-kernel data without tipping off malicious software programs that the compute environment is being monitored.

Figure 9D:
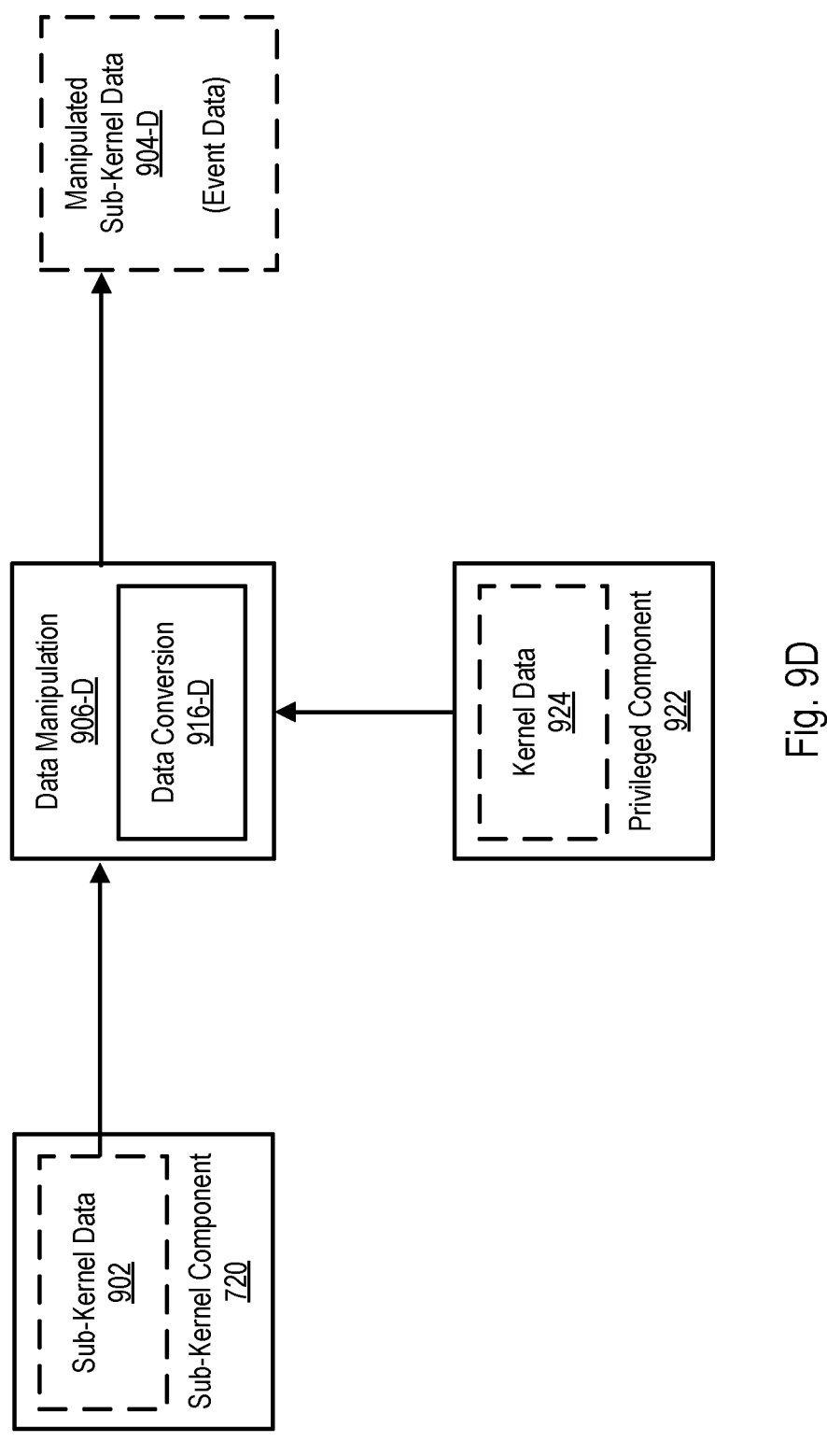
FIG. 9D illustrates additional examples of how data collected from a sub-kernel space may be manipulated in furtherance of methods described herein for compute environment security monitoring using such sub-kernel data.

As with the examples of FIGS. 9B and 9C, FIG. 9D shows a data manipulation 906-D illustrating that the manipulating of the collected sub-kernel data 902 may again include converting the collected sub-kernel data 902 into event data that represents one or more events occurring with respect to the compute resource. Again, manipulated sub-kernel data 904-D communicated to the data platform is shown to include or be made up of this event data to which the sub-kernel data 902 has been converted. Similar to the data manipulation 906-C in FIG. 9C, sub-kernel data 902 is shown to be manipulated with assistance from another component of data collection system 500 operating at a higher level than the sub-kernel space in which sub-kernel component 720 operates. However, rather than the kernel component 722 or application component 724 shown in FIG. 9C, FIG. 9D illustrates that the converting of the collected sub-kernel data 902 into the event data at data conversion 916-D is performed with assistance from a privileged component 922. For example, as shown, data conversion 916-D may be performed based on the collected sub-kernel data 902 and further based on kernel data 924 that is accessed from the kernel space by privileged component 922. The higher-level kernel data 924 may be useful for reconstructing higher level data structures (e.g., processes, files, etc.) in similar ways as described above in relation to kernel data 918 and/or application data 920.

In certain implementations, privileged component 922 may operate in the kernel space using eBPF technology such that the overhead and development of a full kernel module (e.g., a driver component) may be avoided. eBPF is a kernel technology that allows programs to run in the kernel using an eBPF virtual machine that gives eBPF programs privileged access to some, but not necessarily all, hardware available to the kernel. As such, eBPF programs can be used to access and modify data in the kernel, as well as to control the behavior of the kernel. However, because the eBPF virtual machine is a lightweight, sandboxed execution environment, the modifying of kernel source code and/or the loading of kernel modules (e.g., drivers) may be avoided and the security, performance, and observability of the operating system may be greater than it would be for kernel modules such as kernel component 722.

As mentioned above, privileged components and other kernel components (e.g., privileged component 922, kernel component 722, etc.) may be deployed to the kernel space from the sub-kernel space (e.g., installed within kernel space 710 from sub-kernel space 706). In this way, the deployment of privileged component 922 (or kernel component 722) would be accomplished out of view of user-space applications and the operation of the component would be undetectable from user space 714. This may be especially beneficial if malicious software has become operational in the user space and the software is trying to ascertain if security monitoring is occurring on the compute resource so that it can modify its behavior or adjust its attack approach accordingly. As described above, being able to covertly collect event data and monitor a compute environment without tipping off potential threat actors to the fact that they are being monitored may allow for greater security to be achieved.

While privileged modules (e.g., eBPF modules) may typically be installed (and may be expected by threat actors to be installed) in the kernel space from above the operating system (i.e., from the user space), sub-kernel component 720 may be configured to deploy privileged component 922 to the kernel space from below the operating system (i.e., from sub-kernel space 706 where sub-kernel component 720 operates). This may be accomplished in any suitable way. As one example, sub-kernel component 720 may be configured to gain control of a particular operating system process that is known and expected to be operating in the kernel space (e.g., an IDLE process that is fully privileged to run as root and that typically does nothing but consume idle processor cycles), and to co-opt this process to perform operating system calls associated with deploying (e.g., installing) privileged component 922 in a manner undetectable from the user space. Other software running on top of the operating system would be unable to see what system calls the IDLE process makes as it sets up and installs privileged component 922 in this way, such that this installation would be undetectable from the user space perspective. Once privileged component 922 is covertly installed in this way, additional privileged code (other kernel modules, other components of the data collection system) may similarly be deployed or otherwise manipulated with full operating system privilege and under cover from user-space applications. Additionally, kernel data 924 may be provided back down to sub-kernel component 720 by the covertly-installed privileged component 922 to assist with data manipulation 906-D and data conversion 916-D in any of the ways described herein.

FIGS. 9A-9D have shown various ways that sub-kernel data may be collected from below an operating system (e.g., from a sub-kernel space such as associated with physical hardware or a hypervisor or the like) and how this sub-kernel data may be manipulated and converted into event data (e.g., with or without assistance from higher-level components that may have more insight into data structures used by the operating system). As described above (e.g., in relation to methods 521 and 531 of FIG. 5B), the analysis of live state snapshots of a compute resource may provide an additional or alternative way of deriving event data for use by a data platform without reliance on conventional user-space agents whose mere presence could cause threat actors to adjust their behavior (e.g., to act more aggressively, more covertly, etc.) as they attempt to evade security monitoring efforts.

Figure 10A:
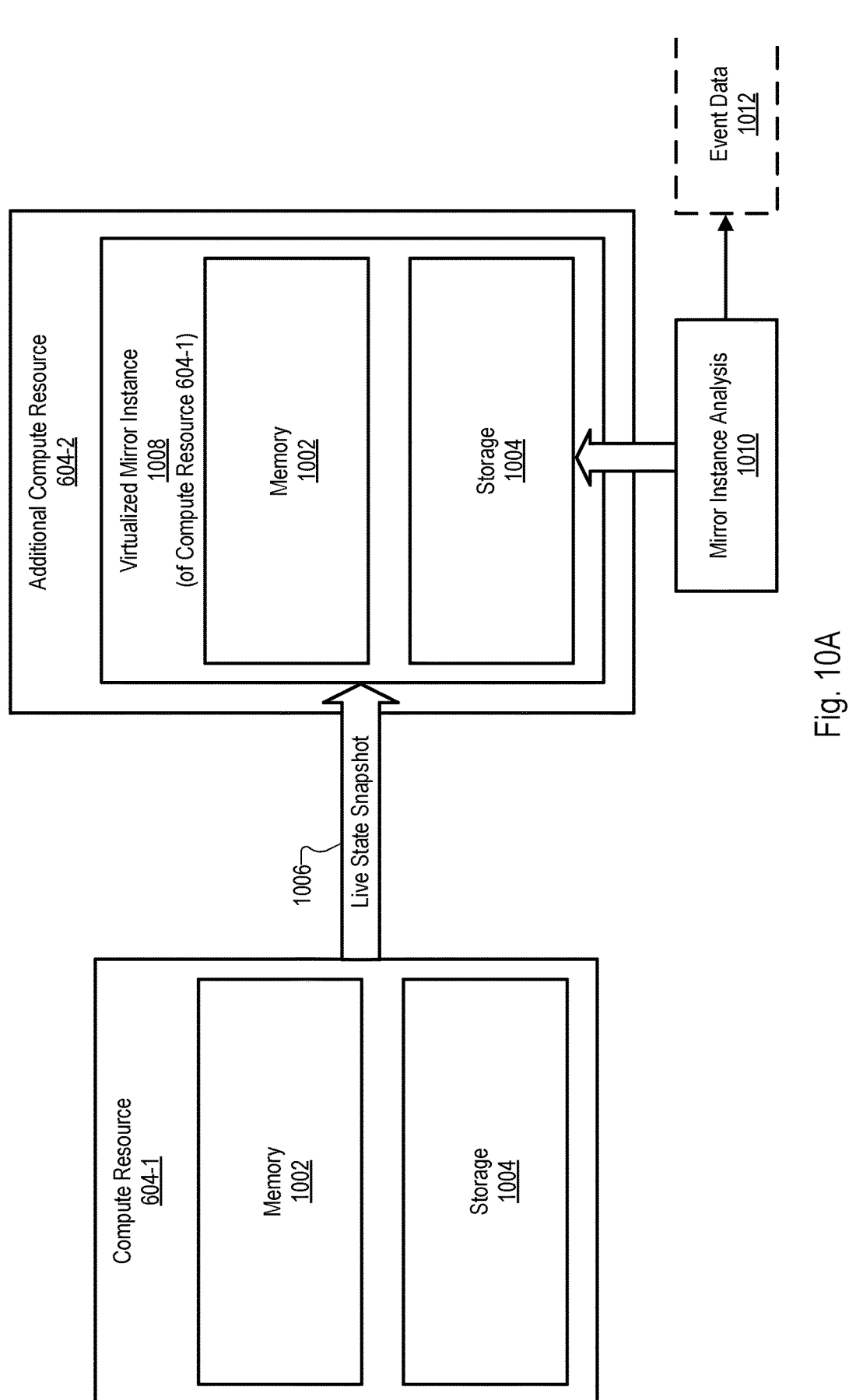
FIG. 10A illustrates example aspects of how a live state snapshot of a compute resource may be used in furtherance of methods described herein for compute environment security monitoring.

To illustrate these snapshot-related principles in more detail, FIG. 10A shows example aspects of how a live state snapshot of a compute resource may be used in furtherance of methods described herein for compute environment security monitoring. The state of a particular compute resource 604 may be defined at a given point in time by the data that is stored both in the memory of the compute resource and in the data storage maintained by the compute resource. Accordingly, a particular compute resource labeled compute resource 604-1 is shown in FIG. 10A to include memory 1002 and storage 1004. A live state snapshot 1006 of compute resource 604-1 will then be understood to include a representation of the data in both memory 1002 and storage 1004 for a particular moment in time. In some examples, a state snapshot such as live state snapshot 1006 may be made up of a plurality of narrower snapshots, such as snapshots only relating to the memory of a compute resource (e.g., representing memory 1002 at a point in time) and separate snapshots relating to the storage of the compute resource (e.g., representing storage 1004 at the same point in time). Collectively, such memory and storage snapshots are referred to as a "state snapshot" if they incorporate the entirety of the memory and storage data defining the compute resource's state, or if they at least incorporate enough of that data to approximate the state of the compute resource for a particular purpose such as described herein (e.g., for scanning the compute resource to determine event data, for simulating the compute resource's behavior, etc.).

There are various possibilities for how a live state snapshot of a compute resource may be used to facilitate or contribute to the security monitoring of the compute environment being performed by the data platform. As one possibility, for example, live state snapshot 1006 may be statically analyzed (e.g., scanned, processed, etc.) to determine event data or other information that may be provided to data platform 510 for use in its security monitoring (e.g., to be incorporated in a polygraph or other such representation described above). As another possibility shown in FIG. 10A, a virtualized mirror instance of compute resource 604-1 may be reconstituted in a dummy environment so that the mirror instance can be analyzed (e.g., including by running monitoring software such as conventional agent software in the user space) without affecting compute resource 604-1 itself. For example, as shown in FIG. 10A, data collection system 500 may be configured to construct, based on live state snapshot 1006, a virtualized mirror instance 1008 of compute resource 604-1 to be hosted on an additional compute resource 604-2 (which, as described in more detail below, may be implemented as a compute resource in compute environment 602, a compute resource on the platform side 612-P of the network, or in other suitable ways). An analysis of this virtualized mirror instance 1008 may then be performed at mirror instance analysis 1010 to determine event data 1012 based on live state snapshot 1006.

As mentioned above, a state snapshot may be referred to herein as a "live" state snapshot (or, alternatively, to have been "live captured"), if the state snapshot is captured in a manner that does not require significant or detectable disruption to the compute resource (e.g., pausing execution of computing tasks long enough that timeouts and/or other such detectable issues begin to occur). To accomplish such live capture of a state snapshot, one example technique that may be employed is illustrated in FIG. 10B, which shows certain example aspects of how a live state snapshot of a compute resource may be live captured while avoiding detectable disruption to the compute resource.

Figure 10B:
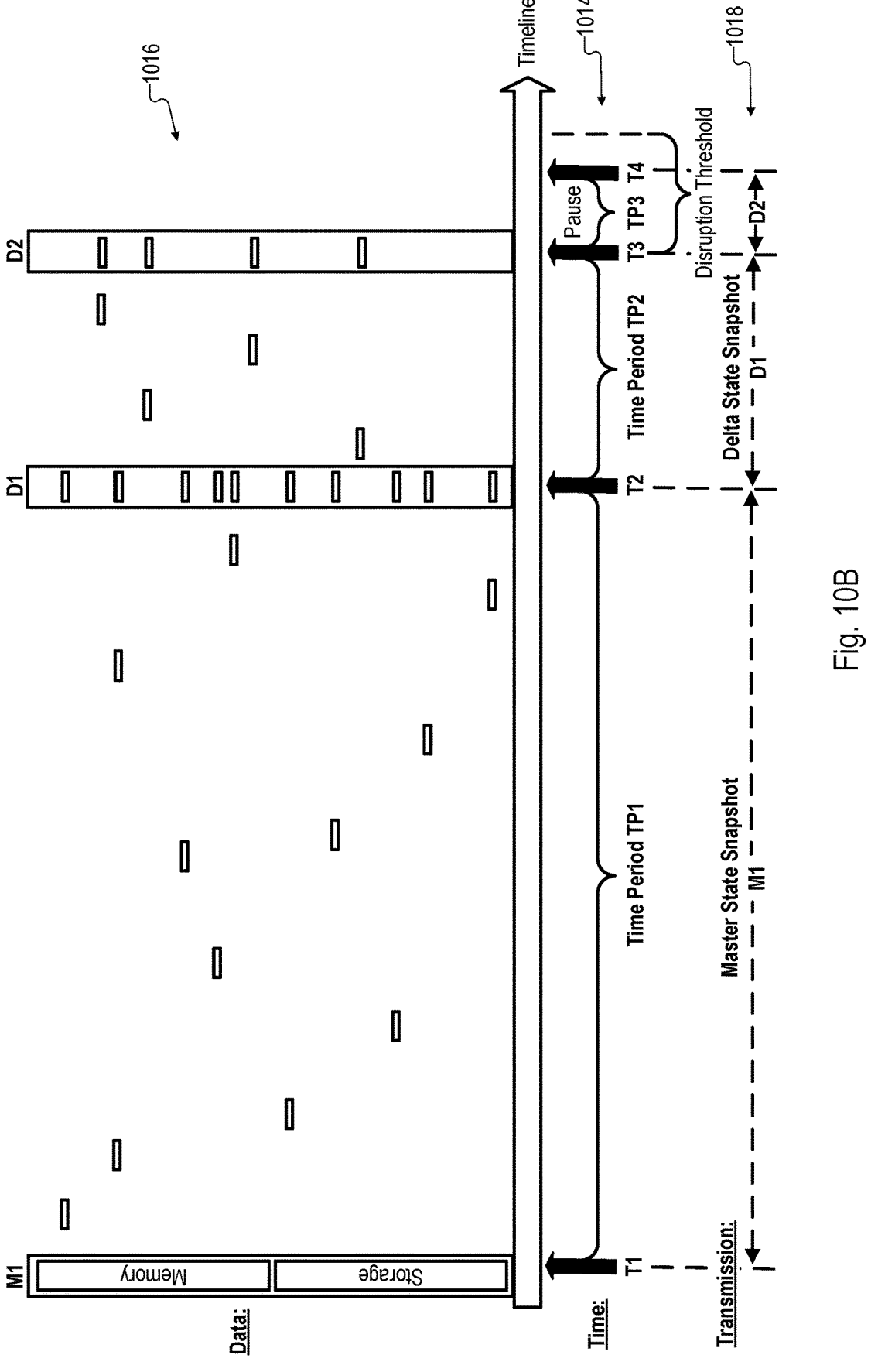
FIG. 10B illustrates example aspects of how a live state snapshot of a compute resource may be live captured while avoiding detectable disruption to the compute resource.

As shown, a time segment 1014 of FIG. 10B depicts a timeline along which various times (labeled "T1," "T2," etc.) and time periods (labeled "Time Period TP1," "Time Period TP2," etc.) are indicated. FIG. 10B further shows a data segment 1016 in which data from memory 1002 and storage 1004 is represented with respect to the times and time periods of time segment 1014. For example, at time T1, a master snapshot M1 is shown to be captured that incorporates the entire state of the compute resource (e.g., the entire memory 1002 and storage 1004). Even if all this data can be instantaneously snapshotted at this master capture time T1, however, it may not be possible or practical to instantaneously transfer all this snapshot data to a location where it can be used (e.g., scanned, analyzed, used to construct the virtualized mirror instance 1008 of compute resource 604-1, etc.). Rather, the time period TP1 may represent the amount of time it takes to transmit the data snapshotted at master capture time T1 and, as represented by small boxes in data segment 1016 along time period TP1, certain parts of memory 1002 and storage 1004 may continue to change during this transmission time period. Accordingly, by time T2, when the entirety of master snapshot M1 has been transmitted, the master snapshot M1 is already at least somewhat stale or out of date with the current state of the compute resource (due to the changes during time period TP1). To update the master snapshot at time T2, the entire contents of memory 1002 and storage 1004 need not be re-snapshotted and transmitted. Rather, a delta snapshot D1 is shown that includes only the memory and storage data that has changed and requires updating.

As delta snapshot D1 includes significantly less data than the original master snapshot M1, it will be understood that transmitting delta snapshot D1 will take less time than transmitting master snapshot M1. Hence, as shown in FIG. 10B, delta snapshot D1 is transmitted during a time period TP2 that is shorter than time period TP1. Here again, data in memory 1002 and/or storage 1004 may continue to change to make even delta snapshot D1 somewhat stale or out of date. But since time period TP2 is shorter than time period TP1, the changes in the data are presumably less significant, so that if this process continues, the delta snapshots gets smaller and smaller until one can be transmitted without halting execution of the compute resource for more than a few milliseconds (e.g., 5-10 ms or some other time that is short enough as to not cause timeouts or other detectable disruptions to program execution). For example, a delta snapshot D2 that represents changes to the compute resource state that occurred as it executed during time period TP2 may be determined to include a small enough amount of data as to be transmissible during a time period TP3 that is shorter than a disruption threshold time (labeled "Disruption Threshold" in FIG. 10B) such as 5 ms, 10 ms, or another suitable amount of time that is predetermined to be short enough to avoid execution problems (e.g., timeouts) and evade detection by threat actors operating in user space. Accordingly, as shown, program execution by the compute resource may be temporarily suspended ("Pause") during time period TP3 so that, by time T4, execution may resume and a fully up-to-date live state snapshot (generated by updating the master state snapshot with each of the successive delta state snapshots) is captured.

As illustrated by a transmission segment 1018 under the time segment 1014 and data segment 1016 of FIG. 10B, the live capture of live state snapshot 1006 may be performed by constructing virtualized mirror instance 1008 of compute resource 604-1 as follows. During a first time period (time period TP1) subsequent to a master capture time (time T1) represented by the master state snapshot (master state snapshot M1), the master state snapshot may be transmitted to the additional compute resource. Then, during a second time period (time period TP2) subsequent to the first time period, a first delta state snapshot of the one or more delta state snapshots (delta state snapshot D1) may be transmitted to the additional compute resource. This first delta state snapshot may indicate changes to the compute resource that occurred during the first time period subsequent to the master capture time (which, as illustrated and as explained above, may constitute significantly less data than the entirety of the data incorporated in the master state snapshot). Finally, during a third time period (time period TP3) subsequent to the second time period, a second delta state snapshot of the one or more delta state snapshots (delta state snapshot D2) may be transmitted to the additional compute resource. This second delta state snapshot may indicate changes to the compute resource that occurred during the second time period subsequent to the first time period (which, as illustrated and as explained above, may constitute even less data than was incorporated in the first delta state snapshot). This process may continue for as many delta state snapshots as necessary until the transmission time period is short enough that the changes during the time period may be transmitted in less time than the predetermined disruption threshold time. At this point (at time T3 in this example), the compute resource may be paused during the transmission time period (time period TP3 in this example), which may be shorter than the time threshold configured to ensure the avoiding of the detectable disruption to the compute resource (labeled as the "Disruption Threshold" in this example).

State snapshots such as live state snapshot 1006 may be captured and provided (e.g., transmitted) by any component or combination of components of data collection system 500 operating on either side of a network and/or at any level of memory space as may serve a particular implementation. Likewise, analysis of live state snapshots (e.g., mirror instance analysis 1010, etc.) may be performed by the same or different component(s) within data collection system 500. The implementation of data collection system 500 (illustrated in FIG. 7 with components distributed across various memory spaces including sub-kernel space 706, kernel space 710, and user space 714, as well as across different sides of the network including components 720-724 on the environment side 612-E and backend component 726 on the platform side 612-P) will now be referenced to illustrate a few particular examples of how different embodiments of data collection system 500 may implement compute environment security monitoring using a live state snapshot of a compute resource.

In a first example, data platform 510 may operate at a first site associated with the platform side 612-P of the network 608 communicatively coupling data platform 510 and compute environment 602, compute environment 602 may operate at a second site associated with the environment side 612-E of network 608, and these first and second sites may be physically located remotely from one another (e.g., in different buildings, in different cities, etc.). In this example, the additional compute resource 604-2 hosting the virtualized mirror instance 1008 may be included, along with the compute resource 604-1, within the compute environment 602 operating on the environment side 612-E of network 608 at the second site. The analyzing of this virtualized mirror instance 1008 may be performed in this example by one or more of: 1) sub-kernel component 720 of data collection system 500 operating on the environment side of the network in sub-kernel space 706 below operating system 712 of compute resource 604-1, 2) kernel component 722 of data collection system 500 operating on the environment side of the network in kernel space 710 of operating system 712 of the compute resource, or 3) application component 724 of data collection system 500 operating on the environment side of the network in user space 714 of operating system 712 of compute resource 604-1.

In another example, data platform 510 may also operate at a first site associated with platform side 612-P of network 608, compute environment 602 may also operate at a second site associated with environment side 612-E of network 608, and these first and second sites may also be physically located remotely from one another. In this example, however, the additional compute resource 604-2 hosting the virtualized mirror instance 1008 may operate on platform side 612-P of the network at the first site (i.e., rather than being included within compute environment 602 at the second site). As such, the analyzing of virtualized mirror instance 1008 in this example may be performed by backend component 726 of data collection system 500, which, as illustrated in FIG. 7, may similarly operate on platform side 612-P of the network (at the first site).

In still other examples, other combinations and permutations of capturing live state snapshot 1006 and performing mirror instance analysis 1010 to determine the event data 1012 may be employed. For example, both sides 612 of the network 608 may be housed nearby one another (e.g., in a single building such as a cloud data center that hosts both data platform 510 and compute environment 602) such that the geographical distinctions mentioned above are not particularly relevant. Additionally, in certain examples, relatively raw sub-kernel data (e.g., live state snapshot 1006 or other data captured by sub-kernel component 720) may be provided to data platform 510 itself so that event data may be determined within the data platform (e.g., by way of mirror instance analysis 1010, etc.) rather than by a component of data collection system 500. While live state snapshot 1006 is described herein as being captured by sub-kernel component 720, it will be understood that in some examples, higher level components (e.g., a kernel module such as kernel component 722, a privileged component such as privileged component 922, etc.) may additionally or alternatively be used to live capture the state snapshot in ways that have been described.

As mentioned above, various techniques may be used to analyze live state snapshot 1006 once it is capture. For example, as has been described, the snapshot data itself may be analyzed to directly determine event data 1012 or a virtualized mirror instance 1008 of the compute resource 604-1 may be constructed so that mirror instance analysis 1010 may be performed whereby the compute resource is simulated and analyzed in various ways without a risk of tipping off any entity in the actual compute resource 604-1. As yet another approach for using live state snapshots to derive event data and/or otherwise enable security monitoring of the compute environment, the virtualized mirror instance 1008 of compute resource 604-1 may be simulated and monitored as it receives identical input as the real compute resource 604-1. However, whereas certain monitoring techniques that are known to risk tipping off malicious software to the fact that it is operating in a monitored system (e.g., operating an agent in the user space to directly collect and report event data back to the data platform) may be avoided in the actual compute resource 604-1, these monitoring techniques may be employed in the virtualized mirror instance 1008 of the compute resource 604-1 to help achieve at least two objectives.

First, by employing these monitoring techniques (e.g., by deploying a user-space agent), event data 1012 may be directly collected and reported in straightforward ways (i.e., from above the operating system, where the advanced techniques described herein for monitoring from below the operating system need not be employed) still without risk of providing intelligence to a threat actor whose attack approach to compute resource 604-1 may be informed by that intelligence (e.g., intelligence indicating that the compute environment is being monitored, that certain data is being collected, etc.).

Second, by cloning the state snapshot of the compute resource 604-1 and then providing identical input data to the clone (i.e., to virtualized mirror instance 1008), data collection system 500 may gain insight into dormant or devious software based on differences in behavior of the actual compute resource 604-1 (in which malicious software has no reason to believe it is being monitored) and its virtualized mirror instance 1008 (in which the snapshotted malicious software does have reason to believe it is being monitored). For instance, if the replicated machine (i.e., virtualized mirror instance 1008) mirrors the original machine (i.e., compute resource 604-1) and incoming requests are sent to both machines to see if their answers match, mirror instance analysis 1010 may expect to see matching answers unless there is some influence of an agent-sensitive security threat (e.g., malicious software that is enabled, or configured to behave differently, when it detects that an agent is present in the environment and/or that security monitoring of the environment is otherwise underway). If the answers provided by both machines start to diverge, mirror instance analysis 1010 may take this as a sign that compute resource 604-1 may be under attack (e.g., as the threat actor is emboldened by its belief that it is operating in an unmonitored compute environment).

Figure 10C:
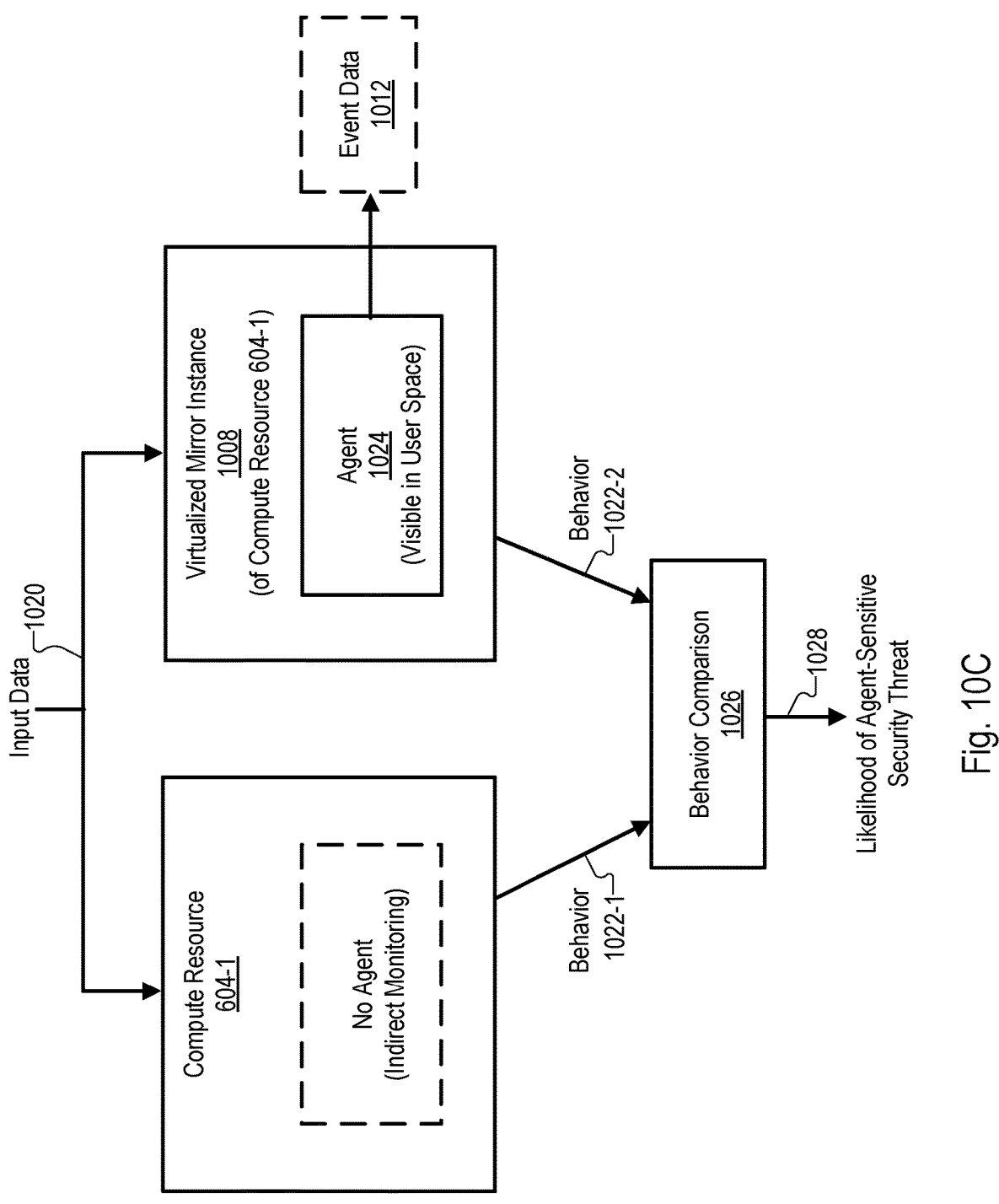
FIG. 10C illustrates aspects of how a behavior comparison between a compute resource and a virtualized mirror instance of the compute resource constructed based on a live state snapshot of the compute resource may be used in furtherance of methods described herein for compute environment security monitoring.

To illustrate, FIG. 10C shows certain aspects of how a behavior comparison between compute resource 604-1 and virtualized mirror instance 1008 of the compute resource (constructed based on live state snapshot 1006 of compute resource 604-1) may be used in furtherance of methods described herein for compute environment security monitoring. More particularly, as shown, both compute resource 604-1 and virtualized mirror instance 1008 may receive the same input data 1020, which may cause each of them to exhibit certain behaviors 1022 (e.g., behavior 1022-1 for compute resource 604-1 and behavior 1022-2 for virtualized mirror instance 1008). As such, the analyzing of virtualized mirror instance 1008 of compute resource 604-1 (i.e., mirror instance analysis 1010) may include: 1) operating virtualized mirror instance 1008 based on substantially identical input data 1020 as is received by compute resource 604-1; 2) deploying, to a user space of an operating system of additional compute resource 604-2, an agent 1024 configured to determine event data 1012 by monitoring additional compute resource 604-2; 3) comparing behavior 1022-1 of compute resource 604-1 and behavior 1022-2 of virtualized mirror instance 1008 as compute resource 604-1 and virtualized mirror instance 1008 each operate in accordance with the substantially identical input data 1020 (represented in FIG. 10C by a behavior comparison 1026); and 4) determining, based on the comparing 1026 of the behaviors 1022, a likelihood 1028 that an agent-sensitive security threat is operating in the compute environment. By periodically capturing live state snapshots and performing this type of side-by-side behavior comparison, valuable insights may be gained that may be pertinent to the security monitoring, as well as that may be difficult to detect otherwise (due to the tendency of the agent-sensitive security threats to keep a low profile and/or to behave inconspicuously when it is believed that security monitoring is being performed).

What is claimed is:

1. A method comprising:

live capturing, by a sub-kernel component of a data collection system communicatively coupled to a data platform configured to perform security monitoring of a compute environment, a state snapshot of a compute resource within the compute environment, the live capturing performed by updating a master state snapshot with one or more delta state snapshots to avoid detectable disruption to the compute resource during the live capturing, wherein the master state snapshot comprises an entire state of the compute resource captured at a first capture time and a delta state snapshot comprises changes to the compute resource captured at a second capture time occurring after the first capture time;

determining, by the data collection system and based on the state snapshot, event data that represents one or more events occurring with respect to the compute resource; and providing, by the data collection system, the event data to the data platform for use by the data platform in performing the security monitoring of the compute environment.

2. The method of claim 1, further comprising:

constructing, by the data collection system and based on the state snapshot, a mirror instance of the compute resource hosted on an additional compute resource;

wherein the determining of the event data based on the state snapshot is performed by analyzing the mirror instance of the compute resource.

3. The method of claim 2, wherein the constructing of the mirror instance of the compute resource includes:

transmitting, the master state snapshot to the additional compute resource during a first time period subsequent to the first capture time;

transmitting, during a second time period subsequent to the first time period, a first delta state snapshot of the one or more delta state snapshots to the additional compute resource, the first delta state snapshot indicating changes to the compute resource that occurred during the first time period subsequent to the first capture time; and transmitting, during a third time period subsequent to the second time period, a second delta state snapshot of the one or more delta state snapshots to the additional compute resource, the second delta state snapshot indicating changes to the compute resource that occurred during the second time period subsequent to the first time period.

4. The method of claim 3, wherein the compute resource is paused during the third time period and the third time period is shorter than a time threshold configured to ensure the avoiding of the detectable disruption to the compute resource.

5. The method of claim 3, wherein:

the data platform operates at a first site associated with a platform side of a network communicatively coupling the data platform and the compute environment;

the compute environment operates at a second site associated with an environment side of the network, the second site physically remote from the first site;

the additional compute resource hosting the mirror instance is included, along with the compute resource, within the compute environment operating on the environment side of the network at the second site; and the analyzing of the mirror instance is performed by one or more of:

the sub-kernel component of the data collection system operating on the environment side of the network in a sub-kernel space below an operating system of the compute resource, a kernel component of the data collection system operating on the environment side of the network in a kernel space of the operating system of the compute resource, or an application component of the data collection system operating on the environment side of the network in a user space of the operating system of the compute resource.

6. The method of claim 3, wherein:

the data platform operates at a first site associated with a platform side of a network communicatively coupling the data platform and the compute environment;

the compute environment operates at a second site associated with an environment side of the network, the second site physically remote from the first site;

the additional compute resource hosting the mirror instance operates on the platform side of the network at the first site; and the analyzing of the mirror instance is performed by a backend component of the data collection system, the backend component operating on the platform side of the network.

7. The method of claim 2, wherein the analyzing of the mirror instance of the compute resource includes:

operating the mirror instance based on substantially identical input data as is received by the compute resource; and deploying, to a user space of an operating system of the additional compute resource, an agent configured to determine the event data by monitoring the additional compute resource.

8. The method of claim 7, wherein the analyzing of the mirror instance of the compute resource further includes:

comparing a behavior of the compute resource and a behavior of the mirror instance as the compute resource and the mirror instance each operate in accordance with the substantially identical input data; and determining, based on the comparing of the behaviors, a likelihood that an agent-sensitive security threat is operating in the compute environment.

9. The method of claim 1, wherein:

the compute resource is associated with a virtual machine executing on a processor that includes a plurality of processor cores; and the method further comprises:

gaining control, by the sub-kernel component, of one or more processor cores of the plurality of processor cores; and dedicating, by the sub-kernel component, the one or more processor cores to be used exclusively for operation of the sub-kernel component by assigning non-operational busywork to fill any extra bandwidth that the one or more processor cores have beyond the operation of the sub-kernel component.

10. The method of claim 1, wherein the event data is provided to the data platform for use by the data platform in performing the security monitoring by:

constructing a graph based on the event data, the graph comprising a plurality of nodes connected by a plurality of edges, wherein each node of the plurality of nodes represents a logical entity and each edge of the plurality of edges represents a behavioral relationship between nodes connected by the edge; and identifying, based on the graph, a security threat associated with the compute resource within the compute environment.

11. A computer program product embodied in a non-transitory computer-readable storage medium and comprising computer instructions configured to direct a data collection system to perform a process comprising:

live capturing, by a sub-kernel component of the data collection system, a state snapshot of a compute resource within a compute environment, wherein the compute resource is communicatively coupled to a data platform configured to perform security monitoring of the compute environment, and wherein the live capturing is performed by updating a master state snapshot with one or more delta state snapshots to avoid detectable disruption to the compute resource during the live capturing, wherein the master state snapshot comprises an entire state of the compute resource captured at a first capture time and a delta state snapshot comprises changes to the compute resource captured at a second capture time occurring after the second capture time;

determining, based on the state snapshot, event data that represents one or more events occurring with respect to the compute resource; and providing the event data to the data platform for use by the data platform in performing the security monitoring of the compute environment.

12. The computer program product of claim 11, wherein the process further comprises:

constructing, based on the state snapshot, a mirror instance of the compute resource hosted on an additional compute resource;

wherein the determining of the event data based on the state snapshot is performed by analyzing the mirror instance of the compute resource.

13. The computer program product of claim 12, wherein the constructing of the mirror instance of the compute resource includes:

transmitting, the master state snapshot to the additional compute resource during a first time period subsequent to the first capture time;

transmitting, during a second time period subsequent to the first time period, a first delta state snapshot of the one or more delta state snapshots to the additional compute resource, the first delta state snapshot indicating changes to the compute resource that occurred during the first time period subsequent to the first capture time; and transmitting, during a third time period subsequent to the second time period, a second delta state snapshot of the one or more delta state snapshots to the additional compute resource, the second delta state snapshot indicating changes to the compute resource that occurred during the second time period subsequent to the first time period.

14. The computer program product of claim 13, wherein the compute resource is paused during the third time period and the third time period is shorter than a time threshold configured to ensure the avoiding of the detectable disruption to the compute resource.

15. The computer program product of claim 12, wherein the analyzing of the mirror instance of the compute resource includes:

operating the mirror instance based on substantially identical input data as is received by the compute resource; and deploying, to a user space of an operating system of the additional compute resource, an agent configured to determine the event data by monitoring the additional compute resource.

16. The computer program product of claim 15, wherein the analyzing of the mirror instance of the compute resource further includes:

comparing a behavior of the compute resource and a behavior of the mirror instance as the compute resource and the mirror instance each operate in accordance with the substantially identical input data; and determining, based on the comparing of the behaviors, a likelihood that an agent-sensitive security threat is operating in the compute environment.

17. The computer program product of claim 11, wherein: the compute resource is associated with a virtual machine executing on a processor that includes a plurality of processor cores; and the process further comprises:

gaining control, by the sub-kernel component, of one or more processor cores of the plurality of processor cores; and dedicating, by the sub-kernel component, the one or more processor cores to be used exclusively for operation of the sub-kernel component by assigning non-operational busywork to fill any extra bandwidth that the one or more processor cores have beyond the operation of the sub-kernel component.

18. A method comprising:

receiving, by a data platform configured to perform security monitoring of a compute environment, a live state snapshot of a compute resource within the compute environment, wherein the live state snapshot is live captured by a sub-kernel component of a data collection system communicatively coupled to the data platform, and wherein the live capture of the live state snapshot is performed by updating a master state snapshot with one or more delta state snapshots to avoid detectable disruption to the compute resource during the live capture, wherein the master state snapshot comprises an entire state of the compute resource captured at a first capture time and a delta state snapshot comprises changes to the compute resource captured at a second capture time occurring after the second capture time;

determining, by the data platform and based on the live state snapshot, event data that represents one or more events occurring with respect to the compute resource; and using, by the data platform, the event data to perform the security monitoring of the compute environment.

19. The method of claim 18, further comprising:

constructing, by the data platform and based on the live state snapshot, a mirror instance of the compute resource hosted on an additional compute resource associated with the data platform;

wherein the determining of the event data based on the live state snapshot is performed by analyzing the mirror instance of the compute resource.

20. The method of claim 18, wherein the using of the event data to perform the security monitoring includes:

constructing a graph based on the event data, the graph comprising a plurality of nodes connected by a plurality of edges, wherein each node of the plurality of nodes represents a logical entity and each edge of the plurality of edges represents a behavioral relationship between nodes connected by the edge; and identifying, based on the graph, a security threat associated with the compute resource within the compute environment.

* * * * *